(12) United States Patent
Hirasawa

(10) Patent No.: US 7,441,124 B2
(45) Date of Patent: Oct. 21, 2008

(54) RECORDING APPARATUS AND METHOD

(75) Inventor: Tsutomu Hirasawa, Saitama (JP)

(73) Assignee: Sony Corporation, Tokyo (JP)

( * ) Notice: Subject to any disclaimer, the term of this patent is extended or adjusted under 35 U.S.C. 154(b) by 717 days.

(21) Appl. No.: 10/380,738

(22) PCT Filed: Jul. 4, 2002

(86) PCT No.: PCT/JP02/06799

§ 371 (c)(1),
(2), (4) Date: Aug. 18, 2003

(87) PCT Pub. No.: WO03/009141

PCT Pub. Date: Jan. 30, 2003

(65) Prior Publication Data

US 2004/0068605 A1    Apr. 8, 2004

(30) Foreign Application Priority Data

Jul. 18, 2001    (JP)    ............................. 2001-217589

(51) Int. Cl.
*G06F 11/30* (2006.01)
*H04N 7/167* (2006.01)
(52) U.S. Cl. .................. 713/189; 713/193; 380/201
(58) Field of Classification Search ................ 713/189, 713/193, 194; 705/50–52, 57, 59; 380/200, 380/201; 726/26–28; 711/115, 100, 101; 707/1
See application file for complete search history.

(56) References Cited

U.S. PATENT DOCUMENTS 5,408,633 A * 4/1995 Katsumura et al. .......... 711/115
5,729,741 A * 3/1998 Liaguno et al. .......... 707/104.1
5,870,756 A * 2/1999 Nakata et al. ............... 707/200

(Continued)

FOREIGN PATENT DOCUMENTS

EP    1 045 386 A1    10/2000

(Continued)

OTHER PUBLICATIONS

"Tokushu Hard Disc Kosaijutsu," ASCII, Sep. 1, 1992, vol. 16, No. 9, pp. 165-180.

(Continued)

*Primary Examiner*—Kee M. Tung
*Assistant Examiner*—Joni Hsu
(74) *Attorney, Agent, or Firm*—Wolf, Greenfield & Sacks, P.C.

(57) ABSTRACT

The present invention relates, for example, to a recording apparatus and method suitable for use in temporarily storing data recorded to a detachable recording medium. In step S501, a directory, recorded to an MS, to be stored is searched, and its capacity is calculated and displayed on a display screen. In step S502, a user operation is accepted to select the directory to be stored. In step S503, all files that belong to the selected directory to be stored are retrieved, and recorded to an HDD as one archive file. In step S504, the original object directory and a file name of the archive file are stored in a matching relationship with each other into the recorded archive file. In step S505, the directory which has been stored in the HDD is deleted from the MS. The present invention is suitably applied, for example, to an audio data server.

20 Claims, 94 Drawing Sheets

U.S. PATENT DOCUMENTS

| | | | |
|---|---|---|---|
| 6,064,880 A | 5/2000 | Alanara | |
| 6,735,699 B1 * | 5/2004 | Sasaki et al. | 726/28 |
| 6,868,494 B1 * | 3/2005 | Shitara et al. | 713/189 |
| 6,987,927 B1 * | 1/2006 | Battaglia et al. | 386/117 |
| 7,058,681 B1 * | 6/2006 | Uno et al. | 709/203 |
| 7,124,094 B1 * | 10/2006 | Kobayashi et al. | 705/26 |
| 2001/0037378 A1 * | 11/2001 | Hirayama | 709/219 |

FOREIGN PATENT DOCUMENTS

| | | |
|---|---|---|
| JP | 2000-261584 A | 9/2000 |
| JP | 2000261584 | 9/2000 |
| JP | 2001-84165 A | 3/2001 |
| JP | 2001084165 | 3/2001 |
| JP | 2001-101796 A | 4/2001 |
| JP | 2001101796 | 4/2001 |

OTHER PUBLICATIONS

Akio Harada, "Tokushu hard disc kosaijutsu," ASCII, Asuki Shuppan, Tokyo, Japan, vol. 16, No. 9, Sep. 1, 1992, pp. 165-180.

* cited by examiner

BASIC OBJECT TYPE 1

BASIC OBJECT TYPE 2

F I G. 2 9
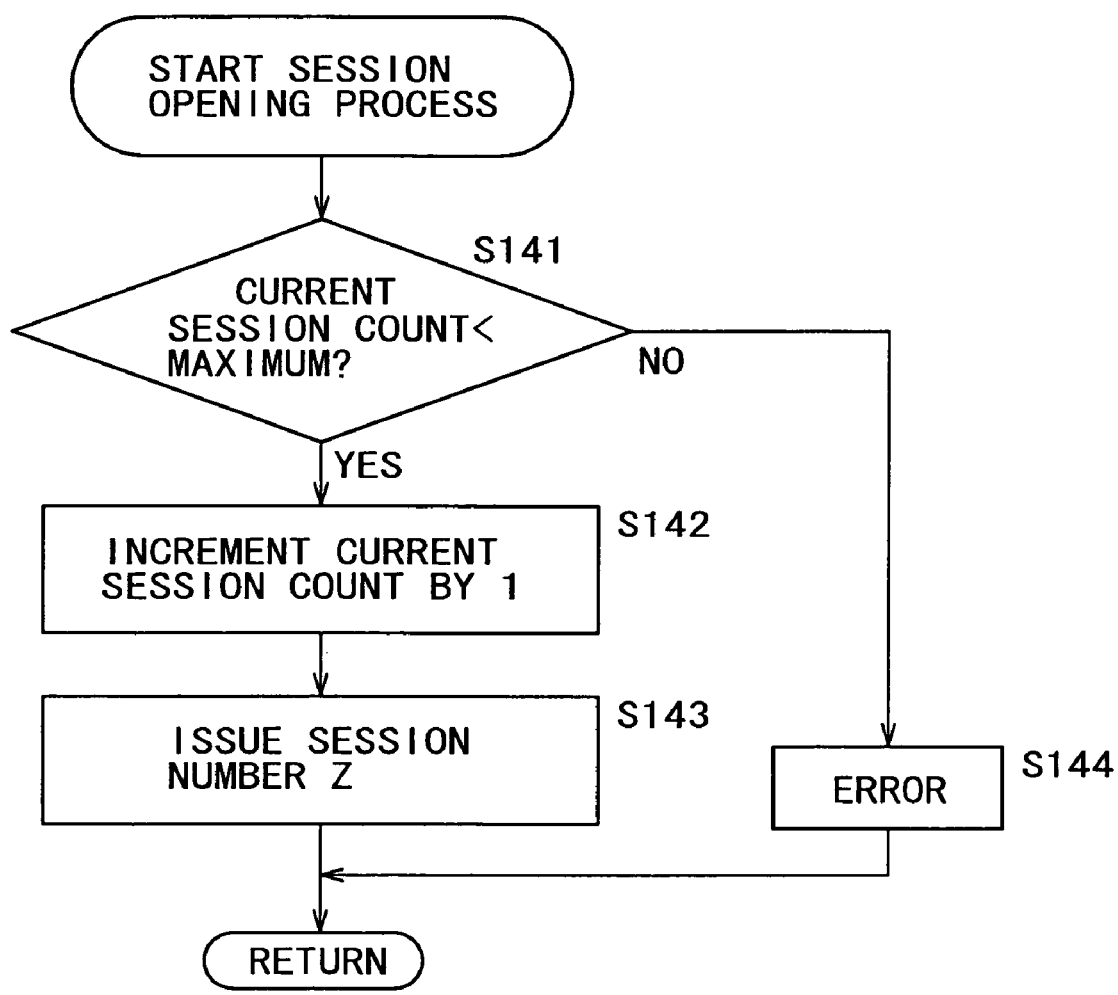

F I G. 3 7
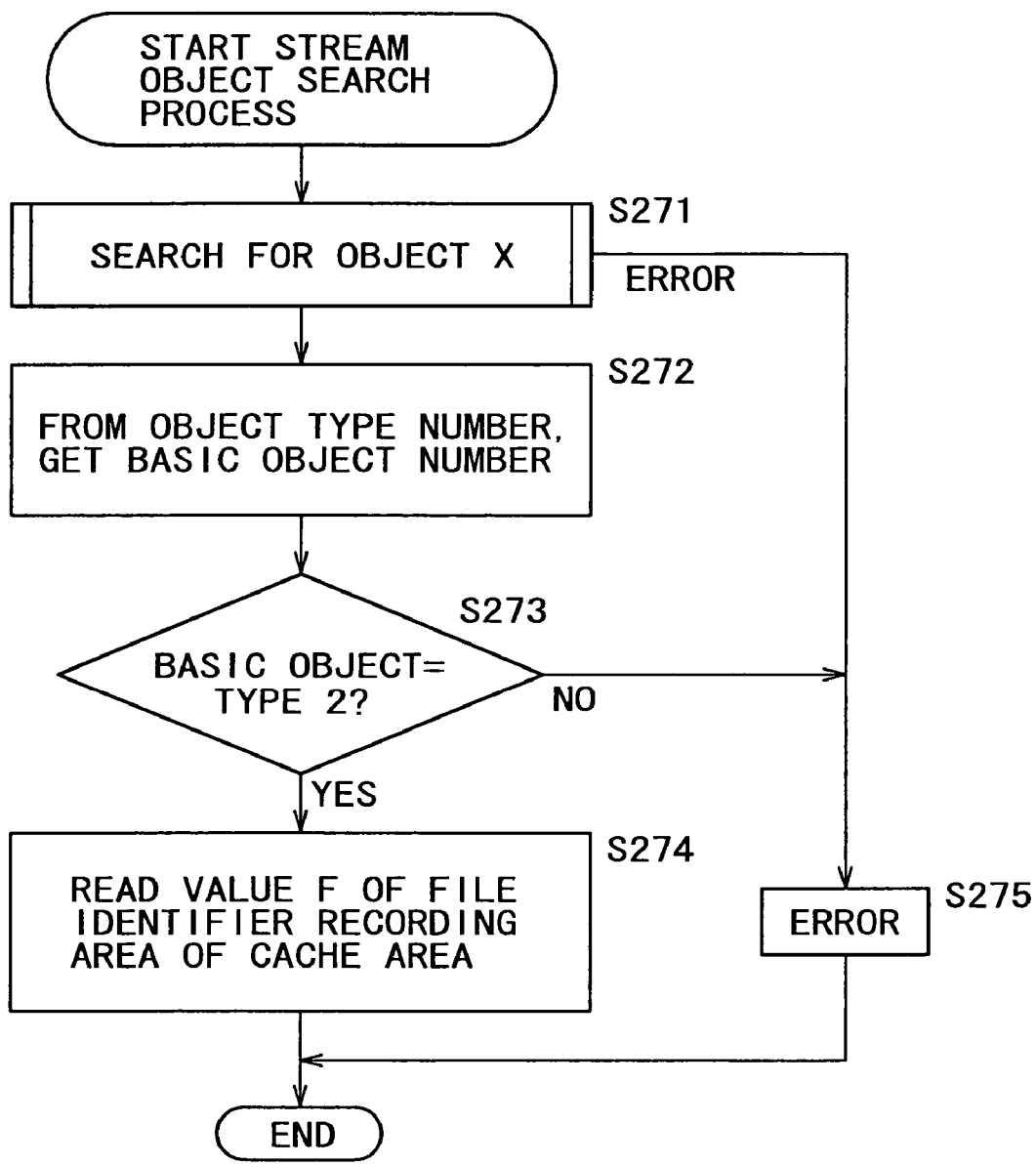

F I G. 3 9

| FOLDER LIST OBJECT FORMAT | | |
|---|---|---|
| NAME | SIZE | MEANING |
| OID | 4 BYTES | ID OF THIS OBJECT |
| MAX | 4 BYTES | MAX. NUMBER OF FOLDERS (=100) |
| N | 4 BYTES | CURRENT NUMBER OF FOLDERS |
| Folder (1-100) | 4*100 (400) BYTES | MATRIX OF IDs OF FOLDER OBJECTS |
| Reserve | 612 BYTES | |

FIG. 40

FOLDER OBJECT FORMAT

| NAME | SIZE | MEANING |
|---|---|---|
| OID | 4 BYTES | ID OF THIS OBJECT |
| MAX | 4 BYTES | MAX. NUMBER OF FOLDERS (=200) |
| N | 4 BYTES | CURRENT NUMBER OF ALBUMS |
| Album (1-200) | 4*200 (800) BYTES | MATRIX OF IDs OF ALBUM OBJECTS |
| Title | 36 BYTES | FOLDER NAME, CHARACTER CODE |
| Reserve | 176 BYTES | |

FIG. 41

| ALBUM OBJECT FORMAT | | |
|---|---|---|
| NAME | SIZE | MEANING |
| OID | 4 BYTES | ID OF THIS OBJECT |
| MAX | 4 BYTES | MAX. NUMBER OF TRACKS (=400) |
| N | 4 BYTES | NUMBER OF TRACKS IN ALBUM |
| Track(1-400) | 4*400(1600) BYTES | MATRIX OF IDs OF MUSIC OBJECT |
| Title | 516 BYTES | TITLE, CHARACTER CODE |
| Artist | 260 BYTES | ARTIST NAME, CHARACTER CODE |
| CreationData | 8 BYTES | DATE OF CREATION |
| MEDIA KEY | 32 BYTES | MEDIA KEY OF CD |
| Reserve | 1660 BYTES | |

FIG. 42

| \multicolumn{3}{c}{TRACK OBJECT FORMAT} |||
|---|---|---|
| NAME | SIZE | MEANING |
| OID | 4 BYTES | ID OF THIS OBJECT |
| SOID | 4 BYTES | FILE IDENTIFIER OF CONTENT DATA TO BE LINKED |
| Title | 516 BYTES | MUSIC TITLE, CHARACTER CODE |
| Artist | 260 BYTES | ARTIST NAME, CHARACTER CODE |
| Time | 8 BYTES | PLAYBACK TIME |
| LastAccessDate | 8 BYTES | DATE OF LAST ACCESS |
| PC | 4 BYTES | PLAYBACK COUNTER |
| CreationData | 8 BYTES | DATE OF CREATION |
| Reserve | 980 BYTES | RESERVED (FIXED TO 0x00) |
| AC | 12544 BYTES | MUSIC ATTRIBUTE AND PLAYBACK CONTROL INFORMATION |

FIG. 43

| NAME | SIZE | AC | |
|---|---|---|---|
| | | MEANING | |
| Ckey | 8 BYTES | CONTENT KEY | |
| Codec | 1 BYTE | CODEC IDENTIFICATION VALUE | |
| CodecAttr | 1 BYTE | CODEC ATTRIBUTE | |
| LT | 1 BYTE | PLAYBACK LIMITATION INFORMATION | |
| VLD | 1 BYTE | VALIDITY CHECK FLAG | |
| LCMLOGNUM | 1 BYTE | CHECK-OUT DESTINATION COUNT | |
| Reserve | 7 BYTES | | |
| CDI | 16 BYTES | CODEC DEPENDENCY INFORMATION | |
| CID | 20 BYTES | CONTENT SERIAL NUMBER | |
| PBS | 8 BYTES | PLAYBACK PERMISSION START DATE | |
| PBE | 8 BYTES | PLAYBACK PERMISSION END DATE | |
| XCC | 1 BYTE | EXTENDED CC | |
| CT | 1 BYTE | REMAINING PLAYBACK COUNT | |
| CC | 1 BYTE | CONTENT CONTROL | |
| CN | 1 BYTE | REMAINING CHECK-OUT COUNT | |
| SRC | 40 BYTES | SOURCE INFORMATION | |
| LCMLOG | 48*256 BYTES | INFORMATION OF CHECK-OUT DESTINATION | |
| Reserve | 140 BYTES | | |

FIG. 44

| NAME | SIZE | CONTENTS DATA FORMAT MEANING |
|---|---|---|
| AT3H | 16KB | ATARC3 HEADER |
| PRT | 16KB | ATARC3 PART |
| RSV | 32KB | RESERVE |
| AT3SU-1 | 16KB | SOUND UNIT SEQUENCE |
| AT3SU-2 | 16KB | SOUND UNIT SEQUENCE |
| ⋰ | ⋰ | ⋰ |
| ⋰ | ⋰ | ⋰ |
| AT3SU-N | 16KB | SOUND UNIT SEQUENCE |

FIG. 45

| CC OBJECT FORMAT | | |
|---|---|---|
| NAME | SIZE | MEANING |
| OID | 4 BYTES | ID OF THIS CC OBJECT |
| SOID | 4 BYTES | ID OF STREAM OBJECT TO BE LINKED |
| Reserved | 16 BYTES | |

FIG. 46

| CC DATA FORMAT | | |
|---|---|---|
| NAME | SIZE | MEANING |
| CatFolder | 10KB | CatFolder |
| CatAlbum | 200KB | CatAlbum |
| CatTrack | 600KB | CatTrack |

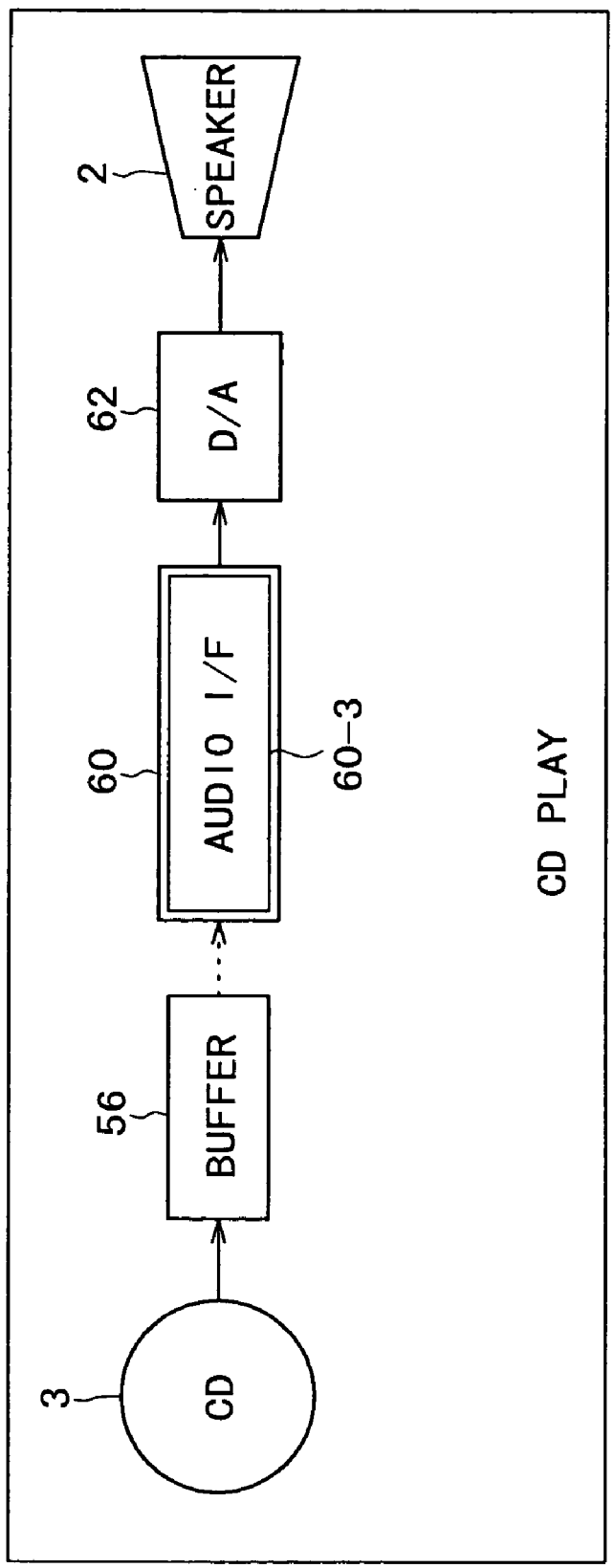

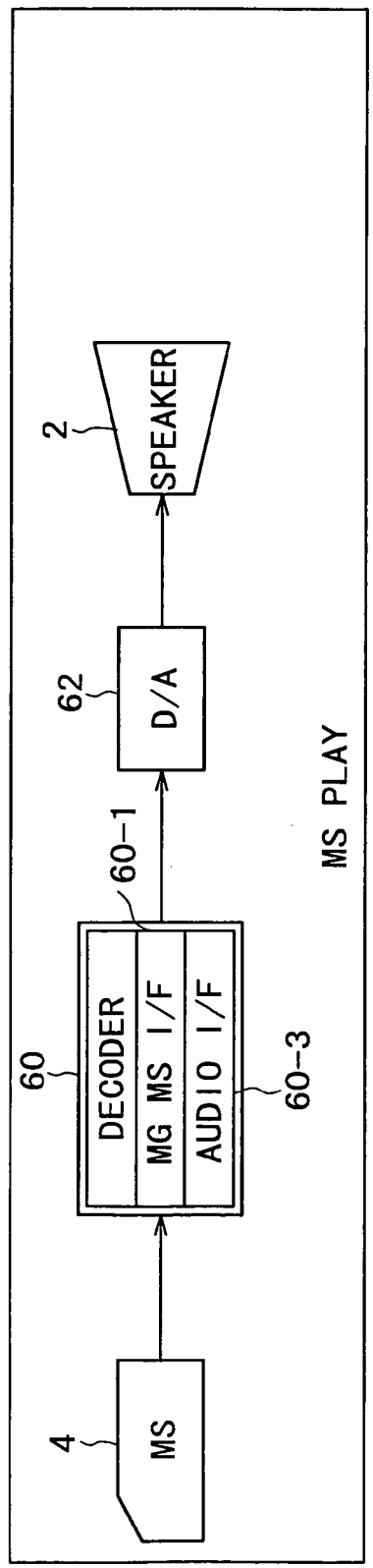
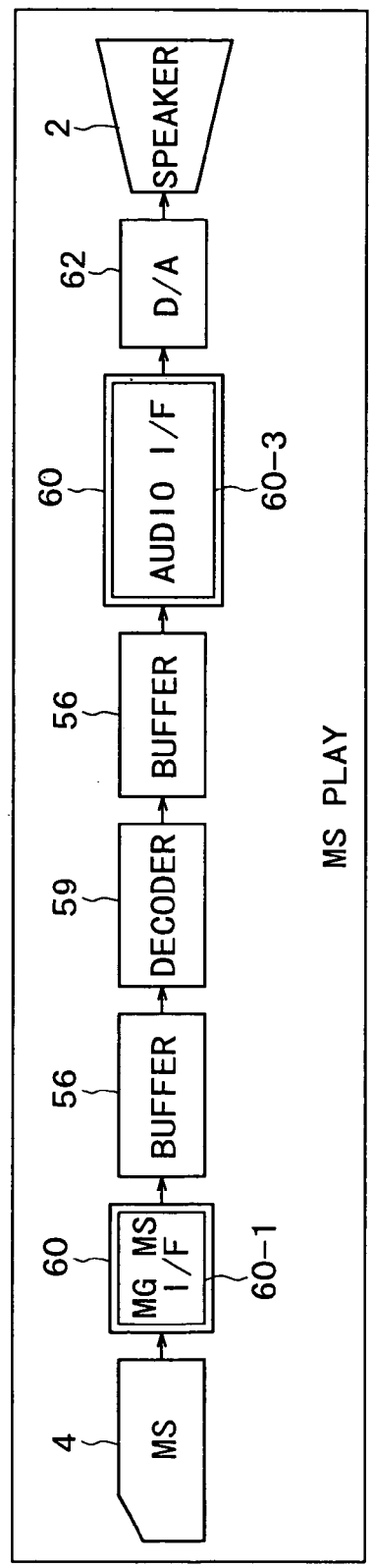

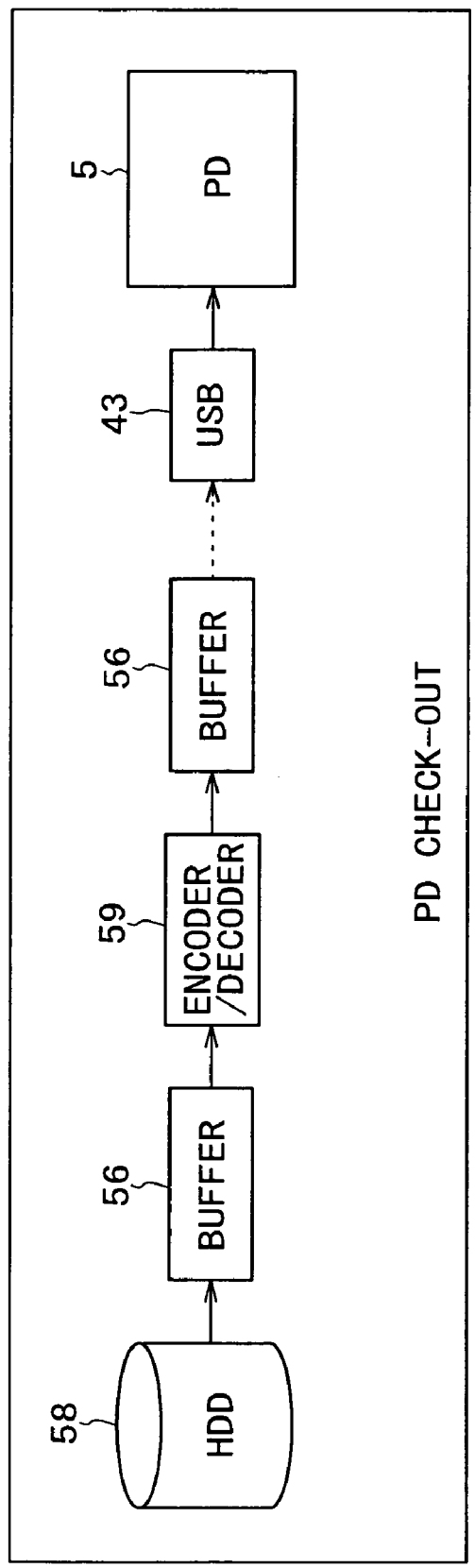
F I G. 5 6

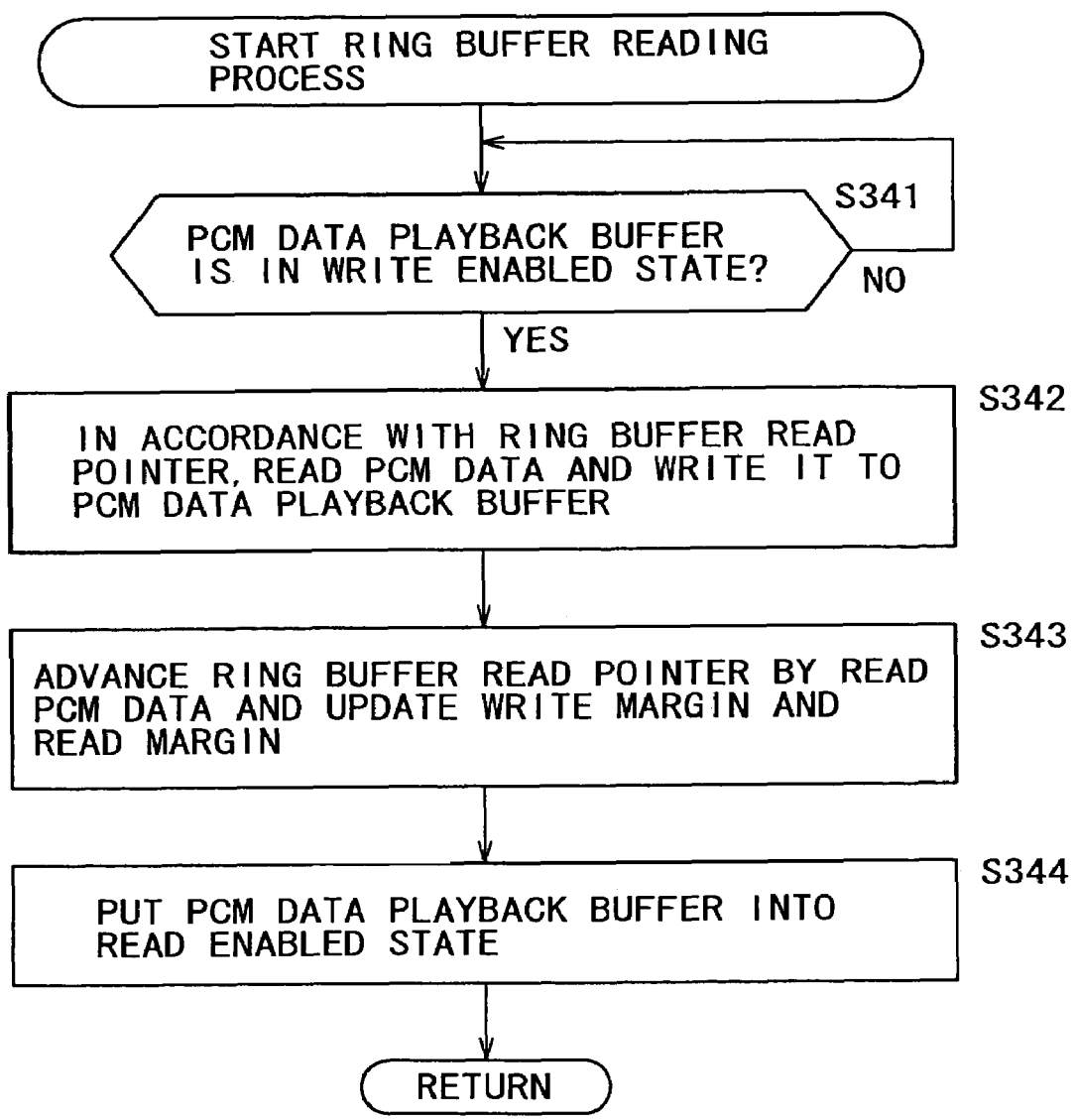

| 261 | 262 |
|---|---|
| CD→HDD | REC SETTING CHECK |
| FOLDER | :Temp — 263 |
| NAME | :The One/CARIAH MAREY — 264 |
| BIT RATE | :132kbps — 265 |
| RECORDING LEVEL | :0 — 266 |
| ▶‖ | :REC START — 267 |

| | FOLDER NUMBER | ALBUM NUMBER | TRACK NUMBER |
|---|---|---|---|
| ENTIRE HDD | F1 | A1 | T1 |
| | | | T2 |
| | | | ... |
| | | A2 | T1 |
| | | | T2 |
| | | | ... |
| | | | |
| | F2 | A1 | T1 |
| | | | T2 |
| | | | ... |
| | | | |
| | | | |
| | Fn | A1 | T1 |
| | | | T2 |
| | | | ... |
| | | | |
| | | Am | T1 |
| | | | T2 |
| | | | ... |

FIG. 73

| FOLDER NUMBER | ALBUM NUMBER | TRACK NUMBER |
|---|---|---|
| F1 | A1 | T1 |
| | | T2 |
| | | ... |
| | A2 | T1 |
| | | T2 |
| | | ... |
| | | |
| | | |
| | | |
| | Am | T1 |
| | | T2 |
| | | ... |

FIG. 74

| FOLDER NUMBER | ALBUM NUMBER | TRACK NUMBER |
|---|---|---|
| F1 | A1 | T1 |
| F1 | A1 | T2 |
| ⋮ | ⋮ | ⋮ |
| F1 | A1 | Tn |

FIG. 75

| FOLDER NUMBER | ALBUM NUMBER | TRACK NUMBER |
|---|---|---|
| F2 | A1 | T1 |

FIG. 79

| MEDIA | HDD → MS | |
|---|---|---|
| STATE 1 | ● | |
| STATE 2 | ● | ○ |
| STATE 3 | ○ | ○ |
| STATE 4 | ○ | ● |
| STATE 5 | | ○ |

FIG. 80

```
┌─────────────────────────────────────┐
│ ▣        ⊚ IMPRESSIONS              │
├─────────────────────────────────────┤
│ ▶♪ 001 KENKAOYAME          ■ 04:34  │
│  ♪ 004 ASUNOWATASHI/TAKE   ■ 04:54  │
│  ♪ 006 MAERSEY BEA         ■ 03:22  │
│  ♪ 007 Forever F           ■ 04:24  │
├─────────────────────────────────────┤
│ ⊘  MOVE OUT                  ♪ 000  │
└─────────────────────────────────────┘
```

FIG. 81

```
┌─────────────────────────────────────┐
│ ▣           MOVE OUT LIST           │
├─────────────────────────────────────┤
│ ∨ ♪ 004 ROKUNAMONJANE/NAGA          │
│ ∨ ♪ 010 OnoricoFlow                 │
│ ▶♪ 012 WHEN YOU VELIE               │
├─────────────────────────────────────┤
│    MOVE OUT              ♪ 002/003  │
└─────────────────────────────────────┘
```

292 — points to line with 004 ROKUNAMONJANE/NAGA
291 — points to MOVE OUT label
293 — points to 002/003

FIG. 83

| MEDIA | HDD ← | MS |
|---|---|---|
| STATE 11 |  | ● |
| STATE 12 | ○ | ● |
| STATE 13 | ○ | ○ |
| STATE 14 | ● | ○ |
| STATE 15 | ● |  |

FIG. 84

| | ⊙ MEMORY STICK | |
|---|---|---|
| ▶♪ 001 | SWEETHEA | ■ 04:23 |
| ♪ 004 | MY ALL/M | ■ 04:52 |
| ♪ 006 | ALWAYS B | ■ 04:19 |
| ♪ 007 | ONE SWEE | ■ 04:42 |
| 🔍 MOVE IN | | ♪ 000 |

FIG. 85

| | MOVE IN LIST | |
|---|---|---|
| 302 — ˅♪ 001 | SWEETHEART/Mar | |
| ˅♪ 006 | ALWAYS BE MY B | |
| ▶♪ 007 | ONE SWEET DAY/ | |
| 301 — MOVE IN | | ♪ 002/003 |
| | | 303 |

FIG. 95

| | NOW CHECK IN | |
|---|---|---|
| 381 | | 382 |
| 383 → | ✗ ♪ 001 Forever Friend | |
| 384 → | ✓ ♪ 002 KOINOARASHI/TAKEUCHI MARIA | |
| 385 → | ▶ ♪ 003 Please Again/TAKE | |
| | ♪ 004 FANTASY/Mraih | |
| | SKIP NO 001 ♪ 002/020 | |

FIG. 96

| | NOW CHECK OUT | |
|---|---|---|
| 391 | | 392 |
| | ✓ ♪ 001 KENKAOYAMETE/TAKEUCHI | |
| | ✓ ♪ 002 KOINOARASHI/TAKEUCHI MARIA | |
| | ✗ ♪ 003 MAERSEY BEAT DE/TAKE | |
| | ▶ ♪ 004 FANTASY/Mraih | |
| | SKIP NO 003 ♪ 003/015 | |

FIG. 97

| | CHECK OUT |
|---|---|
| | ✓ ♪ 012 JUNAI RHAPSODY/TAKEUCHI |
| | ✓ ♪ 013 LINDA/TAKEUCHI MARIA |
| | ✗ ♪ 014 UCHINIKAERO/TAKEUCHI MARIA |
| | ✓ ♪ 015 EKI/TAKEUCHI MARIA |
| 401 → | COMPLETE! ♪ 013/015 |

FIG. 99

| DIRECTORY (FILE NAME) | USE |
|---|---|
| MEMSTICK.ind | FILE INDICATIVE THAT THIS RECORDING MEDIUM IS MEMORY STICK |
| DCIM | DIRECTORY FOR STORING STILL PICTURE FILES |
| VOICE | DIRECTORY FOR STORING VOICE FILES |
| HIFI | DIRECTORY FOR STORING AUDIO FILES |
| CONTROL | DIRECTORY FOR STORING CONTROL INFORMATION FILES |
| TEL | DIRECTORY FOR STORING TELEPHONE AND FACSIMILE INFORMATION FILES |
| OPEN-R | DIRECTORY FOR STORING ENTERTAINMENT ROBOT INFORMATION FILES |
| POSITION | DIRECTORY FOR STORING POSITION INFORMATION FILES |
| PALM | DIRECTORY FOR STORING Palm OS DATA FILES |
| MP3 | DIRECTORY FOR STORING MP3 FILES |
| MSXXXXXX | DIRECTORY FOR STORING VENDOR-UNIQUE INFORMATION FILES |

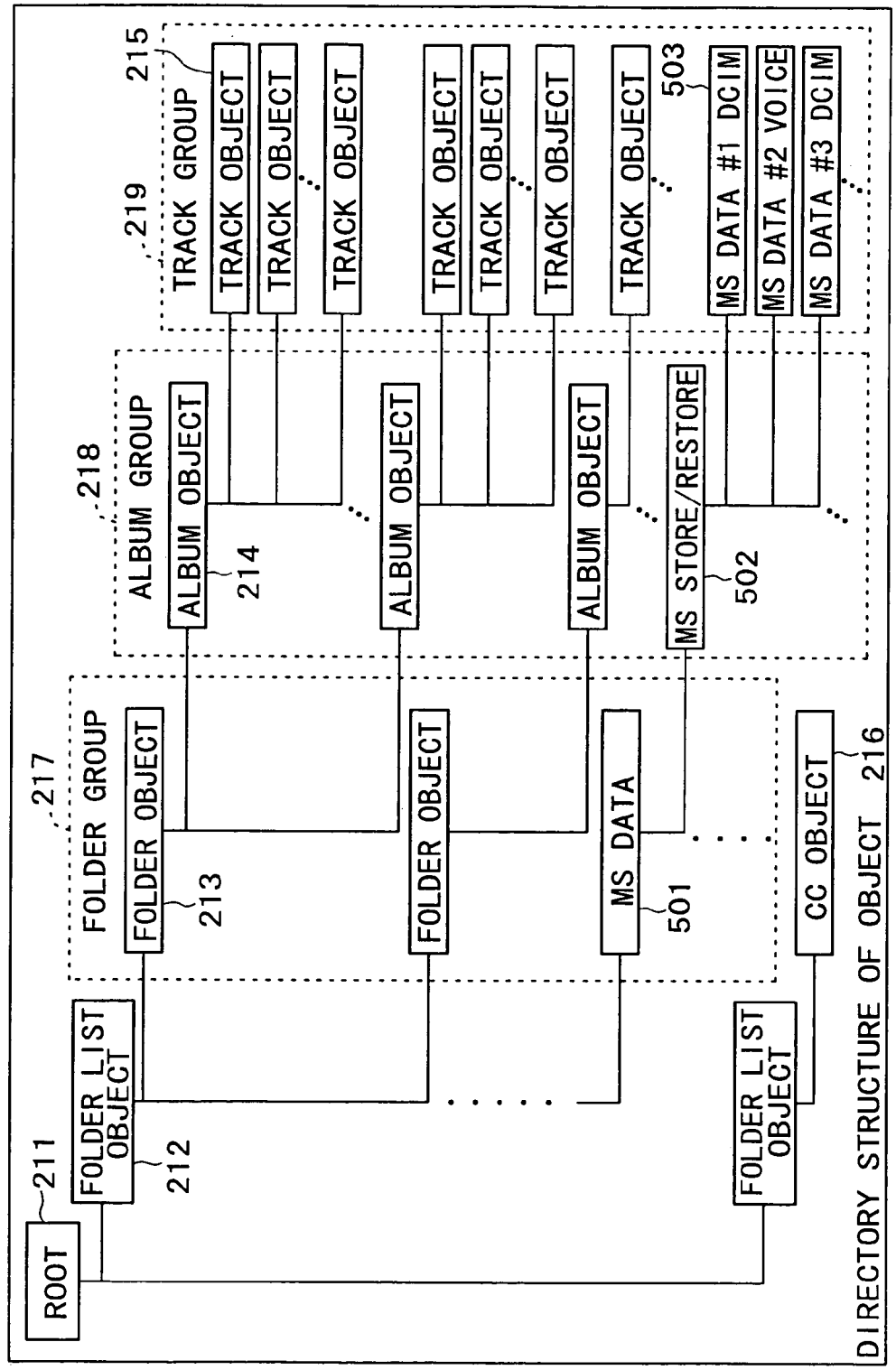

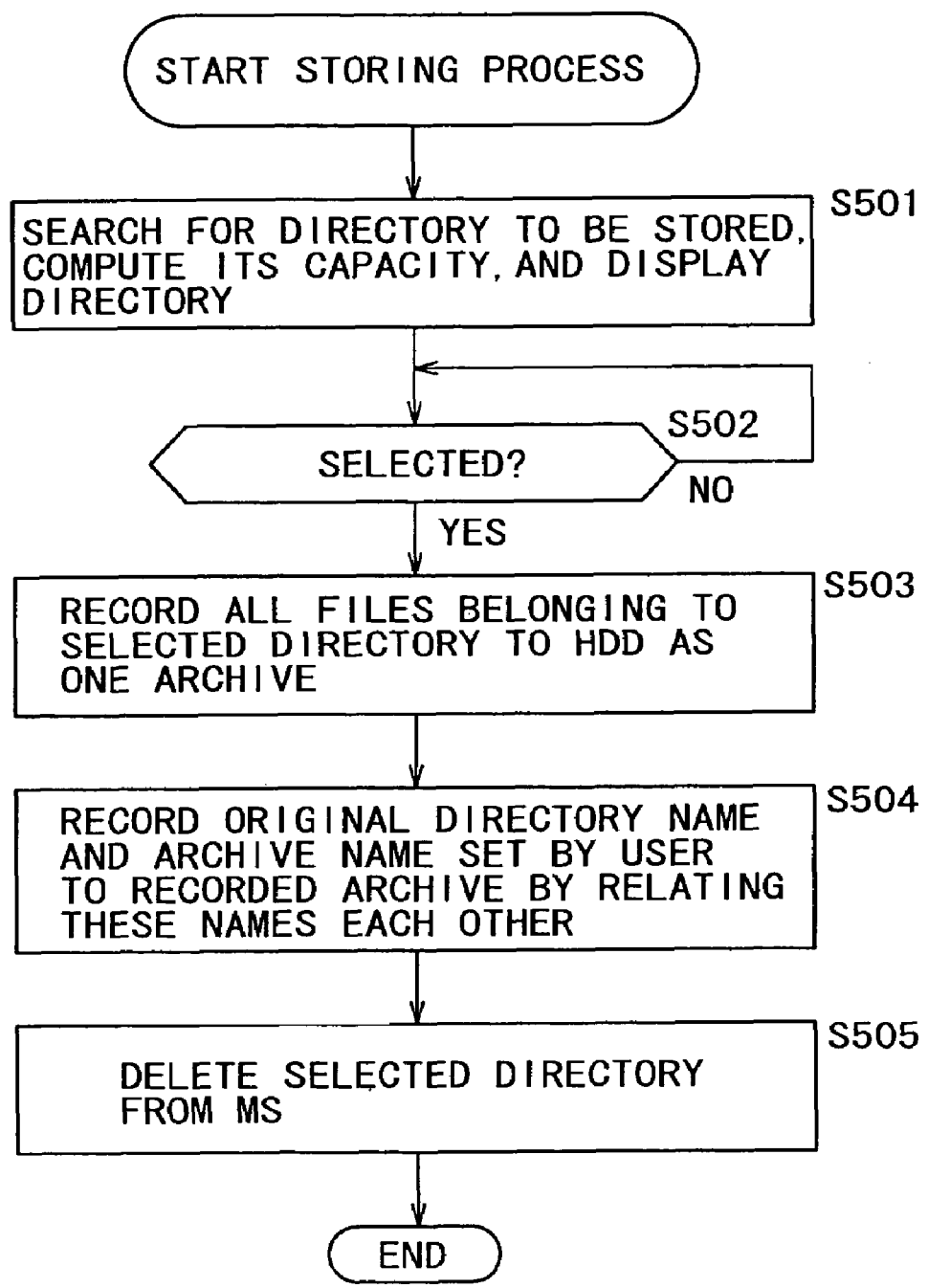

RECORDING APPARATUS AND METHOD

TECHNICAL FIELD

The present invention relates to a recording apparatus and method and, more particularly, to a recording apparatus and method suitable for use in temporarily storing data recorded to a detachable recording medium.

BACKGROUND ART

For example, some of the portable devices (hereafter referred to as PDs) such as the Network Walkman (trademark), digital still cameras, digital video cameras, IC recorders, personal computers, and other electronic equipment may use detachable semiconductor memories such as the Memory Stick (hereafter referred to as MS).

One MS may be shared by some of the above-mentioned electronic devices of different types as long as its storage capacity allows. For example, one MS may be loaded in a digital still camera and, after recording image data into it, this MS may be loaded on an IC recorder to record audio data or loaded on a personal computer to record given data.

However, if one MS is shared between a plurality of electronic devices as mentioned above, the storage capacity of the MS may run short because it already stores data recorded by another device. If this happens, the data recorded by another device may be temporarily moved to another recording medium (for example, the MS may be loaded on a personal computer and the data stored in the MS may be moved to the hard disk drive of the personal computer).

This requires time and labor for the user in selecting, by using a personal computer, the data to be temporarily moved from the MS to another recording medium. It is also troublesome for the user to restore the data temporarily moved to another recording medium back to the MS.

DISCLOSURE OF INVENTION

It is therefore an object of the present invention to automate the processing of temporarily moving data formatted in a predetermine manner from an MS to another storage medium and the processing of restoring the moved data formatted in a predetermined manner from that storage medium to the MS.

The first recording apparatus according to the present invention is characterized in that it includes:

acceptance means for accepting a user operation;

search means for searching the first storage medium for a data file which is different in format from the content data;

read means for reading the data file retrieved by the search means from the first information storage medium;

storage means for storing, as an archive file, the data file read by the read means into a second storage medium which is incorporated in the recording apparatus;

deletion means for deleting the data file from the first storage medium; and control means for controlling, in response to the user operation accepted by the acceptance means, the search means, the read means, the storage means, and the deletion means.

The search means may search for the data file which belongs to a predetermined directory in the first information storage medium as the data file which is different in format from the content data.

The first recording apparatus according to the present invention may further include decode means for decoding the content data, and the search means may search for the data file which cannot be decoded by the decode means.

The search means may search for the data file not attached with copyright information as the data file which is different in format from the content data.

The storage means may store, as one archive file, a plurality of the data files formatted in a same way read by the read means into the second information storage which is incorporated in the recording apparatus.

The first recording method according to the present invention is characterized in that it includes:

an acceptance step for accepting a user operation;

a search step for searching the first storage medium for a data file which is different in format from the content data;

a read step for reading the data file retrieved by the process of the search step from the first information storage medium;

a storage step for storing, as an archive file, the data file read by the process of the read step into a second storage medium which is incorporated in the recording apparatus;

a deletion step for deleting the data file from the first storage medium; and a control step for controlling, in response to the user operation accepted by the process of the acceptance step, a process of the search step, a process of the read step, a process of the storage step, and a process of the deletion step.

The first program stored in the storage medium according to the present invention is characterized in that it includes:

an acceptance step for accepting a user operation;

a search step for searching the first storage medium for a data file which is different in format from the content data;

a read step for reading the data file retrieved by the process of the search step from the first information storage medium;

a storage step for storing, as an archive file, the data file read by the process of the read step into an incorporated second storage medium;

a deletion step for deleting the data file from the first storage medium; and a control step for controlling, in response to the user operation accepted by the process of the acceptance step, a process of the search step, a process of the read step, a process of the storage step, and a process of the deletion step.

The first program according to the present invention is characterized in that it causes a computer to execute:

an acceptance step for accepting a user operation;

a search step for searching the first storage medium for a data file which is different in format from the content data;

a read step for reading the data file retrieved by the process of the search step from the first information storage medium;

a storage step for storing, as an archive file, the data file read by the process of the read step into an incorporated second storage medium;

a deletion step for deleting the data file from the first storage medium; and a control step for controlling, in response to the user operation accepted by the process of the acceptance step, a process of the search step, a process of the read step, a process of the storage step, and a process of the deletion step.

The second recording apparatus according to the present invention is characterized in that it includes:

acceptance means for accepting a user operation;

search means for searching the first storage medium for a data file which is different in format from the content data;

read means for reading the data file retrieved by the search means from the first information storage medium;

storage means for storing, as an archive file, the data file read by the read means into a second storage medium which is incorporated in the recording apparatus;

deletion means for deleting the data file from the first storage medium; and control means for controlling, in response to the user operation accepted by the acceptance means, the search means, the read means, the storage means, and the deletion means.

The search means may search for the data file which belongs to a predetermined directory in the first information storage medium as the data file which is different in format from the content data.

The second recording apparatus according to the present invention may further include decode means for decoding the content data, and the search means may search for the data file which cannot be decoded by the decode means.

The search means may search for the data file not attached with copyright information as the data file which is different in format from the content data.

The storage means may store, as one archive file, a plurality of the data files formatted in a same way read by the read means into the second information storage medium which is incorporated in the recording apparatus.

The third recording apparatus according to the present invention is characterized in that it includes:

acceptance means for accepting a user operation;

search means for searching a second information storage medium which is incorporated in the recording apparatus for an archive file;

read means for reading the archive file retrieved by the search means from the second information storage medium;

restoration means for restoring a data file into the first information storage medium on the basis of the archive file read by the read means;

deletion means for deleting the archive file stored in the second information storage means; and control means for controlling, in response to the user operation accepted by the acceptance means, the search means, the read means, the restoration means, and the deletion means.

The search means may search for the archive file which belongs to a predetermined directory in the second information storage medium.

The third recording apparatus may further include decode means for decoding the content data, and the search means may search for the archive file which cannot be decoded by the decode means.

The search means may search for the archive file not attached with copyright information.

The third recording method according to the present invention is characterized in that it includes:

an acceptance step for accepting a user operation;

a search step for searching a second information storage medium which is incorporated in the recording apparatus for an archive file;

a read step for reading the archive file retrieved by the process of the search step from the second information storage medium;

a restoration step for restoring a data file into the first information storage medium on the basis of the archive file read by the process of the read step;

a deletion step for deleting the archive file stored in the second information storage medium; and a control step for controlling, in response to the user operation accepted by the process of the acceptance step, a process of the search step, a process of the read step, a process of the restoration step, and a process of the deletion step.

The third program according to the present invention is characterized in that it causes a computer to execute:

an acceptance step for accepting a user operation;

a search step for searching an incorporated second information storage medium for an archive file;

a read step for reading the archive file retrieved by the process of the search step from the second information storage medium;

a restoration step for restoring a data file into the first information storage medium on the basis of the archive file read by the process of the read step;

a deletion step for deleting the archive file stored in the second information storage medium; and a control step for controlling, in response to the user operation accepted by the process of the acceptance step, a process of the search step, a process of the read step, a process of the restoration step, and a process of the deletion step.

The forth recording apparatus according to the present invention is characterized in that it includes:

acceptance means for accepting a user operation;

search means for searching a second storage medium which is incorporated in the recording apparatus for an archive file;

read means for reading the archive file retrieved by the search means from the second information storage medium;

restoration means for restoring a data file into the first information storage medium on the basis of the archive file read by the read means;

deletion means for deleting the archive file stored in the second information storage medium; and control means for controlling, in response to the user operation accepted by the acceptance means, the search means, the read means, the restoration means, and the deletion means.

The search means may search for the archive file which belongs to a predetermined directory in the second information storage medium.

The forth recording apparatus according to the present invention may further include a decode means for decoding the content data, and the search means may search for the archive file which cannot be decoded by the decode means.

The search means may search for the archive file not attached with copyright information.

The fifth recording apparatus according to the present invention is characterized in that it includes:

a search block for searching an external information storage medium for particular data which are a particular attribute;

a read block for reading the particular data retrieved by the search block;

a storage controller for storing the particular data read by the read block into an internal information storage medium;

a deletion controller for deleting the particular data stored in the external information storage medium; and a controller for automatically performing control such that, in response to a user instruction, the search block searches the external information storage medium for particular data, the read block reads the retrieved particular data, the storage controller records the particular data to the internal information storage medium, and the deletion controller deletes the particular data from the external storage medium.

The search block may search the external information storage medium for particular data managed by a particular directory.

The search block may further search the external information storage medium for particular data of which copyright is not managed.

The fifth recording apparatus according to the present invention may further include a decoder for decoding particular data, and the search block may search for particular data which cannot be decoded by the decoder.

A sixth recording apparatus according to the present invention is characterized in that it includes:

a search block for searching an internal information storage medium for particular data which are a particular attribute;

a read block for reading the particular data retrieved by the search block;

a storage controller for storing the particular data read by the read block into an external information storage medium;

a deletion controller for deleting the particular data stored in the internal information storage medium; and a controller for automatically performing control such that, in response to a user instruction, the search block searches the internal information storage medium for particular data, the read block reads the retrieved particular data, the storage controller records the particular data to the external information storage medium, and the deletion controller deletes the particular data from the internal storage medium.

The search block may search the external information storage medium for particular data managed by a particular directory.

The search block may search the internal information storage medium for particular data of which copyright is not managed.

The sixth recording apparatus according to the present invention may further include a decoder for decoding particular data, and the search block may search for particular data which cannot be decoded.

In the first recording apparatus and method and program according to the present invention, the first information storage medium is searched for a data file formatted in a different manner from that of content data in response to a user operation, the retrieved data file is read from the first information storage medium, the read data file is stored in the incorporated second information storage medium as an archive file, and the data file stored in the first information storage medium is deleted.

In the second recording apparatus according to the present invention, the first information storage medium is searched for a data file formatted in a different manner from that of content data, the retrieved data file is read from the first information storage medium, the read data file is stored in the incorporated second information storage medium as an archive file, and the data file stored in the first information storage medium is deleted.

In the third recording apparatus and method and program according to the present invention, the incorporated second information storage medium is searched for an archive file in response to a user operation, the retrieved archive file is read from the second information storage medium, a data file is restored into the first information storage medium on the basis of the read archive file, and the archive file stored in the second information storage medium is deleted.

In the fourth recording apparatus according to the present invention, the second information storage medium is searched for an archive file in response to a user operation, the retrieved archive file is read from the second information storage medium, and a data file is restored into the first information storage medium on the basis of the read archive file, and the archive file stored in the second information storage medium is deleted.

In the fifth recording apparatus according to the present invention, control is automatically performed such that an external information storage medium is searched for particular data in response to a user instruction, the retrieved particular data are read, the particular data are recorded to an internal information storage medium, and the particular data are deleted from the external information storage medium.

In the sixth recording apparatus according to the present invention, control is automatically performed such that an internal information storage medium is searched for particular data in response to a user instruction, the retrieved particular data are read, the particular data are stored in an external information storage medium, and the particular data are deleted from the internal information storage medium.

BRIEF DESCRIPTION OF DRAWINGS

FIG. 29 is a flowchart describing a session opening process.

FIG. 37 is a flowchart describing a stream object searching process.

FIG. 39 is a diagram illustrating a folder list object format.

FIG. 40 is a diagram illustrating a folder object format.

FIG. 41 is a diagram illustrating an album object format.

FIG. 42 is a diagram illustrating a track object format.

FIG. 43 is a diagram illustrating details of AC of a track object.

FIG. 44 is a diagram illustrating a content data format.

FIG. 45 is a diagram illustrating a CC object format.

FIG. 46 is a diagram illustrating a CC data format.

FIG. 52 is a diagram illustrating a data flow at a time when CD play is executed.

FIG. 53A is a diagram illustrating a data flow at a time when MS play is executed.

FIG. 53B is a diagram illustrating a data flow at a time when MS play is executed.

FIG. 56 is a diagram illustrating a data flow at a time when a PD check-out is executed.

FIG. 69 is a flowchart describing a ring buffer reading process.

FIG. 70A is a diagram illustrating an exemplary display on a display 15 at a time when music to be recorded is set.

FIG. 70B is a diagram illustrating an exemplary display on the display 15 when recording is on.

FIG. 72 is a diagram illustrating an exemplary play list.

FIG. 73 is a diagram illustrating another exemplary play list.

FIG. 74 is a diagram illustrating still another exemplary play list.

FIG. 75 is a diagram illustrating yet another exemplary play list.

FIG. 79 is a diagram illustrating a move-out processing state transition.

FIG. 80 is a diagram illustrating an exemplary display on the display 15 at the time of a move-out process.

FIG. 81 is a diagram illustrating an exemplary display on the display 15 at the time of a move-out process.

FIG. 83 is a diagram illustrating a move-in process state transition.

FIG. 84 is a diagram illustrating an exemplary display on the display 15 at the time of a move-in process.

FIG. 85 is a diagram illustrating another exemplary display on the display 15 at the time of a move-in process.

FIG. 95 is a diagram illustrating an exemplary display on the display 15 at the time of an exchanging process.

FIG. 96 is a diagram illustrating another exemplary display on the display 15 at the time of an exchanging process.

FIG. 97 is a diagram illustrating still another exemplary display on the display 15 at the time of an exchanging process.

FIG. 99 is a diagram illustrating the types of directories and files recorded on an MS 4.

FIG. 100 is a diagram illustrating archive file recording positions.

FIG. 101 is a flowchart describing storing process.

BEST MODE FOR CARRYING OUT THE INVENTION

Figure 1:
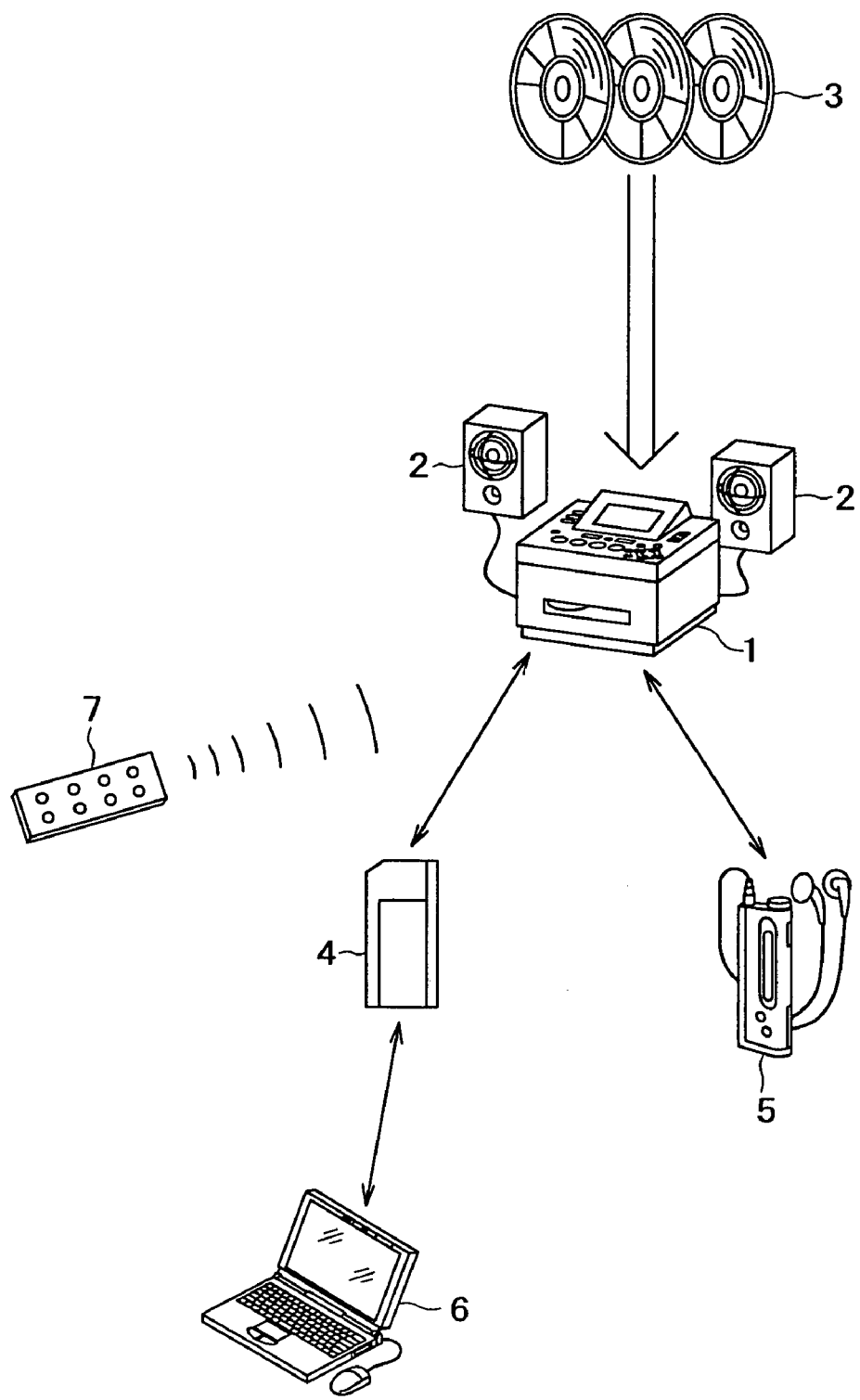
FIG. 1 is a schematic diagram illustrating an overview of an audio server 1 practiced as one embodiment of the invention.

Now, with reference to FIG. 1, an audio server practiced as one embodiment of the invention will be outlined below. An audio server 1 reads PCM (Pulse Code Modulation) data from a music CD 3, encodes the PCM data based on the ATRAC (Adaptive Transform Acoustic Coding) 3 technique, records the encoded data to a hard disk drive 58 (FIG. 6), and manages the recorded encoded data by relating them with hierarchical objects such as, from the higher layer, folder list, folder, album, and track.

The folder list can include a plurality of folders at a layer one step below. Each folder can include a plurality of albums at a layer one step below. Each album can include a plurality of tracks at a layer one step below. Each track located at the bottom layer of this hierarchical structure corresponds to the encoded data for one piece of music, one to one.

In what follows, encoded data are also referred to as content data. Each of the folder list, folders, albums, and tracks is also referred to as an object. Each user specifies any of these objects and issues a variety of commands to the specified objects. It should be noted that the details of the hierarchical structure of the objects will be described later with reference to FIG. 38.

The audio server 1 also plays back the music CD 3 or decodes the encoded data recorded to the hard disk drive (hereafter referred to as an HDD) 58 to output obtained audio signals from a speaker 2.

In addition, the audio server 1 records the encoded data recorded to the HDD 58 to a Memory Stick (trademark) (hereafter referred to as an MS 4) compatible with the Magic Gate (trademark) loaded in an MS slot 45 (FIG. 5) or a portable device (hereafter referred to as a PD) 5 such as the Network Walkman (trademark) connected to a connector 43 (FIG. 5) by a check-out or check-in process and, at the same time, records the encoded data recorded to the MS 4 or the PD 5 to the HDD 58 by a check-in or check-out process or an import process.

The Magic Gate is a data copyright protection technology based on two technologies of encrypting data to be recorded to the MS 4 compatible with the Magic Gate and cross-certifying the audio server 1 on which MS 4 is loaded, thereby preventing digital audio data from being copied, played back, and tampered in an unauthorized manner. The Magic Gate is compliant with the SDMI (Secure Digital Music Initiative) standard.

It should be noted that a check-out process, a check-in process, a move-out process, a move-in process, and an import process to be executed between the audio server 1 and the MS 4 or the PD 5 will be described later.

The MS 4 recorded with encoded data is detached from the audio server 1 and loaded, for example, in a personal computer 6, upon which the recorded encoded data are read to be decoded.

The PD 5 recorded with encoded data decodes them and outputs resultant audio signal from a headphone.

A remote controller 7 receives an operation signal from the user and transmits a corresponding control signal to the audio server 1.

Figure 2:
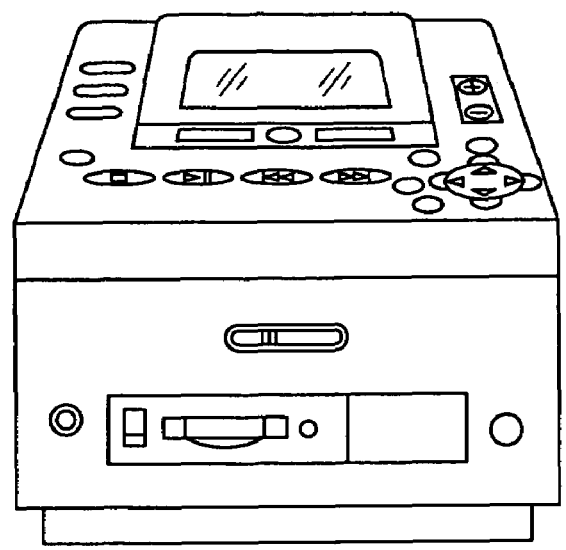
FIG. 2 is an external view of the audio server 1.
Figure 3:
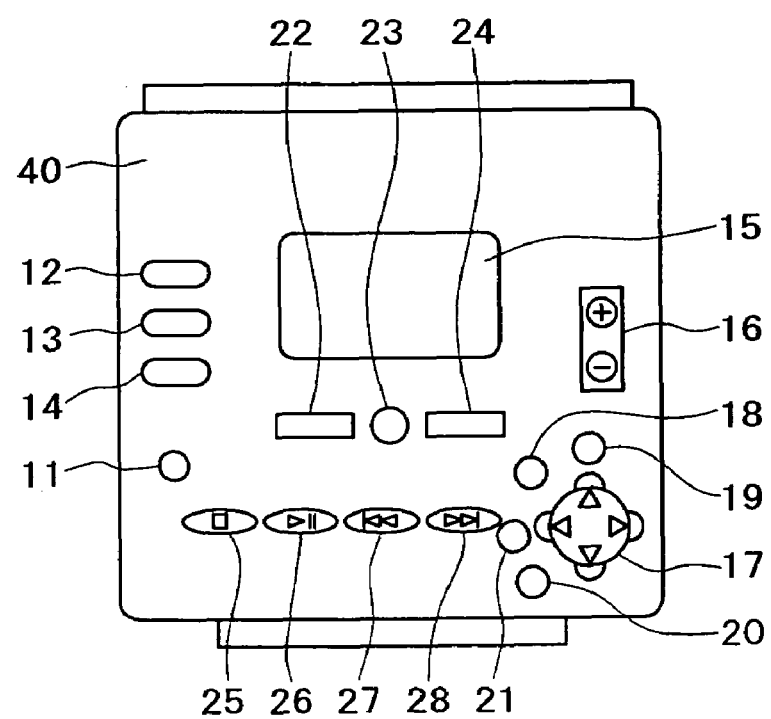
FIG. 3 is a top view of the audio server 1.
Figure 4:
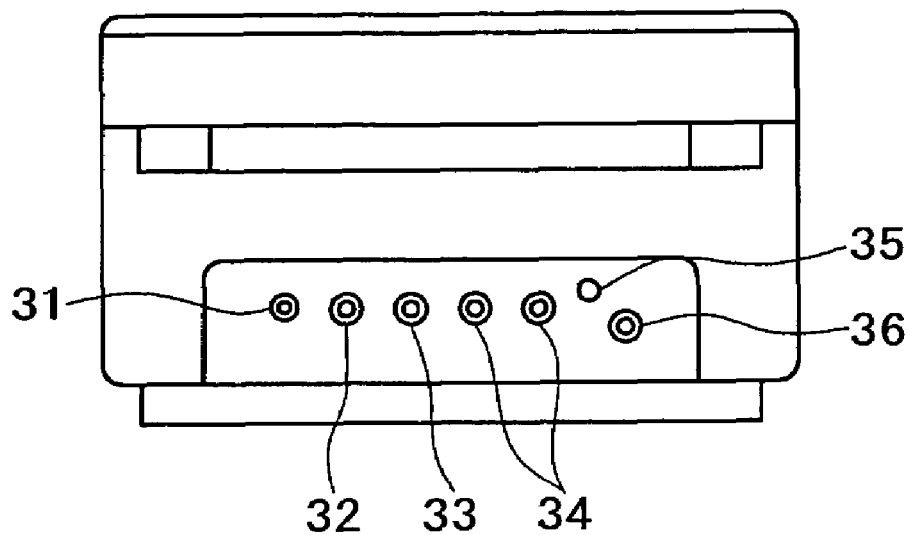
FIG. 4 is a rear view of the audio server 1.
Figure 5:
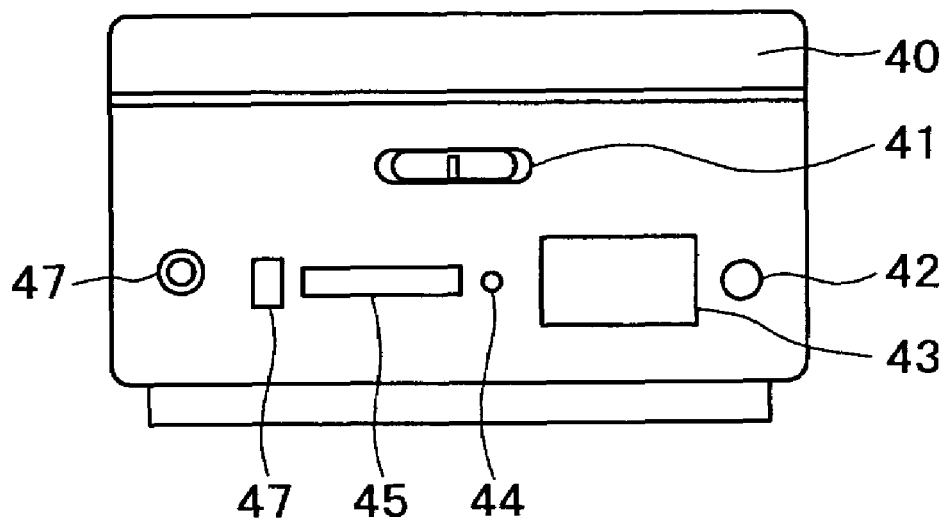
FIG. 5 is an elevational view of the audio server 1.

The following describes an external view of the audio server 1 with reference to FIGS. 2 through 5. FIG. 2 is an elevational view of the audio server 1. FIG. 3 is a top view of the audio server 1. FIG. 4 is a rear view of the audio server 1. FIG. 5 is a top view.

On top of the audio server 1, a cover 40 of a CD tray (not shown) on which a CD is loaded is provided. As shown in FIG. 3, the cover 40 is arranged with buttons such as a power button 11 and a display 15 for displaying various kinds of information. The power (POWER) button 11 is operated to turn on/off the power to the audio server 1. A function (FUNCTION) button 12 is operated to select, as a source, one of the music CD 3, HDD 58, an AUX IN terminal 31, the MS 4, and the PD 5.

A play mode (PLAY MODE) button 13 is operated to switch the playback mode to normal playback in which all tracks included in a playback area are played back each once sequentially, all-music repeat in which all tracks included in the playback area are repetitively sequentially played back, single-music repeat in which only one track is repetitively played back, random repeat in which random selection is performed on all tracks included in the playback area and the selected tracks are repetitively played back at random, or slot machine playback in which an animation indicative of random section of all tracks included in the entire HDD is displayed and the selected tracks are repetitively selected. The playback area will be described later with reference to FIG. 71.

A display (DISPLAY) button 14 is operated to switch between the display contents of the display 15. The display 15, which is constituted by an LCD (Liquid Crystal Display) for example, displays operational situations and information associated with audio data.

A volume (VOLUME) button 16 is operated to increase or decrease the volume to be outputted. A cursor button 17 is operated to move the cursor displayed on the display 15. A select (SELECT) button 18 is operated to select an object displayed on the display 15 or switch between ascending order and descending order in a search operation. An erase (ELASE) button 19 is operated to erase an object such as a track.

An enter (ENTER) button 20 is operated to determine a displayed menu or an object such as a selected track. A menu/cancel (MENU/CANCEL) button 21 is operated to display various operator menus hierarchically arranged or cancel the display. An exchange (EXCHANGE) button 22 is operated to automatically perform check-in process or check-out process on the MS 4 or the PD 5.

A record (RECORD) button 23 is operated to record the audio data in the music CD 3 to the HDD 58 while playing them. A high-speed record (HI SPEED RECORD) button 24 is operated to record the audio data in the music CD 3 to the HDD 58 in a high-speed record mode. It should be noted that, in this high-speed record mode, the audio data to be recorded are audibly outputted from the speaker 2 for example.

A stop button 25 is operated to stop an on-going play or recording operation. A play/pause button 26 is operated to start playback, pause playback, or clear pause of playback. A cue button 27 is operated to cue to a current track or any of preceding tracks or cause rewind and play. A cue button 28 is operated to cue to a next track or cause fast forward and playback.

It should be noted that, although not shown, the remote controller 7 has buttons which are functionally equivalent to the buttons such as the power button 11 disposed on the cover 40.

On the rear side of the audio server 1, the AUX In terminal 31, a Line Out terminal 32, a sub woofer terminal 33, a speaker (L, R) terminal 34, a reset button 35, and a DC In terminal 36 are disposed.

The AUX In terminal 31 can connect the audio server 1 to audio output equipment (not shown) and input the digital audio data or analog sound signal from the connected audio output equipment into the audio server 1. The Line Out terminal 32 can connect the audio server 1 to an amplifier (not shown) for example and output analog sound signals to the connected amplifier. The sub woofer terminal 33 can connect the audio server 1 to a sub woofer (not shown) and output the low frequency component of a reproduced sound signal to the connected sub woofer. The speaker (L, R) terminal 34 can connect the audio server 1 to the speaker 2 and output reproduced sound signals therefrom. The reset button 35 is operated to reset the audio server 1. To the DC In terminal 36, the DC power is supplied from an AC power adaptor (not shown).

On the front of the audio server 1, an open lever 41, a photoreceptor 42, the connector 43, an access light 44, the MS slot 45, an eject lever 46, and a headphone terminal 47 are disposed as shown in FIG. 5. The open lever 41 is slid to open the cover 40. The photoreceptor 42 receives control signals transmitted from the remote controller 7. The connector 43 has a USB (Universal Serial Bus) terminal to which the PD 5, an external HDD, or a keyboard for example may be connected by use of a USB cable.

It should be noted that the connector 43 may have an IEEE 1394 terminal to which the PD 5 for example may be connected by use of an IEEE 1394 cable. Alternatively, a connector compliant with Bluetooth (trademark) or IEEE 802.11b (so-called wireless LAN) may be provided to connect the PD 5 for example in a wireless manner.

The access light 44 blinks when a data read/write operation is being executed on the MS 4 loaded in the MS slot 45 or the PD 5 connected to the connector 43 for example. The MS slot 45 is loaded with the MS 4. The eject lever 46 is operated to eject the MS 4 from the MS slot 45. The headphone 47 is connected to a headphone and output reproduced sound signals therefrom.

Figure 6:
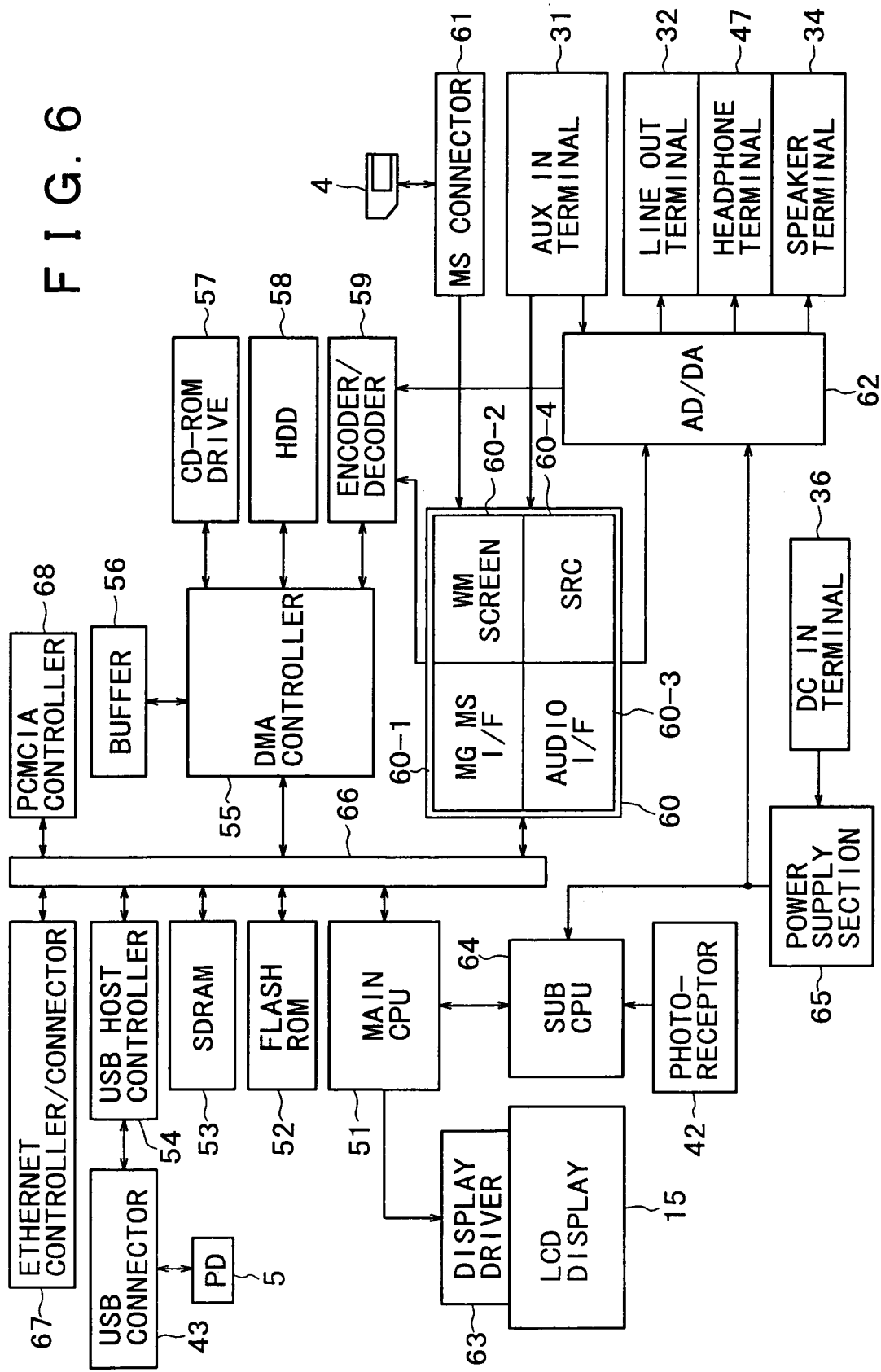
FIG. 6 is a block diagram illustrating an exemplary hardware configuration of the audio server 1.

The following describes an exemplary hardware configuration of the audio server 1 with reference to FIG. 6. The audio server 1 incorporates a main CPU (Central Processing Unit) 51 which controls the audio server 1 in its entirety. The main CPU 51 is connected to a flash ROM 52, an SDRAM 53, a USB host controller 54, a DMA controller 55, a signal processor 60, an Ethernet (trademark) controller/connector 67, and a PCMCIA controller 68 via a bus line 66.

When flash ROM 52 stores a device ID and an encryption key in addition to an RTOS (Real Time Operating System) 71 (FIG. 7) of which starting is completed by the CPU 51 as soon as the power is turned on and the firmware (to be described later with reference to FIG. 7) which is executed on the RTOS 71 for implementing a variety of functions.

The SDRAM (Synchronous Dynamic Random Access Memory) 53 temporarily stores predetermined data and programs when the main CPU 51 executes a variety of processes. The USB host controller 54 controls the data communication with the PD 5 for example connected via the connector 43.

The DMA (Direct Memory Access) controller 55 controls the data transfer between the HDD 58 a buffer 56, a CD-ROM drive 57 and an encoder/decoder 59. The buffer 56 based on SDRAM for example temporarily buffers the data of which transfer is controlled by the DMA controller 55. The CD-ROM drive 57 reads audio data from the music CD 3 at the speed of CAV8. The HDD 58 stores the encoded data generated by the encoder/decoder 59.

The encoder/decoder 59 encodes the PCM data read by the CD-ROM drive 57 or the audio data inputted from the AUX In terminal 31 at a maximum speed of 8× and an average speed of 5× by use of the ATRAC3 technique of 132 Kbps mode, 105 Kbps mode, or 66 Kbps mode, thereby generating encoded data. Also, the encoder/decoder 59 decodes the encoded data stored in the HDD 58. In addition, the encoder/decoder 59 has the DES (Data Encryption Standard) engine to encrypt the encoded data by use of an encryption key to be generated on the basis of the device ID of a predetermined component of the audio server 1 and a time.

For example, if the HDD 58 has a storage capacity of 9 gigabytes and the encoder/decoder 59 encodes by the ATRAC3 technique of 105 Kbps mode, about 100 music CDs 3 (60 minutes/disc) may be recorded to the HDD 58.

The signal processor 60 is composed of a Magic Gate Memory Stick interface (hereafter referred to as an MGMS I/F) 60-1, a watermark screen (hereafter referred to as a WM screen) 60-2, an audio I/F 60-3, and a sampling rate converter (hereafter referred to as an SRC) 60-4.

The MGMS I/F 60-1 cross-certificates the MS 4 loaded in the MS slot 45 via an MS connector 61 and accordingly encrypts the data and decrypts the encrypted data. The WM screen 60-2 detects an SDMI-compliant watermark (an electronic watermark or the information indicative of the permission or inhibition of copy) embedded in the audio data that pass the signal processor 60.

The audio I/F 60-3 gets digital audio data via the AUX In terminal 31 and supplies the obtained data to the SRC 60-4. Also, the audio interface 60-3 appropriately buffers the digital audio data transferred from the buffer 56 for example into an incorporated buffer 251 (FIG. 62) and then outputs the buffered data to an AD/DA 62.

The SRC 60-4 converts the sampling rate of the digital audio data from the audio I/O 60-3 into 44.1 KHz and outputs the resultant digital audio data to the encoder/decoder 59.

It should be noted that, although not shown, the signal processor 60 also incorporates an ATRAC3 encoder/decoder which operates at a speed of 1×.

The MS connector 61 relays the data communication between the MS 4 inserted therein and the MGMS I/F 60-1. The AD/DA 62 converts the digital audio data inputted from the audio I/F 60-3 of the signal processor 60 into an analog sound signal and outputs it to the Line Out terminal 32, the speaker terminal 34, or the headphone terminal 47. The AD/DA 62 also digitize the analog sound signal inputted from the AUX In terminal 31 to output a resultant digital signal to the encoder/decoder 59.

The Ethernet controller/connector 67 controls the data communication with other electronic equipment connected via Ethernet (trademark). The PCMCIA (Personal Computer Memory Card International Association) controller 68 has an IC card interface compliant with the PCMCIA standard.

The main CPU 51 is connected to a display driver 63 and a sub CPU 64. The display driver 63 controls a display operation performed on the display 15. The sub CPU 64 controls, especially when the power is off, a power supply section 65, controls a main frame reset operation, counts an incorporated clock, detects an operation performed on the power button 11 for example, controls the photoreceptor 42, and controls the AD/DA 62. The power supply section 65 converts the DC voltage supplied from the DC In terminal 36 into a predetermined voltage and supplies it to the audio server 1 in its entirety.

The following describes, with reference to FIG. 7, the firmware which the main CPU 51 reads from the flash ROM 52 to actually execute the functions of the audio server 1 which are described below. It should be noted that the functions of the audio server 1 include CD ripping, CD recording, HD recording (digital input), HD recording (analog input), HD play, CD play, MS play, check-out/check-in, import, and move-out/move-in for example, their details and relationship with the firmware being described later with reference to FIGS. 47 through 56.

The firmware has four layers, namely, an application layer (APP) 72, an upper-middleware layer (UMW) 73, a lower-middleware layer (LMW) 74, and a device driver layer (DD) 75.

The application layer 72 includes a main application (hereafter referred to as a main APP) 76, a hard disk application (hereafter referred to as an HD APP) 77, a CD application (hereafter referred to as a CD APP) 78, a Memory Stick application (hereafter referred to as an MS APP) 79, a portable device application (hereafter referred to as a PD APP) 80, and a front-end processor (hereafter referred to as an FEP) 81.

Each module of the application layer 72 requests the corresponding module of the upper-middleware layer 73 in accordance with the user operation associated with a function executable by the audio server 1 and provides a user interface by controlling the display of processing situations.

The main APP 76 controls each module of the application layer 72. For example, at the time of starting up, the main APP 76 creates a startup screen to start up each module. In response to a user operation transmitted from an input middleware 97, main APP 76 notifies the corresponding module thereof. The main APP 76 supplies the display data from each module to a display device driver 105. The main APP 76 executes switching between modules. In response to a volume change operation done by the user, the main APP 76 notifies an audio 10 middleware (AIO) 94. In response to a setup operation done by the user, the main APP 76 notifies each module of settings. The main APP 76 holds the setting information (play mode for example) common to the modules. In response to a power-off operation, the main APP 76 ends each module and requests a system control middleware (SYSTEM) 98 for a power-off sequence.

Upon reception of a HDD 58 driving operation, the HD APP 77 notifies a hard disk middleware 82 thereof and gets an operation state of the hard disk middleware 82 to generate display data.

Upon reception of a CD-ROM drive 57 driving operation, the CD APP 78 notifies a CD middleware 88 thereof and gets an operation state of the CD middleware 88 to generate display data.

Upon reception of an operation associated with the MS 4 loaded in the MS slot 45, the MS APP 79 notifies the MS middleware 89 thereof and gets an operation state of the MS middleware 89 to generate display data.

Upon reception of an operation associated with the PD 5 connected to the connector 43, the PD APP 80 notifies a PD middleware 90 thereof and gets an operation state of the PD middleware 90 to generate display data.

The FEP 81 executes kana-kanji conversion when inputting the title, for example, of the music CD 3 to be recorded.

The upper-middleware layer 73 is composed of the following modules obtained by modeling the functions of the audio server 1. Namely, the upper-middleware layer 73 includes the hard disk middleware (hereafter referred to as an HD MW) 82, the CD middleware (hereafter referred to as a CD MW) 88, the MS middleware (hereafter referred to as an MS MW) 89 and the PD middleware (hereafter referred to as a PD MW) 90.

The HD MW 82 is composed of an HDCC 83 which manages the encoded data stored in the HDD 58, a CD RIPPING 84 which compresses and encrypts the audio data stored the music CD 3 in cooperation with the CD MW 88 to record the resultant data to the HDD 58, an HD PLAY 85 which decrypts and decompresses the encoded data stored in the HDD 58 in cooperation with the audio 10 middleware 94, an HD REC 86 which compresses and encrypts the audio data inputted from the AUX In terminal 31 in cooperation with the audio 10 middleware 94, and a C IN/C OUT 87 which controls the check-in and check-out operations with the MS 4 or the PD 5 in cooperation with the MS MW 89 or the PD MW 90.

The CD MW 88 realizes a function as a CD player by causing the CD device driver 102 to control the CD-ROM drive 57. The MD MW 89 realizes a function as an MS player in cooperation with an audio 10 middleware 94 and an MS file system middleware 95. The PD MW 90 controls the PD 5 in cooperation with an USB host middleware 96 and a USB host device driver 104.

The lower-middleware layer 74 includes the following modules obtained by modeling the functions which can be shared by the modules of the upper-middleware layer 73, namely, a hard disk object database middleware (hereafter referred to as an HD DB) 91, a hard disk file system middleware (hereafter referred to as an HD FS) 92, an MGR middleware (MGR) 93, the audio IO middleware (AIO) 94, the Memory Stick File System Middleware (MS FS) 95, the USB host middle ware (USB) 96, the input handle middleware (INPUT) 97, and the system control middleware (SYSTEM) 98. Each module constituting the lower-middleware layer 74 is called by each module constituting the upper-middleware layer 73.

The device driver layer (DD) 75 includes the following modules which are obtained by modeling hardware devices, namely, a hard disk device driver 99, a decoder/encoder device driver 100, a DMA device driver 101, a CD device driver 102, a signal processor device driver 103, a USB host device driver 104, a display device driver 105, an audio device driver 106, a key device driver 107, a power device driver 108, and a clock device driver 109. It should be noted that, in FIG. 7, the audio device driver 106 through the clock device driver 109 enclosed by dashed lines are executed by the sub CPU 64. Each module is constituted mainly by libraries, its API (Application Program Interface) being called by each module included in the upper-middleware layer 73 or the lower-middleware layer 74.

Figure 8:
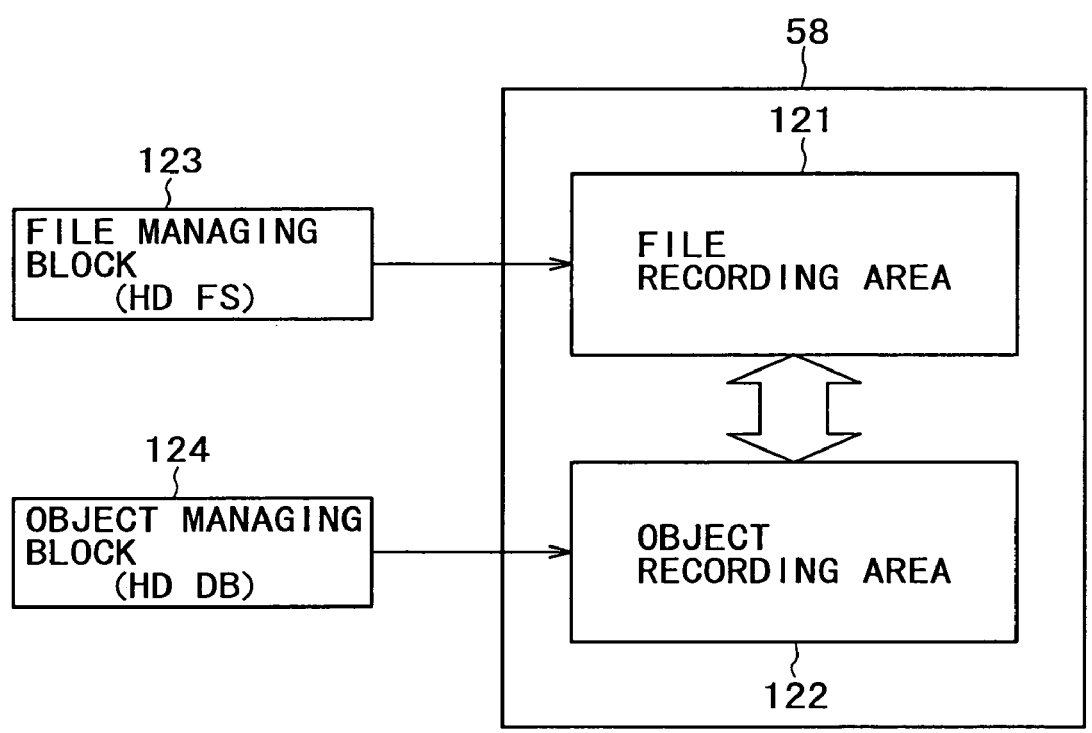
FIG. 8 is a diagram illustrating a FAT file system (data format) applied to a HDD 58.

The following describes a FAT (File Allocation Table)-type file system (data format) applied to the HDD 58 with reference to FIGS. 8 through 20. As shown in FIG. 8, the HDD 58 has a file recording area 121 for recording encoded data (content data) as a file and an object recording area 122 for recording an object including the information for identifying a position at which the content data recorded to the file recording area 121 are recorded.

A file managing block 123 executes all file-associated processes such as file creation, issuance of ID to newly created file, and read, write and delete operations on the file recording area 121. The file managing block 123 is equivalent to the HD FS 92 included in the lower-middleware layer 74.

An object managing block 124 recognizes the physical location of an object in the object recording area 122 and executes object write, read, and delete operations. The object managing block 124 is equivalent to the HD DB 91 included in the lower-middleware layer 74. It should be noted that the management of objects by a database will be described later with reference to FIGS. 21 through 37.

Figure 9:
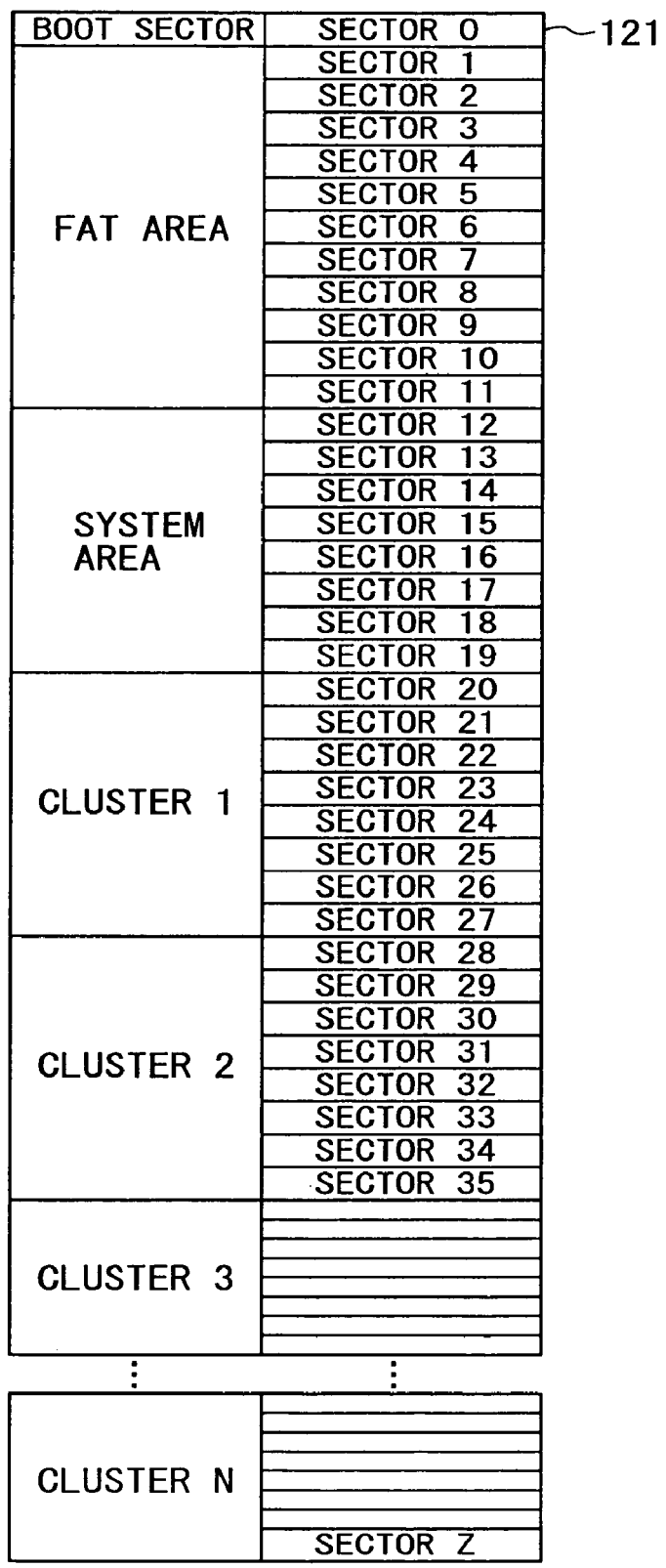
FIG. 9 is a diagram illustrating a logical structure of a file recording area 121.

FIG. 9 shows a logical structure of the file recording area 121. The file recording area 121 is divided into sectors having a predetermined capacity, which is the minimum unit of writing and reading in the file recording area 121. Each sector is assigned with a serial sector number. The file recording area 121 is formed by a FAT area, a system area, and a plurality of clusters, configured by the predetermined number of sectors. Each cluster is assigned with a cluster number having a fixed length. Each file to be recorded in the file recording area 121 is formed by a plurality of interlinked clusters.

Figure 10:
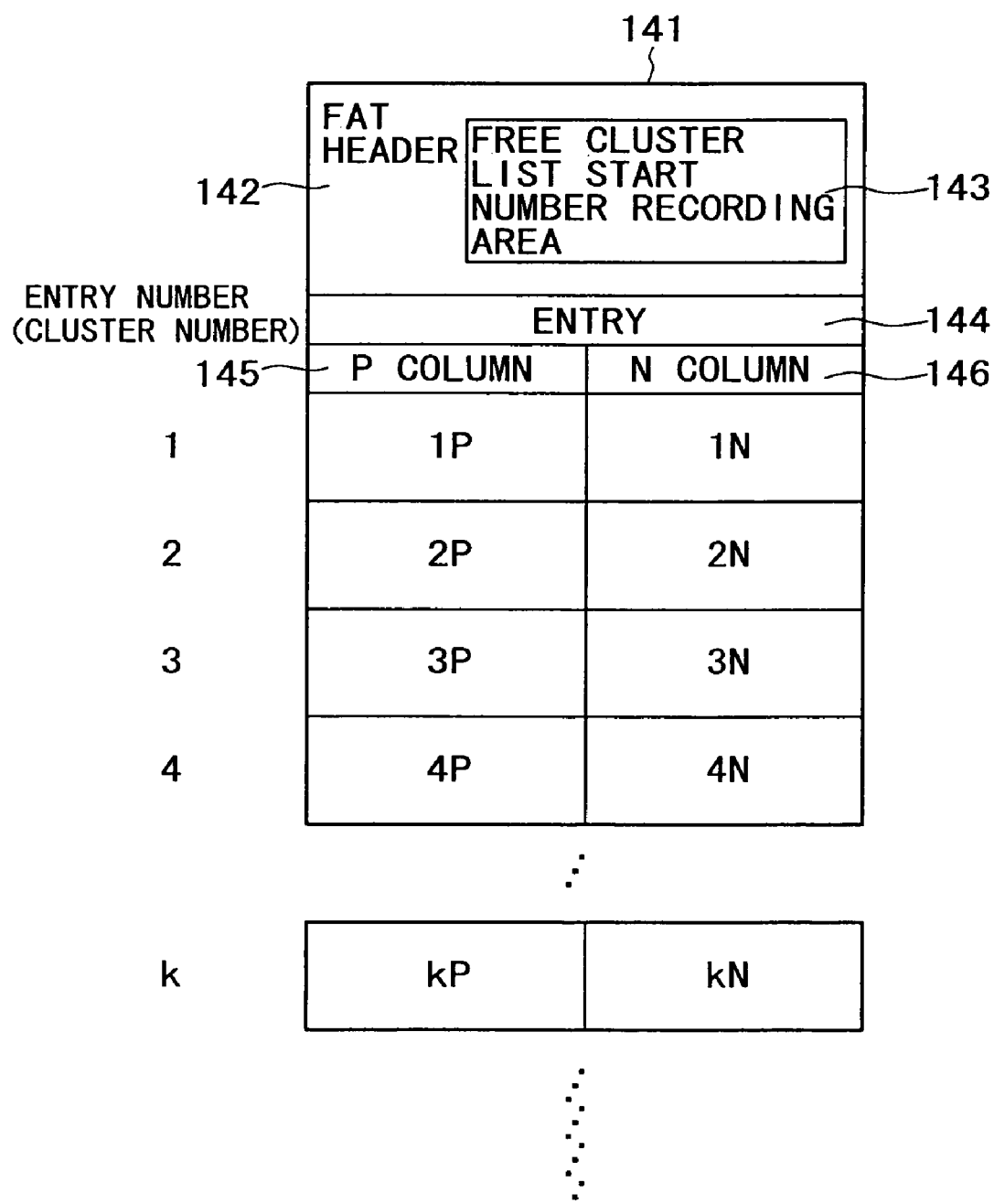
FIG. 10 is a diagram illustrating a configuration of a FAT 141.

The linking relationship between the clusters is recorded to a table called a FAT 141 (FIG. 10). The FAT 141 is recorded in the FAT area of the file recording area 121 and, when the file managing block 123 operates, transferred to the SDRAM 53.

FIG. 10 shows a structure of the FAT 141. The FAT 141 is configured by a FAT header 142 and a plurality of FAT entries 144 corresponding to the clusters respectively. The header 142 includes a free cluster list start number recording area 143. The start cluster numbers of the sequence of free clusters recording no data are recorded to the free cluster list start number recording area 143. If there is no free cluster, −1=0xFFFFFFFF is recorded to the free cluster list start number recording area 143.

Each FAT entry 144 is assigned with the entry number which is the same number as the cluster number assigned to the corresponding cluster. For example, the FAT entry corresponding to cluster number 1 is assigned with entry number 1. In what follows, the FAT entry having entry number 1 is also written as FAT entry E(1). The FAT entry 144 is divided into column P 145 and column N 146.

To the P column 145 of the FAT entry 144, the cluster number assigned to the cluster linked before the corresponding cluster is recorded. If there is no cluster to be linked before, namely, if the corresponding cluster is located at the head of the file, 0xFFFFFFFF is recorded to the P column 146.

To the N column 146 of the FAT entry 144, the cluster number assigned to the cluster linked after the corresponding cluster is recorded. If there is no cluster linked after, namely, if the corresponding cluster is located at the end of the file, 0xFFFFFFFF is recorded to the N column 146.

Figure 11:
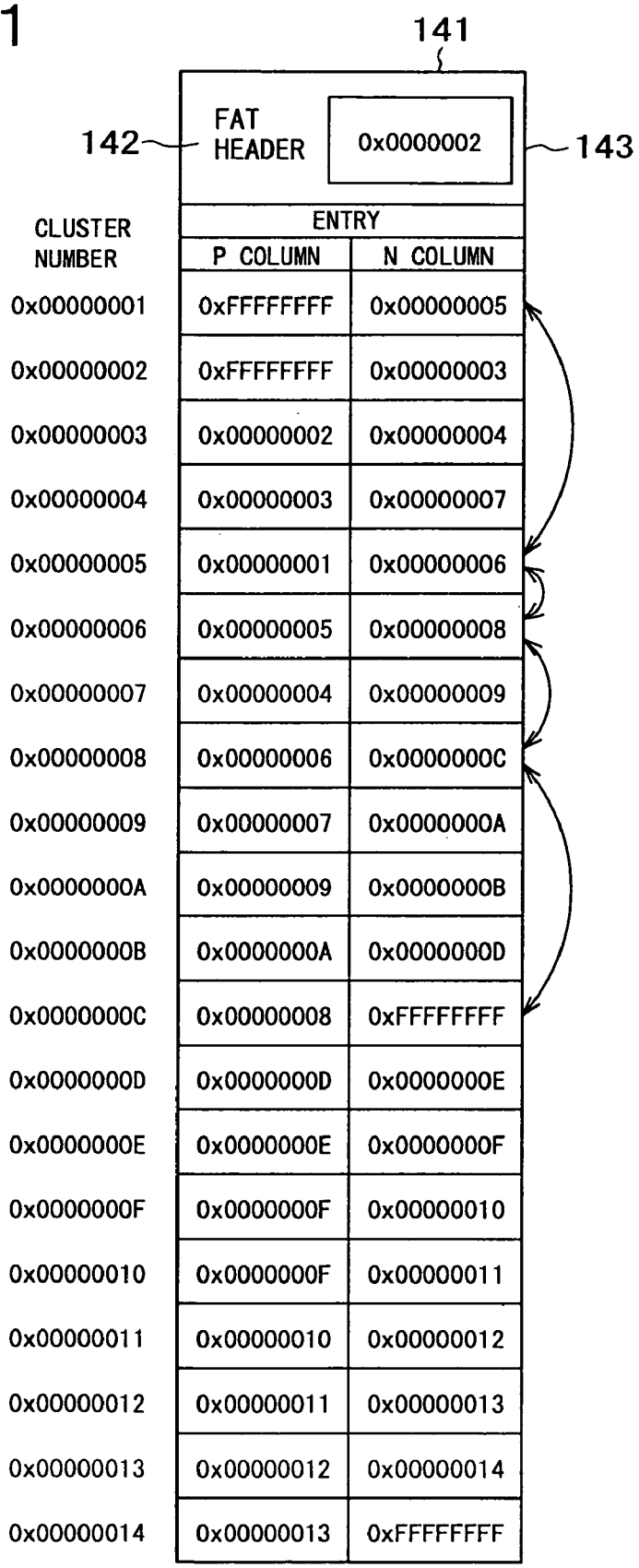
FIG. 11 is a diagram illustrating one example of the FAT 141.

For example, if only one cluster is recorded to five clusters having cluster numbers 1, 5, 6, 8, and 12 in the file recording area 121, then, as shown in FIG. 11, 0xFFFFFFFF indicative of that there is no cluster to be linked before is recorded to column P of FAT entry E(1) of entry number 1 (0x00000001) and cluster number 5 (0xFFFFFFFF) is assigned to the cluster linked after is recorded to column N.

To column P of FAT entry E(5) of entry number 5 (0x00000005), cluster number 1 (0x00000001) assigned to the cluster linked before is recorded and, to column N, cluster number 6 (0x00000006) assigned to the cluster linked after is recorded.

The like recording is performed to the FAT entries E(6) and E(8) of entry numbers 6 and 8.

To column P of FAT entry E(12) of entry number 12 (0x0000000C), cluster number 8 (0x00000008) assigned to the cluster linked before is recorded and, to column N, 0xFFFFFFFF indicative of that there is no cluster linked after is recorded.

In this case, a sequence of clusters from cluster number (0x00000002) to cluster number (0x00000014) are free clusters, so that the cluster number (0x00000002) indicative of its head is recorded to the free cluster list start number recording area 143.

Figure 12:
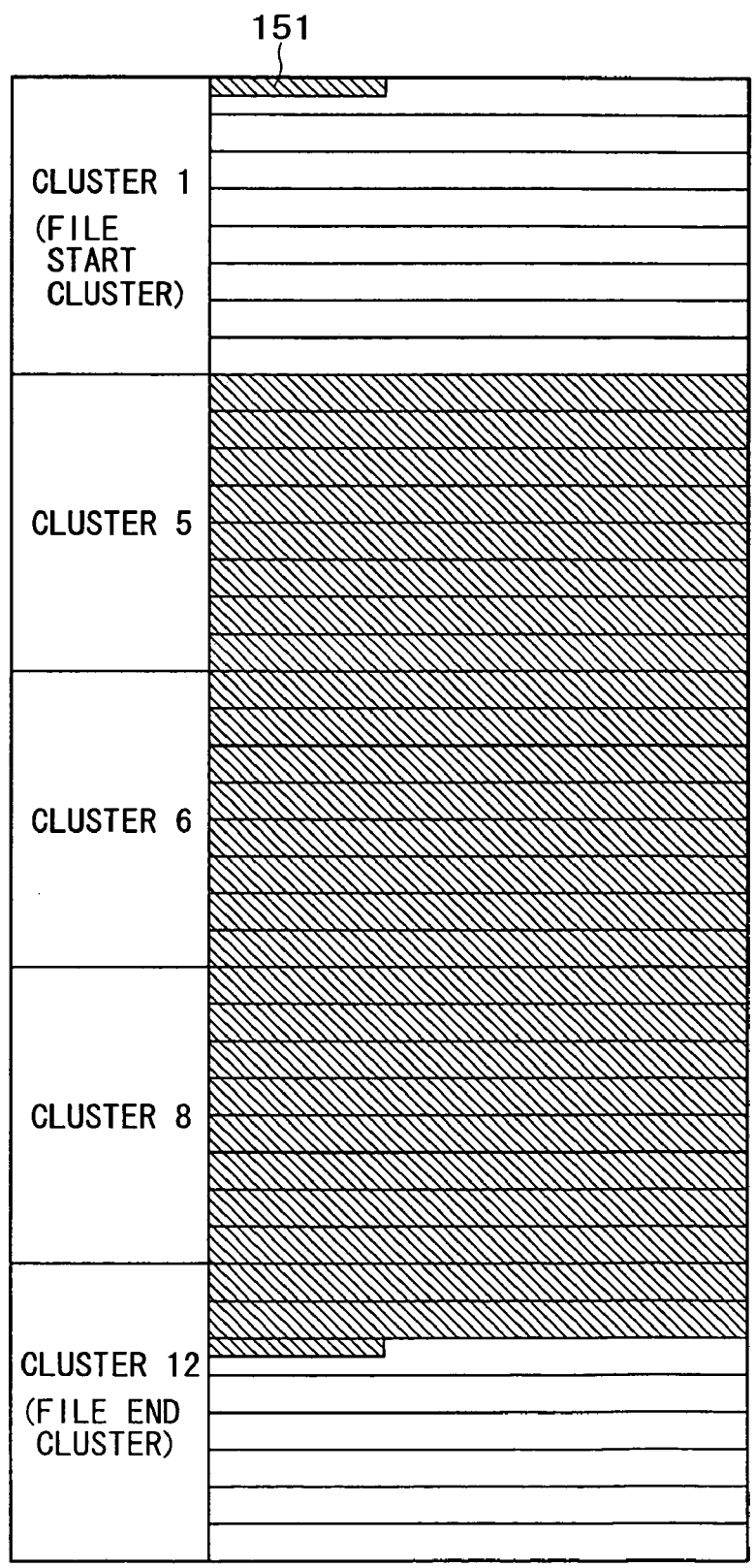
FIG. 12 is a diagram illustrating an exemplary record of a file recording area 121.

FIG. 12 shows a manner in which one file is recorded to five clusters assigned with cluster numbers 1, 5, 6, 8, and 12. The file start cluster (in this case, cluster 1) has a size recording area 151 for recording information associated with file size. The data contained in this file are recorded to the second (in this case, cluster 5) and subsequent clusters. It should be noted that the size recording area 151 may be arranged in the cluster at the end of file (in this case, cluster 12).

Figure 13:
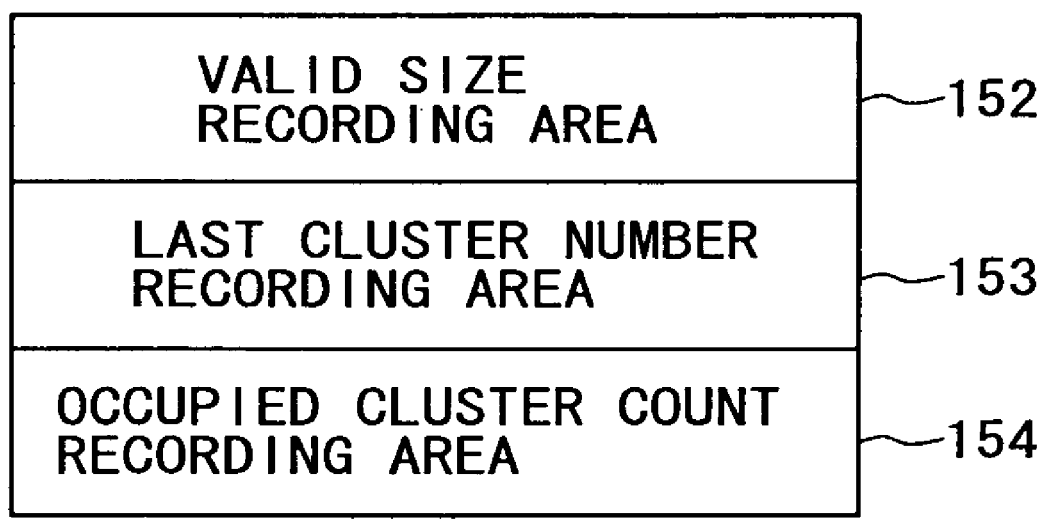
FIG. 13 is a diagram illustrating a structure of a size recording area 151.

FIG. 13 shows an exemplary configuration of the size recording area 151. The size recording area 151 has a valid size recording area 152, a last cluster number recording area 153, and an occupied cluster count recording area 154. To the valid size recording area 152, the number of valid bytes of the end cluster (in this case, cluster 12) is recorded. Normally, its value is 1 or more, a value below cluster size being recorded. To the last cluster number recording area 153, the cluster number (in this case, 0x0000000C) of the end cluster (in this case, cluster 12) is recorded. To the occupied cluster count recording area 154, the number of clusters forming the data recording portion of file (in this case, 4) is recorded.

The following describes a file creating process (namely, a content data recording process), a file reading process, and a file reserve reading process (namely, a process of reading content data in reverse direction), which use FAT, with reference to the flowcharts shown in FIGS. 14 through 20. It should be noted that these processes are controlled by the HD FS 92 belonging to the file managing block 123, namely the lower-middleware layer 74.

Figure 14:
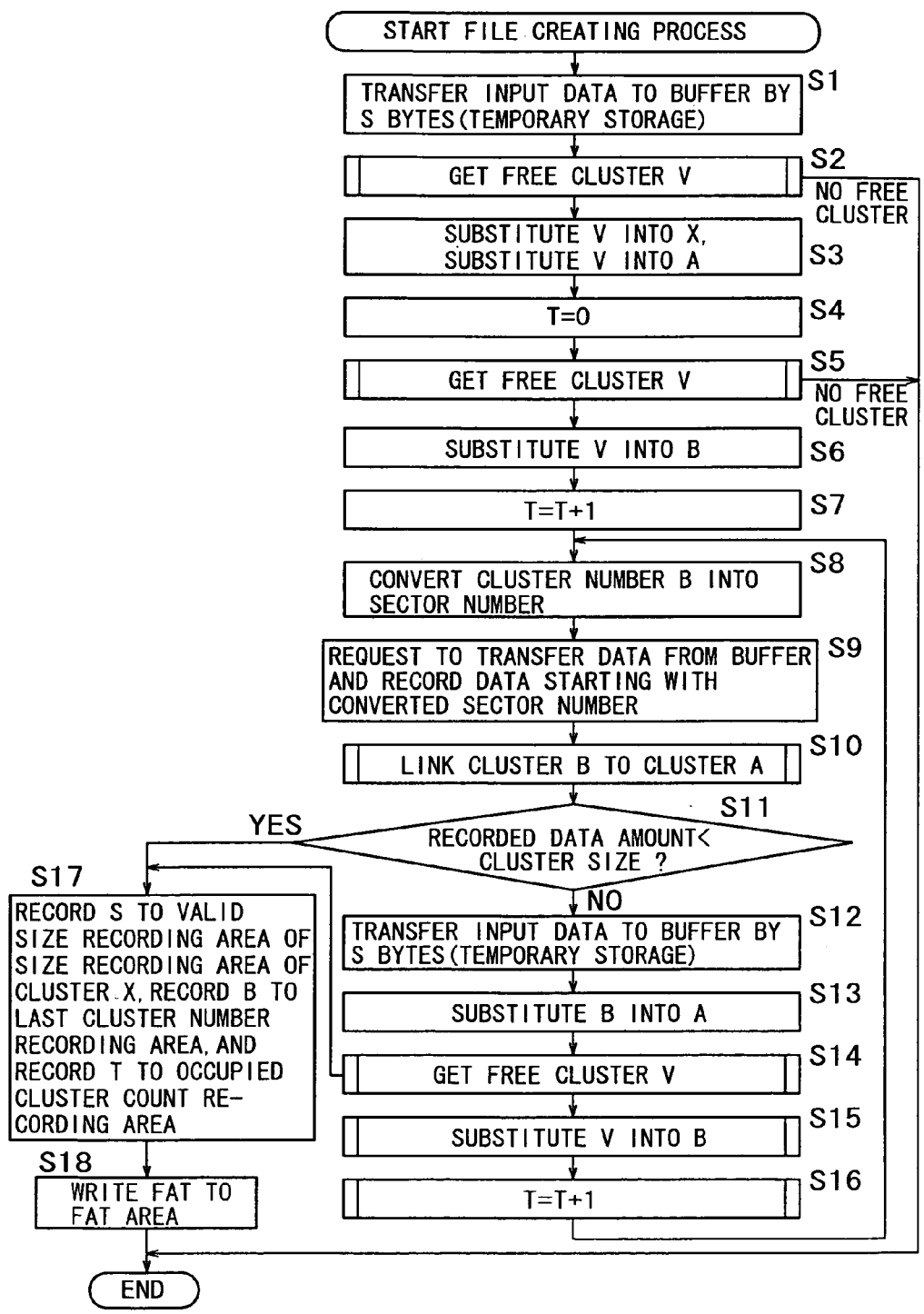
FIG. 14 is a flowchart describing a file creating process.

First, the file creating process will be described with reference to the flowchart shown in FIG. 14. In step S1, the HD FS 92 transfers the content data to be recorded to the HDD 58 from the CD-ROM drive 57 for example to the buffer 56 on a cluster size basis (let the data amount transferred be S bytes). In step S2, the HD FS 92 searches the file recording area 121 for free clusters and retrieves (or allocates) them.

Figure 15:
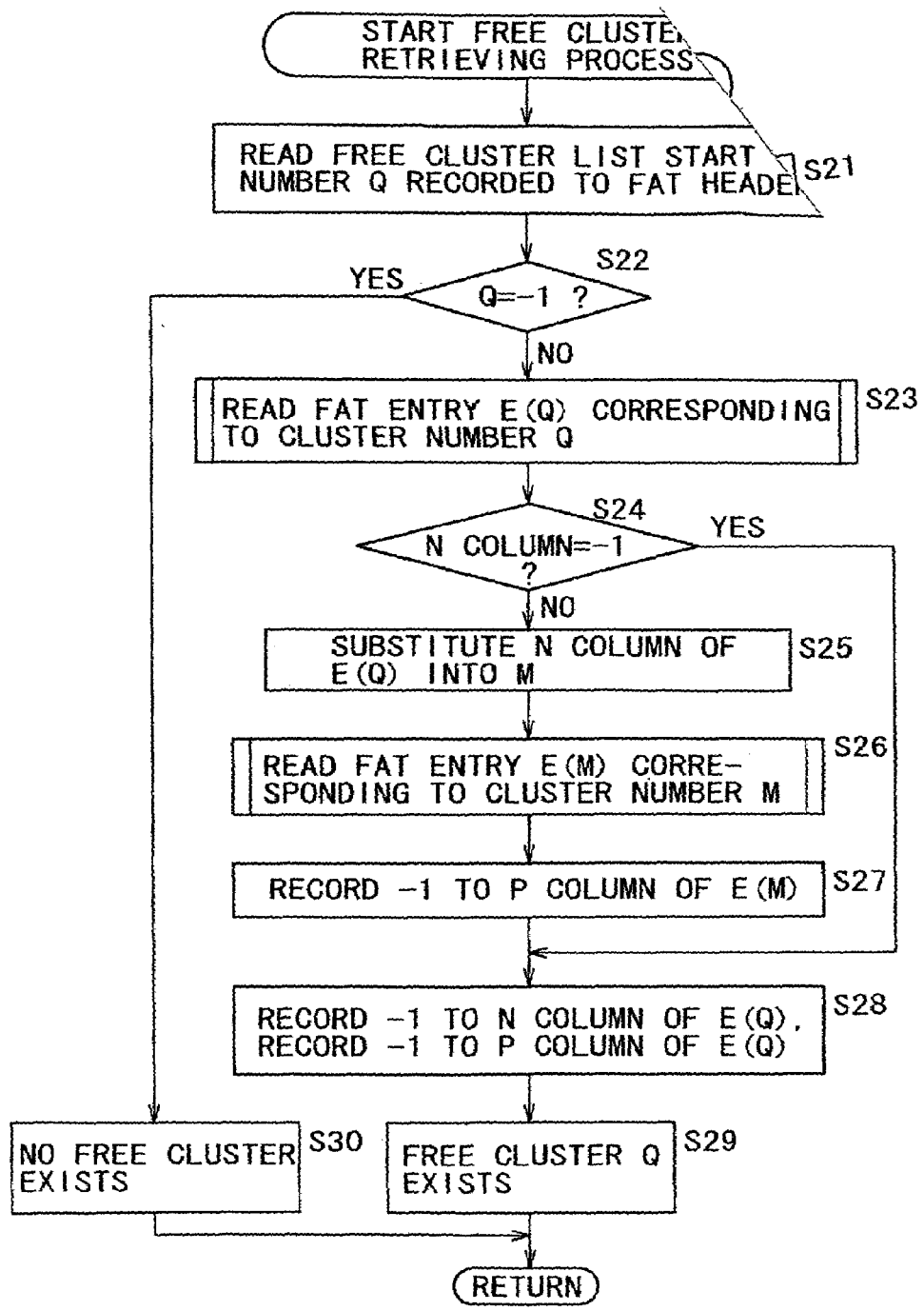
FIG. 15 is a flowchart describing a free cluster retrieving process.

This free cluster retrieving process will be described with reference to the flowchart shown in FIG. 15. In step S21, the HD FS 92 reads value Q recorded to the free cluster list start number recording area 143 recorded to the FAT header 141. In step S22, the HD FS 92 determines whether or not value Q is −1, namely, whether there is no free cluster. If value Q is not −1, namely, if there is a free cluster, then the procedure goes to step S23. In step S23, the HD FS 92 reads FAT entry E(Q) corresponding to value Q (the cluster number of the free cluster).

Figure 16:
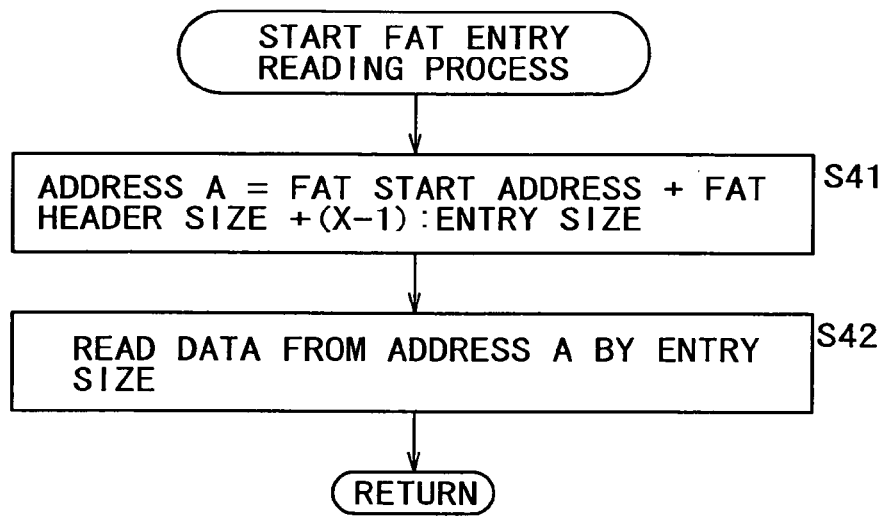
FIG. 16 is a flowchart describing FAT entry reading process.
Figure 17:
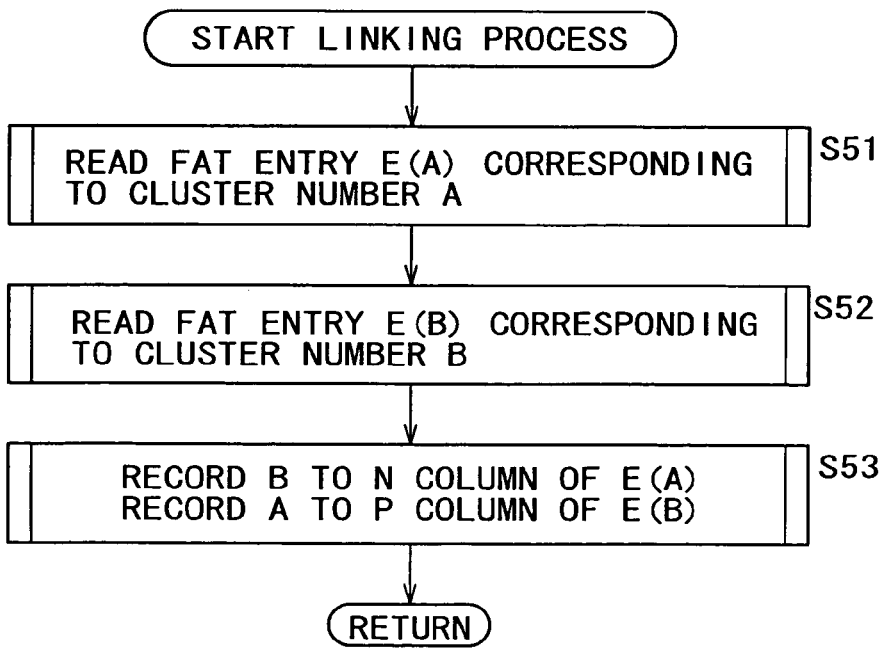
FIG. 17 is a flowchart describing a linking process.

The following describes a process of reading FAT entry E(X) corresponding to given cluster number X in relation to the process of reading FAT entry E(Q) with reference to the flowchart shown in FIG. 16. In step S41, the HD FS 92 adds a known FAT header size to a known FAT entry start address and then adds a product obtained by multiplying a value obtained by subtracting 1 from value X (X−1) by a known entry size, thereby computing address A. In step S42, the HD FS 92 reads the data by one entry size with address A as the start address. This is the process of reading FAT entry E(X) corresponding to given cluster number X.

Returning to FIG. 15, the HD FS 92 determines whether or not the value of column N of FAT entry E(Q) is −1 (0xFFFFFFFF) in step S24. If the value of column N of FAT entry E(Q) is not −1, then the procedure goes to step S25.

In step S25, the HD FS 92 substitutes the value of column N of FAT entry E(Q) into variable M. In step S26, the HD FS 92 reads FAT entry E(M) corresponding to cluster number M. In step S27, the HD FS 92 records −1 (0xFFFFFFFF) to column P of FAT entry E(M).

In step S28, the HD FS 92 records −1 (0xFFFFFFFF) to column N of FAT entry E(Q) and −1 (0xFFFFFFFF) to column P of FAT entry E(Q). In step S29, the HD FS 92 returns to FIG. 14 because there is a free cluster of cluster number Q. This is the process of free cluster retrieval.

It should be noted that, in step S24, if the value of column N of FAT entry E(Q) is found −1, the processes of steps S25 through S27 are skipped.

If value Q recorded to the free cluster list start number recording area 143 is found −1 in step S22, then the procedure goes to step S30. In step S30, the HD FS 92 returns to FIG. 14 because there is no free cluster. It should be noted that, if no free cluster is found, it is regarded that the HDD 58 is full, and the file creating process shown in FIG. 14 comes to an end.

In what follows, the description will be continued by reading the retrieved free cluster having cluster number Q as the free cluster having cluster number V. In step S3, the HD FS 92 substitutes cluster number V of free cluster into variables X and A. In step S4, the HD FS 92 substitutes 0 into occupied cluster count T. In step S5, the HD FS 92 retrieves a new free cluster in the same manner as the above-mentioned process of step S2. Let the cluster number of the retrieved free cluster be V. If no new free cluster is retrieved, this file creating process comes to an end.

In step S6, the HD FS 92 substitutes value V into variable B. In step S7, the HD FS 92 increments occupied cluster count T by 1. In step S8, the HD FS 92 converts cluster number B into sector numbers (for example, if sectors are related to clusters as shown in FIG. 9, cluster number 2 is converted into sector numbers 28 through 35). Sector numbers corresponding to cluster number B are determined. In step S9, the HD FS 92 records the content data buffered in step S1 to the converted sector numbers in the file recording area 121.

After the recording of the buffered content data has ended, the HD FS 92 links the cluster of cluster number B to the cluster of cluster number A (at this point of time, this cluster is a free cluster) in step S10. The following describes this linking process with reference to the flowchart of FIG. 17.

In step S51, as with the above-mentioned process described with reference to FIG. 16, the HD FS 92 reads FAT entry E(A) corresponding to cluster number A and, in step S52, reads FAT entry E(B) corresponding to cluster number B. In step S53, the HD FS 92 records cluster number B to column N of FAT entry E(A) and cluster number A to column P of FAT entry E (B). It should be noted that the process of step S53 is executed on the FAT 141 developed in the SDRAM 53. This is the process of linking the cluster having cluster number A and the cluster having cluster number B.

Returning to FIG. 14, in step S11, the HD FS 92 determines whether or not data amount S of the content data recorded in step S9 is equal to the cluster size. If data amount S of the content data recorded in step S9 is found equal to the cluster size, then it indicates that the recording of the content data to be recorded has not completed, so that the procedure goes to step S12.

In step S12, the remaining portion of the content data recorded before is transferred to the buffer 56 by the cluster size. In step S13, cluster number B is substituted into variable A. In step S14, the HD FS 92 retrieves a new free cluster as with the above-mentioned process of step S2. Let the cluster number of the newly retrieved cluster be V. It should be noted that, if no new free cluster is retrieved in step S14, then the procedure goes to step S17. In step S15, the HD FS 92 substitutes value V into variable B. In step S16, the HD FS 92 increments occupied cluster count T by 1.

Then, the procedure returns to step S8 to repeat the above-mentioned processes. If, in step S11, data amount S of the content recorded in step S9 is found unequal to the cluster size, it indicates that the recording of the content data to be recorded has been completed, so that the procedure goes to step S17.

In step S17, the HD FS 92 arranges the size recording area 151 in the free cluster having cluster number X retrieved in step S2, records data amount S recorded to the last cluster to the valid size recording area 152, records the value of variable B to the last cluster number recording area 153, and records the value of variable T to the occupied cluster count recording area 154.

In step S18, the FAT 141 recorded to the FAT area of the file recording area 121 is updated by the FAT 141 rewritten by the process of step S10. Thus, a new file is created. It should be noted that a file identifier having the same value as the start cluster number of a sequence clusters recorded with content data is issued to the newly created file.

Figure 18:
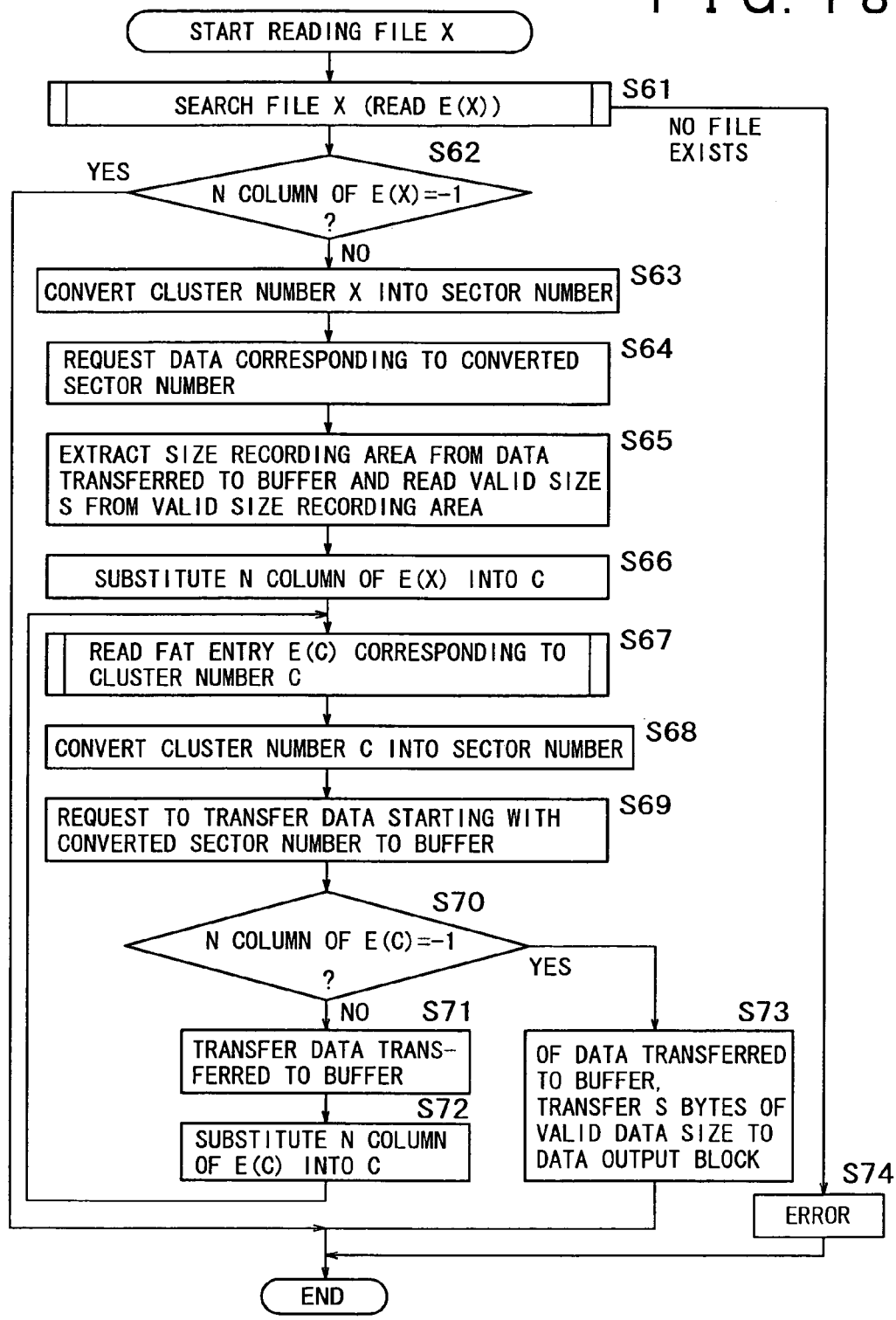
FIG. 18 is a flowchart describing a file X reading process.

The following describes a process of reading a file of which file identifier is X (hereafter referred to as file X) with reference to the flowchart shown in FIG. 18. In step S61, the HD FS 92 executes a search process for determining whether or not there is file X.

Figure 19:
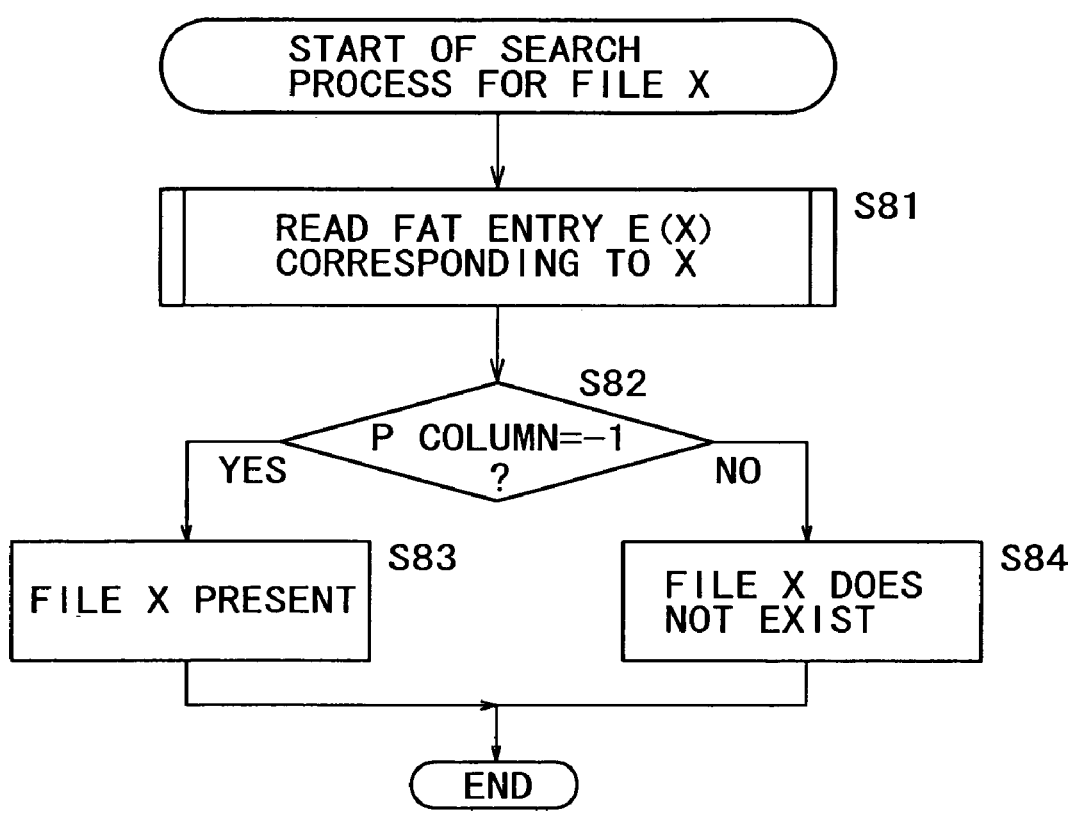
FIG. 19 is a flowchart describing a file X searching process.

The following describes a file X search process with reference to the flowchart shown in FIG. 19. In step S81, the HD FS 92 gets FAT entry E(X) corresponding to entry number X. In step S82, the HD FS 92 determines whether or not the value of column P of FAT entry E(X) is −1 (0xFFFFFFFF). If the value of column P of FAT entry E(X) is found −1, then the procedure goes to step S83. In step S83, file X is found existing because the cluster of entry number X (=cluster number X) is the start cluster among a sequence of clusters on which the file is recorded, so that the procedure returns to the file reading process shown in FIG. 18.

Conversely, if the value of column P of FAT entry E(X) is found not −1 in step S82, the procedure goes to step S84. In step S84, the HD FS 92 determines that there is no file X because the cluster of entry number X (=cluster number X) is not the start cluster among a sequence of clusters on which the file is recorded, so that the procedure returns to the file reading process shown in FIG. 18. Thus, the file X search process is executed.

In what follows, the description will be continued on the assumption that file X exists. In step S62, the HD FS 92 determines whether or not the value of column N of FAT entry E(X) is −1 (0xFFFFFFFF). If the value of FAT entry E(X) is found −1, then it indicates that file X has no data, so that the reading process comes to an end.

If the value of column N of FAT entry E(X) is found not −1 in step S62, then the procedure goes to step S63. In step S63, the HD FS 92 converts cluster number X (the start cluster) into sector numbers. In step S64, the HD FS 92 controls the DMA controller 55 to read the size recording area 151 recorded to the converted sector numbers to buffer this area in the buffer 56. In step S64, the HD FS 92 reads valid size S (the data amount recorded to the last cluster among a sequence of clusters on which file X is recorded) recorded to the valid size recording area 152 of the size recording area 151 buffered in step S63.

In step S66, the HD FS 92 substitutes the value of column N of FAT entry E(X) into variable C. In step S67, the HD FS 92 reads FAT entry E(C) corresponding to cluster number C, namely the second cluster, as with the above-mentioned process described with reference to FIG. 16. In step S68, the HD FS 92 converts cluster number C into sector numbers. In step S69, the HD FS 92 controls the DMA controller 55 to read the content data recorded to the sectors having the converted sector numbers by one cluster to buffer the content data in the buffer 56.

In step S70, the HD FS 92 determines whether or not the value of column N of FAT entry E(C) is −1 (0xFFFFFFFF). If the value of column N of FAT entry E(C) is found not −1, then the procedure goes to step S71. In step S71, the HD FS 92 controls the DMA controller 55 to output all data buffered in the buffer 56 to the encoder/decoder 59 and so on. Because the content data of file X have not all been read, so that the procedure goes to step S72. In step S72, the HD FS 92 substitutes the value of column N of FAT entry E(C) into variable C. Then, the procedure returns to step S67 to repeat the above-mentioned processes.

Then, in step S70, if the value of column N of FAT entry E(C) is found −1, it indicates that the reading starting with the last cluster recorded with the content data of file X has been completed, so that the procedure goes to step S73. In step S73, the HD FS 92 controls the DMA controller 55 to output the data for valid size S which are the last of the content data buffered in the buffer 56 to the encoder/decoder 59 and so on.

If no file X is found existing in the file search process of step S61, the procedure goes to step S74, in which an error is determined, upon which the file X reading process comes to an end. Thus, the file X reading process is executed.

Figure 20:
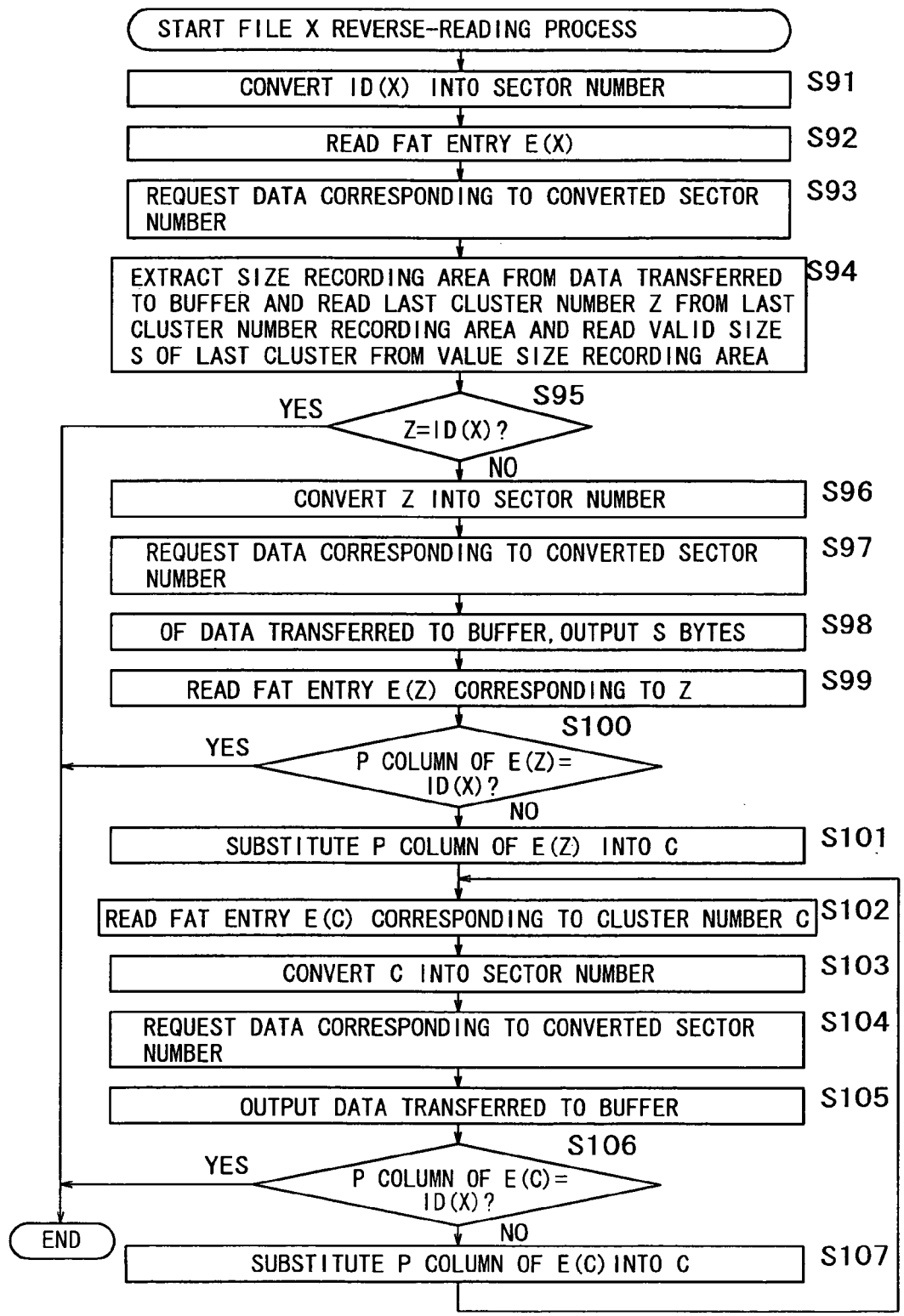
FIG. 20 is a flowchart describing a file X reverse reading process.

The following describes a file X reverse reading process with reference to the flowchart shown in FIG. 20. The reverse reading herein denotes a process in which content data are played back every several second retrospectively such that certain content data of which play time is 100 seconds are played back for about 100 milliseconds from 90th second and then played back for 100 milliseconds from 80th second and then played back for 100 milliseconds from 70th second, for example.

In step S91, the HD FS 92 converts the file identifier (=X, hereafter referred to as ID(X)) into sector numbers. It should be noted that ID(X) is the same as the cluster number of the start cluster among a sequence of clusters on which file X is recorded.

In step S92, FAT entry E(X) corresponding to cluster X is read. In step S93, the HD FS 92 controls the DMA controller 55 to read the size recording area 151 recorded to the sector having the sector number converted in step S91 to buffer it in the buffer 56. In step S94, the HD FS 92 reads valid size S from the valid size recording area 152 of the size recording area 151 buffered in step S93 and last cluster number Z from the last cluster number recording area 153.

In step S95, the HD FS 92 determines whether or not last cluster number Z is equal to ID (X). If last cluster number Z is found equal to ID (X), it indicates that file X has no content data, so that the reverse reading process comes to an end.

If last cluster number Z is found unequal to ID(X), then the procedure goes to step S96. In step S96, the HD FS 92 converts last cluster number Z to sector numbers. In step S97, the HD FS 92 controls the DMA controller 55 to read the data including the end portion of the content data recorded to the sector numbers converted in step S96 to buffer the data in the buffer 56. In step S98, the HD FS 92 controls the DMA controller 55 to output only the data for S bytes of the data buffered in the buffer 56, namely, the end portion of the content data to the encoder/decoder 59 and so on.

In step S99, the HD FS 92 reads FAT entry E(Z) corresponding to last cluster number Z. In step S100, the HD FS 92 determines whether or not the value of column P of FAT entry E(Z) is equal to ID(X). If the value of column P of FAT entry E(Z) is found equal to ID(X), the reverse reading process comes to an end because the content data of file X have been recorded to the last one cluster.

If the value of column P of FAT entry E(Z) is found unequal to ID(X), then the procedure goes to step S101 to read the data by one cluster from the end retrospectively. In step S101, the HD FS 92 substitutes the value of column P of FAT entry E(Z) into variable C.

In step S102, the HD FS 92 reads FAT entry E(C) corresponding to cluster number C. In step S103, the HD FS 92 converts cluster number C into sector numbers. In step S104, the HD FS 92 controls the DMA controller 55 to read the content data recorded to the sector numbers converted in step S103 to buffer the content data in the buffer 56. In step S105, the HD FS 92 controls the DMA controller 55 to output the content data for one cluster buffered in the buffer 56 to the encoder/decoder 59 and so on.

In step S106, the HD FS 92 determines whether or not the value of column P of FAT entry E(C) corresponding to cluster number C is equal to ID (X). If the value of column P of FAT entry E(C) is found unequal to ID(X), it indicates that file X has not all been read, so that the procedure goes to step S107 to read by one cluster retrospectively. In step S107, the HD FS 92 substitutes the value of column P of FAT entry E(C) into variable C. Then, the procedure returns to step S102 to repeat the above-mentioned processes.

If the value of column P of FAT entry E(C) is found equal to ID(X) in step S106, it indicates that file X has been read up to its beginning, so that the reverse reading process comes to an end. Thus, the file X reverse reading process is executed.

As described and according to the HD FS 92 of the audio server 1, for a file identifier for identifying a particular file, a cluster number, which is a fixed-length value, of the start cluster of the area to which this file is recorded is assigned, so that the recording position of the file may be identified with ease. Consequently, as compared with the case in which a file name is not fixed in length, the file search time may be significantly reduced.

In addition, because of the fixed file length, the time required for a file search operation may be made uniform.

Further, according to the HD FS 92 of the audio server 1, there is no limitation to the size of a file to be recorded, so that not only audio data but also video data, which are greater in size may be recorded as a file.

Still further, according to the HD FS 92 of the audio server 1, if one file is recorded over a plurality of clusters, the clusters are used in the forward direction, so that, at the time of recording and playback, a seek operation is performed in a constant direction. Consequently, the recording drops at recording and sound drops at playback are prevented from occurring.

Figure 21:
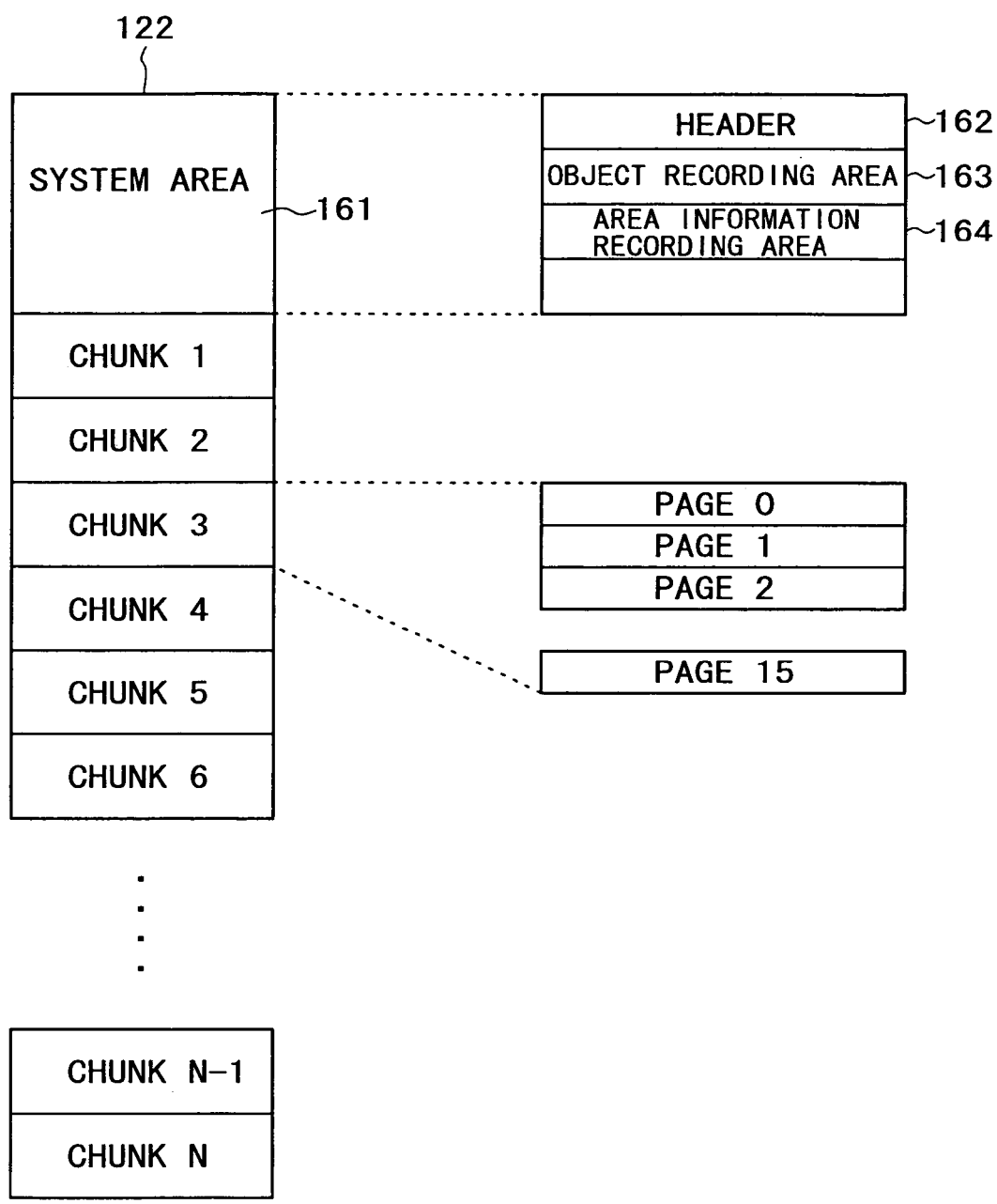
FIG. 21 is a diagram illustrating a logical structure of an object recording area 122.

The following describes objects corresponding to folder, album or track with reference to FIGS. 21 through 27. FIG. 21 shows a logical structure of the object recording area 122 to which an object is recorded. The object recording area 122 is formed by a system area 161 and a plurality of chunks divided so as to have a predetermined capacity. Each object is recorded to chunks.

The system area 161 has a header 162, an object type recording area 163, and an area information recording area 164. To the plurality of chunks, serial numbers beginning with 1 are applied in order from the top one of them. In the following description, for example, the chunk to which the number 1 is applied is referred to as chunk 1, the chunk to which the number 2 is applied is referred to as chunk 2, and so forth.

Each chunk is divided into pages having a predetermined capacity. The pages forming each chunk are assigned with serial numbers, 0 to the start page and subsequent numbers to the subsequent pages. For example, the page assigned with number 0 is page 0, the page assigned with number 1 is page 0, and so on.

Figure 22:
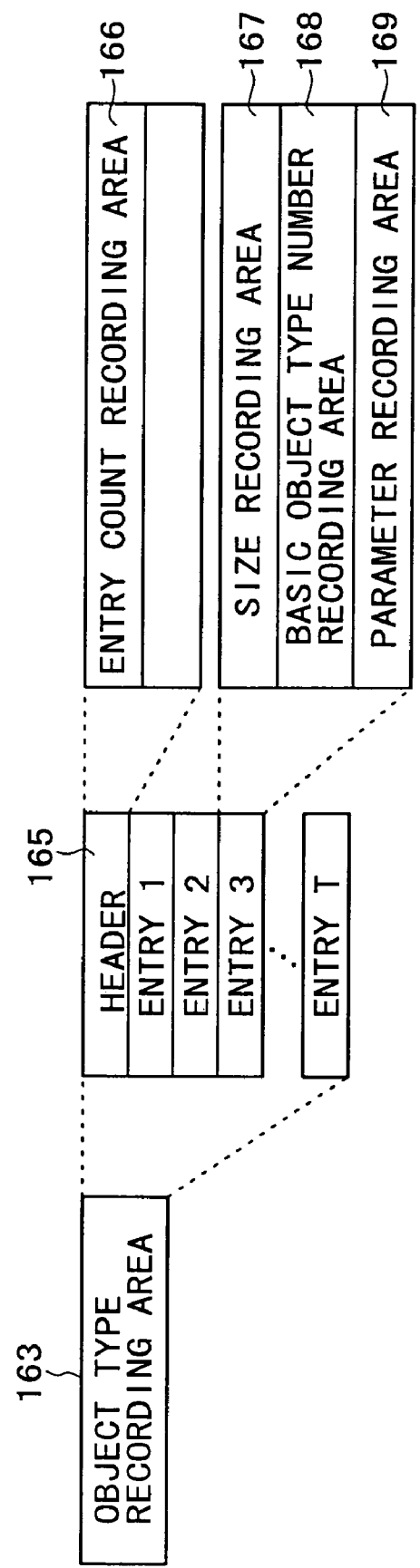
FIG. 22 is a diagram illustrating a structure of an object type recording area 163.

FIG. 22 shows the structure of the object type recording area 163 of the system area 161, which is formed by a header 165 and T entries. T is a preset constant. The header 165 has an entry count recording area 166. The entry count recording area 166 records the number of currently registered entries (the maximum value is T).

Each entry of the object type recording area 163 has a size recording area 167, a basic object type number recording area 168, and a parameter recording area 169. For example, entry t records the information associated with object type number t. Namely, the size recording area 167 of entry t records the size of the object having object type number t. The basic object type number recording area 168 of entry t records the basic object type number indicative of the basic object type to which the object having object type number t belongs. The parameter recording area 169 of entry t records the information associated with the size as it is when the size of the object having object type number t is variable in length.

Figure 23:
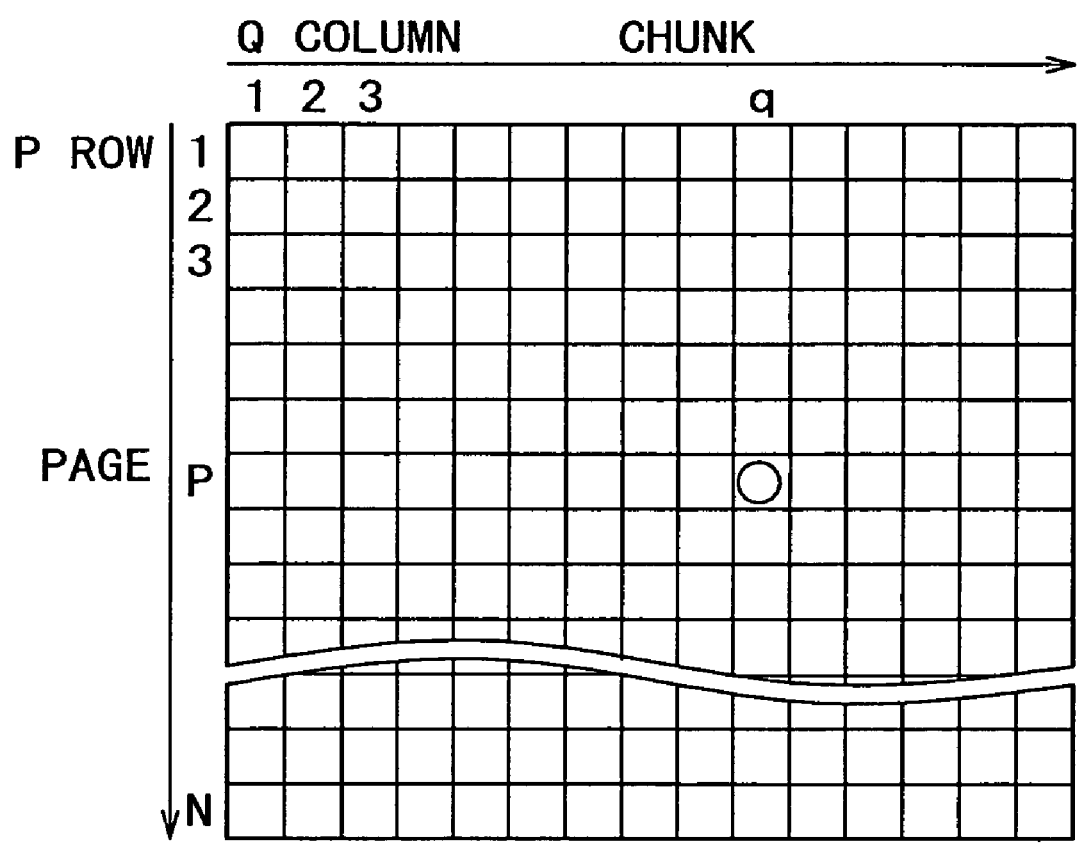
FIG. 23 is a diagram illustrating an area information recording area 164.

FIG. 23 shows the area information recording area 164 of the system area 161. The area information recording area 164 is formed by the bit sequences indicative of the total number of pages of the object recording area 122 (a value obtained by multiplying the total number of chunks by the number of pages forming one chunk). It should be noted that, for the convenience of description, FIG. 23 shows a matrix of (the total number of chunks) column X (the number of pages forming one chunk) row. For example, as shown in FIG. 23, the bit indicated by "○" at column q, row p corresponds to page p of chunk q. If page p of chunk q is in use, 1 is recorded to the bit indicated by "○". Conversely, if page p of chunk q is in use, 0 is recorded to the bit indicated by "○".

Figure 24:
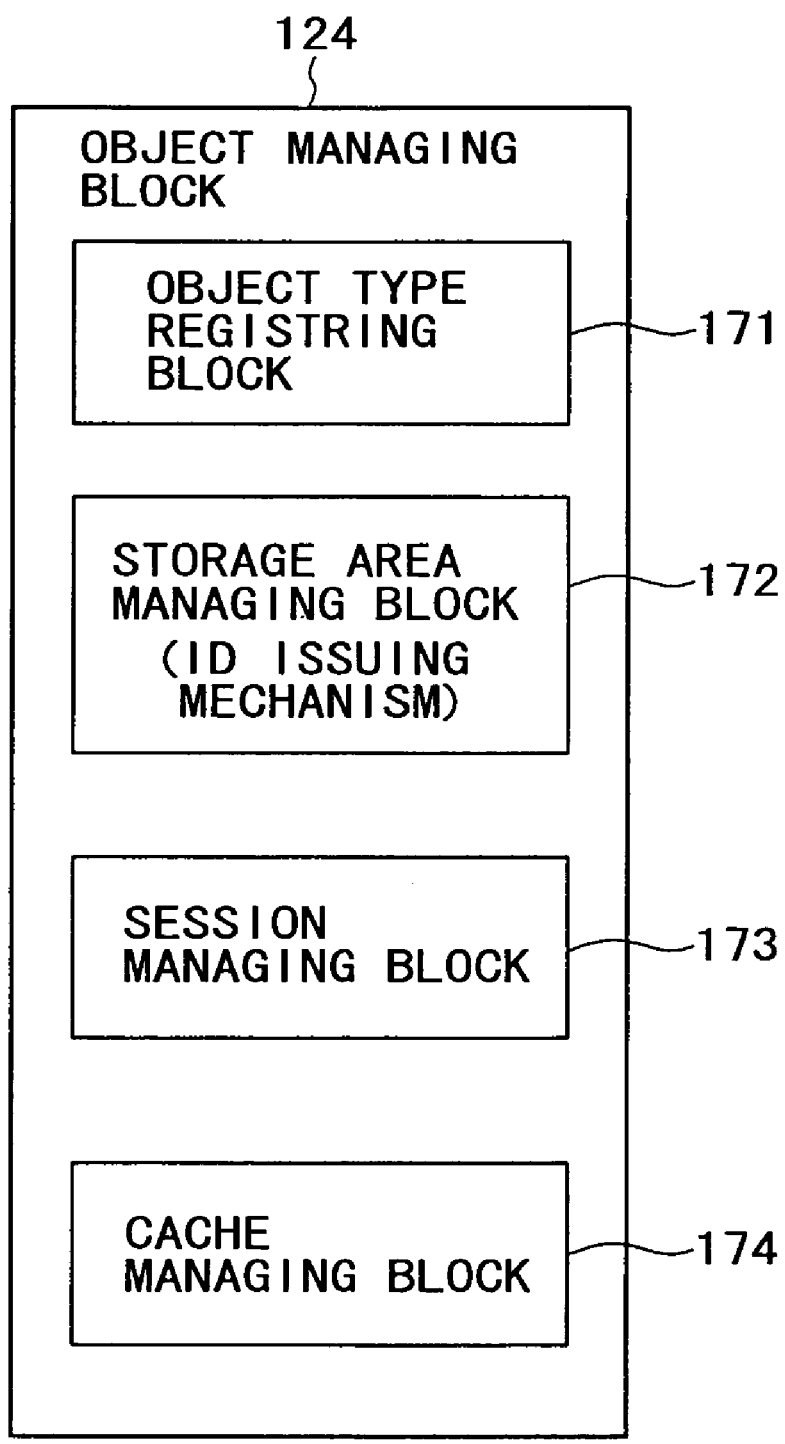
FIG. 24 is a diagram illustrating an object managing block 124.

FIG. 24 shows an exemplary configuration of the object managing block 124 equivalent to the HD DB 91 included in the lower-middleware layer 74. The object managing block 124 is formed by an object type registering block 171, a storage area managing block 172, a session managing block 173, and a cache managing block 174.

The object type registering block 171 performs the registration of object types (the writing to the object type recording area 163). Further, the object type registering block 171 performs the response to the enquires for object types (the reading from the object type recording area 163).

The storage area managing block 172 inverts predetermined bits in the area information recording area 164. Further, the storage area managing block 172 also searches for a continuous unused area of the predetermined number of pages by reading the bit of the area information recording area 164. In addition, the storage area managing block 172 issues an identifier to each object.

Figure 25:
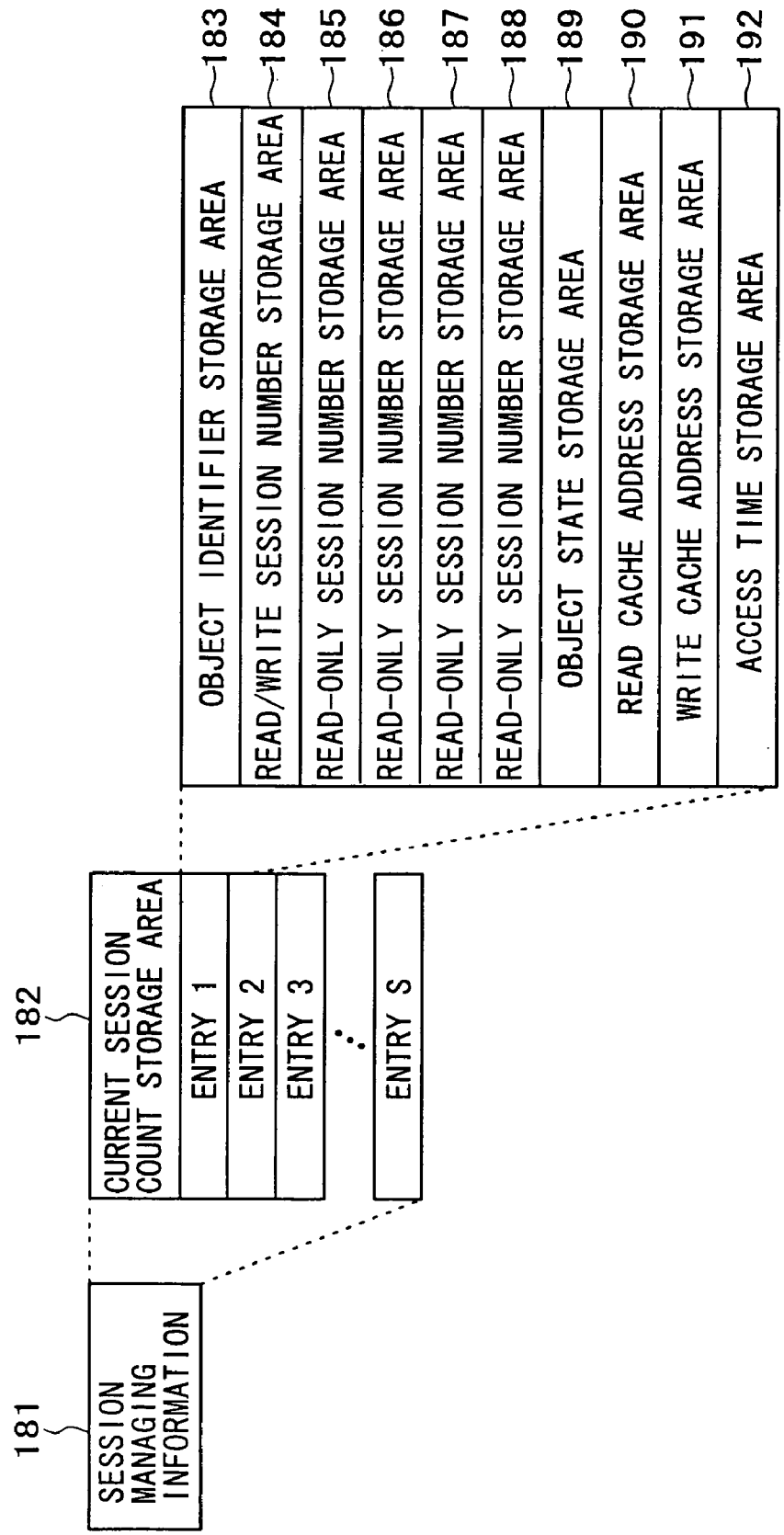
FIG. 25 is a diagram illustrating a session managing information 181.

The session managing block 173 issues a session number to the currently executed session and manages session managing information 181 (FIG. 25). Term session herein denotes a process for controlling data read and write operations for example.

FIG. 25 shows an exemplary configuration of the session managing information 181. The session managing information 181 is formed by a current session count storage area 182 for storing the number of currently opened sessions (hereafter referred to as the number of current sessions) and S entries corresponding to objects and in each of which information of a session having the access right to the object is recorded. The maximum value of the number of current sessions and value S are predetermined.

Each entry of the session managing information 181 is formed by an object identifier storage area 183, a read/write session number storage area 184, a read-only session number storage areas 185 through 188, an object state storage area 189, a read cache address storage area 190, a write cache address storage area 191, and an access time storage area 192.

Figure 27:
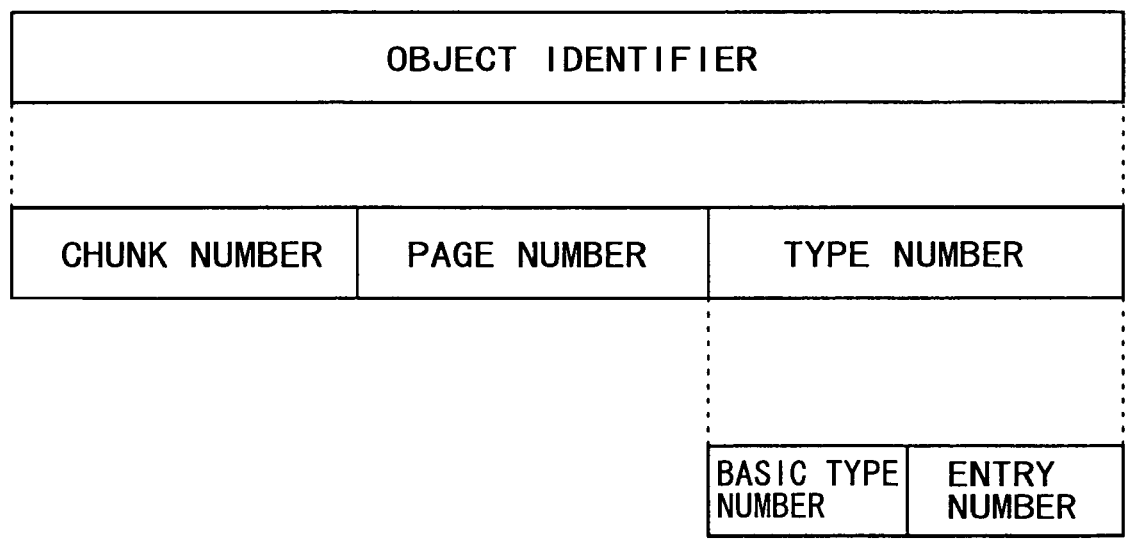
FIG. 27 is a diagram illustrating a structure an object identifier.

The object identifier storage area 183 stores the object identifier of the corresponding object (FIG. 27). The read/write session number storage area 184 stores the session number of the session having write access right to the corresponding object. The read-only session number storage areas 185 through 188 store the session numbers having read access right to the corresponding object. It should be noted that a plurality of sessions having read access right to an object may exist. FIG. 25 shows an example in which there are up to four sessions having read access right and one session having read/write access right.

The object state storage area 189 stores information indicative of the state of the corresponding object ("CREATE" indicative of creation, "UPDATE" indicative of update, and "REMOVE" indicative of removal). The read cache address storage area 190 stores the address of the read cache in which an object to be read is temporarily stored. The write cache address storage section 191 stores the address of the write cache in which an object to be written is temporarily stored. The access time storage area 192 stores the last access time for the corresponding object.

It should be noted that, if there is no information to be stored in the object identifier storage area 183 through the access time storage area 192, 0 is stored in these storage areas.

Figure 26A:
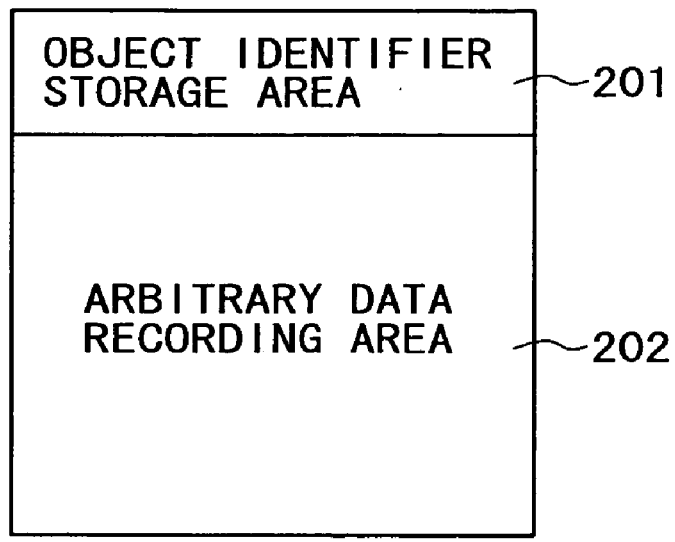
FIG. 26A is a diagram illustrating a basic object type 1.
Figure 26B:
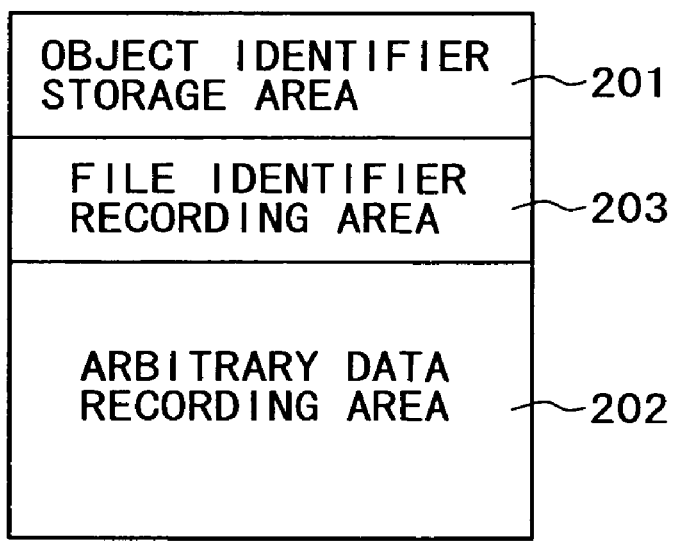
FIG. 26B is a diagram illustrating a basic object type 2.

FIG. 26A and FIG. 26B show the exemplary configurations of basic object type 1 and basic object type 2, which are the two basic object types to be recorded to chunks.

As shown in FIG. 26A, basic object type 1 is formed by an object identifier recording area 201 for recording own object identifier and an arbitrary data recording area 202 for recording given data (for example, the data such as the name of the object to be set by the user). The basic object type 1 includes objects such as folder list, folder, and album.

As shown in FIG. 26B, basic object type 2 is formed by the object identifier recording area 201 for recording own object identifier, the arbitrary data recording area 202 for recording arbitrary data, and a file identifier recording area 203 for recording the file identifier of the file corresponding to the own (object). Basic object type 2 includes a track object.

The object identifier to be recorded to the object identifier recording area 201 is formed by a chunk number indicative of the head of a sequence of pages in which a corresponding object is stored, the number of the head page, and a type number as shown in FIG. 27. The type number is formed by basic object type number to which the corresponding object belongs (either basic object type 1 or basic object type 2) and the entry number of the object type recording area 163 in which the type of the corresponding object is registered.

The following describes an object creating process, an object searching process, an object updating process, a stream object creating process, and a stream object searching process with reference to the flowcharts shown in FIGS. 28 through 37. Term stream object herein denotes the object which corresponds, one to one, to the content data stored in the file recording area 121, namely the stream object indicates a track. The stream object belongs to basic object type 2 (FIG. 26B). Therefore, any other objects than the stream object are folder or album objects, which belong to basic object type 1.

It should be noted that the above-mentioned processes are controlled by the object managing block 124, namely the HD DB 91 belonging to the lower-middleware layer 74 of the firmware.

First, the object creating process not for stream objects will be described by use of an example in which an object of object type number t with reference to the flowchart shown in FIG. 28. It should be noted that object type number t includes basic type number (in this example, basic object type 1) and entry number as shown in FIG. 27.

In step S121, the HD DB 91 opens a write session. The write session opening process will be described below with reference to the flowchart shown in FIG. 29. In step S141, the HD DB 91 reads the number of current sessions from the current session count storage area 182 to determine whether or not the number of retrieved current sessions is smaller than the preset maximum value. If the number of current sessions is found smaller than the preset maximum value, the procedure goes to step S142.

In step S142, the HD DB 91 increments the number of current sessions stored in the current session count storage area 182 of the session managing information 181 by 1. In step S143, the HD DB 91 opens a write session and issues session number Z by use of random numbers for example. The procedure returns to FIG. 28.

It should be noted that, if, in step S141, the number of current sessions is found not smaller than the preset maximum value, no more session can be opened, so that the procedure goes to step S144, in which the HD DB 91 determines an error. Then, the session opening processing comes to an end and the object creating process shown in FIG. 28 is discontinued.

Figure 28:
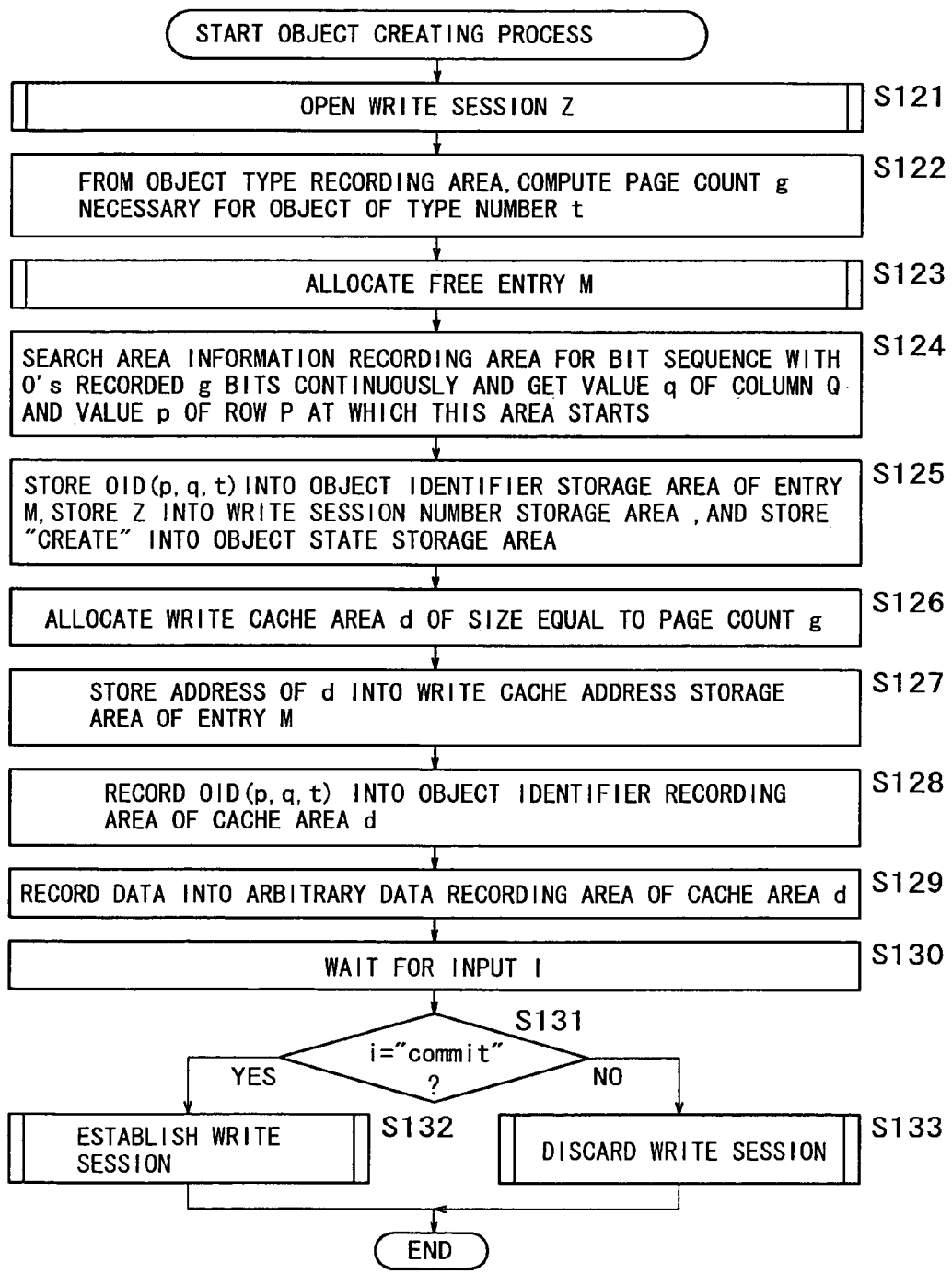
FIG. 28 is a flowchart describing an object creating process.
Figure 30:
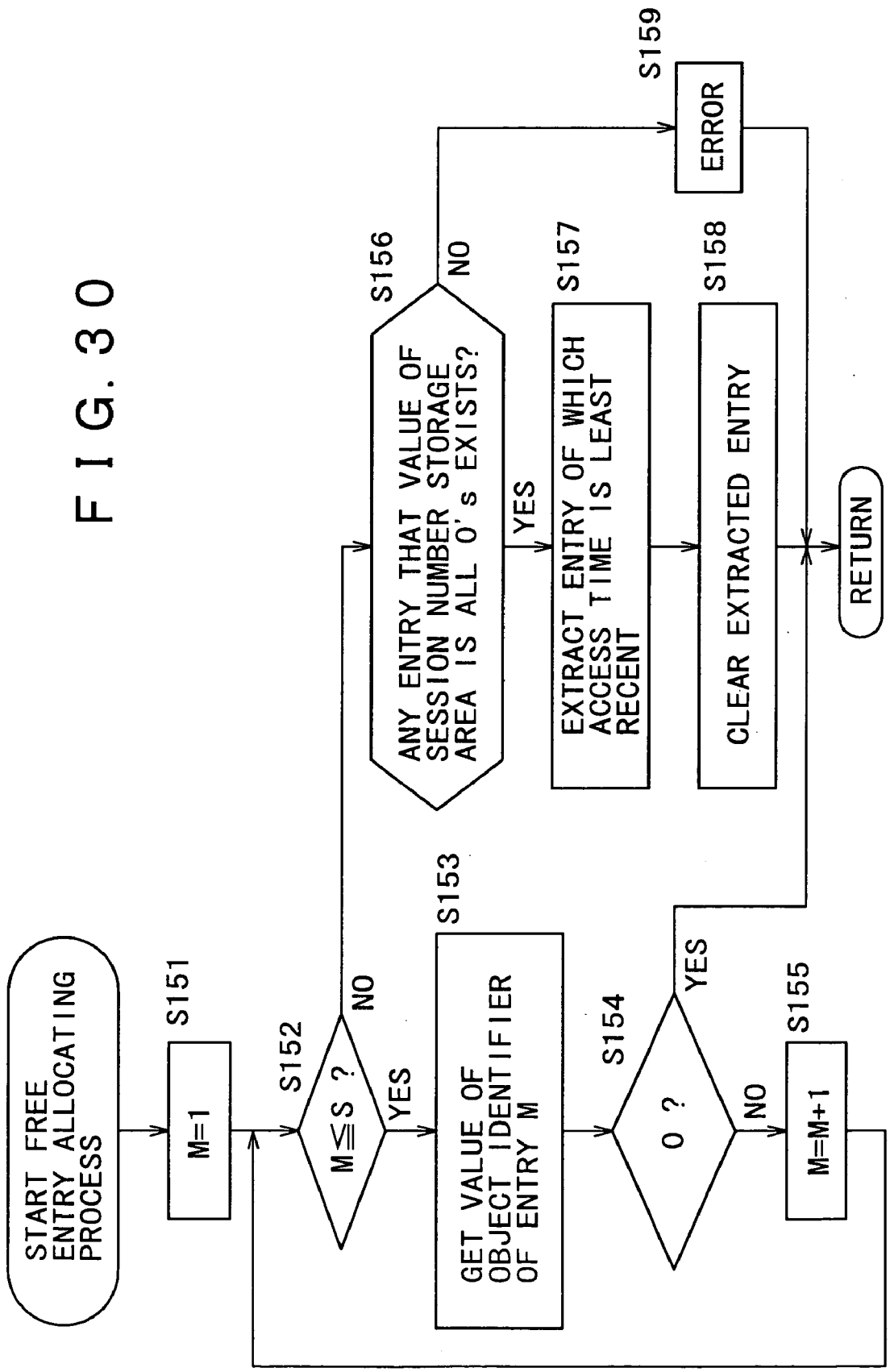
FIG. 30 is a flowchart describing a free entry allocating process.

In step S122 shown in FIG. 28, in order to allocate pages of a chunk to which an object of object type number t is recorded, the HD DB 91 reads the size of the object of object type number t from the size recording area 167 of entry t of object type recording area 163 to compute the number of pages of the chunk equivalent to the computed size. Let the computed number of pages be g.

In step S123, the HD DB 91 allocates a free entry among the plurality of entries forming the session managing information 181. The following describes a process of free entry allocation with reference to the flowchart shown in FIG. 30.

In step S151, the HD DB 91 initializes variable M to 1. In step S152, the HD DB 91 determines whether or not variable M is equal to or smaller than the number of entries S forming the session managing information 181. If variable M is found equal to or smaller than the number of entries S, then the procedure goes to step S153. In step S153, the HD DB 91 reads the value of the object identifier storage area 183 forming the session managing information 181. In step S154, the HD DB 91 determines whether or not the value of the object identifier storage area 183 of retrieved entry M is 0. If the value of object identifier storage area 183 of entry M is found 0, it indicates that entry M is a free entry, so that entry M is allocated, upon which the procedure returns to FIG. 28.

In step S154, if the value of the object identifier storage area 183 of entry M is found not 0, then the procedure goes to step S155. In step S155, the HD DB 91 increments variable M by 1. The procedure returns to step S152 to repeat the above-mentioned processes. Then, if the value of object identifier storage area 183 of entry M is found not 0 in step S154 and variable M is found not equal to or smaller than the number of entries S in step S152, it indicates that there is currently no free entry, so that the procedure goes to step S156 to create a free entry.

In step S156, the HD DB 91 determines whether or not, among the entries forming the session managing information 181, there is any entry that the values of the read/write session number storage block 184 and the read-only session number storage blocks 185 through 188 are all 0s. If such an entry is found, the procedure goes to step S157. In step S157, the HD DB 91 extracts, from among the entries that the values of the read/write session number storage block 184 and read-only session number storage blocks 185 through 188 are all 0s, the entry that the value of the access time storage area 192 is the smallest (namely, the entry of the least recent access time).

In step S158, the HD DB 91 clears the values of the current session count storage area 182 through access time storage area 192 of the extracted entry to 0s and allocates this entry as free entry M. The procedure returns to FIG. 28.

It should be noted that, in step S156, among the entries forming the session managing information 181, if there is no entry that the values of the read/write session number storage block 184 and the read-only session number storage blocks 185 through 188 are all 0s, it indicates that no free entry can be allocated, so that the procedure goes to step S159. In step S159, the HD DB 91 determines an error. The free entry allocating processing comes to an end and the object creating process shown in FIG. 28 is discontinued.

Returning to FIG. 28, in step S124, the HD DB 91 searches the area information recording area 164 for a bit sequence recorded with 0s by g bits continuously. Let the start position of the retrieved bit sequence recorded with 0s by g bits continuously be column q, row p. In step S125, the HD DB 91 stores, in the object identifier storage area 183 of allocated entry M, object identifier OID (q, p, t) formed by chunk number q, page number p, and object type number t as shown in FIG. 27. In addition, the HD DB 91 stores session number Z into the read/write session number storage area 184 of the entry M in session managing information 181 and records "CREATE" indicative of the object creation into the object state storage area 189.

In step S126, the HD DB 91 allocates a write cache area d equal to the number of pages g indicative of the size of the object, into the buffer 56. In step S127, the HD DB 91 stores the address of the write cache area d allocated in the buffer 56 into the write cache address storage area 191 of entry M of the session managing information 181.

In step S128, the HD DB 91 starts recording object X of object basic type 1 shown in FIG. 26A to the write cache area d allocated in the buffer 56. In doing so, the HD DB 91 first records the object identifier OID (q, p, t) to the object identifier recording area 201 in the write cache area d. In step S129, the HD DB 91 records the arbitrary data of the object to be created (for example, the name of the object to be created) to the arbitrary data recording area 202 in the write cache area d.

In step 130, the HD DB 91 waits for the input of signal I representative of a user operation. In step S131, the HD DB 91 determines whether or not signal I is "commit," namely whether or not signal I is for establishing the session creation. If signal I is found a commit, then the procedure goes to step S132 to establish write session Z. If signal I is fount not a commit, then the procedure goes to step S133 to discard write session Z.

Figure 31:
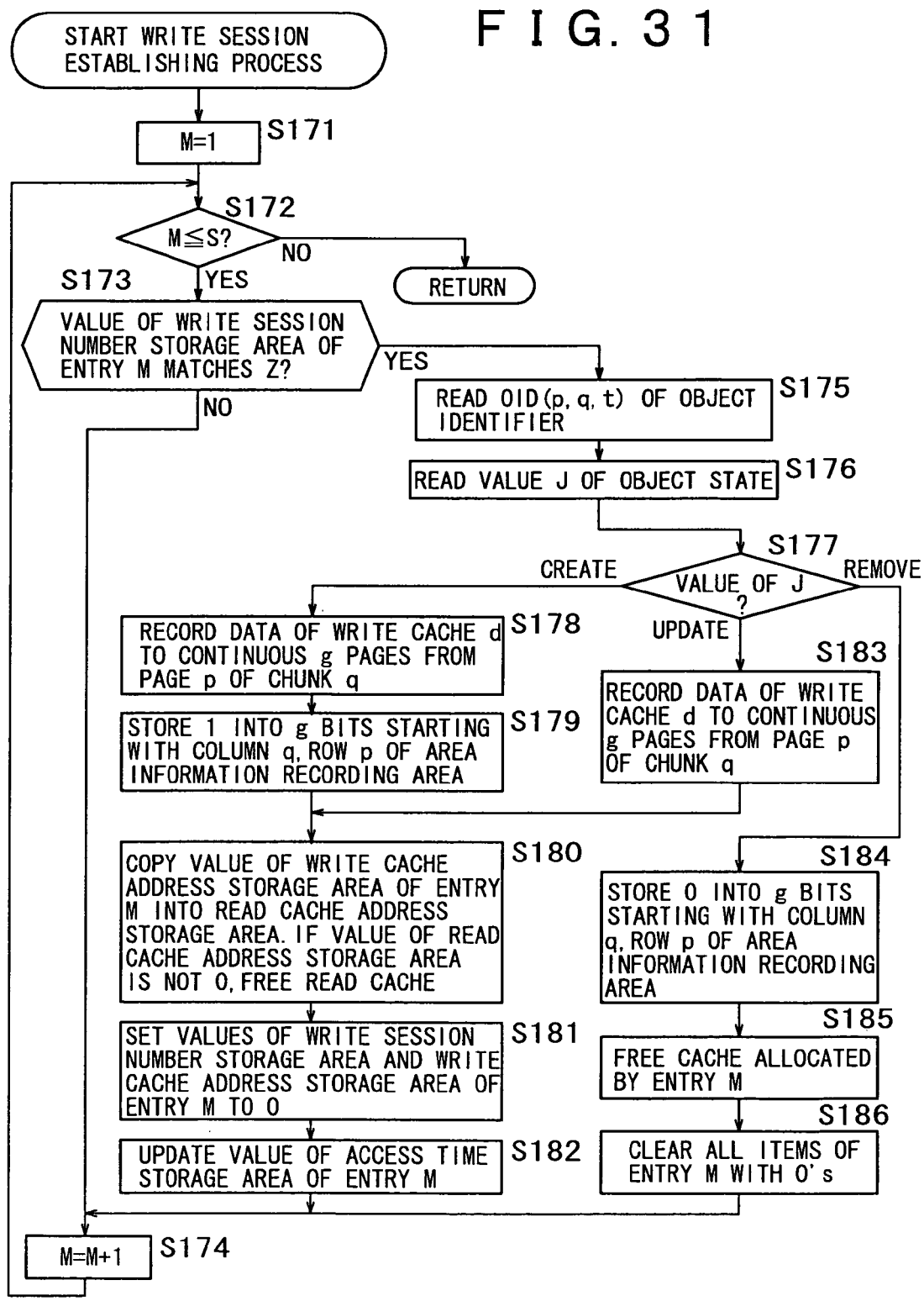
FIG. 31 is a flowchart describing a write session establishing process.

The following describes a process of establishing the write session shown in step S132 with reference to the flowchart shown in FIG. 31. It should be noted that "establishment of a session" herein denotes to reflect the recording in the object recording area 122 upon creation, updating and moving or the like of an object performed after opening of the session concerned and enter the results of the reflection.

In step S171, the HD DB 91 initializes variable M to 1. In step S172, the HD DB 91 determines whether or not variable M is equal to or smaller than the number of entries S forming the session managing information 181. If variable M is found equal to or smaller than the number of entries S, then the procedure goes to step S173. In step S173, the HD DB 91 reads the value of read/write session number storage area 184 of entry M forming the session managing information 181 to determine whether or not this value matches session number Z. If the value of the read/write session number storage area 184 of entry M is found not matching session number Z, the procedure goes to step S174 to search for an entry that the value of the read/write session number storage area 184 of entry M matches session number Z.

In step S174, the HD DB 91 increments variable M by 1. The procedure returns to step S172 to repeat the above-mentioned processes. If the value of the read/write session number storage area 184 of entry M is found matching session number Z in step S173, then the procedure goes to step S175. Namely, only the entry in which session number Z is stored in the read/write session number storage area 184 is extracted to be processed in steps S175 and on.

In step S175, the HD DB 91 reads the object identifier from the object identifier storage area 183 of entry M in which session number Z is stored in the read/write session number storage area 184. In step S176, the HD DB 91 reads information J indicative of object state from the object state storage area 189 of entry M in which session number Z is stored in the read/write session number storage area 184. In step S176, the HD DB 91 determines whether information J indicative of object state is "CREATE", "UPDATE", or "REMOVE".

If information J indicative of object state is found "CREATE", then the procedure goes to step S178. In step S178, the HD DB 91 records the object recorded to the write cache area d allocated in the buffer 56 to pages q and on of chunk p in the object recording area 122. In step S179, the HD DB 91 records 1 to g bits subsequent to column q, row p in the area information recording area 164.

In step S180, the HD DB 91 copies the value of write cache address storage area 191 of entry M to the read cache address storage area 190. If a value other than 0 is stored in the read cache address storage area 190, then the read cache area in which the buffer 56 indicated by that value is arranged is freed.

In step S181, the HD DB 91 stores 0s into the read/write session number storage area 184 of entry M and the write cache address storage area 191 of entry M. In step S182, the HD DB 91 updates the value of the access time storage area 192 of entry M by the current time.

If information J indicative of object state is found "UPDATE" in step S177, the procedure goes to step S183. In step S183, the HD DB 91 records the object recorded to write cache area d allocated in the buffer 56 to pages q and on of chunk p in object recording area 122. The procedure goes to step S180.

If information J indicative of object state is found "REMOVE" in step S177, the procedure goes to step S184. In step S184, the HD DB 91 records 0s to g bits subsequent to column q, row p of the area information recording area 164. In step S185, the HD DB 91 frees the write cache and read cache allocated in the buffer 56 by entry M. In step S186, the HD DB 91 stores 0s into the object identifier storage area 183 through the access time storage area 192 of entry M. The processing goes to step S174.

Then, the processes subsequent to step S172 are repeated until variable M is found not equal to or smaller than the number of entries S in step S172. If variable M is found not equal to or smaller than the number of entries S, the process for establishing the write session is completed.

Figure 32:
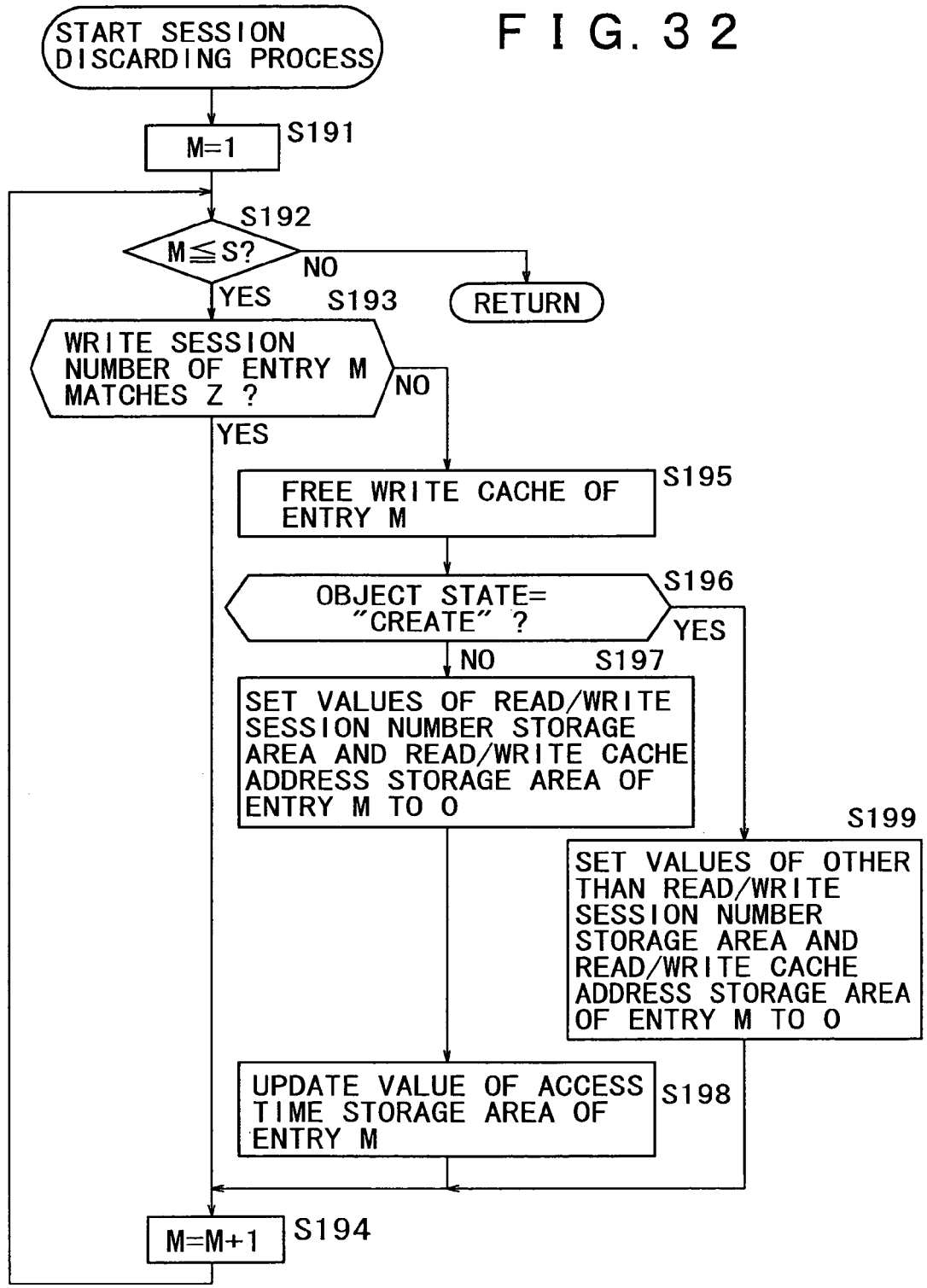
FIG. 32 is a flowchart describing a session discarding process.

The following describes the process of step S133 shown in FIG. 28, namely, the process of discarding a write session with reference to the flowchart shown in FIG. 32. In step S191, the HD DB 91 initializes variable M to 1. In step S192, the HD DB 91 determines whether or not variable M is equal to or smaller than the number of entries S forming the session managing information 181. If variable M is found equal to or smaller than the number of entries S, the procedure goes to step S193.

In step S193, the HD DB 91 reads the value of the read/write session number storage area 184 of entry M forming the session managing information 181 to determine whether or not the value matches session number Z. If the value of the read/write session number storage area 184 of entry M is found not matching session number Z, then the procedure goes to step S194 to search for an entry in which the value of the read/write session number storage area 184 of entry M matches session number Z. In step S194, the HD DB 91 increments variable M by 1. The procedure returns to step S192 to repeat the above-mentioned processes.

If the value of the read/write session number storage area 184 of entry M is found matching session number Z in step S193, then the procedure goes to step S195. Namely, only the entry in which session number Z is stored in the read/write session number storage area 184 is extracted and processed in steps 195 and on.

In step S195, the HD DB 91 frees the write cache area allocated in the buffer 56 by entry M. In step S196, the HD DB 91 determines whether or not the object state stored in the object state storage area 189 is "CREATE". If the object state is found not "CREATE", the procedure goes to step S197.

In step S197, the HD DB 91 stores 0s into the read/write session number storage area 184 and the write cache address storage area 191 of entry M. In step S198, the HD DB 91 updates the value of the access time storage area 192 of entry M by the current time. The procedure goes to step S194.

It should be noted that, if the object state stored in the object state storage area 189 of entry M is found "CREATE" in step S196, then the procedure goes to step S199. In step S199, the HD DB 91 stores 0s in the areas other than the read/write session number storage area 184 and the write cache address storage area 191 of entry M, namely stores 0s into the object identifier storage area 183, read-only session number storage areas 185 through 188, the object state storage area 189, the read cache address storage area 190, and the access time storage area 192. Then, the procedure goes to step S194.

Then, until variable M is found not equal to or smaller than the number of entries S in step S192, the above-mentioned processes are repeated. If variable M is found not equal to or smaller than the number of entries S, the write session discarding process comes to an end.

Figure 33:
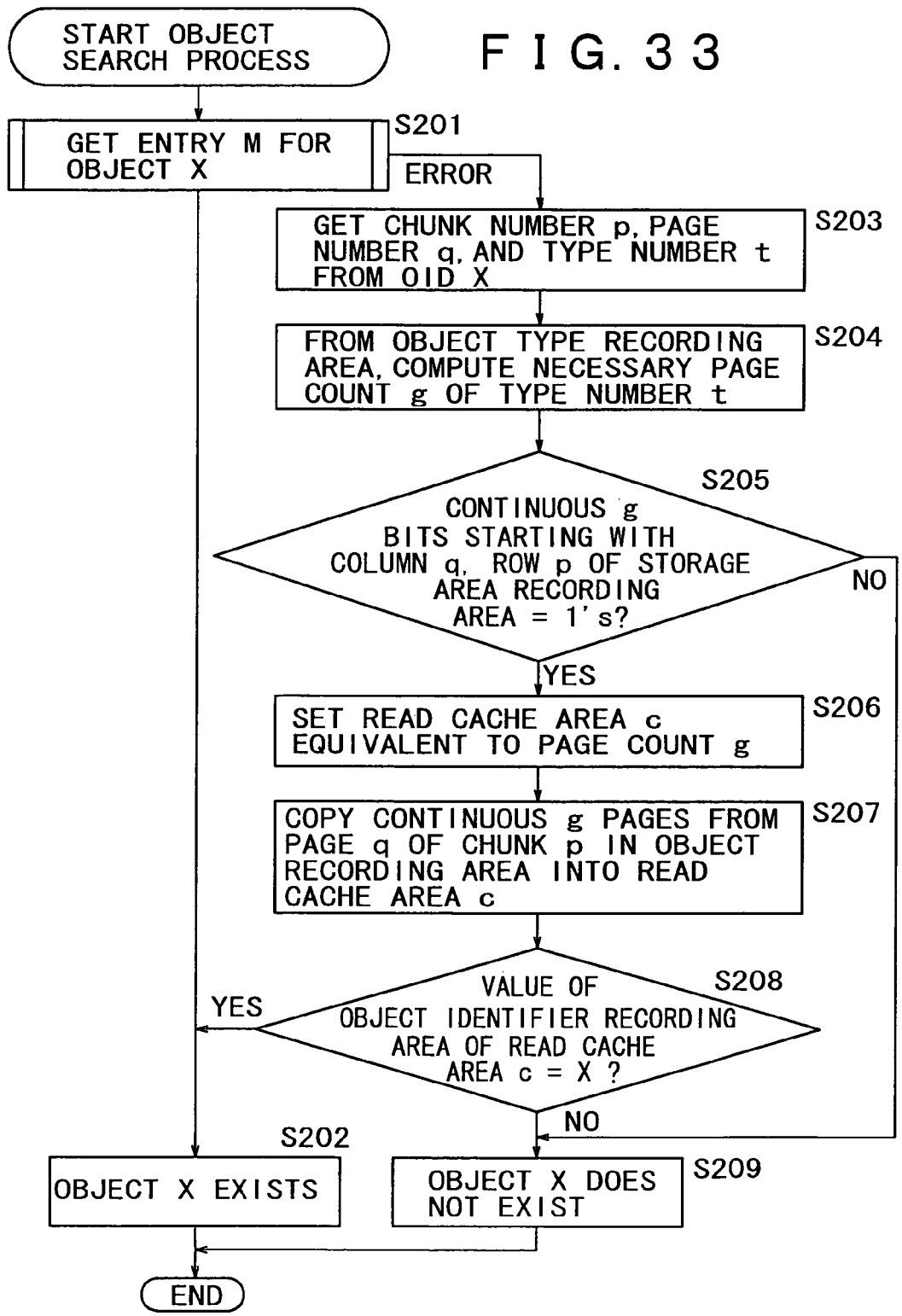
FIG. 33 is a flowchart describing an object searching process.
Figure 34:
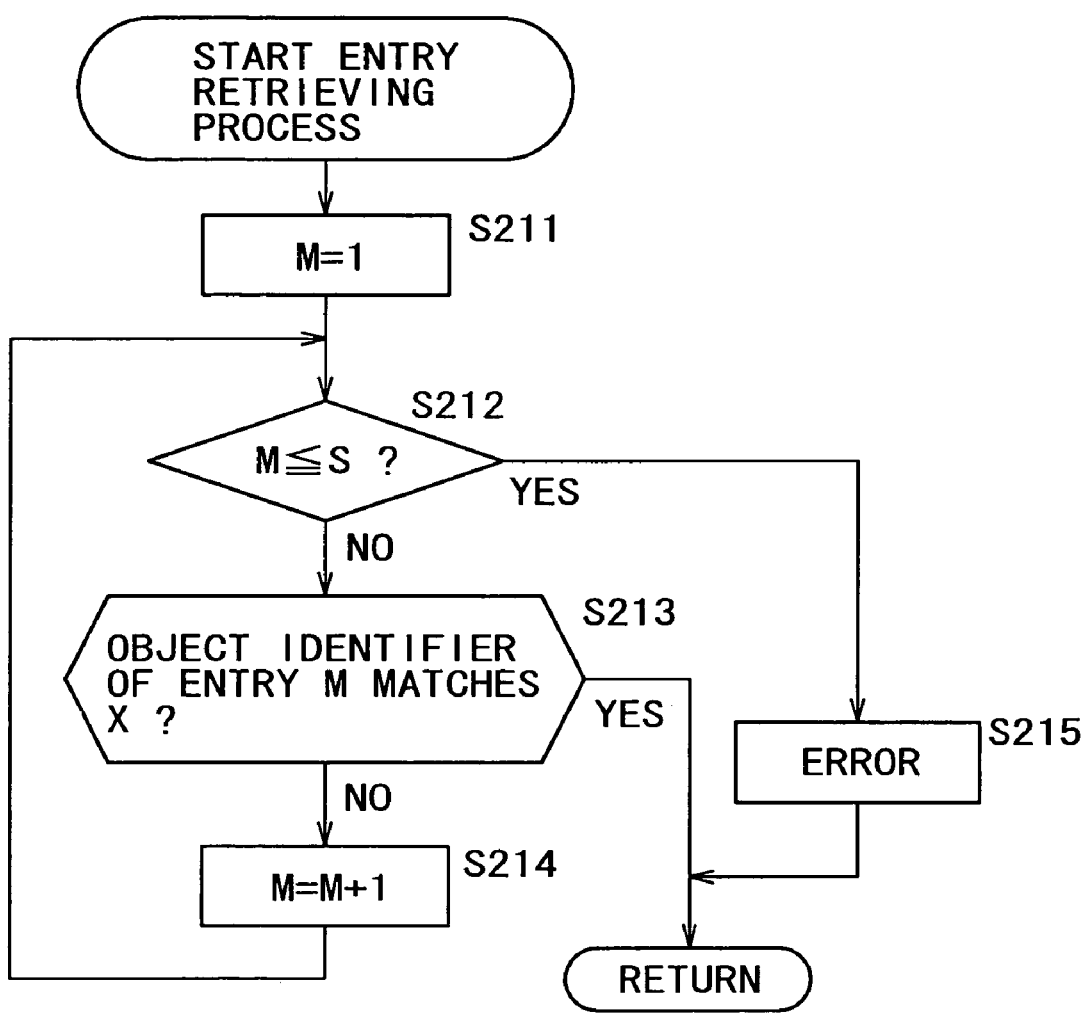
FIG. 34 is a flowchart describing an entry retrieving process.

The following describes an object search process by use of an example in which an object having object identifier OID=X (hereafter referred to as object X) with reference to the flowchart shown in FIG. 33. It should be noted that the session is assumed to have already been opened.

In step S201, the HD DB 91 gets entry M corresponding to object X. The process of getting the entry for object X will be described below with reference to the flowchart shown in FIG. 34.

In step S211, the HD DB 91 initializes variable M to 1. In step S212, the HD DB 91 determines whether or not variable M is equal to or smaller than the number of entries S forming the session managing information 181. If variable M is determined equal to or smaller than the number of entries S, then the procedure goes to step S213.

In step S213, the HD DB 91 reads the value of the object identifier storage area 183 of entry M forming the session managing information 181 to determine whether or not this value matches identifier OID=X of object X. If the value of the object identifier storage area 183 of entry M is found not matching object identifier OID=X of object X, then the procedure goes to step S214 to search for an entry in which the value of the object identifier storage area 183 matches object identifier OID=X of object X.

In step S214, the HD DB 91 increments variable M by 1. The procedure returns to step S212 to repeat the above-mentioned processes. If the value of the object identifier storage area 183 of entry M is found matching object identifier OID=X of object X in step S123, it indicates that entry M corresponding to object X has been retrieved, so that this process comes to an end, the procedure returning to FIG. 33.

It should be noted that, in step S213, the decision in which the value of the object identifier storage area 183 of entry M does not match object identifier OID=X of object X is repeated and variable M is not equal to or smaller than the number of entries S in step S212, the procedure goes to step S215. In step S215, the HD DB 91 determines an error, namely, the HD DB 91 has failed to get entry M for object X, thereby ending this process. The procedure returns to FIG. 33.

Returning to FIG. 33, if entry M for object X is retrieved in step S201, then the procedure goes to step S202. In step S202, because entry M for object X has been retrieved, the HD DB 91 determines that object X is in the buffer 56, thereby ending this process.

Conversely, if entry M for object X is not retrieved in step S201, the procedure goes to step S203. In step S203, the HD DB 91 resolves object identifier OID=X of object X to get the chunk number, page number, and object X type number t of the object recording area 122 in which the object is recorded.

In step S204, the HD DB 91 reads the value of the size recording area 167 corresponding to type number t from the object type recording area 163 and, on the basis of the retrieved value, computes the number of pages g necessary for recording object X.

In step S205, the HD DB 91 references the area information recording area 164 to determine whether or not g bits subsequent to column q, row p are 1s. If the g bits subsequent to column q, row p of the area information recording area 164 are found 1s, then the procedure goes to step S206. In step S206, the HD DB 91 sets read cache area c equivalent to the number of pages g to the buffer 56. In step S207, the HD DB 91 copies the data recorded to the pages g subsequent to page p of chunk q in the object recording area 122 to the read cache area c of the buffer 56.

In step S208, the HD DB 91 determines whether or not the object identifier recorded to a portion equivalent to the object identifier recording area 201 of the data copied to the read cache area c matches object identifier X. If a match is found, it indicates that the data cached in the read cache area c is object X, so that the procedure goes to step S202.

If the object identifier recorded to the portion equivalent to the object identifier recording area 201 of the data copied to the read cache area c is found not matching object identifier X, the procedure goes to step S209. In step S209, the HD DB 91 determines that object X does not exist in the object recording area 122 either, upon which this process comes to an end.

Figure 35:
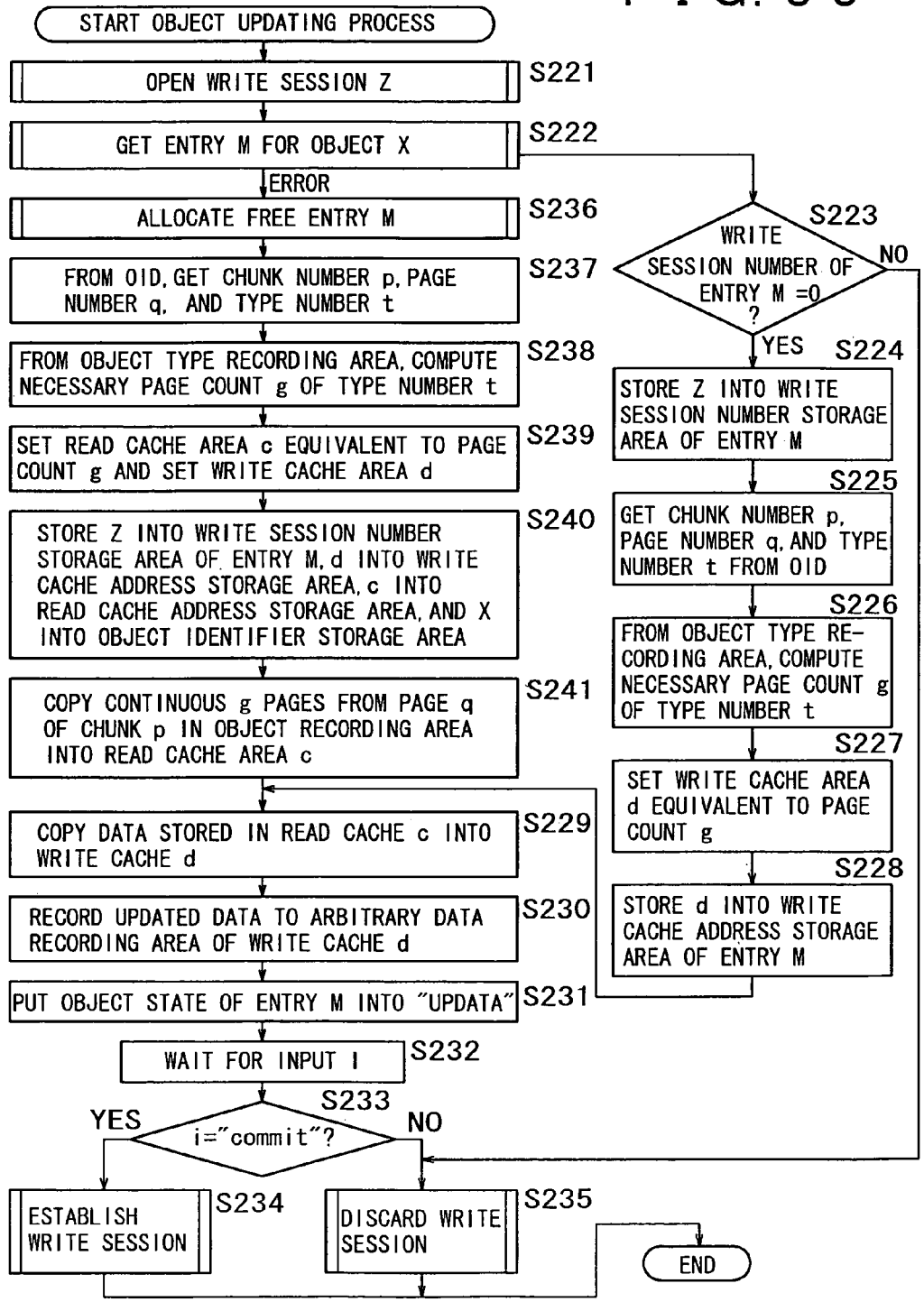
FIG. 35 is a flowchart describing an object updating process.

The following describes an object X updating process with reference to the flowchart shown in FIG. 35. The object X updating process herein denotes the rewriting given data of object X.

In step S221, the HD DB 91 opens write session Z as with the above-mentioned process of step S121 described with reference to FIG. 29. In step S222, the HD DB 91 gets entry M for object X as with the above-mentioned process of step S201 described with reference to FIG. 34.

If entry M for object X is retrieved in the process of step S222, then the HD DB 91 determines that object X is cached in the read cache area c set to the buffer 56, upon which the procedure goes to step S223. In step S223, the HD DB 91 determines whether or not the value of the read/write session number storage area 184 of entry M is 0. If the value of the read/write session number storage area 184 of entry M is found 0, then the procedure goes to step S224.

In step S224, the HD DB 91 stores session number Z of the write session opened in step S221 into the read/write session number storage area 184 of entry M. In step S225, the HD DB 91 resolves object identifier OID=X of object X to get the chunk number, page number, and object X type number t of the object recording area 122 in which the object is recorded.

In step S226, the HD DB 91 reads the value of the size recording area 167 of the entry corresponding to type number t from the object type recording area 163 and, on the basis of the retrieved value, computes the number of pages g necessary for recording object X. In step S227, the HD DB 91 sets write cache area d equivalent to the number of pages g to the buffer 56. In step S228, the HD DB 91 stores the address of write cache area d into the write cache address storage area 191 of entry M.

In step S229, the HD DB 91 copies the data in the read cache area c in buffer 56 to the write cache area d. In step S230, the HD DB 91 records given data of object X to be updated to the arbitrary data recording area 202 of object X copied to the write cache area d.

In step S232, the HD DB 91 waits for the inputting of signal I corresponding to a user operation. In step S233, the HD DB 91 determines whether or not signal I is commit, namely whether signal I establishes the session update operation. If signal I is found commit, then, the procedure goes to step S234. In step S234, the HD DB 91 establishes write session Z as with the process of step S132 described above with reference to FIG. 31. Conversely, if signal I is found not commit, the procedure goes to step S235. In step S235, the HD DB 91 discards write session Z as with the process of step S133 as described above with reference to FIG. 32.

It should be noted that, if the value of the read/write session number storage area 184 of entry M is found not 0 in step S223, it indicates that object X is being updated by a session other than session Z, so that the procedure goes to step S235.

If, in step S222, entry M corresponding to object X is not retrieved, the procedure goes to step S236. In step S236, the HD DB 91 allocates free entry M as with the process of step S123 described above with reference to FIG. 30.

In step S237, the HD DB 91 resolves object identifier OID=X of object X to get the chunk number, page number, and object X type number t of the object recording area 122 in which the object is recorded. In step S238, the HD DB 91 reads the value of the size recording area 167 of the entry corresponding to type number t from the object type recording area 163 and, on the basis of the retrieved value, computes the number of pages g necessary for recording object X. In step S239, the HD DB 91 sets the read cache area c and write cache area d corresponding to the number of pages g to the buffer 56.

In step S240, the HD DB 91 stores the address of the read cache area c into the read cache address storage area 190 of entry M, the address of the write cache area d into the write cache address storage area 191 of entry M, and object identifier IOD=X of object X into the object identifier storage area 183 of entry M.

In step S241, the HD DB 91 copies the data of object X recorded up to the number of pages g subsequent to page p of chunk q in the object recording area 122 to the read cache area c in the buffer 56. The procedure goes to step S229.

As described, the file X updating process copies the data of file X from the read cache area c to the write cache area d, rewrites the data of file X cached in the write cache area d, and records the rewritten data to the object recording area 122 by the session establishing operation.

Figure 36:
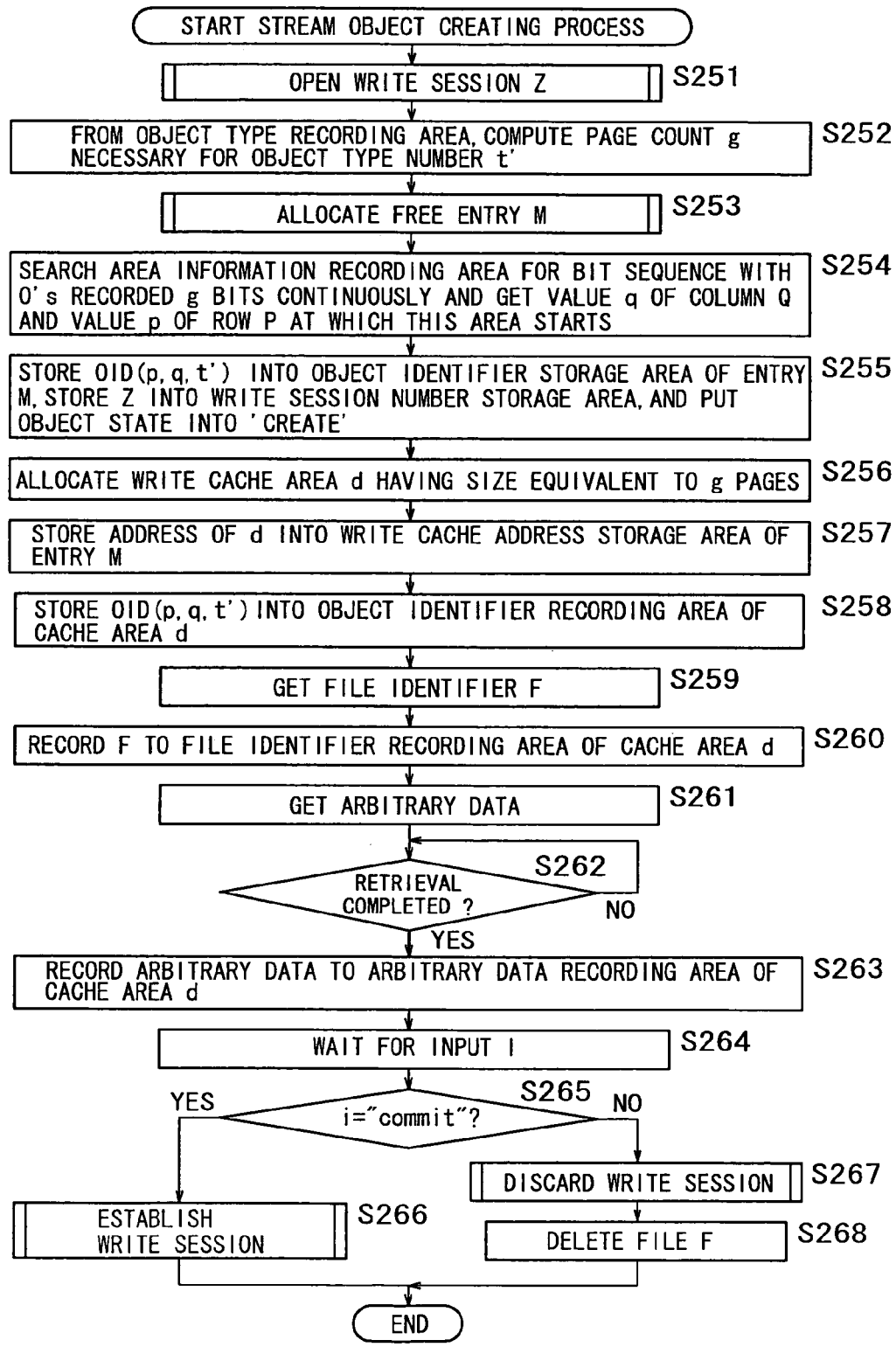
FIG. 36 is a flowchart describing a stream object creating process.

The following describes a process of creating an object of a track corresponding, one to one, to the content data to be recorded to the file recording area 121, namely an stream object having object type number t' with reference to the flowchart shown in FIG. 36. It should be noted that object type number t' includes a basic type number (in this example, basic object number 2) and an entry number.

In step S251, the HD DB 91 opens a write session as with the process of step S121 described above with reference to the flowchart of FIG. 29. In step S252, in order to allocate the pages of a chunk to which the stream object of object type number t' is to be recorded, the HD DB 91 reads the size of the object having object type number t' from the size recording area 167 of entry t' of the object type recording area 163 to compute the number of pages of the chunk equivalent to the retrieved size. Let the computed number of pages be g.

In step S253, the HD dB 91 allocates free entry M among a plurality of entries forming the session managing information 181 as with the process of step S123 described above with reference to the flowchart of FIG. 30. In step S254, the HD DB 91 searches the area information recording area 164 for a bit sequence in which g bits are continuously 0s. Let the start position of the retrieved bit sequence in which g bits are continuously 0s be column q, row p. In step S255, the HD DB 91 stores object identifier OID (q, p, t') formed by chunk number q, page number p, and object type number t' as shown in FIG. 27 into the object identifier storage area 183 of allocated entry M. Further, the HD DB 91 stores session number Z into the read/write session number storage area 184 of entry M of the session managing information 181 and records "CREATE" indicative of creation to the object state storage area 189.

In step S256, the HD DB 91 allocates write cache area d equal to the number of pages g, which is the size of the stream object, into the buffer 56. In step S257, the HD DB 91 stores the address of the allocated write cache area d in the buffer 56 into the write cache address storage area 191 of entry M of the session managing information 181.

In step S258, the HD DB 91 starts recording stream object X of object basic type 2 shown in FIG. 26B to the write cache area d allocated in the buffer 56. To begin with, the HD DB 91 records object identifier OID (q, p, t') to the object identifier recording area 201 of the write cache area d. In step S259, the HD DB 91 gets file identifier F (the same value as the cluster number of the start cluster of a cluster sequence to which the present content data are recorded) of the content data to be created by the HD FS 92, which corresponds to the stream object. In step S260, the HD DB 91 records file identifier F to the file identifier recording area 203 of the write cache area d.

In step S261, the HD DB 91 starts getting given data (for example, the name of a stream object to be created) of a stream object to be created. In step S262, the HD DB 91 waits until the data retrieval is completed. It should be noted that, while the processes of steps S261 and S262 are performed, a file of the content data having file identifier F corresponding to the stream object concerned is created and recorded to the file recording area 121 by the HD FS 92.

In step S263, the HD DB 91 records the retrieved given data to the arbitrary data recording area 202 of the write cache area d.

In step S264, the HD DB 91 waits for the inputting of signal I corresponding to a user operation. In step S265, the HD DB 91 determines whether or not signal I is commit, namely, whether or not signal I establishes the session creation. If signal I is found commit, the procedure goes to step S266. In step S266, the HD DB 91 establishes write session Z as with the process of step S132 described above with reference to FIG. 31.

Conversely, if signal I is found not commit, then the procedure goes to step S267. In step S267, the HD DB 91 discards write session Z as with the process of step S133 described above with reference to FIG. 32. In step S268, the HD DB 91 requests the HD FS 92 to delete file F. Thus, the process of stream object creation is performed.

The following describes a process of searching for a stream object having object identifier OID=X (hereafter referred to as stream object X) with reference to the flowchart shown in FIG. 37. It should be noted that the session has already been opened.

In step S271, the HD DB 91 executes the same process as the object X search process described above with reference to FIG. 33. In step S272, the HD DB 91 gets the object type number included in object identifier OID=X of object X retrieved in the process of step S271. Let the retrieved object type number be t. Further, the HD DB 91 gets the object basic type number included in object type number t.

In step S273, the HD DB 91 determines whether or not the basic object type number of retrieved object X is basic object type 2. If the basic object type number of the retrieved object X is found basic object type 2, it indicates that the retrieved object X is a stream object, so that the procedure goes to step S274. In step S274, the HD DB 91 reads the file identifier from the file identifier recording area 203 of the retrieved stream object X and supplies the retrieved file identifier to the HD FS 92.

It should be noted that, if the object having object identifier OID=X could not be retrieved in step S271, the procedure goes to step S275. Further, if the basic object type number of the retrieved object X is found not basic object type 2 in step S273, the procedure also goes to step S275. In step S275, the HD DB 91 determines an error, namely that there is no stream object X, thereby ending the stream object search process.

Figure 38:
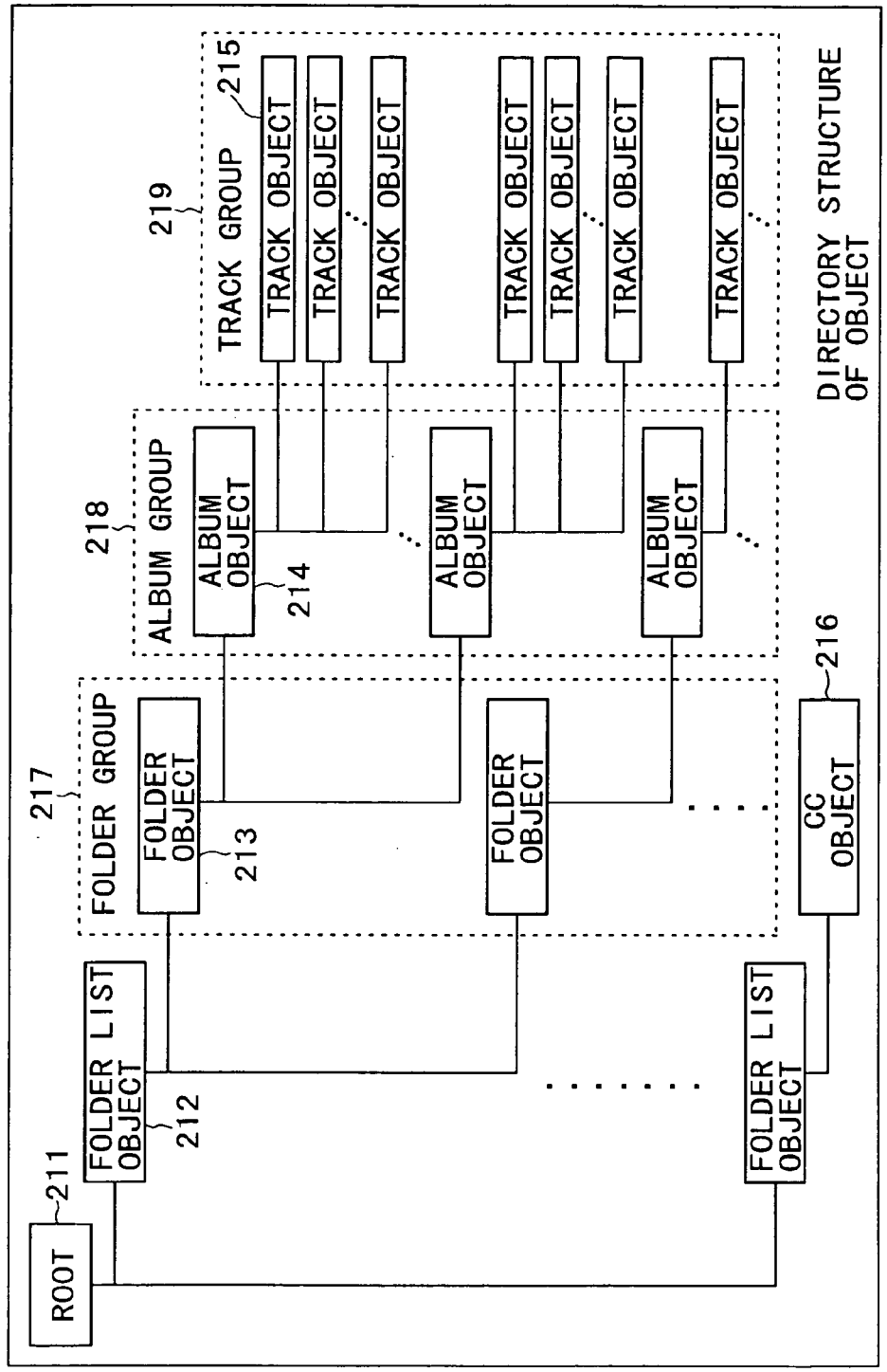
FIG. 38 is a diagram illustrating an object directory structure.

Now, referring to FIG. 38, there is shown a directory structure of the objects recorded to the object recording area 122. The object recording area 122 is hierarchically formed by a root 211, folder list objects 212, folder objects 213, album objects 214, and track objects 215 in this order.

The HD DB 91 can create a plurality of folder objects below each folder list object 212. The HD DB 91 can create a plurality of album objects 214 below each folder object 213. The HD DB 91 can create a plurality of track objects 215 below each album object 214. Each track object 215 corresponds to the content data for one piece of music.

Each folder object 213, album object 214, and track object 215 are objects which are presented to the user when selecting music to be played back. The HD DB 91 can create information objects (for example, a CC (Content Control) object 216) other than the objects to be presented to the user, below the root 211, the folder list object 212, or the folder object 213.

If the folder object 213 is created below the folder list object 212, the HD DB 91 prohibits any other objects than the folder object 213 to be created below the same folder list object 212. If the album object 214 is created below the folder object 213, the HD DB 91 prohibits any other objects than the album object 214 below the same folder object 213. The HD DB 91 also prohibits any other objects than track object 215 to be created below the album object 214.

Each of the above-mentioned objects is recorded in accordance with the above-mentioned rules, so that a folder group 217, an album group 218, and a track group 219 are constructed in the object recording area 122.

The following describes the data format of each of the above-mentioned objects.

FIG. 39 shows the data format of the folder list object 212. Because the folder list object 212 belongs to basic object type 1 shown in FIG. 26A, it is formed by the object identifier recording area 201 and the arbitrary data recording area 202. To the object identifier recording area 201 of the folder list object 212, a 4-byte object identifier OID is recorded.

To the arbitrary data recording area 202 of the folder list object 212, the maximum number MAX (4 bytes) of folder objects 213 that can be created below this folder list object 212, the number of folder objects 213 N (4 bytes) created below this folder list object 212, and 4×100-byte Folder indicative of the matrix of IDs of folder objects 213 created below this folder list object 212 are recorded. The arbitrary data recording area 202 of the folder list object 212 has a 612-byte reserved area.

FIG. 40 shows the data format of the folder object 213. Because the folder object 213 belongs to basic object type 1 shown in FIG. 26A, it is formed by the object identifier recording area 201 and the arbitrary data recording area 202. To the object identifier recording area 201 of the folder object 213, a 4-byte object identifier OID is recorded.

To the arbitrary data recording area 202 of the folder object 213, the maximum number MAX (4 bytes) of album objects 214 that can be created below this folder object 213, the number of album objects 214 N (4 bytes) created below this folder object 213, 4×200-byte Album indicative of the matrix of IDs of album objects 214 created below this folder object 213, and 36-byte Title indicative of the folder name of this folder object 213 are recorded. The arbitrary data recording area 202 of the folder object 213 has a 176-byte reserve area.

FIG. 41 shows the data format of the album object 214. Because the album object 214 belongs to basic object type 1 shown in FIG. 26A, it is formed by the object identifier recording area 201 and arbitrary data recording area 202. To the object identifier recording area 201 of the album object 214, a 4-byte object identifier OID is recorded.

To the arbitrary data recording area 202 of the album object 214, the maximum number MAX (4 bytes) of track objects 215 that can be created below this album object 214, the number N (4-bytes) of track objects 215 created below this album object 214, 4×400-byte Track indicative of the matrix of IDs of track objects 215 created below this album object 214, 516-byte Title indicative of the name of this album object 214, 260-byte Artist indicative of the artist name of this album object 214, 8-byte Creation Date indicative of the date of creation of this album object 214, and 32-byte media key indicative of the media key of the music CD 3, which is the source of this album object 214 are recorded. The arbitrary data recording area 202 of the album object 214 has a 1660-byte reserve area.

FIG. 42 shows the data format of the track object 215. Because the track object 215 belongs to basic object type 2 shown in FIG. 26B, it is formed by the object identifier recording area 201, the arbitrary data recording area 202, and file identifier recording area 203. To the object identifier recording area 201 of the track object 215, a 4-byte object identifier OID is recorded. To the file identifier recording area 203 of the track object 215, a 4-byte SOID indicative of the file identifier of the content data (recorded to the file recording area 121) corresponding on a one-to-one basis.

To the arbitrary data recording area 202 of the track object 215, 516-byte Title indicative of the music title of this track object 215, 260-byte Artist indicative of the artist name of this track object 215, 8-byte Time indicative of the playback time of this album object 214, 8-byte Last Access Date indicative of the date on which this track object 215 was accessed last, 4-byte play counter (PC) indicative of the playback count of this track object 215, 8-byte Creation Date on which this track object 215 was created, and 12544-byte AC indicative of the music attribute and playback control information (the information for copyright protection) of the content data corresponding to this track object 215 are recorded. The arbitrary data recording area 202 of the track object 215 has a 980-byte reserved area.

FIG. 43 shows the details of the 12544-byte AC to be recorded to the arbitrary data recording area 202 of the track object 215. To the AC, 8-byte Ckey indicative of a content key, 1-byte Codec indicative of codec identification value, 1-byte Coded Attr indicative of codec attribute, 1-byte LT indicative of playback limitation information, 1-byte VLD indicative of validity check flag, 1-byte LCMLOGNUM indicative of the number of check-out destinations, 16-byte CDI indicative of codec dependency information, 20-byte CID indicative of content serial number, 8-byte PBS indicative of playback permission start date, 8-byte PBE indicative of playback permission end date, 1-byte XCC indicative of extended CC, 1-byte CT indicative of remaining playback count, 1-byte CC indicative of content control information, 1-byte CN indicative of remaining check-out count, 40-byte SRC indicative of source information, and 48×256-byte LCMLOG indicative of information including check-out destination device ID and flag are recorded.

Especially, in the 1-byte CC indicative of content control information, bit 1 from the MSB (Most Significant Bit) side is indicative of the presence of copyright (0=copyrighted; 1=not copyrighted). Bit 2 from the MSB side is indicative of generation (0=original; 1=not original). Bits 3 and 4 from the MSB side are not in use.

The meanings of the information indicated by bits 5 through 7 from the MSB side of CC are as follows. If 010 are recorded to bits 5 through 7 from the MSB side of CC, it indicates the check-out is enabled (edit is enabled). If 011 are recorded to bits 5 through 7 of the MSB side of CC, it indicates that move is enabled (the edit on PD 5 is disabled). If 100 are recorded to bits 5 through 7 of the MSB side of CC, it indicates that import is enabled (the edit on PD 5 is enabled). If 110 are recorded to bits 5 through 7 from the MSB side of CC, it indicates import is enabled (the edit on the PD 5 is disabled).

FIG. 44 shows the data format of the content data corresponding to the track object 215 on a one-to-one basis. The content data are configured by 16-KB AT3H indicative of the header of ATRAC3, 16-KB PRT indicative of ATRAC3 part, and AT3SU-1 through AT3SU-N each being 16 KB long indicative of a sound unit sequence.

FIG. 45 shows the data format of the CC object 216. The CC object 216 belongs to basic object type 2 shown in FIG. 26B. Therefore, the CC object 216 is formed by the object identifier recording area 201 and the arbitrary data recording area 202. To the object identifier recording area 201 of the CC object 216, a 4-byte object identifier OID is recorded.

The arbitrary data recording area 202 of the CC object 216 has a 16-byte reserved area. To the file identifier recording area 203 of the CC object 216, a 4-byte SOID indicative of the file identifier of the corresponding CC data (recorded to the file recording area 121) is recorded.

FIG. 46 shows the CC data format to be recorded to the file recording area 121. The CC data includes 10-KB CatFolder, 200-KB CatAlbum, and 600-KB CatTrack. CatFolder records the information indicative of the object identifier OID of the folder object 213 corresponding to the folder selected by the user. CatAlbum records the information indicative of the object identifier OID of the album object 214 corresponding to the album selected by the user. CatTrack records the information indicative of the object identifier OID of the track object 215 corresponding to the track selected by the user.

Consequently, if the user selects a track to be played at the time of playback for example, the object identifier OID of the track object 215 corresponding to the track selected by the user is determined on the basis of CatTrack of the CC data, the corresponding file identifier is retrieved from the determined track object 215, and the content data are read for playback.

The following describes the relationship between the data flow and the firmware at the time of the execution of each function of the audio server 1 with reference to FIGS. 47 through 56.

Figure 47:
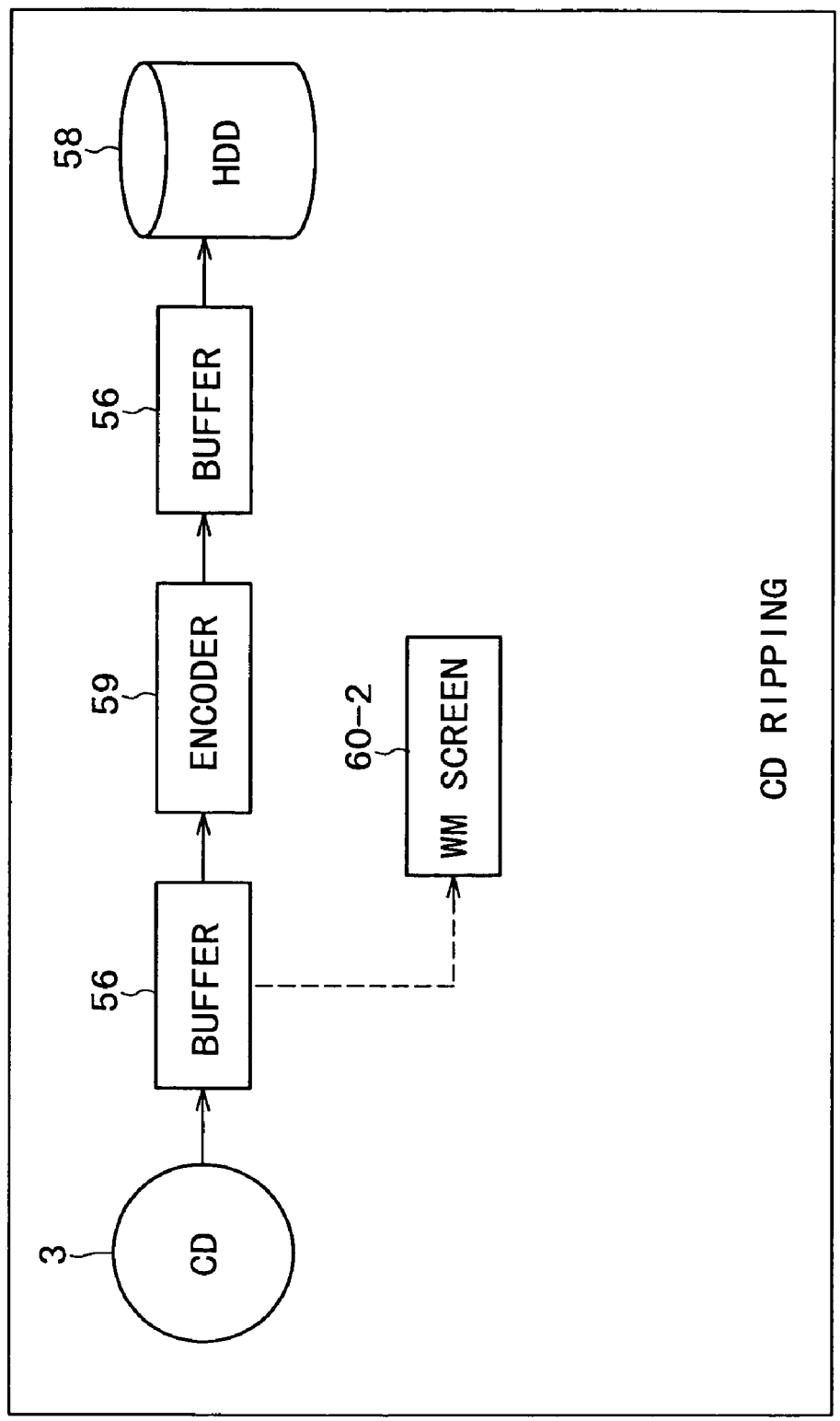
FIG. 47 is a diagram illustrating a data flow at a time when CD ripping is executed.

FIG. 47 shows the data flow at the time when CD ripping is executed. In CD ripping in which the music CD 3 is recorded at high speeds, the digital audio data in the music CD 3 are read by the CD-ROM drive 57 at a speed of CAV8x to be buffered in the buffer 56 under the control of the CD MW 88. At the same time, under the control of the HD MW 82, the digital audio data buffered in the buffer 56 are inputted in the WM screen 60-2 for watermark detection. Next, under the control of the HD MW 82, the digital audio data buffered in the buffer 56 are encoded by the encoder 59 at an average speed of 5x in the ATRAC3 technique for encryption, the resultant encrypted data are buffered in the buffer 56, and then the buffered encrypted data are transferred to the HDD 58 for recording. It should be noted that, although not shown, during CD ripping, the sound corresponding to the digital audio data under recording is outputted from the speaker 2.

Figure 48:
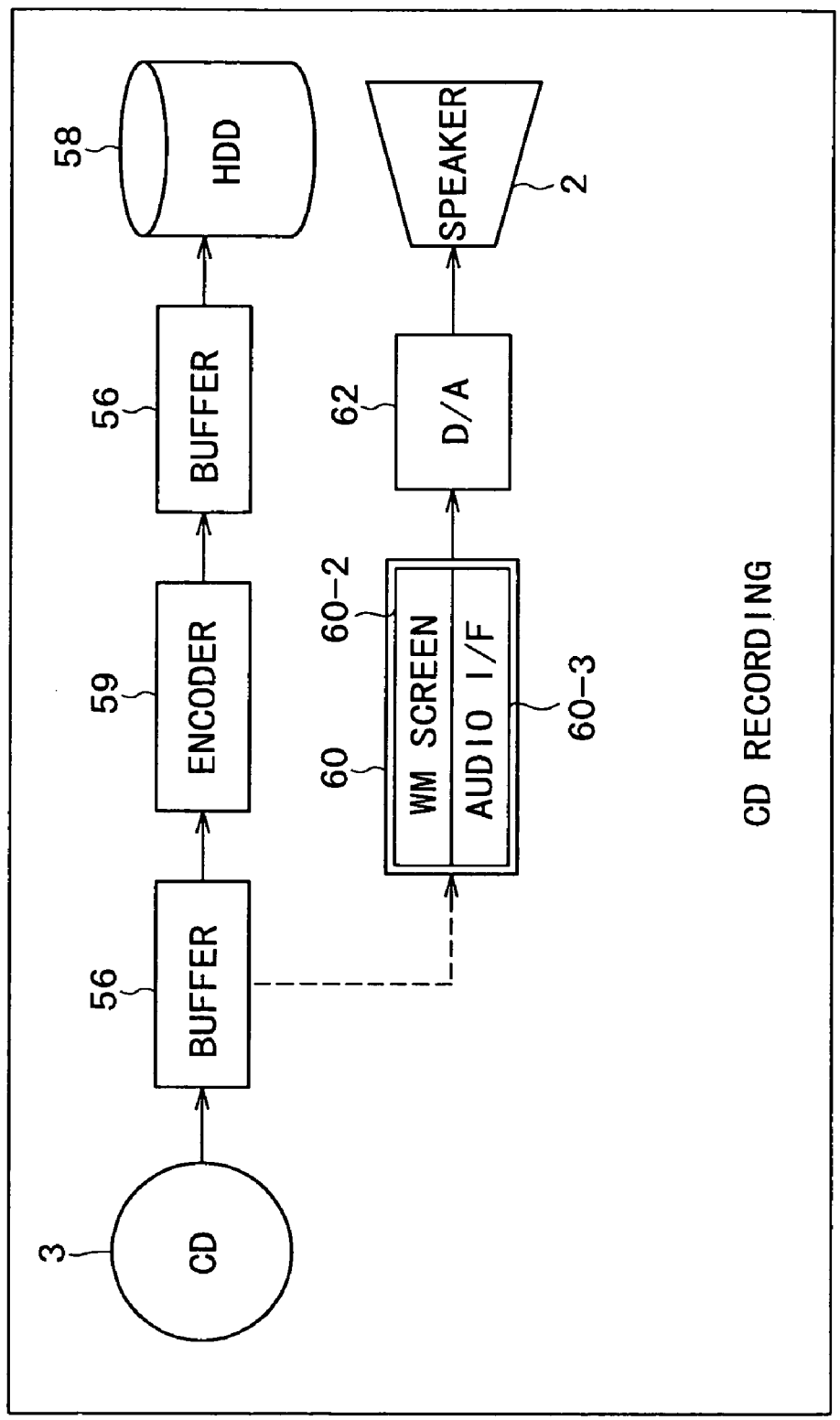
FIG. 48 is a diagram illustrating a data flow at a time when CD recording is executed.

FIG. 48 shows the data flow at the time of CD recording. In CD recording in which the music CD 3 is recorded while being played, the digital audio data in the music CD 3 are read by the CD-ROM drive 57 at a speed of CAV8x to be buffered in the buffer 56 under the control of the CD MW 88. Then, under the control of the HD MW 82, the digital audio data buffered in the buffer 56 are encoded by the encoder 59 at an average speed of 5x in the ATRAC3 technique for encryption, the resultant encrypted data are buffered in the buffer 56, and then transferred to the HDD 58 for recording. At the same time, under the control of the HD MW 82, the audio data buffered in the buffer 56 are supplied to the WM screen 60-2 for watermark detection.

On the other hand, for monitor sounding, the buffered digital audio data are temporarily recorded in a ring buffer 241 (FIG. 61) arranged in the HDD 58 and then read into the audio I/F 60-3 under the control of the HD MW 82. Next, under the control of the AIO MW 94, the digital audio data are transferred to the AD/DA 62 to be converted in analog data, and the corresponding sound is output from the speaker 2.

The details of CD ripping and CD recording will be described later with reference to FIGS. 57 through 70B.

Figure 49:
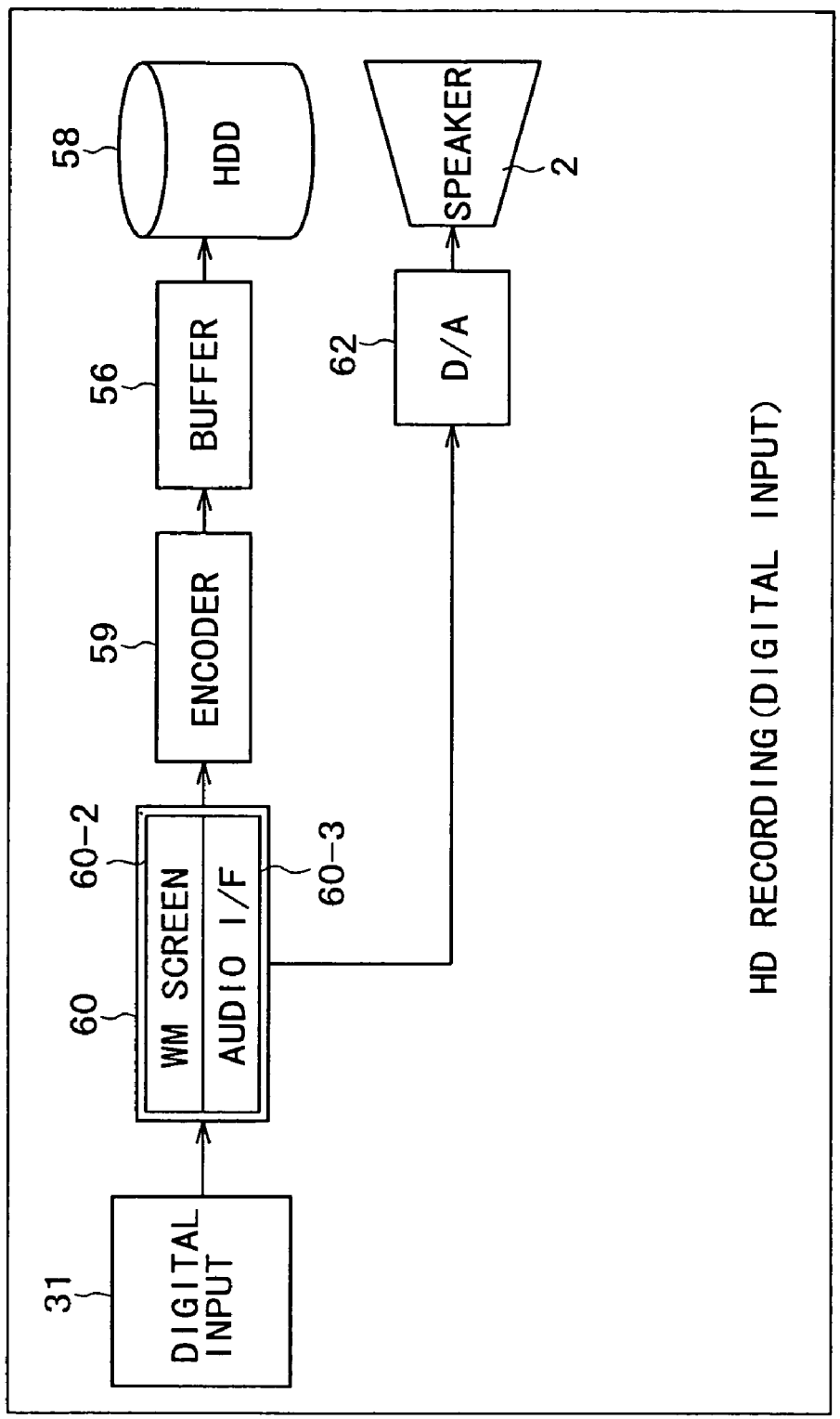
FIG. 49 is a diagram illustrating a data flow at a time when HD recording for digital input is executed.

FIG. 49 shows the data flow at the time of HD recording for digital input. In HD recording in which digital input is encoded for recording on the HDD 58, the digital audio data inputted from the AUX In terminal 31 are supplied to the encoder 59 via the signal processor 60 under the control of the AIO MW 94. Next, under the control of the HD MW 82, the digital audio data are encoded by the encoder 59 for encryption on the basis of the ATRAC3 technique and the encrypted data are transferred to the buffer 56 and then to the HDD 58 for recording. Further, under the control of the HD MW 82, the watermark is detected by the WM screen 60-2 of the signal processor 60. In addition, under the control of the AIO MW 94, the digital audio data are transferred to the D/A 62 by the audio I/F 60-3 of the signal processor 60 to be converted into analog data, which are outputted from the speaker 2.

Figure 50:
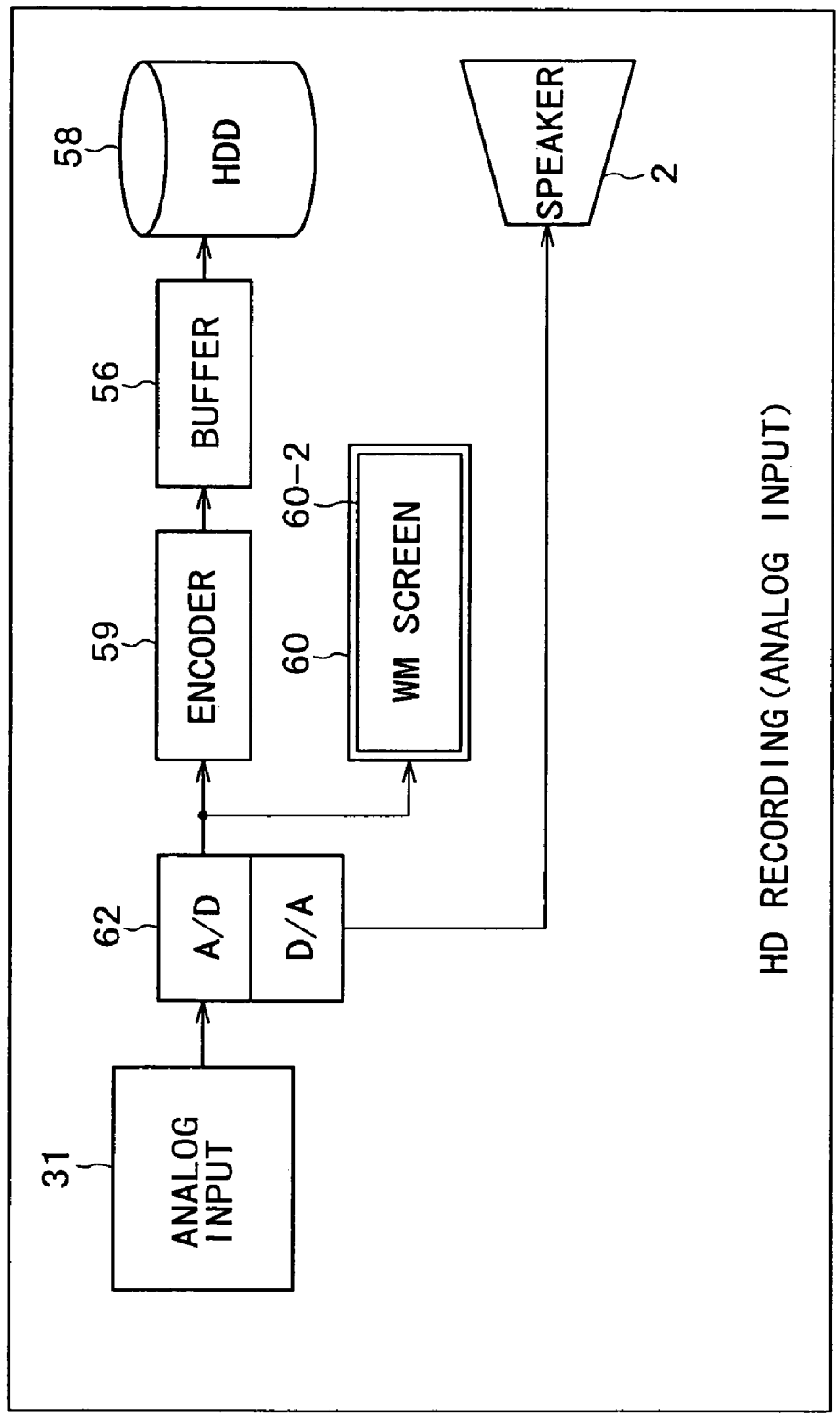
FIG. 50 is a diagram illustrating a data flow at a time when HD recording for analog input is executed.

FIG. 50 shows the data flow at the time of HD recording for analog input. In HD recording in which analog input is encoded to be recorded on the HDD 58, the analog audio data inputted from the AUX In terminal 31 are digitized by the A/D 62 to be supplied to the encoder 59 under the control of the AIO MW 94. Next, under the control of the HD MW 82, the digital audio data are encoded by the encoder 59 for encryption on the basis of the ATRAC3 technique and the encrypted data are transferred to the buffer 56 and then to the HDD 58 for recording. Further, under the control of HD MW 82, the watermark is detected by the WM screen 60-2 from the digital output of the A/D 62. Then, under the control of the AIO MW 94, the analog audio data inputted from the AUX In terminal 31 are outputted from the speaker 2.

Figure 51:
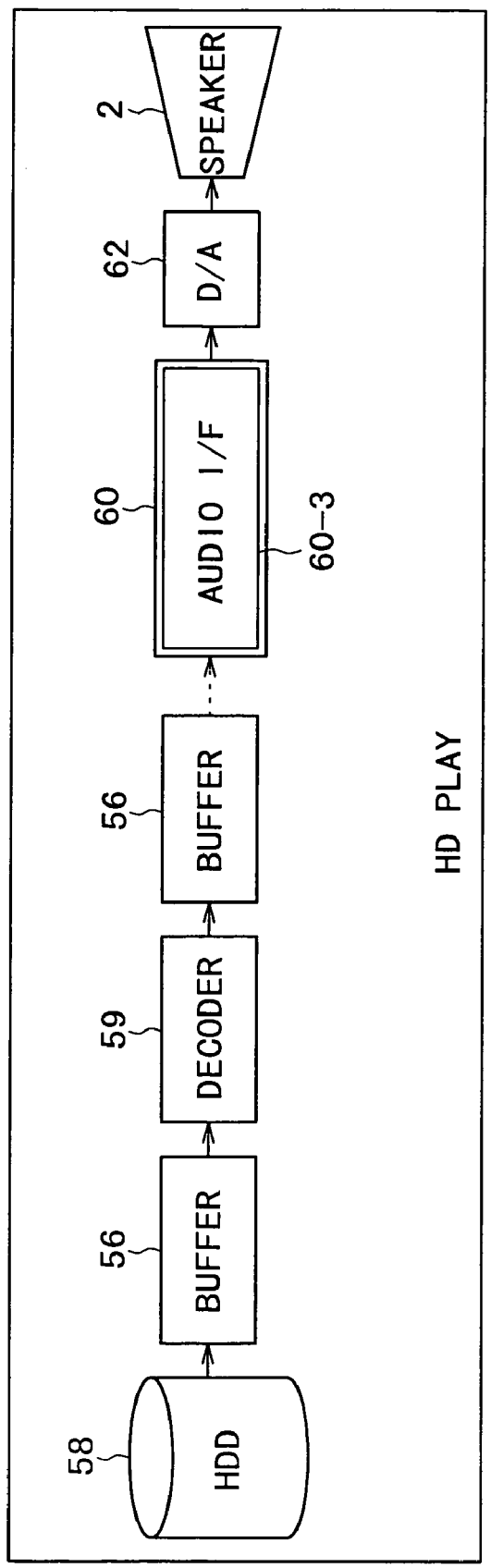
FIG. 51 is a diagram illustrating a data flow at a time when HD play is executed.

FIG. 51 shows the data flow at the time of HD play. In HD play in which encoded data recorded to the HDD 58 are played back, the encoded data read from the HDD 58 are buffered in the buffer 56 and then decrypted and decoded by the decoder 59 under the control of the HD MW 82. The resultant digital audio data are buffered in the buffer 56 and then transferred to the audio I/F 60-3. Next, the digital audio data are transferred to the D/A 62 by the audio I/F 60-3 to be converted into analog data, which are outputted from the speaker 2.

FIG. 52 shows the data flow at the time of CD play. In CD play in which the music CD 3 is played, the digital audio data stored in the music CD 3 are read by the CD-ROM drive 57 and buffered in the buffer 56 to be transferred to the audio I/F 60-3 under the control of the CD MW 88. Next, under the control of the AIO MW 94, the digital audio data are transferred to the D/A 62 by the audio I/F 60-3 to be converted into analog data, which are outputted from the speaker 2.

FIGS. 53A and 53B show each the data flow at the time of MS play. In the MS play in which the encoded data stored in the MS 4 are played, the encoded data stored in the MS 4 are supplied to the MGMS I/F 60-1 to be cross-certified and then decrypted and the resultant data are decoded by a decoder incorporated in the signal processor 60 under the control of the MS MW 89 as shown in FIG. 53A. Next, under the control of the AIO MW 94, the decoded digital audio data obtained by decoding are transferred to the D/A 62 by the audio I/F 60-3 to be converted into analog data, which are outputted from the speaker 2.

As shown in FIG. 53B, the encoded data area read from the MS 4 to be supplied to the MGMS I/F 60-1 to be cross-certified and then decrypted under the control of the MS MW 89. The decrypted encoded data are buffered in the buffer 56 and decoded by the decoder 59, the resultant digital audio data being outputted to the D/A 62 via the buffer 56. Next, under the control of the AIO MW 94, the audio data converted into analog data by the D/A 62 are outputted from the speaker 2.

Figure 54:
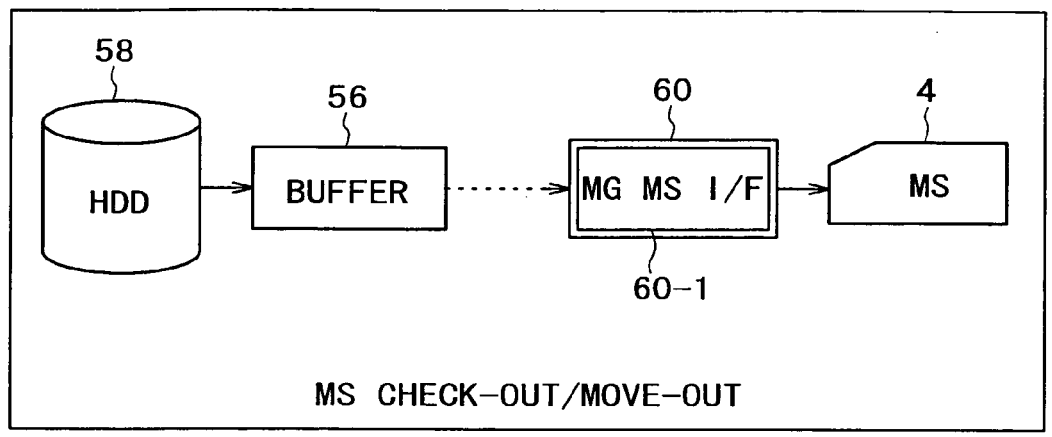
FIG. 54 is a diagram illustrating a data flow at a time when MS check-out/move-out is executed.

FIG. 54 shows the data flow at the time of MS check-out/ move-out. In the MS check-out in which the encoded data stored in the HDD 58 are copied to the MS 4 and in the MS move-out in which the encoded data stored in the HDD 58 are moved to the MS 4, the encoded data read from the HDD 58 are buffered in the buffer 56 under the control of the HD MW

82. Next, under the control of the MS MW 89, the buffered encoded data are transferred to the MGMS I/F 60-1 to be recorded to the MS 4. It should be noted that the check-out and move-out operations will be detailed later.

Figure 55:
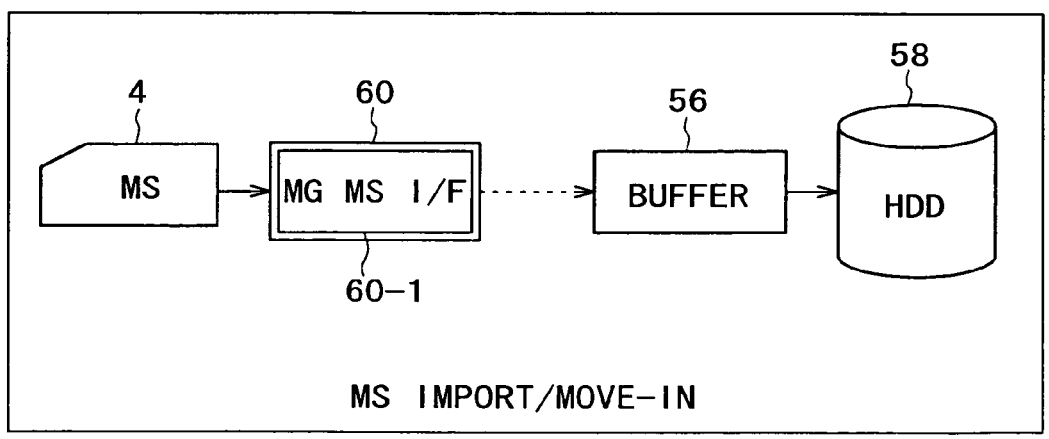
FIG. 55 is a diagram illustrating a data flow at a time when MS import/move-in is executed.

FIG. 55 shows the data flow at the time of MS import/move-in. In the MS import/move-in in which the encoded data stored in the MS 4 are moved to the HDD 58, the encoded data stored in the MS 4 are transferred to the buffer 56 via the MGMS I/F 60-1 under the control of the MS MW 89. Next, under the control of the HD MW 82, the buffered encoded data are transferred to the HDD 58 for recording. It should be noted that the import/move-in operations will be detailed later.

FIG. 56 shows the data flow at the time of PD check-out. In the PD check-out in which the encoded data stored in the HDD 58 are copied to the PD 5, the encoded data read from the HDD 58 are buffered in the buffer 56 and then decrypted by the encoder/decoder 59 and encrypted again for the PD 5 to be buffered in the buffer 56 under the control of the HD MW 82. Next, under the control of the PD MW 90, the buffered encoded data are recorded to the PD 5 via the USB host controller 54 and the USB connector 43.

The following describes the details of CD ripping and CD recording with reference to FIGS. 57 through 70B. CD ripping is performed when the user presses the high-speed recording button 24. The CD recording is performed when the user presses the recording button 23.

Figure 57:
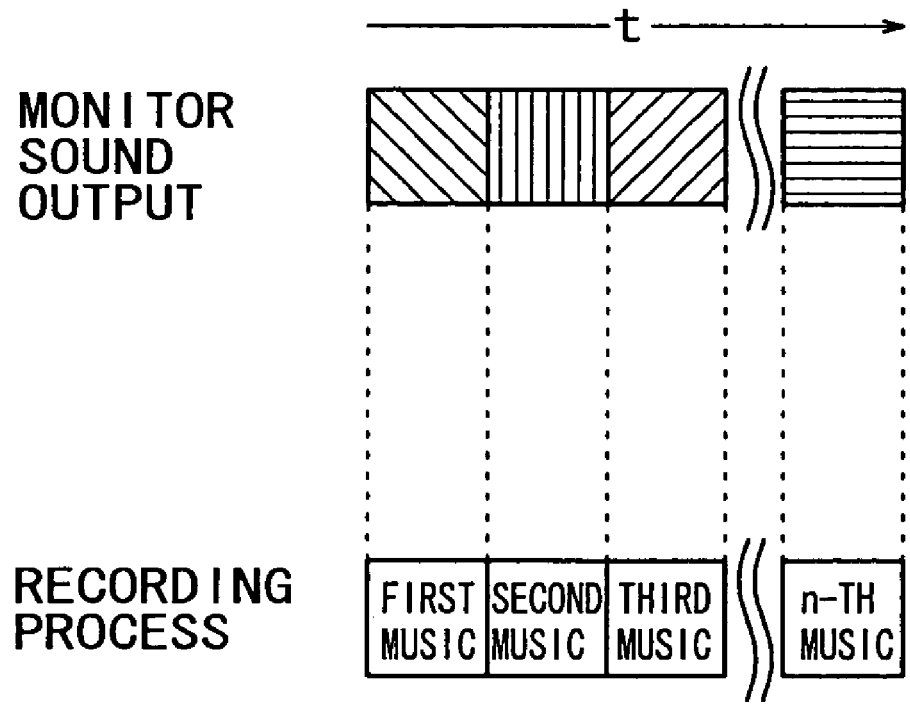
FIG. 57 is a diagram illustrating CD ripping.
Figure 58:
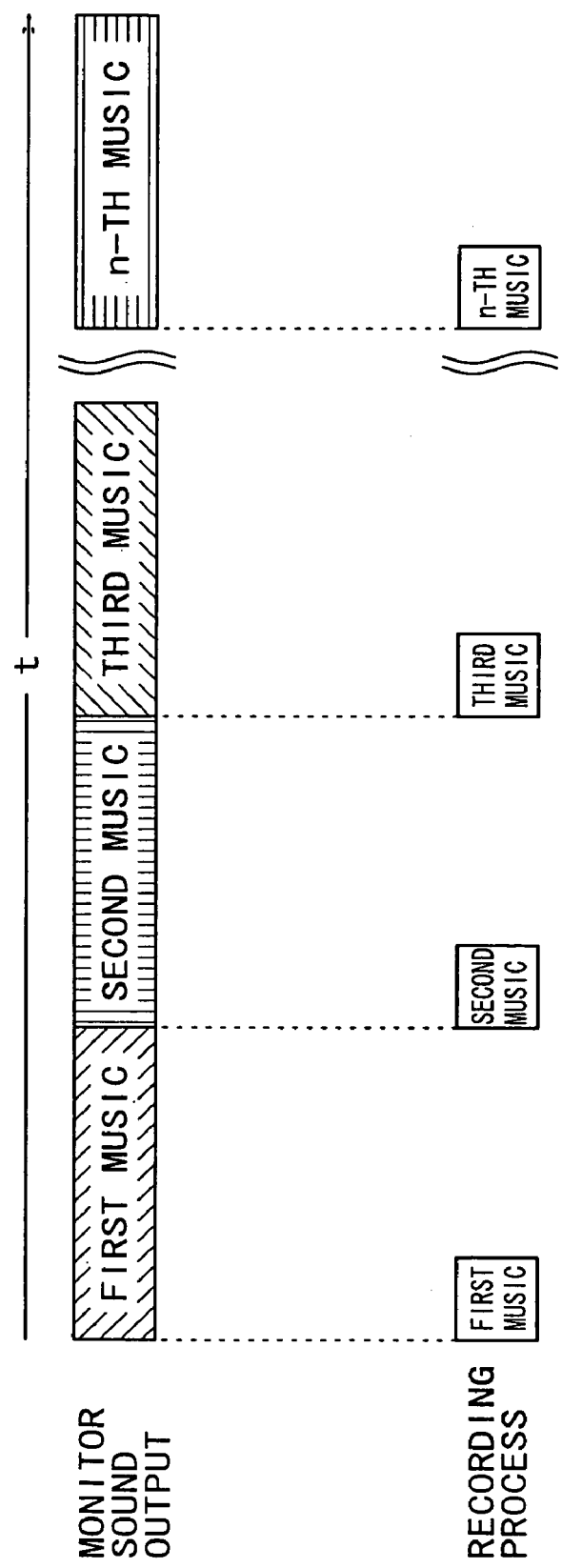
FIG. 58 is a diagram illustrating CD recording.

The following describes the difference between CD ripping and CD recording with reference to FIGS. 57 and 58. The upper portion of FIG. 57 shows the monitor sound output period in CD ripping. The lower portion of FIG. 57 shows the period of recording process (recording after encoding) in CD ripping. The upper portion of FIG. 58 shows the period of monitor sound output in CD recording. The lower portion of FIG. 58 shows the period of recording process (encoding and then recording) in CD recording.

As clearly seen from the comparison between FIG. 57 and FIG. 58, CD ripping and CD recording are the same in the total time necessary for recording process. Namely, the process in which the audio data (PCM data) stored in the music CD 3 are recorded to the HDD 58 by encoding the data on the basis of the ATRAC3 technique is performed at an average speed of 5× relative to the playback speed of the audio data.

For example, if the music CD 3 storing six pieces of music each taking 10 minutes for its play, totaling 60 minutes, is recorded by CD ripping or CD recording, these pieces of music are sequentially recorded taking about two minutes each.

The difference between CD ripping and CD recording lies in the period of monitor sound output.

In the case of CD ripping, monitor sound is outputted only in a period in which the corresponding audio data are being recorded. In the above-mentioned example of the music CD 3, from the beginning of the first piece of music, sound for about two minutes is outputted at a normal playback speed, from the beginning of the second piece of music, sound for about two minutes is outputted at a normal speed, and, subsequently, from the beginning of each of the remaining pieces of music, sound for about two minutes is outputted at a normal speed. Therefore, monitor sound output ends upon the end of the recording process.

In the case of CD recording, monitor sound is outputted regardless of the progress of the recording of the corresponding audio data. In the above-mentioned example of the music CD 3, all sound of the first piece of music is outputted at a normal playback speed, all sound of the second piece of music is outputted at a normal playback speed, and, subsequently, all sound of each of the remaining pieces of music is outputted at a normal playback speed. Therefore, even when the recording process ends, the monitor sound output of the corresponding audio data is continued until the end of the last sixth piece of music.

It should be noted that CD ripping and CD recording may be switched between as required in the course of the process.

Figure 59:
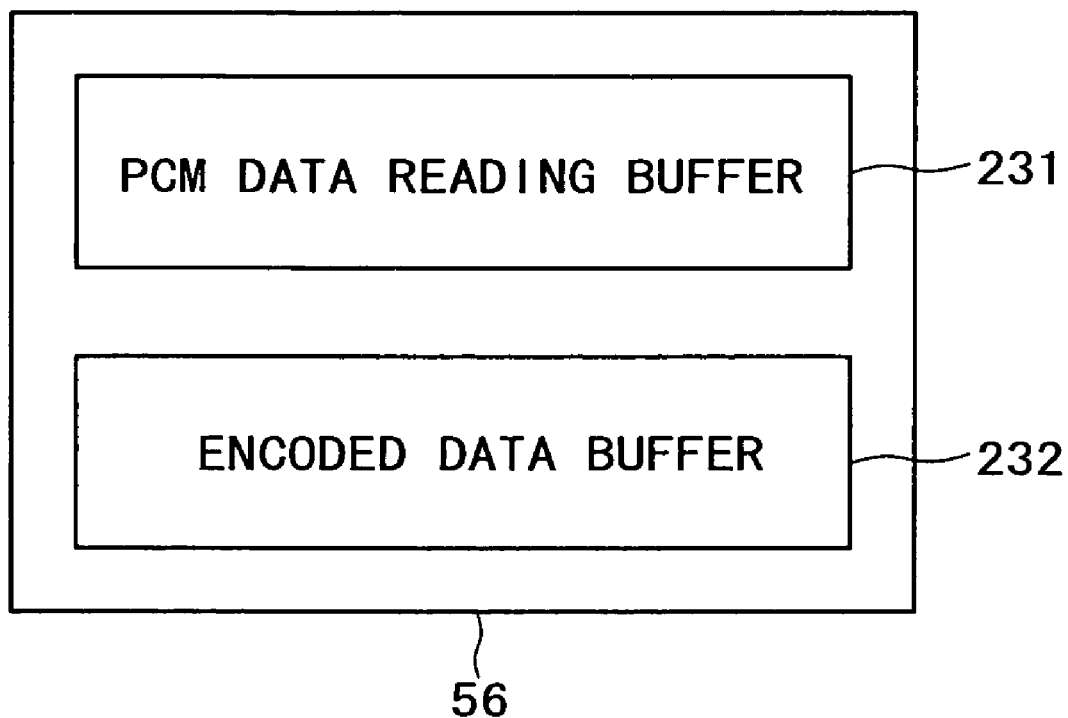
FIG. 59 is a diagram illustrating the partitioning of a buffer 56 in CD ripping or CD recording.

FIG. 59 shows a state of the buffer 56 at the time when CD ripping or CD recording is performed. The buffer 56 has a PCM data reading buffer 231 for buffering the audio data (PCM data) read from the music CD 3 before encoding and a encoded data buffer 232 for buffering the data encoded and encrypted by the encoder/decoder 59.

Figure 60:
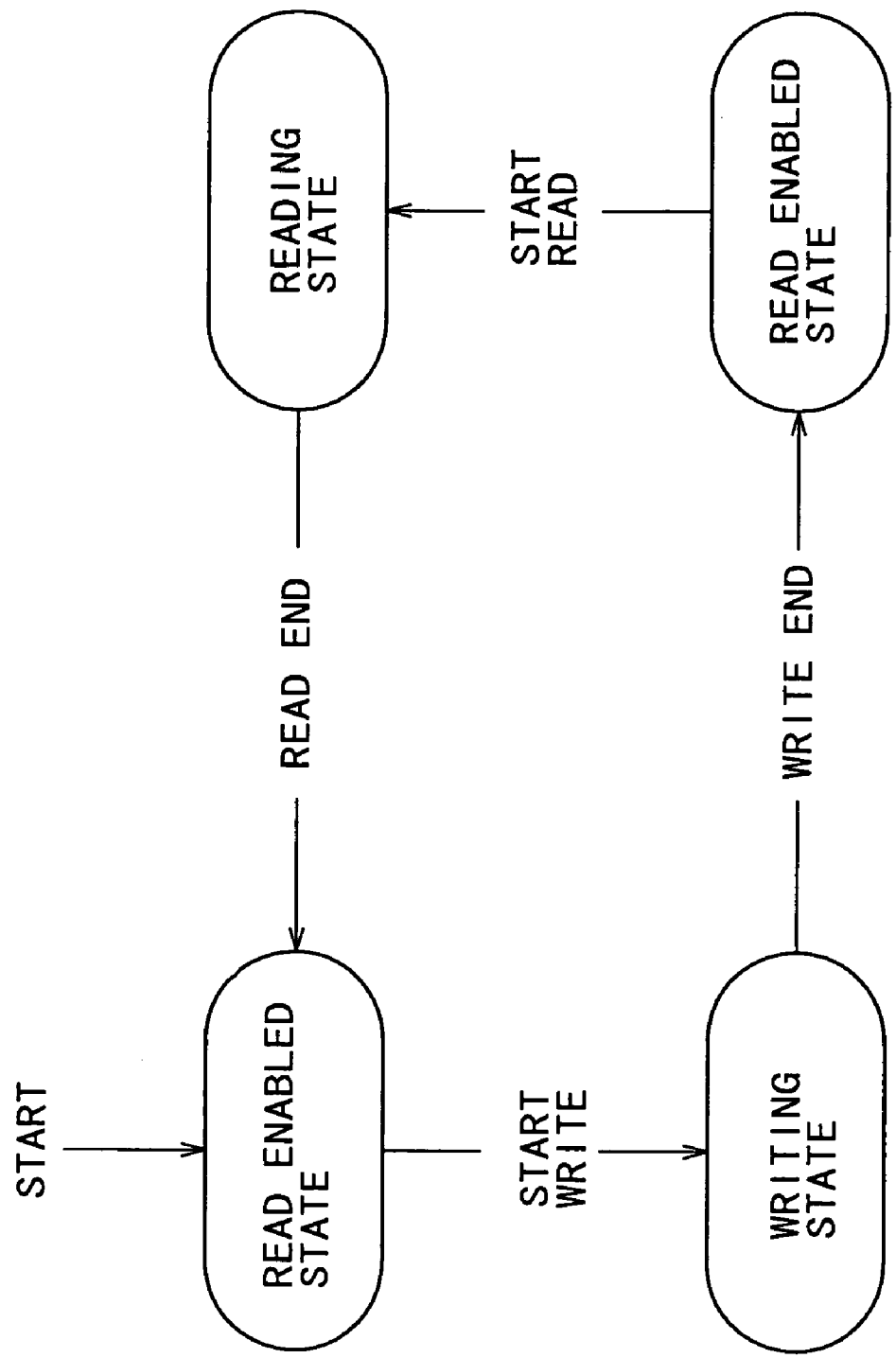
FIG. 60 is a diagram illustrating buffer transition states.

FIG. 60 shows the state transitions of the PCM data reading buffer 231 and the encoded data buffer 232 arranged in the buffer 56 and a PCM data playback buffer 251 arranged in the audio I/F 60-3. Each of the PCM data reading buffer 231, the encoded data buffer 232, and PCM data playback buffer 251 is one of the transition states, the initial write enabled state, the writing state which is entered when data writing starts, the read enabled state which is entered when data writing ends, and the reading state which is entered when data reading starts. It should be noted that, when data reading ends from the reading state, the state returns to the write enabled state.

Figure 61:
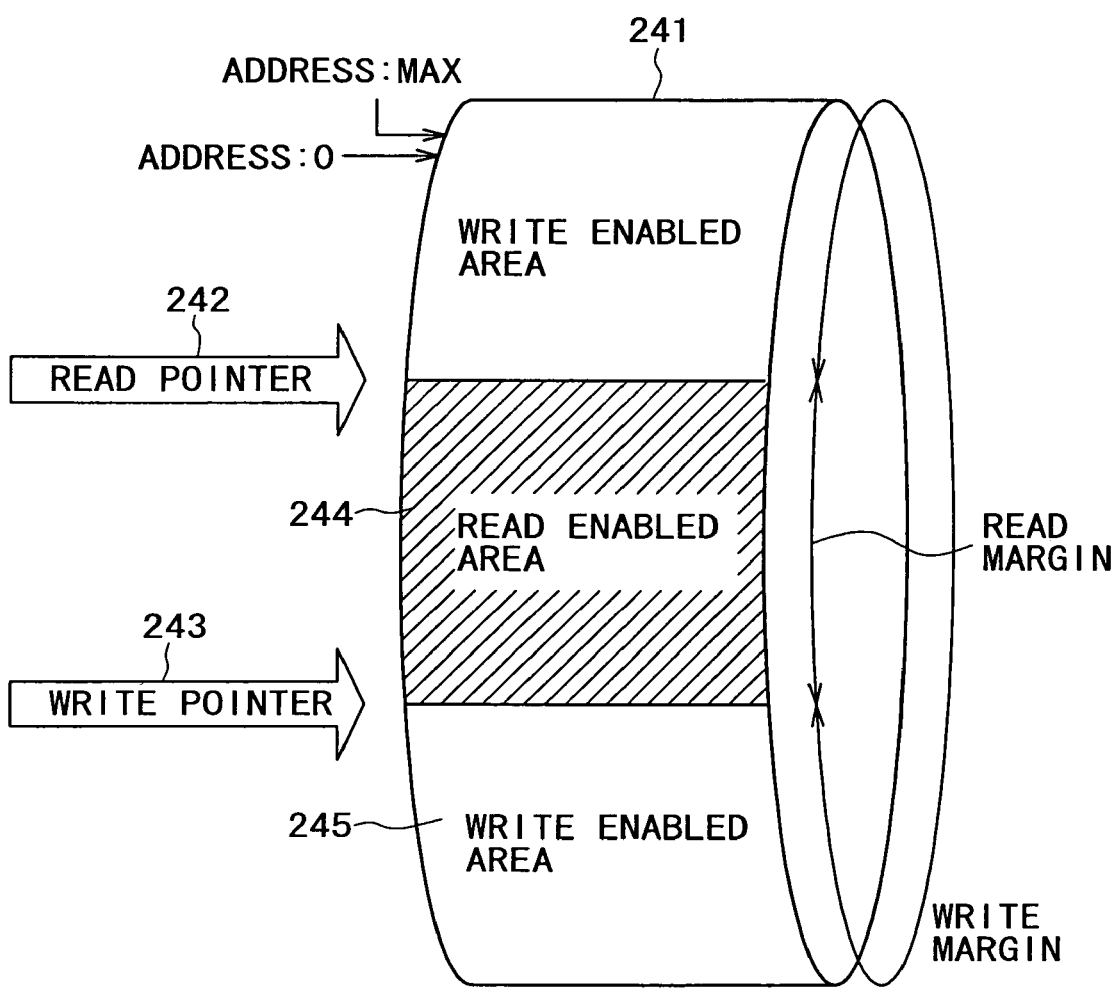
FIG. 61 is a diagram illustrating a ring buffer 241 arranged in a HDD 58.

FIG. 61 shows the structure of the ring buffer 241 arranged in the HDD 58 for buffering the PCM data for monitor sound output when CD ripping or CD recording is performed.

The ring buffer 241 having a predetermined capacity (address 0 through address max for the convenience of description) has a read pointer 242 for pointing a read start address and a write pointer 243 for pointing a write start address. The ring buffer 241 is divided into a read enabled area 244 from the address pointed by the read pointer 242 to the address pointed by the write pointer 243 in the forward direction and a write enabled area 245 from the address pointed by the write pointer 243 to the address pointed by the read pointer 242 in the forward direction. The capacity of the read enabled area 244 is referred to as a read margin. The capacity of the write enabled area is referred to as a write margin.

Figure 62:
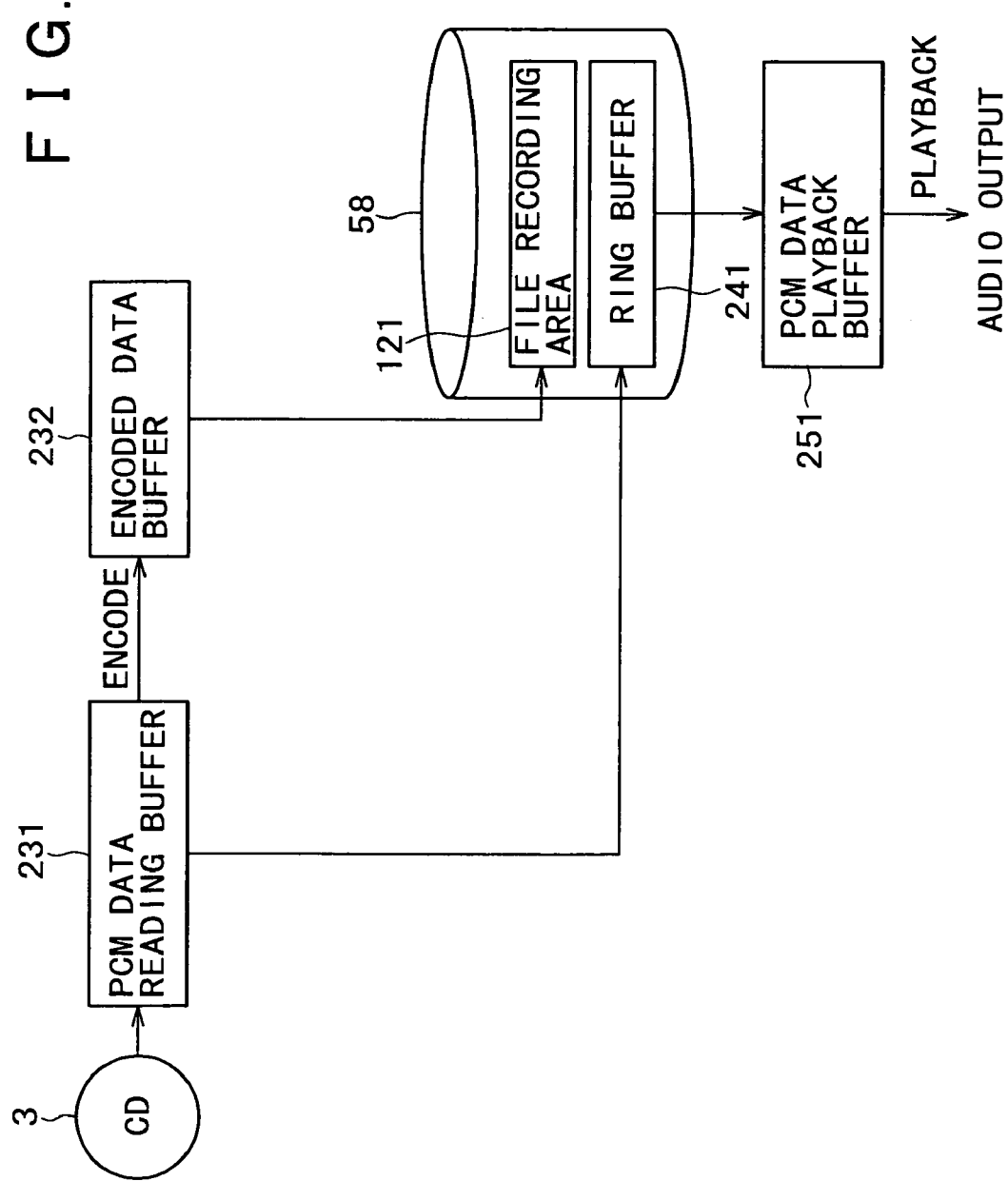
FIG. 62 is a diagram illustrating a data flow between buffers at the time of CD ripping.

FIG. 62 shows the data flow between the buffers at the time of CD ripping and CD recording. The PCM data stored in the music CD 3 are read by the CD-ROM drive 57 to be buffered in the PCM data reading buffer 231 arranged in the buffer 56. The PCM data buffered in the PCM data reading buffer 231 are transferred to the encoder/decoder 59 to be encoded and encrypted. The resultant encoded data are buffered in the encoded data buffer 232 arranged in the buffer 56. The encoded data buffered in the encoded data buffer 232 are transferred to the HDD 58 to be recorded to the file recording area 121.

On the other hand, the PCM data buffered in the PCM data reading buffer 231 are transferred to the HDD 58 to be buffered in the ring buffer 241 arranged in the HDD 58. The PCM data buffered in the ring buffer 241 are transferred to the PCM data playback buffer 251 incorporated in the audio I/F 60-3 to be buffered and then transferred to the AD/DA 62 to be converted into analog data, which are outputted from the speaker 2.

Figure 63:
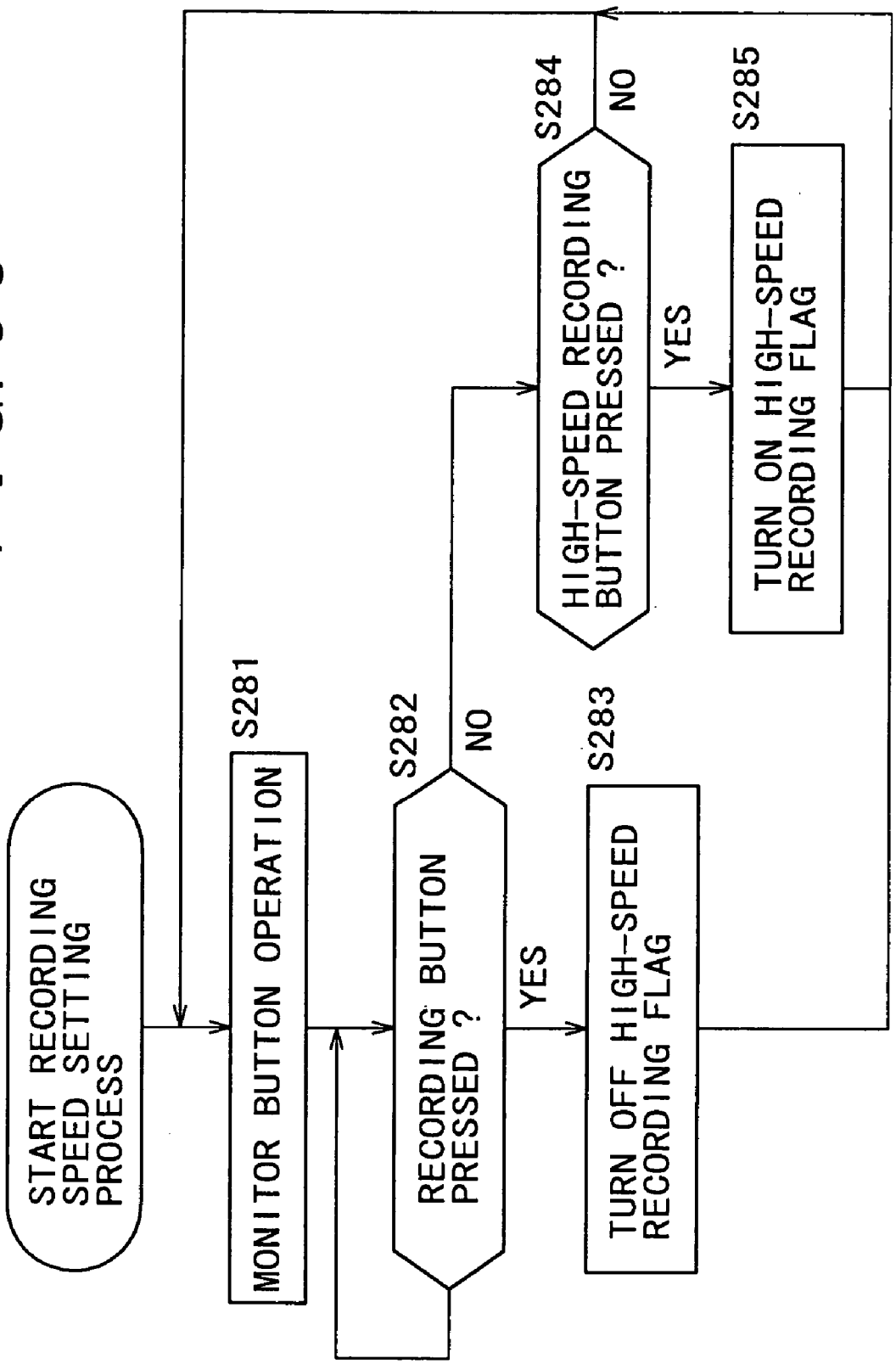
FIG. 63 is a flowchart describing a recording speed setting process.

The following describes a recording speed setting process associated with CD ripping and CD recording with reference to the flowchart shown in FIG. 63. This recording speed setting process is repetitively executed while the music CD 3 is selected as a sound source, namely while the music CD 3 is loaded on the CD-ROM drive 57 and the CD is selected by operating the function button 12.

In step S281, the input handle middleware 97 starts monitoring user's operation on the various buttons. In step S282, the input handle middleware 97 waits until a user's operation is performed on the various buttons. If a user's operation on the various buttons is determined, the information thereof is transmitted to the main APP 76. The main APP 76 determines whether or not the operation is an operation performed on the recording button 23. If the operation is found an operation performed on the recording button 23, then the procedure goes to step S283.

In step S283, the main APP 76 notifies the HD APP 77 of the operation of the recording button 23. The HD APP 77 transmits the information that the recording button 23 has been operated to the CD RIPPING 84 of the HD MW 82. The CD RIPPING 84 turns off the high-speed recording flag arranged by itself in the SDRAM 53 for example. The procedure returns to step S281.

If a user's operation on the various buttons is determined and this operation is found not on the recording button 23 in the S282, the procedure goes to step S284. In step S284, the main APP 76 determines whether or not the user's operation is on the high-speed recording button 24. If the operation is found an operation on the high-speed recording button 24, the procedure goes to step S285.

In step S285, the main APP 76 notifies the HD APP 77 of the operation of the high-speed recording button 24. The HD APP 77 transmits the information that the high-speed recording button 24 has been operated to the CD RIPPING 84 of the HD MW 82. The CD RIPPING 84 turns on the high-speed recording flag, upon which the procedure returns to step S281.

If the operation is found not the operation on the high-speed recording button 24 in step S284, then the procedure returns to step S281.

By the above-mentioned recording speed setting process, when the high-speed recording button 24 is operated and the high-speed recording flag is turned on, the CD ripping as shown in FIG. 57 is executed. Conversely, when the recording button 23 is operated and the high-speed recording flag is turned off, the CD recording as shown in FIG. 58 is executed. It should be noted that the switching from CD ripping to CD recording and vice versa may be performed any time in accordance with the user's button operation.

Figure 64:
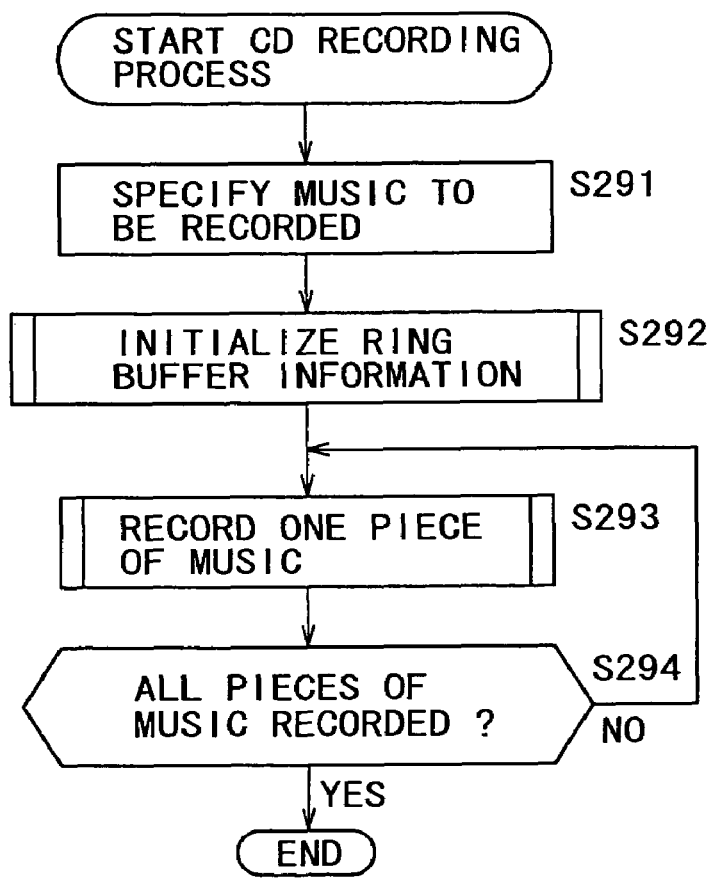
FIG. 64 is a flowchart describing a CD recording process.
Figure 65:
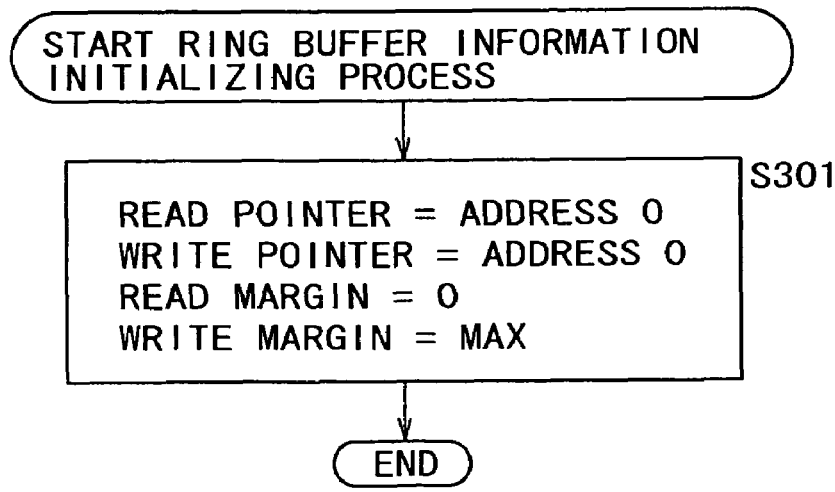
FIG. 65 is a flowchart describing a ring buffer information initializing process.
Figure 66:
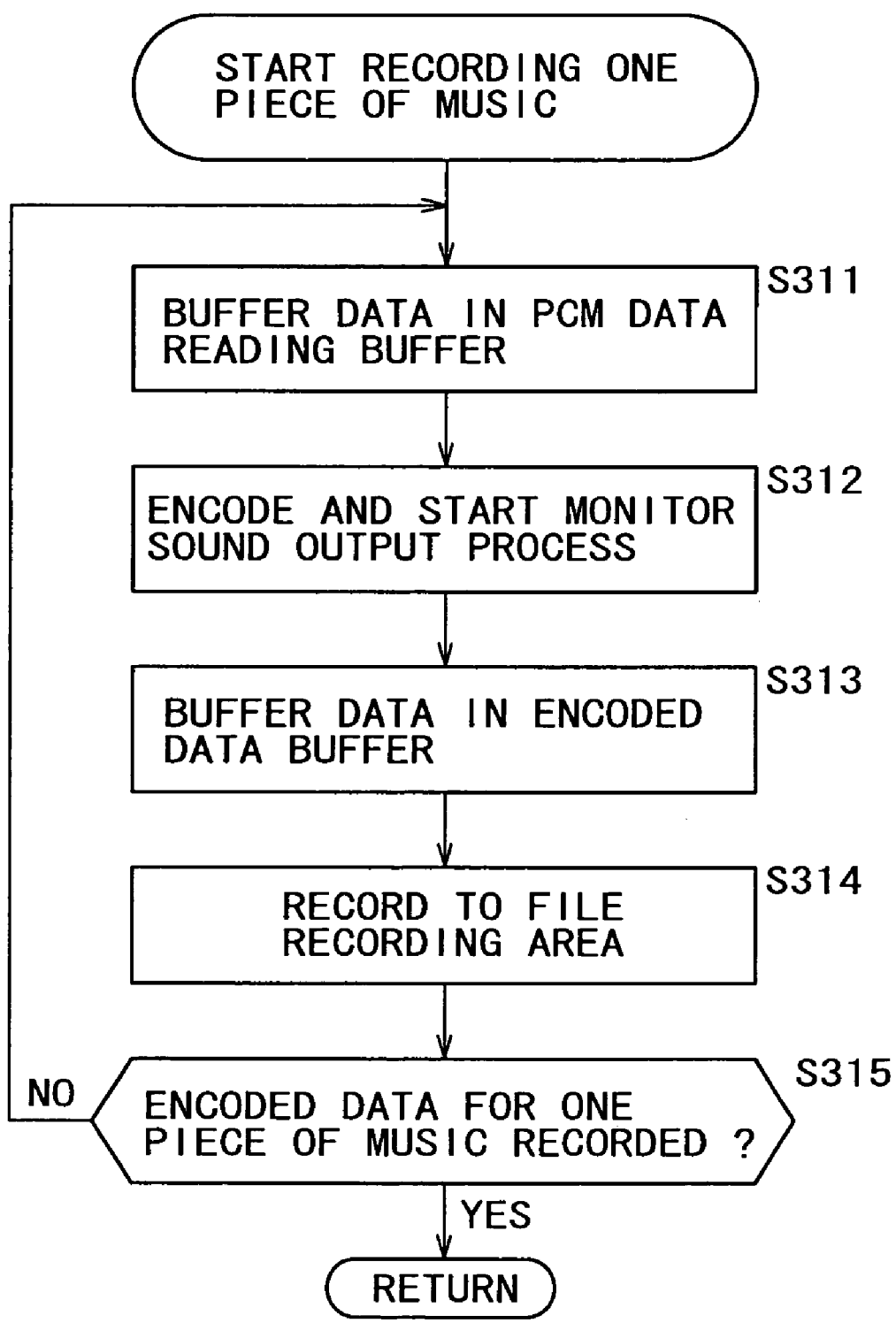
FIG. 66 is a flowchart describing a recording process for one piece of music.

The following describes a CD recording process with reference to the flowchart shown in FIG. 64. This CD recording process is a process which is controlled by the CD RIPPING 84 included in the HD MW 82, which starts when the music CD is loaded, and the function button 12 is pressed to set the sound source to the CD and then the recording button 23 or the high-speed button 24 is operated.

In step S291, the user selects a piece of music to be recorded from the music CD 3 during the recording pause state set by operating the recording button 23 or the high-speed button 24. To be more specific, the user operates a cursor button 17 to select a piece of music from the pieces of music recorded to the music CD 3 and establishes the selection by operating the enter button 20. By repeating these operations, the user selects all pieces of music to be recorded. It should be noted that, if no music selecting operation is performed, it is assumed that all pieces of music recorded to the music CD 3 be selected.

When the music selection has been completed, the user operates the play/pause button 26. The procedure goes to step S292.

In step S292, the CD RIPPING 84 initializes the ring buffer information formed by the read start address and the like pointed by the read pointer 242 set to the ring buffer 241. The following describes this ring buffer information initializing process with reference to the flowchart shown in FIG. 65. In step S301, the CD RIPPING 84 sets the read start address pointed by the read pointer 242 and the write start address pointed by write pointer 243 to address 0 of the ring buffer 241. In addition, the CD RIPPING 84 sets the read margin of the ring buffer 241 to 0 and the write margin to the maximum value max. Thus, the ring buffer information initializing process is performed.

Returning to FIG. 64, in step S293, the CD RIPPING 84 sequentially selects the pieces of music selected in step S291 and executes the recording of one piece of music. The following describes the recording process for recording one piece of music with reference to the flowchart shown in FIG. 66. In step S311, the CD RIPPING 84 requests the CD MW 88 to buffer the PCM data of the piece of music to be recorded to the music CD 3 into the PCM data reading buffer 231 in the write enabled state in units of predetermined data amount (for example, in units of two seconds). When the PCM data of a predetermined data amount has been written (buffered), the state of the PCM data reading buffer 231 moves to the read enabled state.

In step S312, the CD RIPPING 84 causes the encoder/decoder 59 to encode (encode and then encrypt) the PCM data of a predetermined amount buffered in the PCM data reading buffer 231. When the reading of the PCM data of a predetermined data amount from the PCM data reading buffer 231 has been completed, the state of the PCM data reading buffer 231 moves to the write enabled state.

Also, the CD RIPPING 84 starts a monitor sound output process. The monitor sound output process will be described later with reference to FIG. 67.

In step S313, the CD RIPPING 84 buffers the encoded data of a predetermined amount obtained by encoding into the encoded data buffer 232 in the write enabled state in the buffer 56. When the writing (buffering) of the encoded data of a predetermined amount (for example, equivalent to two seconds) has been completed, the state of the encoded data buffer 232 moves to the read enabled state.

In step S314, the CD RIPPING 84 records the encoded data of a predetermined amount buffered in the encoded data buffer 232 to the file recording area 121 of the HDD 58. It should be noted that the process for recording the encoded data to the file recording area 121 in units of a predetermined amount is equivalent to the above-mentioned file creating process described with reference to FIG. 14. The object creating process described with reference to FIG. 28 is also performed.

In step S315, the CD RIPPING 84 determines whether or not the encoded data for one piece of music have been recorded. If the encoded data for one piece of music are found not recorded, then the procedure returns to step S311 to repeat the above-mentioned processes. Then, if the encoded data for one piece of music have been recorded in step S315, the recording process for recording one piece of music comes to an end.

After executing the recording process for one piece of music as described above, the procedure returns to step S294 shown in FIG. 64. In step S294, the CD RIPPING 84 determines whether or not all pieces of music selected in step S291 have been recorded. If all selected pieces of music are found not recorded, the procedure returns to step S293 to record the next piece of music.

Next, if all selected pieces of music are found recorded in step S294, this CD recording process comes to an end.

Figure 67:
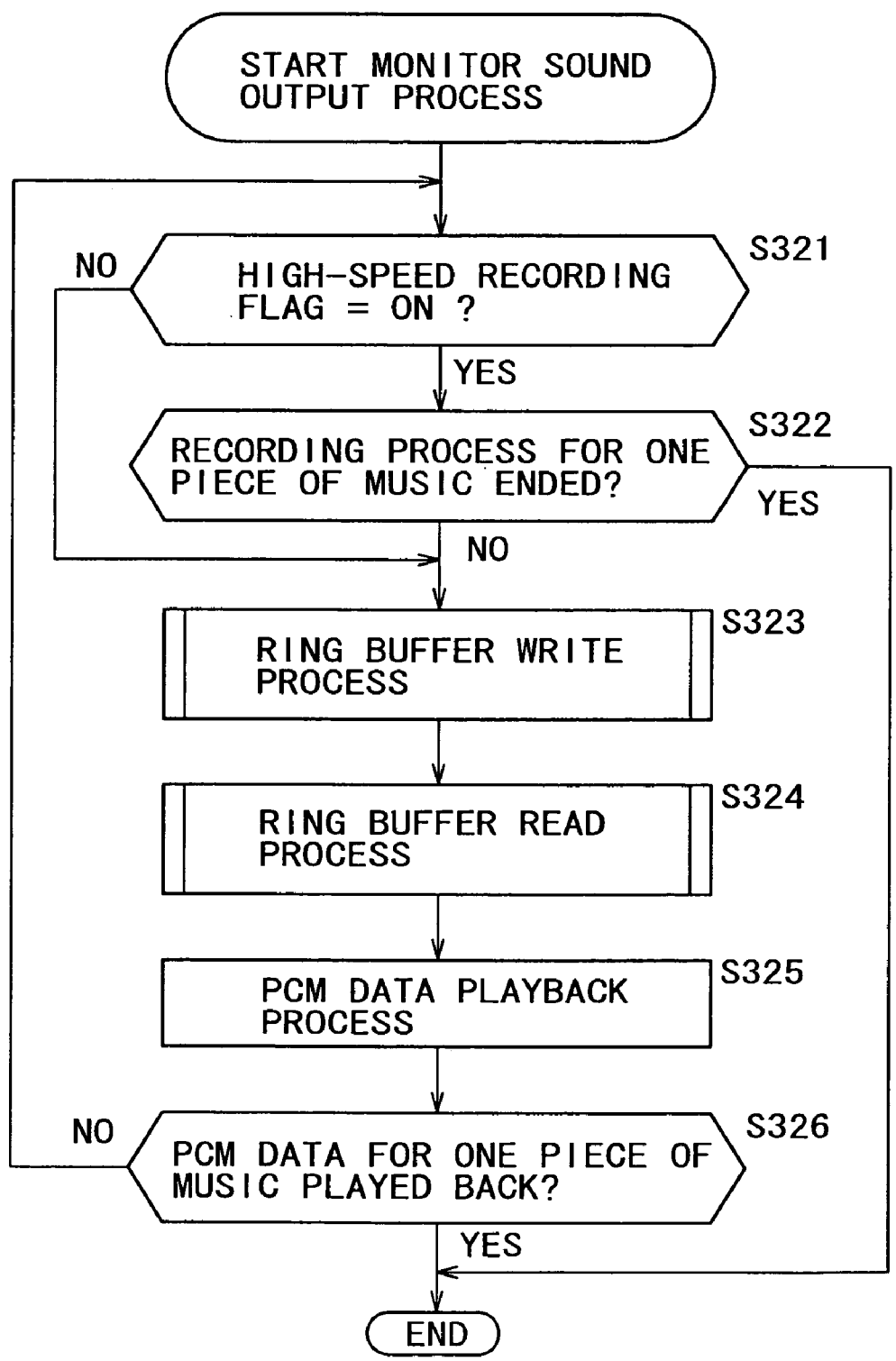
FIG. 67 is a flowchart describing a monitor sound outputting process.

The following describes the monitor sound output process started in step S312 with reference to the flowchart shown in FIG. 67. In step S321, the CD RIPPING 84 determines whether or not the high-speed recording flag is on. If the high-speed recording flag is found on, then the procedure goes to step 322.

In step S322, the CD RIPPING 84 determines whether or not the recording process for one piece of music of the corresponding PCM data has ended. If the recording process for one piece of music of the corresponding PCM data is found not ended, the procedure goes to step S323 to output monitor sound of the PCM data for which the recording of one piece of music is being executed.

In step S323, the CD RIPPING 84 starts writing the PCM data buffered in the PCM data reading buffer 231 to the ring buffer 241. Without waiting for the end of the process in step S323, the CD RIPPING 84 starts reading the PCM data recorded to the ring buffer 241 in step S324.

Figure 68:
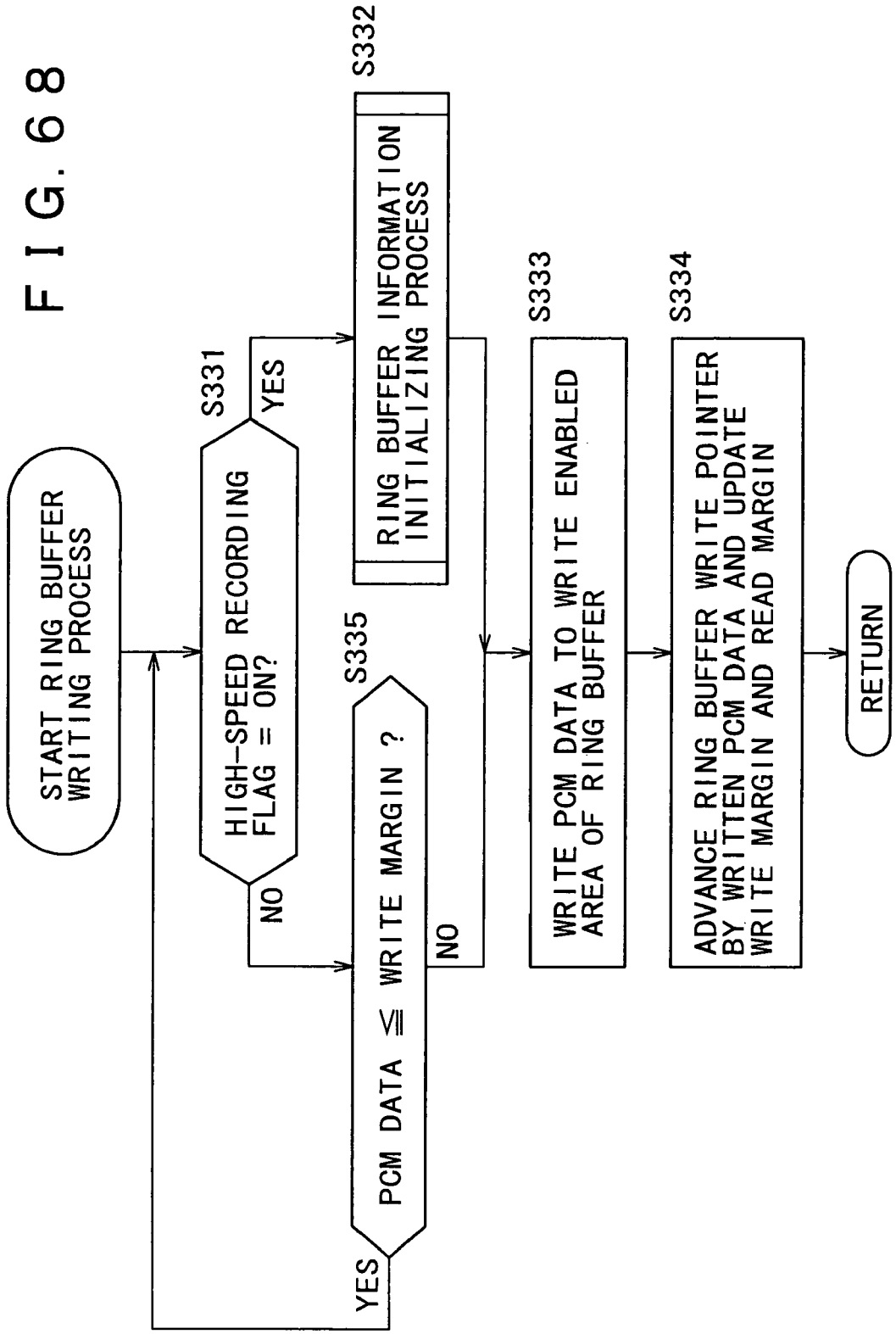
FIG. 68 is a flowchart describing a ring buffer writing process.

The following describes the writing process for writing to the ring buffer 241 in step S323 with reference to the flowchart shown in FIG. 68.

In step S331, the CD RIPPING 84 determines whether or not the high-speed recording flag is on. If the high-speed recording flag is found on, the procedure goes to step S332. In step S332, the CD RIPPING 84 executes the buffer information initializing process described with reference to FIG. 65.

In step S333, the CD RIPPING 84 starts writing the PCM data recorded to the PCM data reading buffer 231 to the write enabled area 245 subsequent to the write start address pointed by the write pointer 243 of the ring buffer information. In step S334, the CD RIPPING 84 increments in the forward direction the write start address value pointed by the write pointer 243 included in the ring buffer information by the amount of the PCM data written in step S333, thereby accordingly updating the write margin value and the read margin value.

It should be noted that, if the high-speed recording flag is found not on in step S331, the procedure goes to step S335. In step S335, the CD RIPPING 84 determines whether or not the size of the PCM data recorded to the PCM data reading buffer 231 is equal to or smaller than the write margin of the ring buffer 241 by referencing the ring buffer information. If the size of the PCM data recorded to the PCM data reading buffer 231 is found equal to or smaller than the write margin of the ring buffer 241, then the procedure goes to step S333.

It should be noted that, if the size of the PCM data recorded to the PCM data reading buffer 231 is found not equal to or smaller than the write margin of the ring buffer 241 in step S335, then the procedure returns to step S331 to repeat the processes of step S331 and step S335 until the high-speed recording flag is found on in step S331 by changing the recording speed settings by the user or the size of the PCM data recorded to the PCM data reading buffer 231 is found not equal to or smaller than the write margin of the ring buffer 241 in step S335 due to the increase in the write margin of the ring buffer 241. Thus, the process of writing to the ring buffer 241 is performed.

The following describes the process of reading from the ring buffer 241 in step S324 with reference to the flowchart shown in FIG. 69. In step S341, the CD RIPPING 84 determines whether or not the PCM data playback buffer 251 incorporated in the audio I/F 60-3 is in the write enabled-state and waits until the PCM data playback buffer is in the write enabled state. If the PCM data playback buffer is found in the write enabled state, then the procedure goes to step S342.

In step S342, the CD RIPPING 84 reads the PCM data recorded to the read enabled area 244 of the ring buffer 241 in accordance with the read start address pointed by the read pointer 242 of the ring buffer 241, and writes the PCM data to the PCM data playback buffer 251.

In step S343, the CD RIPPING 84 increments in the forward direction the value of the read start address pointed by the read pointer 242 included in the ring buffer information by the amount of the PDM data read in step S342, thereby accordingly updating the write margin value and the read margin value.

In step S344, the CD RIPPING 84 moves the state of the PCM data playback buffer 251 to the read enabled state. Thus, the process of reading from the ring buffer 241 is performed.

Returning to FIG. 67, the AIO MW 94 outputs the PCM data buffered in the PCM data playback buffer 251 to the AD/DA 62 in step S325. The AD/DA 62 starts reproducing the inputted PCM data to output the corresponding sound from the speaker 2.

In step S326, the CD RIPPING 84 determines whether or not the PCM data for one piece of music has been played back. If the PCM data for one piece of music are found not completely played back, the procedure returns to step S321 to repeat the above-mentioned processes. If the PCM data for one piece of data are found not completely played back, the monitor sound output process comes to an end.

It should be noted that, if the PCM data for one piece of music is found completely recorded in step S322, this monitor sound output process is immediately discontinued. Thus, the CD recording process is performed.

It should be noted that, in the course of the CD recording process, CD ripping may be switched to CD recording and vice versa in accordance with the user's operation on the recording button 23 or the high-speed recording button 24.

Figures 70A, 70B:

The following describes display examples to be displayed on the display 15 when CD ripping is performed, with reference to FIGS. 70A and 70B. FIG. 70A show an example of information associated with recording setting which is displayed immediately before starting recording. At this moment, display areas 261 through 267 are arranged on the display 15. In this display example, the display area 261 displays the information indicative of recording source and recording destination. The display area 262 displays that the information associated with recording setting is displayed. The display area 263 displays a folder name indicative of storage location. The display area 264 displays the album name and artist name of the album to be recorded. The display area 265 displays the bit rate to be used at the time of recording. The display area 266 displays the recording level to be used at the time of recording. The display area 267 displays the information that the recording starts when the play/pause button 26 is pressed. The recording level at the time of recording is displayed.

FIG. 70B shows a display example which is displayed during recording. At this moment, display areas 271 through 278 are arranged on the display 15. In this display example, the display are 271 displays the information indicative of recording source and recording destination. The display area 272 blinks a character string "In high-speed recording" indicative that CD ripping is being executed. The display area 273 displays the album name and artist name of music being recorded. The display area 274 displays the music number in the music CD 3 of the music being recorded. The display area 275 displays the playback elapsed time of the music being recorded. The display area 276 displays the remaining playback time of the music CD 3. The display area 277 displays a progress bar 279 variable in length in accordance with the recording progress relative to the total number of pieces of music to be recorded. The display area 278 displays the total number of pieces of music to be recorded and the number of pieces of music already recorded and during recording.

For example, if CD ripping is being executed on all pieces music in an album of which playback time is 60 minutes, the length of the progress bar 279 displayed in the display area 277 becomes longer from the start of recording and extends up to the full length of the display area 277 in about 12 minutes because the recording is executed at the speed of about 5×.

It should be noted that the length of the progress bar 279 in the display area 277 may be elongated in proportion to the music playback elapsed time rather than the recording progress.

The following describes a method of reproducing the content data recorded to the HDD 58 with reference to FIGS. 71 through 77. As described, the audio server 1 encodes the music recorded to the music CD 3 and records the content data as a file to the HDD 58. In the case of specifying particular music to be played back, the user specifies the hierarchically arranged objects of folder, album, and track.

Specifying the entire HDD, a given folder, or a given album as a playback area allows the specification of a plurality of music pieces collectively as the music pieces to be recorded. The playback of music is realized by decoding the content data corresponding to the tracks included in the play list to be created on the basis of the specified playback area.

Figure 71:
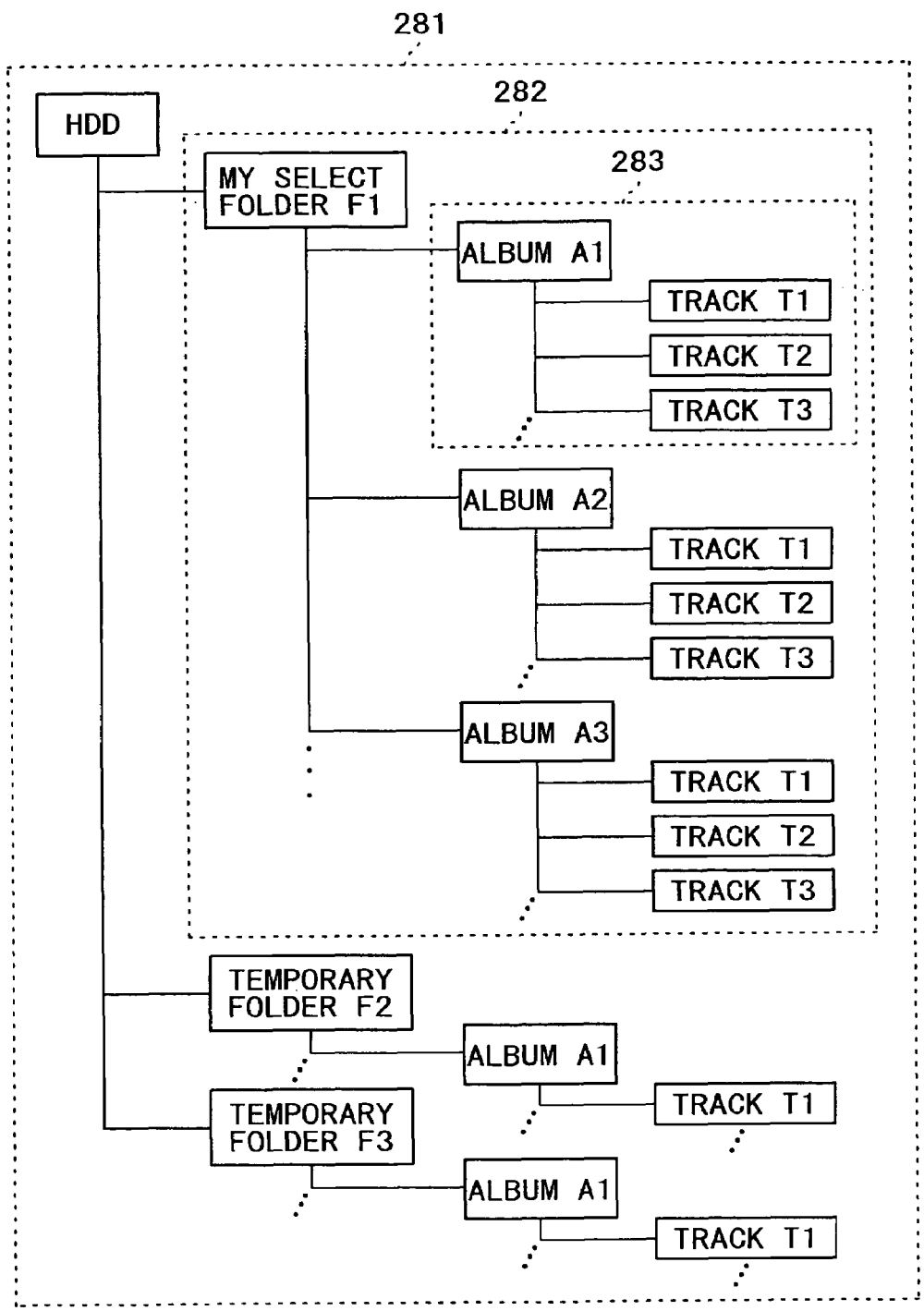
FIG. 71 is a diagram illustrating the setting of a playback area.

FIG. 71 shows an exemplary playback area. If the entire HDD enclosed by dashed lines 281 is specified as a playback area, all track numbers in the HDD 58 are registered in the play list as shown in FIG. 72.

If a my select folder F1 enclosed by dashed lines 282 is specified as the playback area, the album numbers of all albums belonging to the my select folder F1 are registered in the play list as shown in FIG. 73.

If an album A1 of the my select folder F1 enclosed by dashed lines. 283 is specified as the playback area, the track numbers of all tracks belonging to the album A1 of the my select folder F1 are registered in the play list as shown in FIG. 74.

If a track T1 of the album A1 belonging to a temporary folder F2 is specified as the music to be played back, the track T1 of the album A1 belonging to the temporary folder F2 is registered in the play list shown in FIG. 75.

Figure 76:
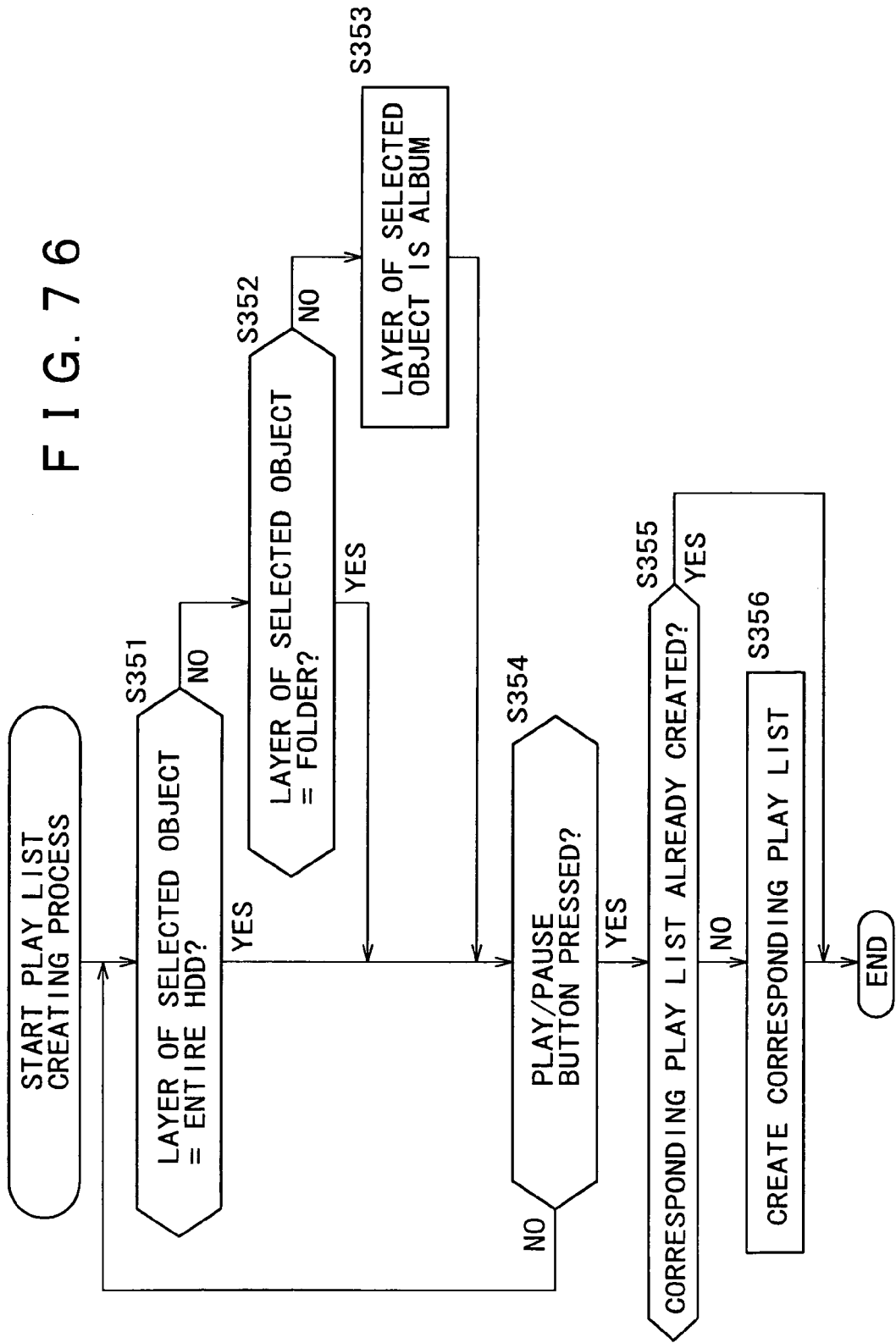
FIG. 76 is a flowchart describing a play list creating process.

The following describes a process of creating the play list corresponding to the specified playback area with reference to the flowchart shown in FIG. 76.

This play list creating process is controlled by the HD PLAY 85 included in the HD MW 82 and starts when the function button 12 is operated to set the sound source to the HDD.

In step S351, the HD PLAY 85 determines whether or not the layer of the object indicative of the playback area selected by the user is the entire HDD. If the layer of the selected object is found not the entire HDD, then the procedure goes to step S352. It should be noted that the user selects a playback area by operating a playback area switching button (not shown) arranged on the remote controller 7 or by operating the cursor button 17, the enter button 20, and the menu/cancel button 21 arranged on the cover 40 in a predetermined sequence.

In step S352, the HD PLAY 85 determines whether or not the layer of the object selected by the user is a folder. If the layer of the object selected by the user is found not a folder, then the procedure goes to step S353.

In step S353, the HD PLAY 85 determines that the layer of the object selected by the user is an album and the procedure goes to step S354.

In step S354, the HD PLAY 85 determines whether or not the play/pause button 26 has been operated. If the play/pause button 26 is found operated, the procedure goes to step S355. In step S355, the HD PLAY 85 determines whether or not the play list belonging to the layer of the selected object has already been created. If the play list is found not created, the procedure goes to step S356. If the play list is found already created, step S356 is skipped.

In step S356, the HD PLAY 85 creates a play list corresponding to the layer of the selected object.

It should be noted that, the play/pause button 26 is found not operated in step S354, then the procedure returns to step S351 to repeat the above-mentioned processes.

It should be noted that, if the layer of the selected object is found the entire HDD in step S351 or the layer of the selected object is found a folder in step S352, then the procedure goes to step S354. Thus, the play list creating process is performed.

It should be noted that a plurality of play lists corresponding to various supposed playback areas may be created beforehand and recorded at a predetermined location and a corresponding play list may be read from among these play lists when the a play list is selected by the user.

Figure 77:
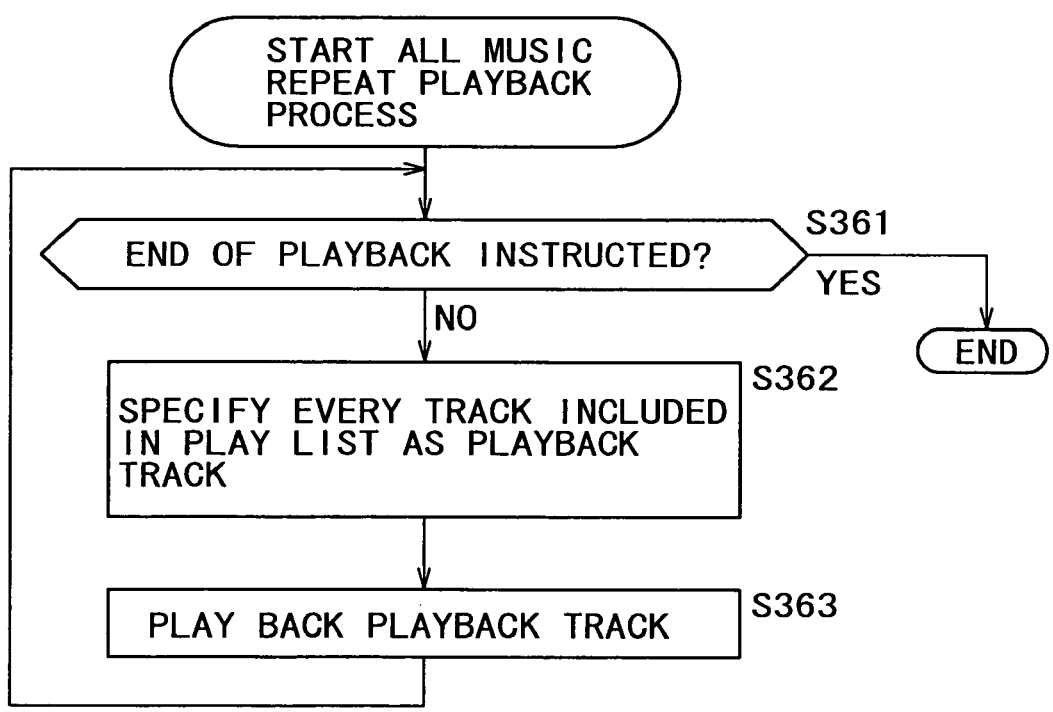
FIG. 77 is a flowchart describing an all music repeat playback process.

The following describes a playback process to be executed after the end of the above-mentioned play list creating process, taking the example where the play mode is set to the all music repeat, with reference to the flowchart shown in FIG. 77.

In step S361, the HD PLAY 85 determines whether or not the end of playback has been instructed by operating the stop button 25. If the end of the playback is found not instructed, the procedure goes to step S362. In step S362, the HD PLAY 85 sequentially specifies all tracks included in the play list each as a playback track.

In step S363, the HD PLAY 85 plays back the content data corresponding to each specified playback track. To be more specific, a track object corresponding to the playback track is identified on the basis of CC data, the file identifier of the corresponding content data is identified on the basis of the value of the file identifier recording area 203 of the identified track object, and the content data are read on the basis of the identified file identifier (=the cluster number of the file recording area 121). Next, the retrieved content data are decoded and outputted.

When the playback of the content data corresponding to the playback track ends, the procedure returns to step S361 to repeat the above-mentioned processes. Then, in step S361, if the end of the playback is determined instructed upon operation of the stop button 25, the playback process with the playback mode being all music repeat ends.

It should be noted that, in the playback modes other than the all music repeat, only the method of specifying playback area and playback track differs from that of the all music repeat, so that the processes are the same between these modes.

The following describes a process of moving out the content data recorded to the HDD 58 of the audio server 1 to the MS 4 with reference to FIGS. 78 through 81.

The process of moving out the content data recorded to the HDD 58 to the MS 4 includes copying the content data from the HDD 58 to the MS 4 and deletes the copied content data from the HDD 58.

Figure 78:
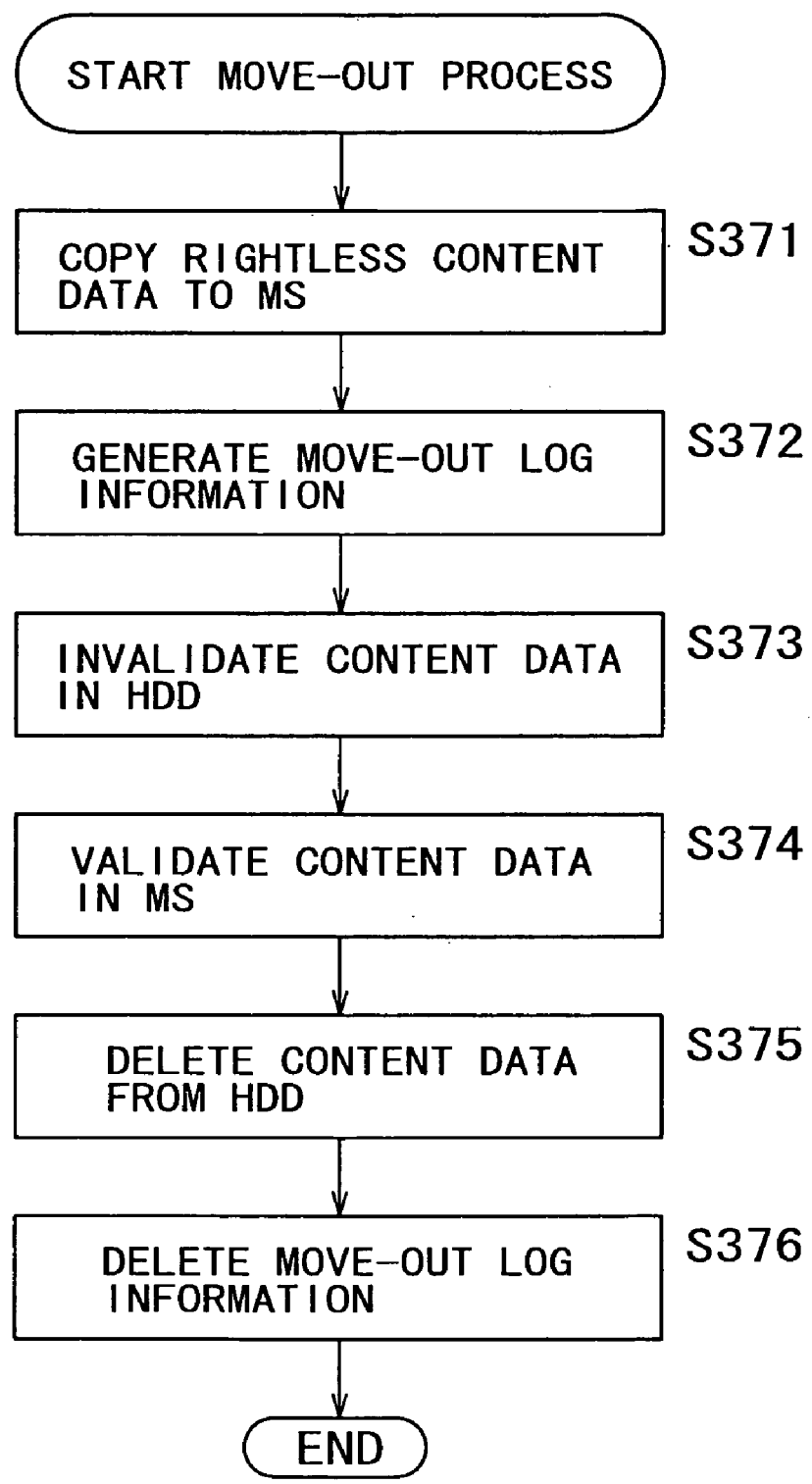
FIG. 78 is a flowchart describing a move-out process.

The following describes the move-out process with reference to the flowchart shown in FIG. 78. It should be noted that the move-out process is controlled by the MS MW 89.

This move-out process starts when the user displays the menu by operating the menu/cancel button 21, selects "edit" by operating the cursor button 17, displays the edit menu by operating the enter button 20, selects "move out" by operating the cursor button 17, operates the enter button 20, selects the track to be moved out by operating the cursor button 17 and the select button 18, displays the list of tracks to be moved out by operation the enter key 20, and then operating the enter key 20 with the MS 4 loaded in the MS slot 45.

In step S371, the MS MW 89 requests the C IN/C OUT 87 to copy the content data recorded to the HDD 58 to be moved out as rightless data (playback disabled data) to the MS 4. It should be noted that, to provide rightless data, a rightful/rightless flag included in the attribute information of the content data is turned off. Namely, the attribute information indicative of right invalidity and the content data are copied to the MS 4.

In step S372, the C IN/C OUT 87 generates a move-out log information indicative that the move-out process has started and records the generated log information to the HDD 58. The move-out log information includes the information for identifying the track to be moved out. In step S373, the C IN/C OUT 87 turns off the flag indicative whether the content data recorded to the HDD 58 have the right or not to render the content data in the HDD 58 rightless.

In step S374, the MS MW 89 turns on the flag indicative whether the content data copied to the MS 4 have the right or not to render the content data in the MS 4 rightful.

In step S375, the C IN/C OUT 87 deletes the content data from the HDD 58. In step S376, the C IN/C OUT 87 deletes the move-out log information generated in the process of step S372.

The above-mentioned processes of steps S371 through S376 are the move-out processes for the content data corresponding to one track. These processes of steps S371 through S376 are repeated for each of the selected tracks.

Figure 87:
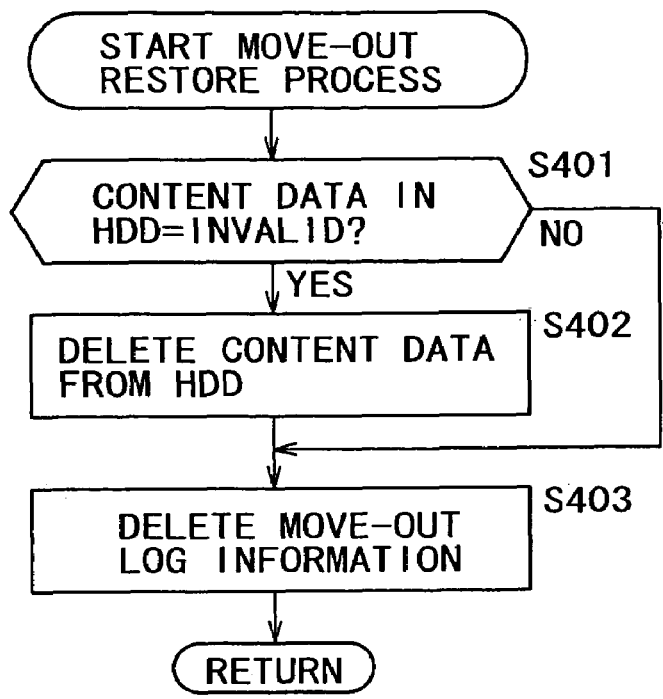
FIG. 87 is a flowchart describing a move-out restore process.
Figure 88:
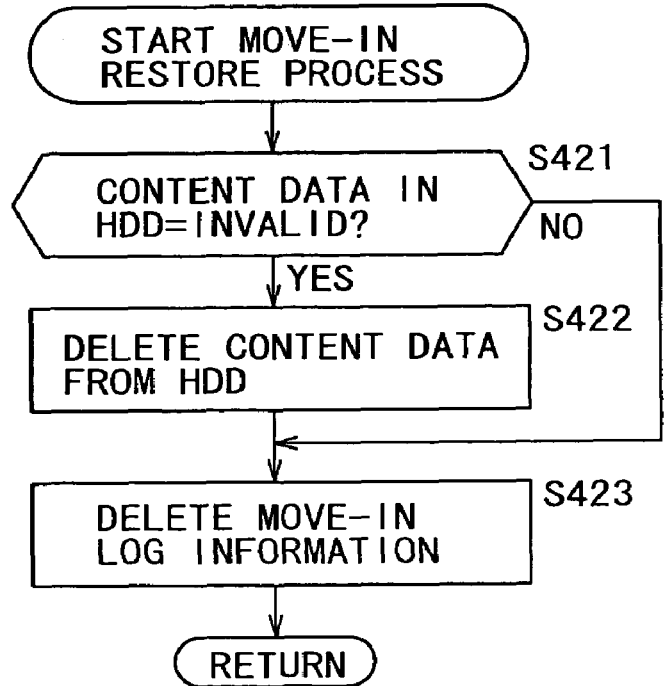
FIG. 88 is a flowchart describing a move-in restore process.

It should be noted that, if a move-out process is discontinued due to power outage for example during the process is on, a restore process for restoring the discontinued process is executed after the power is resumed. The restore process will be described later with reference to FIGS. 86 through 88.

FIG. 79 shows the state transitions of a move-out process. State 1 is the state before the stating of a move-out process. Namely, in this state, content data are recorded to the HDD 58 of the audio server 1 and these content data have the right.

State 2 is a state after the execution of the process of step S371. Namely, in state 2, the content data have been copied from the HDD 58 to the MS 4, resulting in the recording of the content data to both the HDD 58 and the MS 4 and the content data in the HDD 58 have the right while the content data in the MS 4 have no right.

State 3 is a state after the execution of the process of step S373. Namely, in state 3, content data are recorded to both the HDD 58 and the MS 4 and the content data in the HDD 58 and the content data in MS 4 have no right.

State 4 is a state after the execution of the process of step S374. Namely, in state 4, content data are recorded to both the HDD 58 and the MS 4 and the content data on the HDD 58 has no right while the content data in the MS 4 has the right.

State 5 is a state after the execution of the process of step S375. Namely, in state 5, the content data recorded to the HDD 58 have been deleted and therefore only the MS 4 records the content data, which have the right.

FIG. 80 shows a display example on the display 15 at the time of selecting tracks to be moved out. The display 15 shows only the pieces of music that can be moved out.

FIG. 81 show a display example on the display 15 during a move-out process. A display area 291 on the display 15 blinks a character string "Move out" indicative that a move-out process is being executed. A check marker 292 is displays by each moved out track. A display area 293 displays the information indicative of the progress of the move-out process (the number of tracks being moved out or already moved out/the total number of tracks to be moved out).

Figure 82:
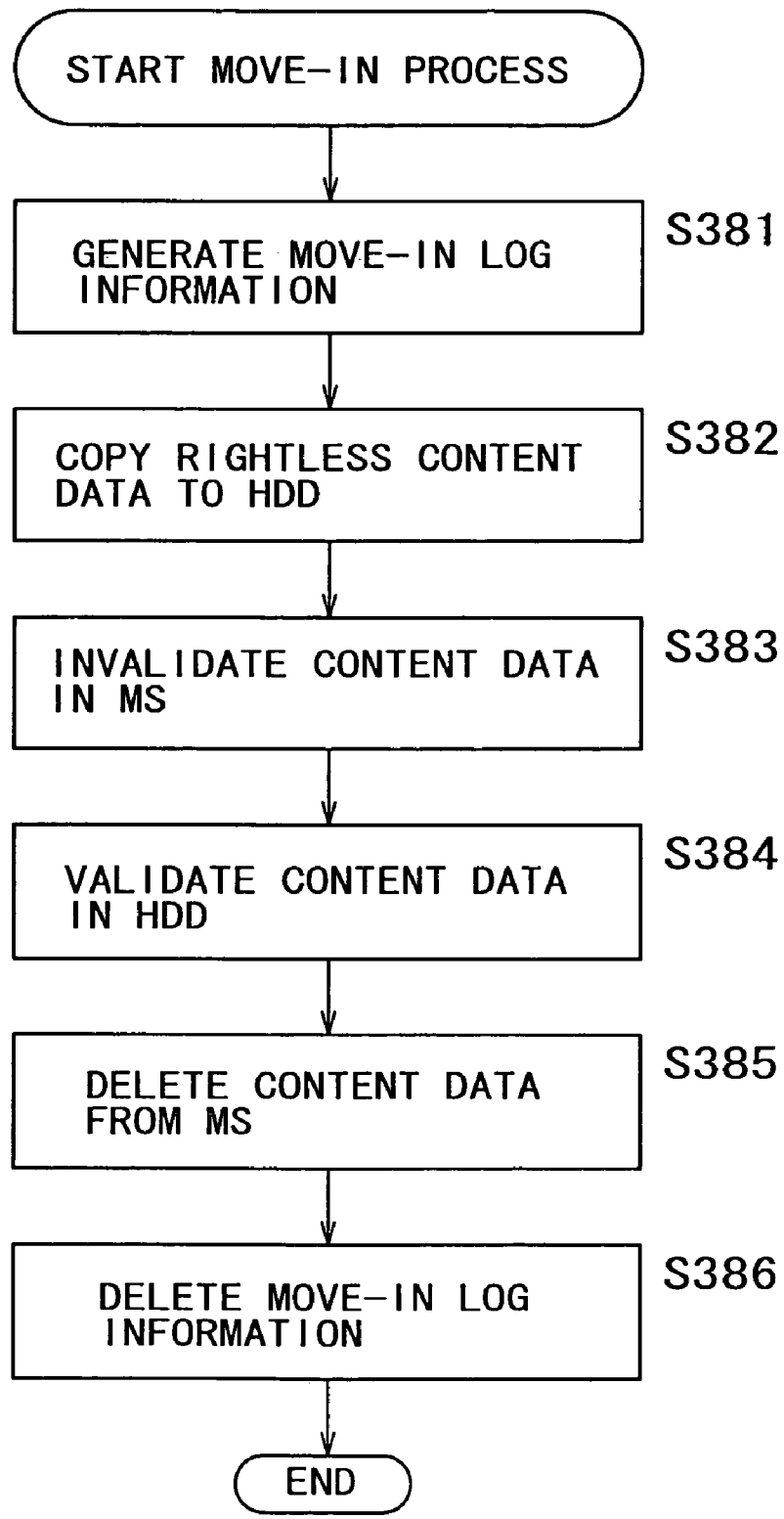
FIG. 82 is a flowchart describing a move-in process.

The following describes a process of moving in the content data recorded to the MS 4 to the HDD 58 of the audio server 1 with reference to FIG. 82 through 81.

The process of moving in the content data recorded to the MS 4 to the HDD 58 denotes a sequence of processes in which the content data recorded to the MS 4 are copied to the HDD 58 and then the content data recorded to the MS 4 are deleted.

The following describes this move-in process with reference to the flowchart shown in FIG. 82. It should be noted that the moving-in process is controlled by the MS MW 89.

This move-in process starts when the user displays a menu by operating the menu/cancel button 21, selects "edit" by operating the cursor button 17, displays the edit menu by operating the enter button 20, selects "move in" by operating the cursor button 17 and then operates the enter button 20, selects the content data to be moved in from the content data recorded to the MS 4 by operating the cursor button 17 and the select button 18, displays the list of content data to be moved in by operating the enter key 20, and, after operating the enter key 20, operates the play/pause button 26 with the MS 4 loaded in the MS slot 45.

In step S381, the MS MW 89 requests the C IN/C OUT 87 to generate move-in log information indicative of the starting of a move-in process and record the generated log information to the HDD 58. The move-in log information includes the information for identifying the content data to be moved in.

In step S382, the C IN/C OUT 87 copies the content data to be moved in from the MS 4 to the HDD 58 as the data having no right. In step S383, the MS MW 89 turns off the flag indicative whether the content data recorded to the MS 4 have the right or not to render the content data in the MS 4 rightless.

In step S384, the C IN/C OUT 87 turns on the flag indicative whether the content data copied to the HDD 58 have the right or not to render the content data in the HDD 58 rightful.

In step S385, the C IN/C OUT 87 requests the MS MW 89 to delete the content data from the MS 4. In step S386, the C IN/C OUT 87 deletes the move-in log information generated in the process of step S382.

The above-mentioned processes of steps S381 through S386 are the move-in process for the content data corresponding to one track. The processes in steps S381 through S386 are repeated for each of the selected tracks.

It should be noted that, if a move-in process is discontinued due to power outage for example during the process is on, a restore process for restoring the discontinued process is executed after the power is resumed.

FIG. 83 shows the state transitions of a move-in process. State 11 is a state before a move-in process starts. Namely, in state 11, content data are recorded to the MS 4 and the content data in the MS 4 have the right.

State 12 is a state after the execution of the process of step S382. Namely, in state 12, by copying the content data from the MS 4 to the HDD 58, the content data are recorded to both the MS 4 and the HDD 58 and the content data in the MS 4 are rightful while the content data in the HDD 58 are rightless.

State 13 is a state after the execution of the process of step S383. Namely, the content data are recorded to both the MS 4 and the HDD 58 and the content data in the MS 4 and the content data in the HDD 58 are both rightless.

State 14 is a state after the execution of the process of step S384. Namely, in state 14, the content data are recorded to both the MS 4 and the HDD 58 and the content data in the MS 4 are rightless while the content data in the HDD 58 are rightful.

State 15 is a state after the execution of the process of step S385. Namely, by deleting the content data from the MS 4, the content data are recorded only to the HDD 58 and therefore the content data in the HDD 58 are rightful.

FIG. 84 shows a display example on the display 15 at the time of selecting content data to be moved in. Of the content data recorded to the MS 4, only the content data that can be moved in are displayed on the display 15.

FIG. 85 shows a display example on the display 15 during the move-in process. A display area 301 of the display 15 blinks a character string "Move in" indicative that a move-in process is being executed. A check marker 302 is displayed by the content data which have been moved in. A display area 303 displays the information indicative of the progress of the move-in process (the number of tracks being moved in or already moved in/the total number of tracks to be moved in).

Thus, the move-in process is performed. A process for importing content data from the MS 4 to the HDD 58 is performed in substantially the same manner. The difference between move-in process and import process lies in the handling of the content data recorded to the HDD 58 by these processes.

The audio server 1 may move out the content data recorded to the HDD 58 by a move-in process to other MS 4 or PD 5 and check out these content data. However, although audio server 1 may check out the content data recorded to the HDD 58 by an import process to other MS 4 or PD 5, but is disabled to move out these content data.

Figure 86:
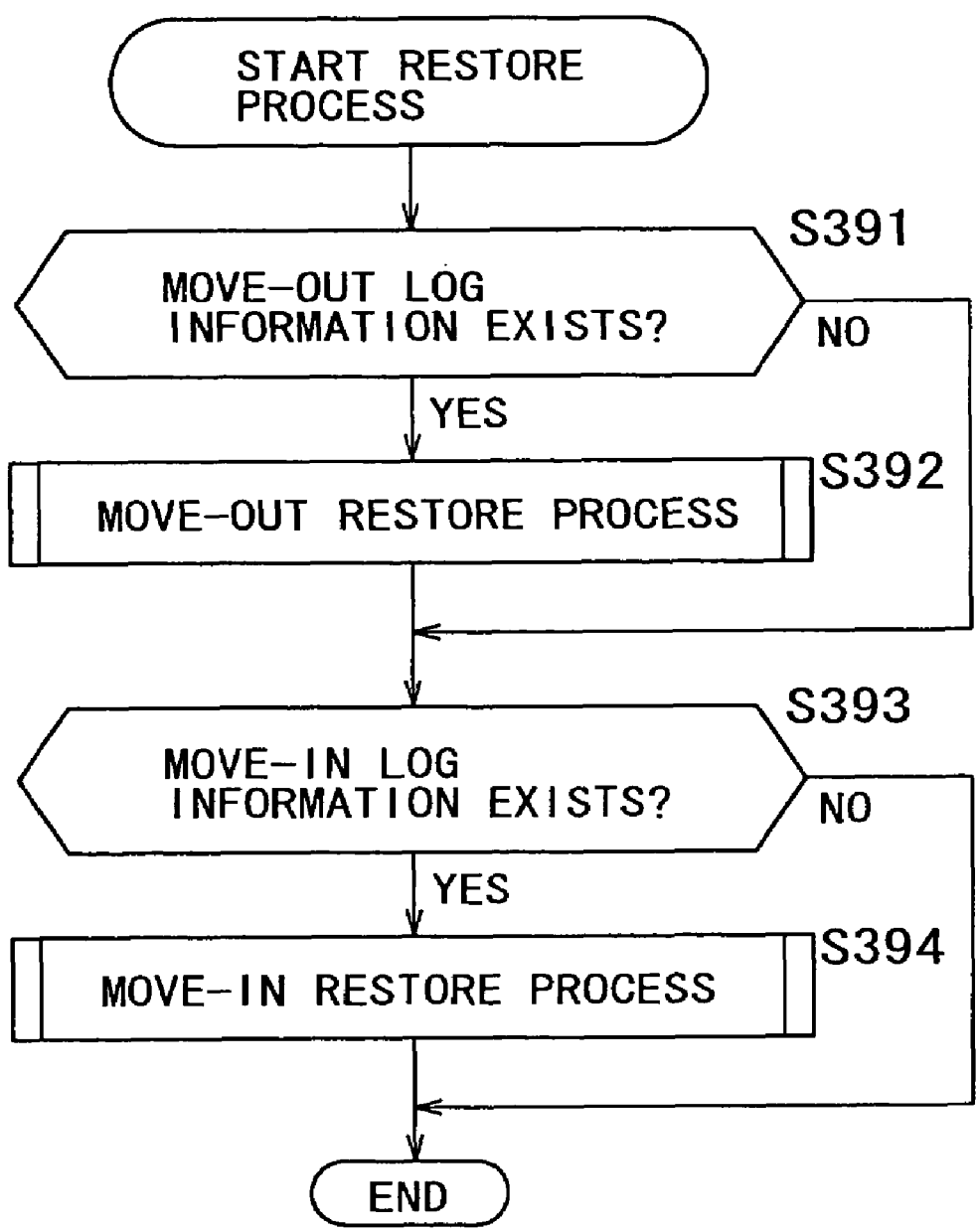
FIG. 86 is a flowchart describing a restore process.

The following describes a restore process for compensating the discontinuation of a move-out process or a move-in process due to power outage for example during the execution of these processes, with reference to FIG. 86. This restore process is started by the MS MW 89 as soon as the power supply is resumed.

In step S391, the MS MW 89 determines whether or not there is move-out log information in the HDD 58. If the move-out log information is found in the HDD 58, the procedure goes to step S392 to compensate the discontinued execution of the move-out process.

In step S392, the MS MW 89 executes a move-out restore process. The following describes the move-out restore process with reference to the flowchart shown in FIG. 87.

In step S401, the MS MW 89 determines whether or not the content data of the HDD 58 are rightless or not. If the content data of the HDD 58 are found rightless, the procedure goes to step S402. The content data of the HDD 58 being rightless indicates state 3 or state 4 in FIG. 79.

In step S402, the MS MW 89 deletes the content data from the HDD 58. If the content data in the HD 58 are deleted in state 4, the state shifts to state 5 in which the move-out process has been completed. If the content data are deleted from the HDD 58 in state 3, the state shifts to the state in which the content data having the rightless data remain in the MS 4.

At this moment, the user loses the content data, but the copyright of the content data is protected. The content data having the rightless data in the MS 4 may be deleted by the user by use of a general-purpose file editing application, so that no wasted data need be left in the MS 4, which are the content data having rightless data.

Conversely, if a restore process is performed such that the content data having rightless data in the MS 4 are deleted to make the content data having rightless data remain in HDD 58, the wasted data which are the content data having rightless data remain recorded to the HDD 58. Because the content data having rightless data do not occur as a result of normal operations, the dedicated audio server 1, one embodiment of the present invention, does not have a function for deleting the content data having rightless data as instructed by the user.

Therefore, to protect the copyright of content data and prevent the audio server 1 from recording invalid data, it is desired to delete the content data from the HDD 58 as shown in step S402.

It should be noted that, if the content data in the 58 are determined not rightless in step S401, step S402 is skipped. Namely, if the content data in the HDD 58 are not rightless, it indicates state 2 shown in FIG. 79. At this moment, the content data having rightless data remain in the MS 4; however, as described above, the content data having rightless data in the MS 4 are deletable by the user by use of a general-purpose file editing application, so that there main no wasted data which are the content data having rightless data in the MS 4.

In step S403, the MS MW 89 deletes the move-out log information from the HDD 58.

The procedure returns to FIG. 86. In step S393, the MS MW 89 determines whether or not there is move-in log information in the HDD 58. If the move-in log information is found in the HDD 58, then the procedure goes to step S394 to compensate the discontinued move-in process.

In step S394, the MS MW 89 executes a move-in restore process. The following describes a move-in restore process with reference to the flowchart shown in FIG. 88.

In step S421, the MS MW 89 determines whether or not the content data in the HDD 58 are rightless or not. If the content data in the HDD 58 are found rightless, then the procedure goes to step S422. If the content data in the HDD 58 are rightless, it indicates state 12 or state 13 shown in FIG. 83.

In step S422, the MS MW 89 deletes the existing content data from the HDD 58.

If the state is state 12, the deletion of the content data existing in the HDD 58 causes the state to shift to state 11, which is before the execution of move-in process. If the content data existing in the HDD 58 are deleted in state 13, the content data having rightness data remain in the MS 4.

At this moment, the user loses the content data, but the copyright of the content data is protected. The content data having rightless data in the MS 4 may be deleted by the user by use of a general-purpose file editing application, so that there remain no wasted data which are the content data having rightless data in the MS 4.

Conversely, if a restore process is performed such that the content data having rightless data in the MS 4 are deleted to make the content data having rightless data remain in HDD 58, the wasted data which are the content data having rightless data remain recorded to the HDD 58. Because the content data having rightless data do not occur as a result of normal operations, the dedicated audio server 1, one embodiment of the present invention, does not have a function for deleting the content data having rightless data as instructed by the user.

Therefore, to protect the copyright of content data and prevent the audio server 1 from recording invalid data, it is desired to delete the content data from the HDD 58 as shown in step S422.

It should be noted that, if the content data in the 58 are determined not rightless in step S421, step S422 is skipped. Namely, if the content data in the HDD 58 are not rightless, it indicates state 14 or state 15 shown in FIG. 83. State 15 presents no problem because the move-in process has been completed therein. In state 14, however, the content data having rightless data remain in the MS 4; as described above, the content data having rightless data in the MS 4 are deletable by the user by use of a general-purpose file editing application, so that there remain no wasted data which are the content data having rightless data in the MS 4.

In step S423, the MS MW 89 deletes the move-in log information from the HDD 58. Thus, the move-in restore process is performed. The procedure returns to FIG. 86, upon which the restore process comes to an end.

It should be noted that, if the move-out log information is found not existing in the HDD 58 in step S391 of FIG. 86, it may indicate that the move-out process has normally ended or the state is state 1 or state 2 shown in FIG. 79. If the move-out process has normally ended or in state 1 which is before the execution of the move-out process, the move-out restore process may be skipped.

In state 2, too, the content data having rightless data remain in the MS 4. However, because the content data having rightless data may be deleted by the user by use of a general-purpose file editing application, no wasted data which are the content data having rightless data remain in the MS 4. Therefore, the process of step S392 is skipped.

If the move-in log information is determined not existing in the HDD 58 in step S393, then it may indicate that the move-in process has normally ended or the state is state 11 shown in FIG. 83. If the move-in process has normally ended and in state 11 which is the state before the execution of a move process, the move-in restore process may be skipped, so that the process of step S394 is skipped.

Even if a restore process is discontinued due to power outage, the process is executed from step S391 again upon power resumption, the discontinued process may be compensated. Thus, the restore process is performed.

Figure 89:
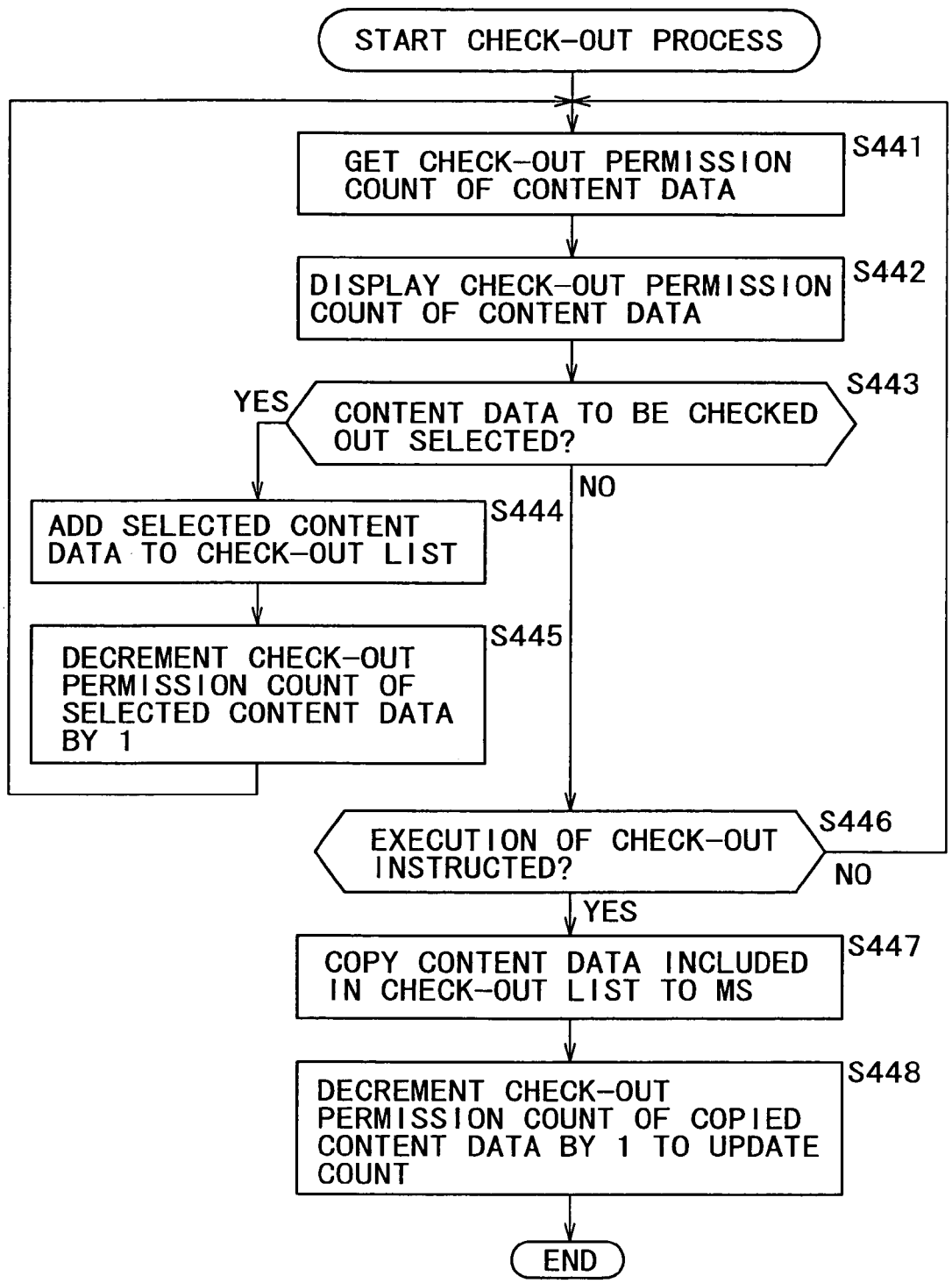
FIG. 89 is a flowchart describing a check-out process.
Figure 90:
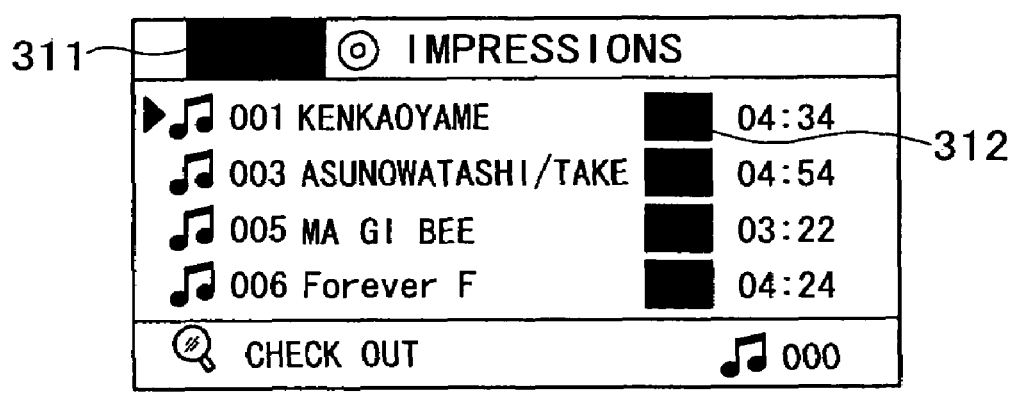
FIG. 90 is a diagram illustrating an exemplary display on the display 15 at the time of a check-out process.
Figure 91:
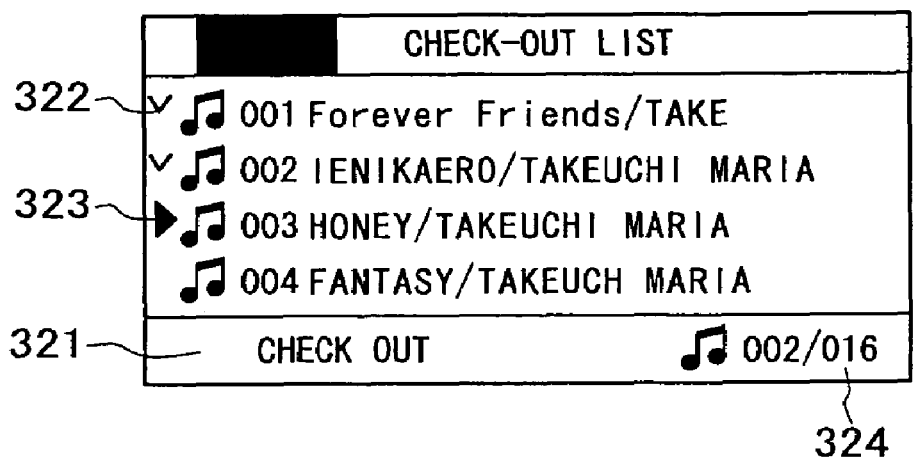
FIG. 91 is a diagram illustrating another exemplary display on the display 15 at the time of a check-out process.

The following describes a process of checking out content data from the HDD 58 of the audio server 1 to the MS 4 with reference to FIGS. 89 through 91.

The process of checking out content data from the HDD 58 denotes a process of temporarily creating a copy of the content data recorded to the HDD 58 into the MS 4 for example and using this copy recorded to the MS 4. The check-out permission count of the content data is set beforehand and this check-out permission count is decremented by 1 every time a check-out process is executed. However, by executing a check-in process to be described later, the check-out permission count is incremented by 1.

The following describes a check-out process with reference to the flowchart shown in FIG. 89. It should be noted that a check-out process is controlled by the C IN/C OUT 87 of the HD MW 82.

This check-out process starts when the user displays the menu by operating the menu/cancel button 21, selects "edit" by operating the cursor button 17, displays the edit menu by operating the enter button 20, selects "check out" by operating the cursor button 17, and operates the enter button 20 with the MS 4 loaded in the MS slot 45.

In step S441, the C IN/C OUT 87 controls the HD DB 91 to get the check-out permission count (the number of times content data may still be checked out) for the content data corresponding to all tracks belonging to a currently selected album. The check-out permission count of content data is recorded to the CN included in the AC (FIG. 42) of each corresponding track object (FIG. 43).

In step S442, the C IN/C OUT 87 requests the associated firmware to display, on the display 15, the information (music title, check-out permission count, and so on) about the tracks of which check-out permission count is 1 or more. FIG. 90 shows a display example on the display 15. A display area 311 on the display 15 displays "HDD" as the information indicative of the sound source of check-out. A display area 312 shows the check-out permission count of the content data corresponding to each track.

In step S443, the C IN/C OUT 87 determines whether or not a track to be checked out has been selected from among the displayed check-out enabled tracks by the user operating the cursor button 17 and the select button 18. If a track to be checked out is found selected, the procedure goes to step S444.

In step S444, the C IN/C OUT 87 adds the selected track to the check-out list. In step S445, the C IN/C OUT 87 decrements the check-out permission count of the content data corresponding to the selected track by 1. The procedure returns to step S441 to repeat the above-mentioned processes.

It should be noted that, if the track to be checked out is found not selected in step S443, the procedure goes to step S446. In step S446, the C IN/C OUT 87 discriminates whether or not the user issues an instruction to execute check-out by operating the enter key 20 so that the list of tracks to be checked out is displayed and then operating the enter key 20. If the execution of check-out is found not instructed, the procedure returns to step S441 to repeat the above-mentioned processes.

Next, in step S446, if the execution of check-out is found instructed, the procedure goes to step S447. In step S447, the C IN/C OUT 87 reads from the HDD 58 the content data corresponding to the track included in the check-out list and requests the MS MW 89 to copy the retrieved content data into the MS 4. It should be noted that the copy of the content data includes the information for identifying the HDD 58, the check-out source.

In step S448, the C IN/C OUT 87 decrements the check-out permission count recorded to the CN of the AC of the track object corresponding to the copied content data by 1 to update the value of the CN. Also, the C IN/C OUT 87 records the information for identifying the MS 4 as the check-out destination information to LCMLOG of the AC.

Although the description is omitted here, a flag indicative of playback enabled or disabled (the validity or invalidity of the right) is used in the same manner as the above-mentioned move-out process, thereby compensating power outage for example and preventing the unauthorized creation of copies from occurring.

FIG. 91 shows a display example on the display 15 during the execution of a check-out process. A display area 321 blinks a character string "Check out" indicative that a check-out process is being executed. A check mark 322 is displayed by each track that has been checked out. A pointer 323 is displayed by the track which is currently being checked out. A display area 324 displays the information indicative of the progress situation of the check-out process (the number of pieces of content data being check out or already checked out/the total number of pieces of content data included in the check-out list). Thus, the check-out process is performed.

Figure 92:
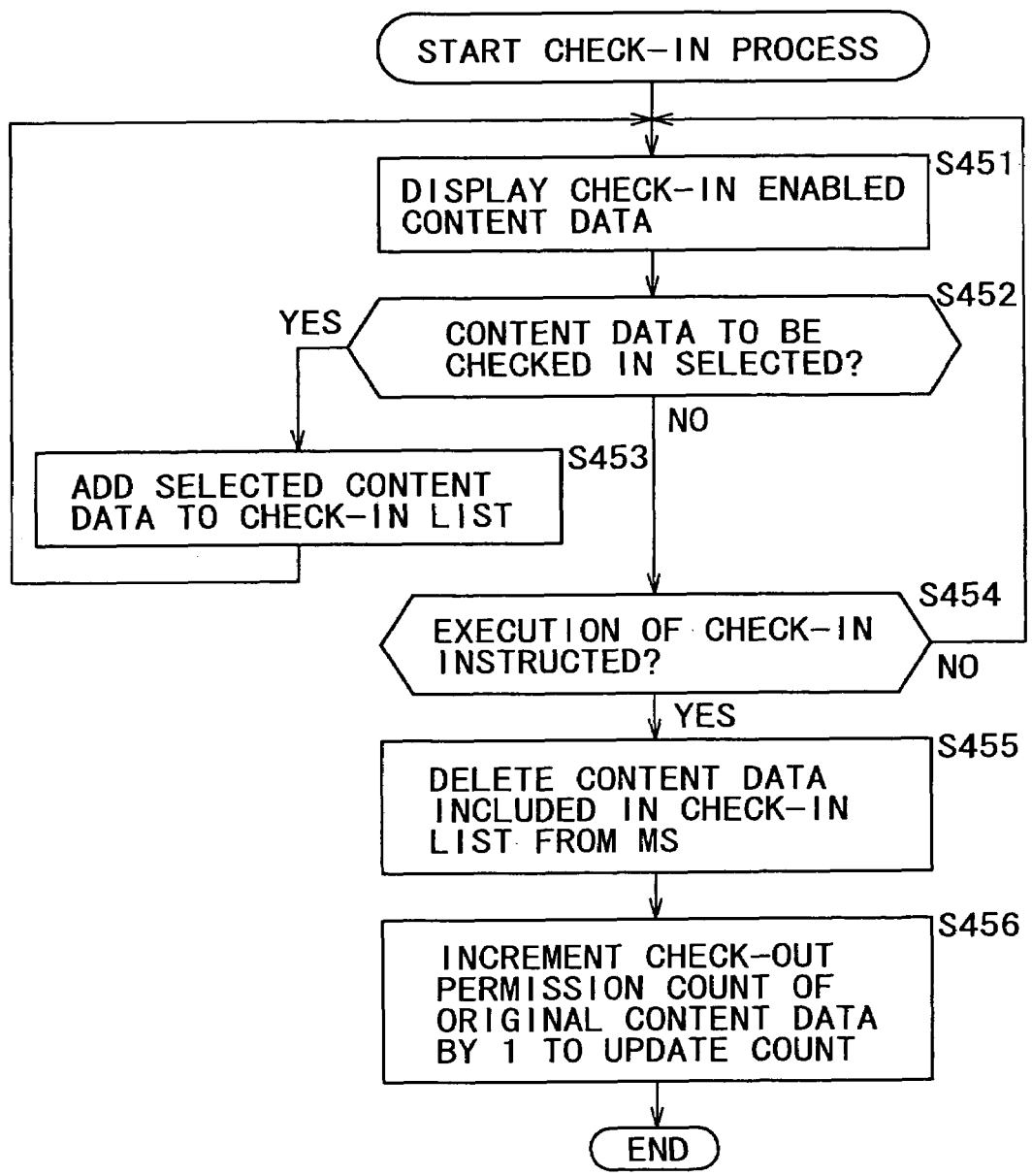
FIG. 92 is a flowchart describing a check-in process.
Figure 93:
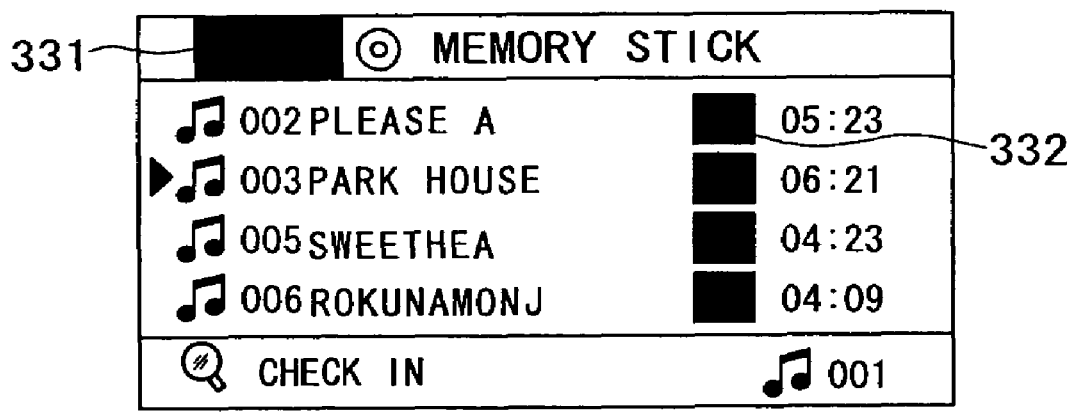
FIG. 93 is a diagram illustrating an exemplary display on the display 15 at the time of a check-in process.
Figure 94:
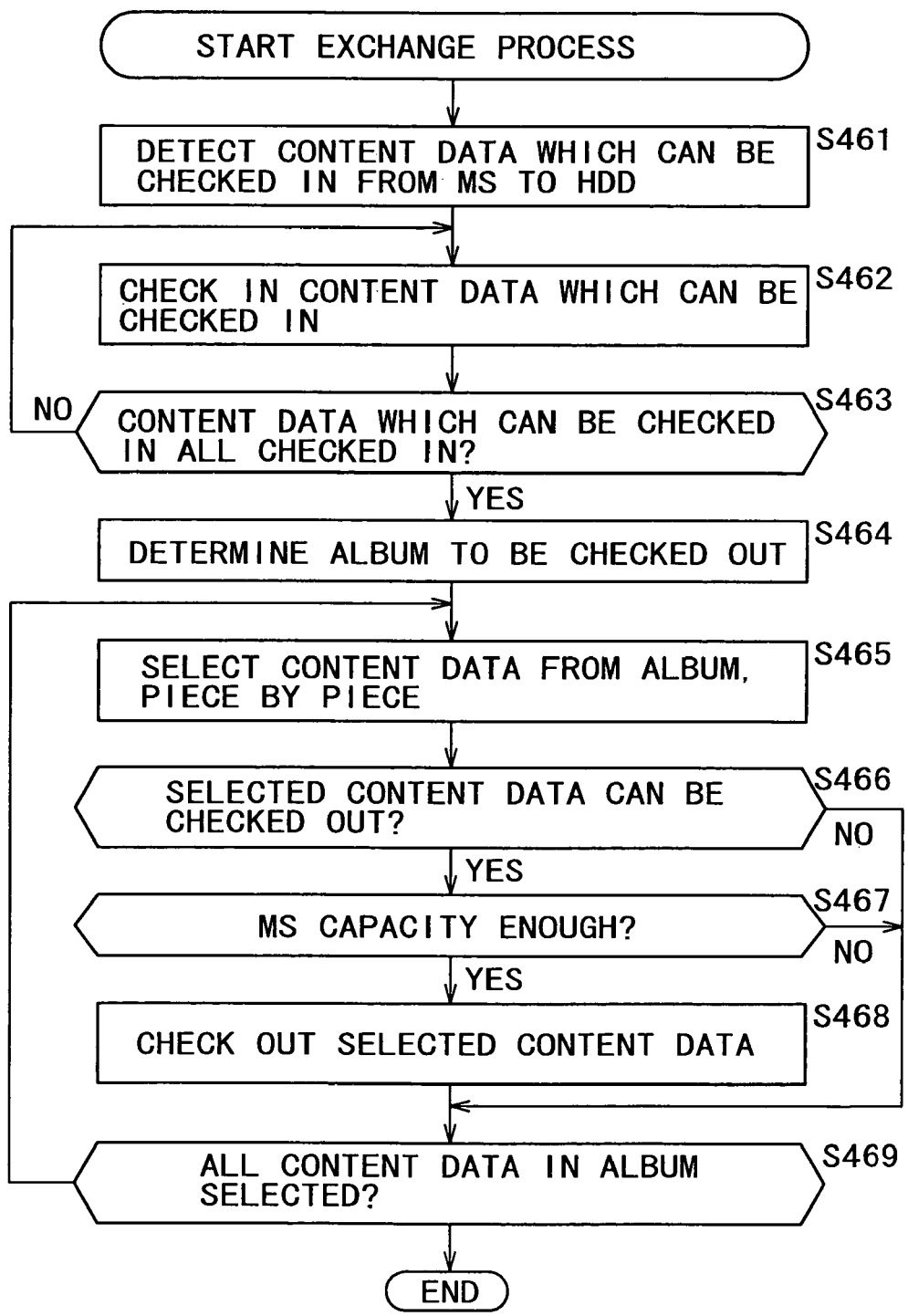
FIG. 94 is a flowchart describing an exchanging process.

The following describes a process of checking in the content data checked out to the MS 4 into the HDD 58 with reference to FIGS. 92 and 93.

A process of checking out the content data recorded to the MS 4 denotes a process in which the copy of the content data temporarily reproduced on the MS 4 is deleted from the HDD 58 and the check-out permission count of the HDD 58 is incremented by 1 to restore the check-out permission count to the original value.

The following describes a check-in process with reference to the flowchart shown in FIG. 92. It should be noted that a check-in process is controlled by the C IN/C OUT 87 of the HD MW 82.

This check-in process starts when the user displays the menu by operating the menu/cancel button 21, selects "Edit" by operating the cursor button 17, displays the edit menu by operating the enter button 20, selects "Check in" by operating the cursor button 17, and operates the enter button 20 with the MS 4 loaded in the MS slot 45.

In step S451, the C IN/C OUT 87 requests the MS MW 89 to identify the content data which can be checked in (the content data checked out from the HDD 58 of the audio server 1) from among the data recorded to the MS 4 and requests the associated firmware to display on the display 15 the information about the content data which can be checked in.

In step S452, the C IN/C OUT 87 displays on the display 15 the information (music title and so on) about the tracks which can be checked in. FIG. 93 shows a display example on the display 15. A display area 331 on the display 15 displays "MS" as the information indicative of the sound source of check-in. An arrow 332 displayed after the information such as the music title name of the content data denotes that the content data can be checked in.

In step S452, the C IN/C OUT 87 determines whether or not the content data to be checked in have been selected from among the displayed content data which can be checked in by the user operating the cursor button 17 and the select button 18. If the content data to be checked in are found selected, the procedure goes to step S453.

In step S453, the C IN/C OUT 87 adds the selected content data to the check-in list. The procedure returns to step S451 to repeat the above-mentioned processes.

If the content data to be checked in are found not selected in step S452, then the procedure goes to step S454. In step S454, the C IN/C OUT 87 discriminates whether or not an instruction to execute check-in is issued by the user operating the enter key 20 to display a list of contents data to be checked in and further operating the enter key 20. If the execution of check-in is found not instructed, the procedure returns to step S451 to repeat the above-mentioned processes.

Next, if the execution of check-in is found instructed in step 5454, the procedure goes to step S455. In step S455, the C IN/C OUT 87 requests the MS MW 89 to delete the content data in the MS 4 included in the check-in list (or may only turn off the flag indicative whether playback is enabled or disabled; namely, may only render the content data rightless).

In step S456, the C IN/C OUT 87 increments the check-out permission count recorded to the CN of the AC of the track object corresponding to the original content data recorded to the HDD 58 by 1 to update the value of the CN. At the same time, the C IN/C OUT 87 deletes the information for identifying the MS 4 recorded as the check-out destination information from the LCMLOG of the AC. Thus, the check-in process is performed.

The following describes, with reference to FIGS. 94 through 97, an exchange process for continuously executing a process of check-in the content data recorded to the MS 4 and a process of collectively checking out a plurality of tracks belonging to an album including a track last played back by the HD play function.

This exchange process starts when the user operates the exchange button 22 with the MS 4 loaded in the MS slot 45.

In step S461, the C IN/C OUT 87 requests the MS MW 89 to identify the content data which can be checked in from among the data recorded to the MS 4. In step S462, the C IN/C OUT 87, in cooperation with the MS MW 89, checks in, piece by piece, the content data recorded to the MS 4 which can be checked in, in the same manner as the above-mentioned check-in process described with reference to FIG. 92.

FIG. 95 shows a display example on the display 15 during the execution of the process of step S462. A display area 381 on the display 15 displays "MS" as the information indicative of the sound source of check-in. A display area 382 blinks a character string "Now Check in" indicative that check-in is being executed. An "X" marker 383 displayed before the information such as music title name of content data indicates that the content data concerned are disabled for check-in. A check marker 384 indicates that the content data concerned have already been checked in. A pointer 385 indicates that the check-in of the content data concerned is being executed.

In step S463, the C IN/C OUT 87 determines whether or not the content data enabled for check-in in the MS 4 have all been checked in. If the content data enabled for check-in in the MS 4 are found not all checked in, then the procedure returns to step S462 to check in next content data. Then, in step S463, if the content data in the MS 4 enabled for check-in are found all checked in, the procedure goes to step S464.

In step S464, the C IN/C OUT 87, in cooperation with the HD DB 91, determines an album of which tracks are all checked out together. To be more specific, for example, the HD DB 91 identifies the track played back last on the basis of the last access date (FIG. 42) of each track object recorded to the object recording area 122 to determine the album to which the identified track belongs as a check-out album.

In step S465, the C IN/C OUT 87 selects one track (namely, content data) from the check-out album. In step S466, the C IN/C OUT 87 determines whether or not the selected content data are enabled for check-out. If the selected content data are found enabled for check-out, the procedure goes to step S467.

In step S467, the C IN/C OUT 87 requests the MS MW 89 to determine whether or not the MS 4 has enough capacity for checking out the selected content data. If the MS 4 is found having an enough capacity for checking out the selected content data, the procedure goes to step S468.

In step S468, the C IN/C OUT 87 checks out the selected content data in the same manner as the check-out process described with reference to FIG. 89.

FIG. 96 shows a display example on the display 15 during the execution of the process of step S468. A display area 391 on the display 15 shows "HDD" as the information indicative of the sound source of check-out. A display area 392 blinks a character string "Now Check out" indicative that check-out is being executed. An "X" marker displayed before the information such as music title name of content data indicates that the content data concerned are disabled for check-out. A check marker indicates that the content data concerned have already been checked out.

In step S469, the C IN/C OUT 87 determines whether or not all tracks (namely, content data) included in the check-out album have been selected in step S465. If all content data are found not selected in step S465, the procedure returns to step S465 to repeat the above-mentioned processes. If all content data are found selected in step S465, this exchange process comes to an end.

It should be noted that, if the selected content data are found not enabled for check-out in step S466, then steps S467 and S468 are skipped. If the MS 4 is found not having enough capacity for checking out the selected content data in step S467, step S468 is skipped.

FIG. 97 shows a display example on the display 15 immediately after the completion of an exchange process. A display area 401 on the display 15 shows a character string "COMPLETE" indicative of the completion of an exchange process.

As described, the user may only operate the exchange button 22 to automatically execute the check-in process for checking in from MS 4 to the HDD 58 and the check-out process for checking out from the HDD 58 to the MS 4. Thus, the exchange process is performed.

It should be noted that the above-mentioned move-out process, move-in process, import process, check-out process, and check-in process may be executed not only between the HDD 58 and the MS 4 but also between the HDD 58 and the PD 5 connected to the connector 43.

Figure 98:
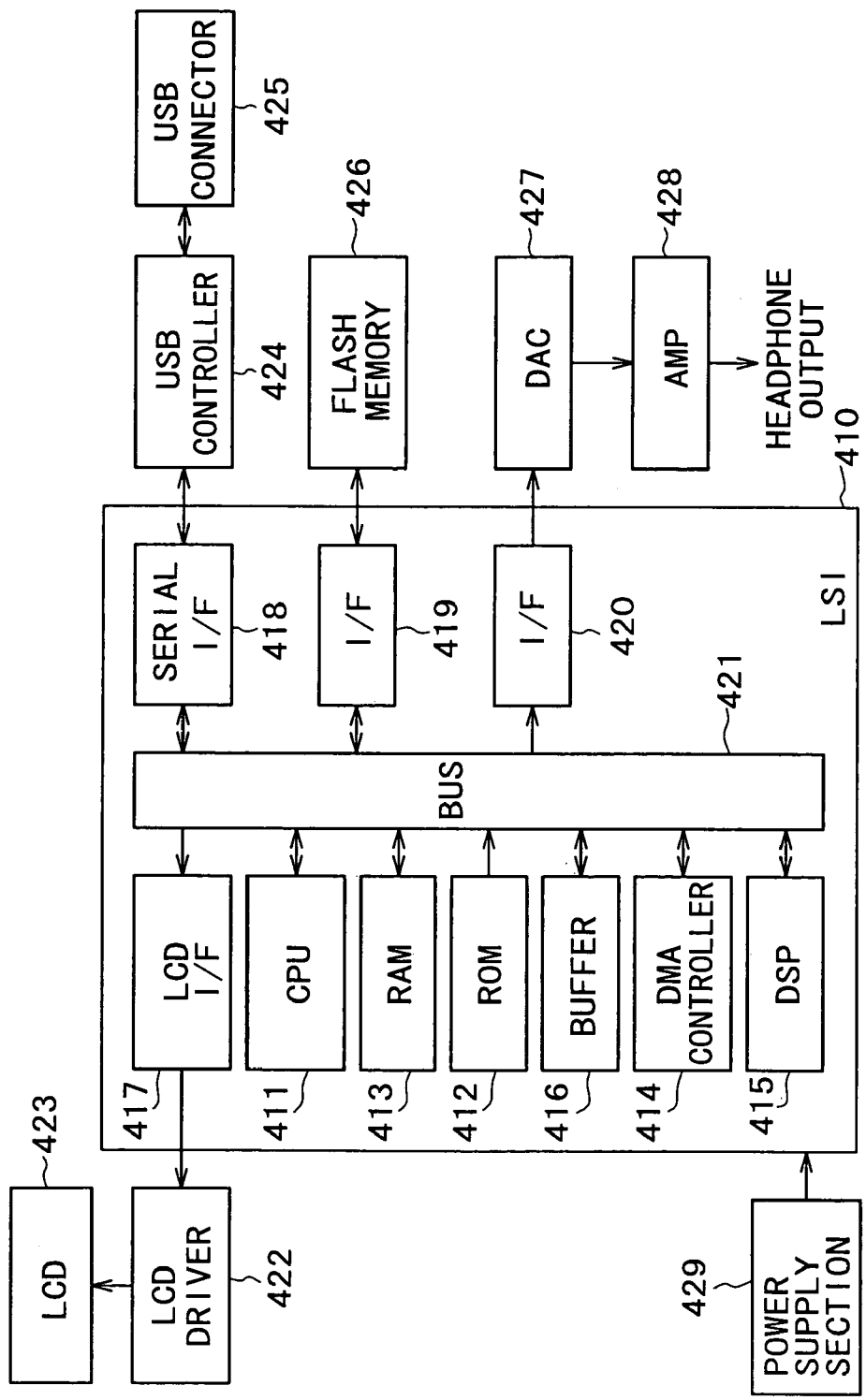
FIG. 98 is a block diagram illustrating an exemplary hardware configuration of a PD 5.

FIG. 98 shows an exemplary configuration of the hardware of the PD 5. An LSI (Large Scale Integration) 410 for implementing the PD 5 incorporates a CPU 411 for controlling the entire PD 5. The CPU 411 is connected to a ROM 412, a RAM 413, a DMA controller 414, a DSP (Digital Signal Processor) 415, a buffer 416, an LCD interface (I/F) 417, a serial interface (I/F) 418, and interfaces 419 and 420 via a bus 421.

The ROM 412 stores the programs for realizing various functions of the PD 5, device ID and encryption key and the like. The RAM 413 temporarily stores predetermined data and programs when the CPU 411 executes various processes. The DMA controller 414 controls the data transfer with a USB controller 424 via the buffer 416, a flash memory 426, and the serial interface 418. The DSP 415 decodes the content data recorded to the flash memory 426 for example. The DSP 415 has a DES engine to encrypt/decrypt content data by use of the encryption key. The buffer 416 temporarily buffers the data of which transfer is controlled by the DMA controller 417.

The LCD interface 417 is followed by an LCD driver 422 and an LCD 423. The serial interface 418 is followed by the USB controller 424 and a USB connector 425. The USB controller 424 controls the data communication with the audio server 1 connected via the USB connector 425. The flash memory 426 connected via interface 419 stores the content data moved out for example from the audio server 1 and additional information such as music titles. The interface 420 is followed by a DAC 427 and an amplifier (AMP) 428. A power supply section 429 supplies power to the LSI 410.

The audio data obtained by a decoding process by the DSP 415 are outputted to a headphone for example via the interface 420, the DAC 427, and the amplifier (AMP) 428.

The move-out process and so on between the HDD 58 and the MS 4 and the move-out process and so on between the HDD 58 and the PD 5 are substantially the same, so that the following describes only the differences between them.

The content data to be recorded to the MS 4 are encrypted by use of the same encryption key as that for the encryption of the content data stored in the HDD 58 of the audio server 1. Therefore, between the HDD 58 and the MS 4, the encrypted content data can be moved out as it is without being decrypted.

On the contrary, the content data to be recorded to the PD 5 are encrypted by use of an encryption key which is different from the encryption key for encrypting the content data stored in the HDD 58 of the audio server 1. Therefore, as described with reference to FIG. 56, between the HDD 58 and the PD 5, the content data recorded to the HDD 58 are decrypted and then encrypted again by use of a different encryption key for the PD 5 and the resultant content data are moved out.

Thus, the move-out process, move-in process, import process, check-out process, and check-in process are executed between the HDD 58 and the PD 5.

The following describes a store function and a restore function of the audio server 1 with reference to FIGS. 99 through 107.

The store function is a function for temporarily storing, where the recording capacity of the MS 4 is running short because of presence of data (for example, a still picture file or a voice file) which cannot be played back by the audio server 1 other than contents data recorded already in the MS 4, the data recorded already in the MS 4 other than the contents data as a single archive file which includes files of the same type recorded simultaneously into the HDD 58.

The restore function denotes the function for restoring the corresponding directory and its files into the MS 4 by use of the archive file generated by the store function on the HDD 58.

FIG. 99 shows the types of directories and data files which are possibly recorded to the MS 4.

File MEMSTICK.ind indicates that the recording medium to which a file concerned is recorded is the Memory Stick. Directory DCIM is a directory storing still picture files generated by a digital still camera for example. Directory VOICE is a directory for storing voice files generated by an IC recorder for example. Directory HIFI is a directory for storing the content data attached with copyright information checked out or moved out from the audio server 1 for example. Directory CONTROL is a directory for storing control information files. Directory TEL is a directory for storing telephone and facsimile information files. Directory OPEN-R is a directory for storing entertainment robot information files. Directory POSITION is a directory for storing positional information files. Directory PALM is a directory for storing PALM OS data files. Directory MP3 is a directory for storing MP3 files. Directory MSxxxxxx is a directory for storing vendor-unique information files ("xxxxxx" is information for identifying the vendor).

FIG. 100 shows the recording positions of archive files which are generated, by the store function, under the directory structure of the object recording area 122 in the HDD 58. On the layer on which folder objects 217 are arranged, an MS data object 501 is arranged. On the layer below the MS data object 501, an MS store/restore object 502 is arranged. The archive files (in FIG. 100, MS data #1.DCIM, MS data #2.VOICE, and MS data #3.DCIM) are recorded on the layer below the MS store/restore object 502.

It should be noted that the name of archive file such as "MS data #1" may be set by the user in an arbitrary manner.

The following describes a store process by the HD MW 82 for implementing the store function with reference to the flowchart shown in FIG. 101. This store process starts when the user selects the MS 4 as sound source by repetitively pressing the function button 12, selects "Edit" by operating the cursor button 17 after pressing the menu/cancel button 21, presses the enter button 20, selects "Store (MS→HDD)" by operating the cursor button 17, and then presses the enter button 20.

In step S501, the HD MW 82 requests the MS MW 89 to search the directories recorded to the MS 4 for a directory to be stored, namely, a directory other than directory HIFI, computes the capacity of the retrieved directory, and displays the computed capacity on the display 15.

Figure 102:
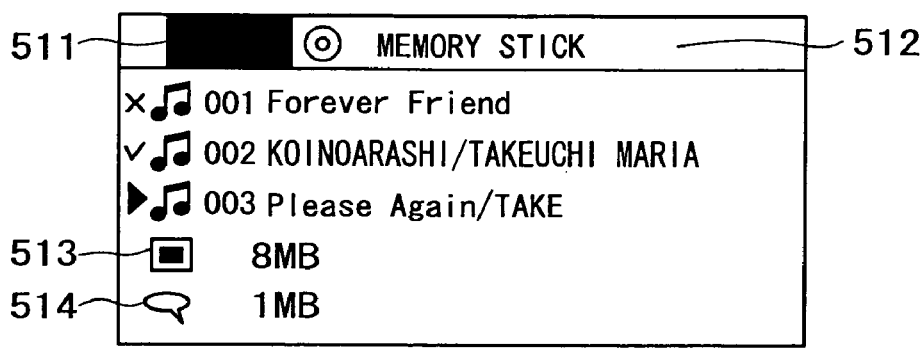
FIG. 102 is a diagram illustrating an exemplary display on the display 15 at the time of a storing process.

FIG. 102 shows a display example on the display 15 when the MS 4 is selected as sound source. Display areas 511 and 512 show character strings "MS" and "Memory Stick" indicative of sound sources. A display marker 513 indicates a still picture file storage directory; in this example, its capacity is 8 MB. A display marker 514 indicates a voice file storage directory; in this example, its capacity is 1 MB.

Figure 103:
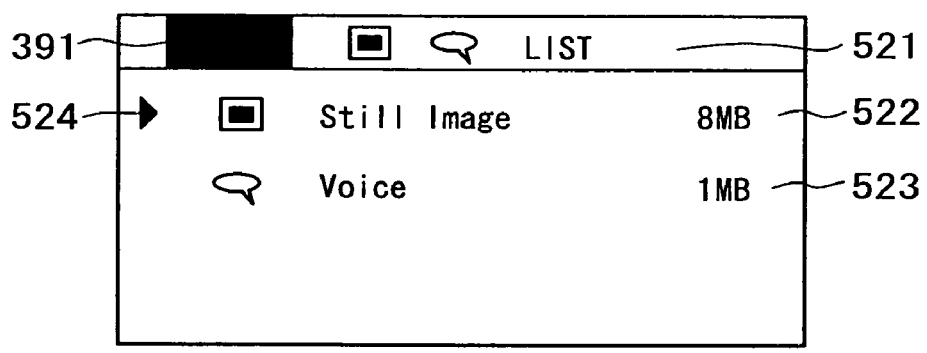
FIG. 103 is a diagram illustrating another exemplary display on the display 15 at the time of a storing process.

Returning to FIG. 101, in step S502, the HD MW 82 accepts the user operation for selecting the directory to be stored and waits until the user performs a select operation. FIG. 103 shows an display example on the display 15 in which a list of directories which can be stored is displayed. A display area 521 shows the information that the list of directories which can be stored is displayed. A display area 522 shows that there is a still picture file storage directory which can be stored and its capacity is 8 MB. A display area 524 shows that there is a voice file storage directory which can be stored and its capacity is 1 MB. A cursor 524 points the still picture file storage directory or the voice file storage directory in accordance with the operation of the cursor button 17.

Returning to FIG. 101, in step 502, if a user operation for selecting a directory to be stored is performed, the procedure goes to step S503. In step 503, the HD MW 82 requests the MS MW 89 to read all files belonging to the directory to be stored and records them as one archive file into the layer below the MS store/restore object 502 of the object recording area 122 of the HDD 58. In step S504, the HD MW 82 records the original directory (for example, directory DCIM) and the archive file name (for example, "2001/08/11") to the recorded archive file by relating the original directory and the archive file name.

It should be noted that the archive file name may be set by the user in an arbitrary manner; however, if no file name is set, the date of the store process concerned is automatically set as the archive file name such as "2001/08/11".

Figure 104:
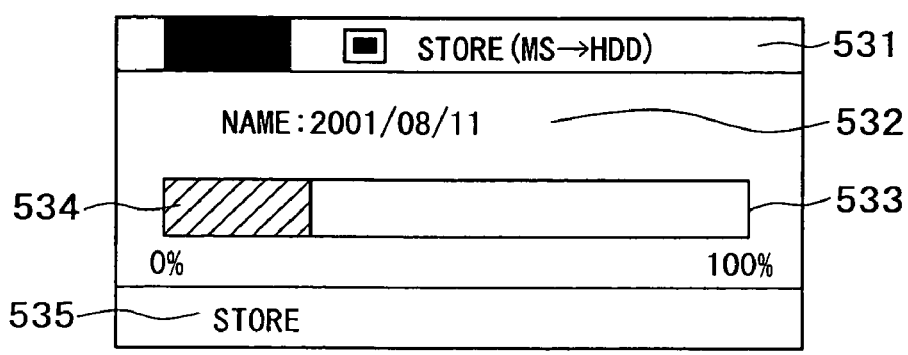
FIG. 104 is a diagram illustrating still another exemplary display on the display 15 at the time of a storing process.

FIG. 104 shows a display example in the display 15 when an archive file being generated. A display area 531 shows the information that the still picture file storage directory of the MS 4 is stored in the HDD 58. A display area 532 shows the file name (in this example, "2001/08/11") of the generated archive file. A display area 533 shows a variable-length bar 534 which extends in proportion to the progress of the store processing concerned. A display area 535 blinks a character string "Store" indicative that a store process is being executed.

Returning to FIG. 101, in step 505, the HD MW 82 requests the MS MW 89 to delete, from the MS 4, the directory in the MS 4 with the archive file generated in the HDD 58. Thus, the store process is performed.

It should be noted that the retrieved directory which can be stored may be automatically selected for executing the subsequent processes rather than waiting for the user operation for selecting the directory to be stored as the process in step 502.

As described, a store process allows the searching of the directories and files recorded to the MS 4 for directories which can be stored. A store process also allows the selecting and storing of a directory in which the files generated by particular electronic equipment are stored. In addition, a store process prevents any ill-intentioned user who tries to copy the content data stored in the HIFI file in an unauthorized manner from using this store function because the HIFI directory in which files having copyright information in the MS 4 are stored is not processed by this store function.

Figure 105:
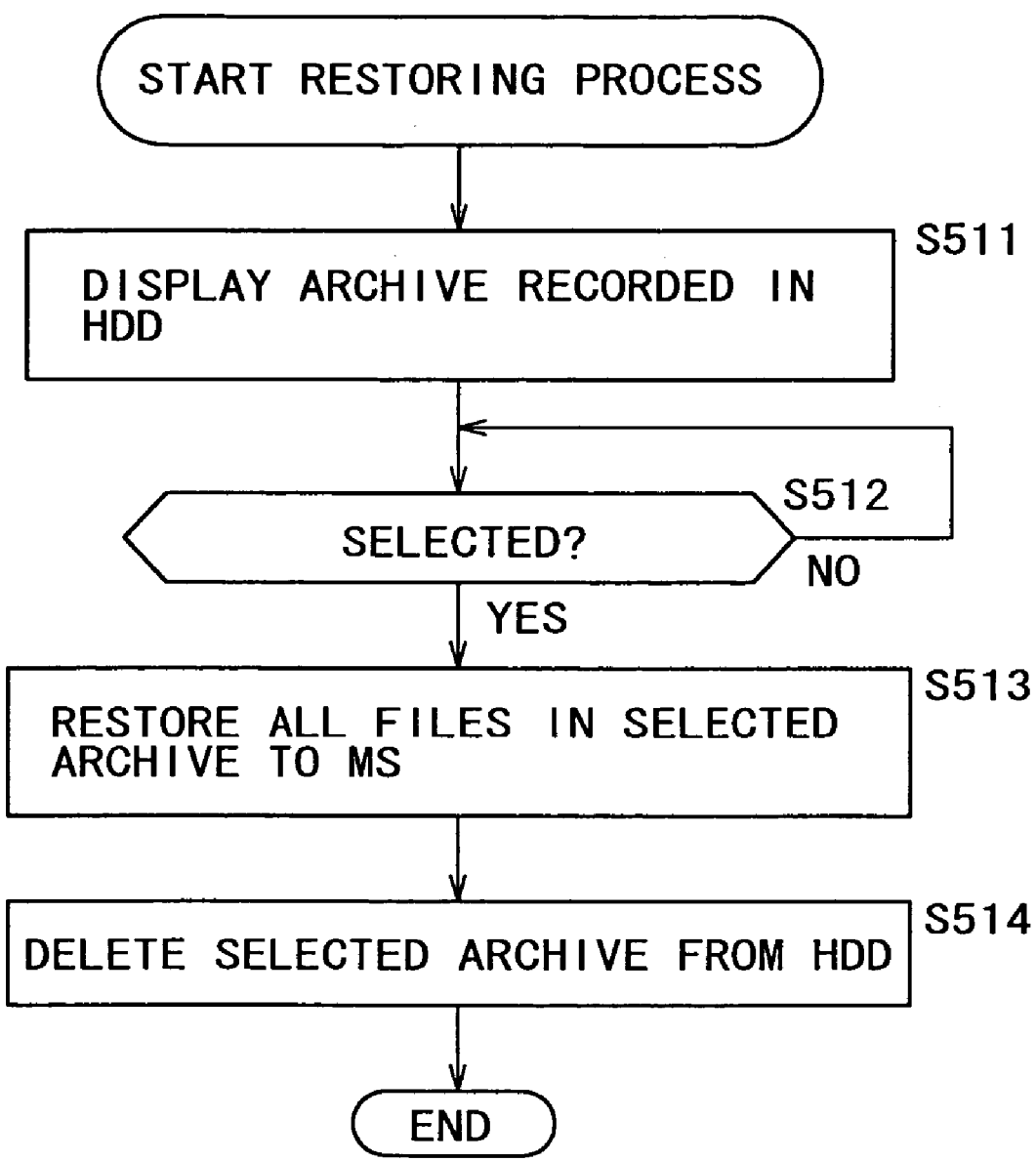
FIG. 105 is a flowchart describing a restoring process.

The following describes a restore process for restoring, on the MS 4, a directory equivalent to an archive file stored in the HDD 58 with reference to the flowchart shown in FIG. 105.

This restore process starts when the user selects the HDD 58 as sound source by repetitively pressing the function button 12, selects "Edit" by operating the cursor button 17 after pressing the menu/cancel button 21, presses the enter button 20, selects "Restore (MS→HDD")" by operating the cursor button 17, and then pressing the enter button 20.

In step 501, the HD MW 82 displays, on the display 15, the list of archive files belonging to the layer below the MS store/restore object 502 of the object recording area 122 of the HDD 58.

Figures 106, 107:
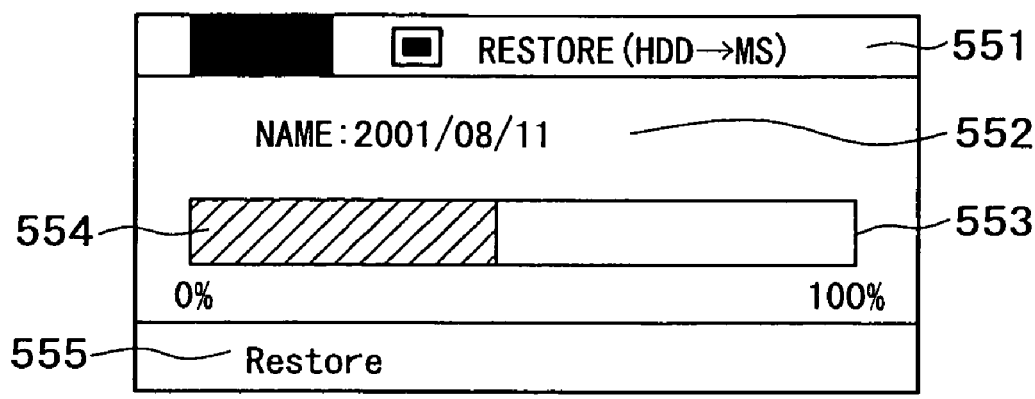
FIG. 106 is a diagram illustrating an exemplary display on the display 15 at the time of restoring process.
FIG. 107 is a diagram illustrating another exemplary display on the display 15 at the time of restore process.

FIG. 106 shows a display example on the display 15 for displaying the list of archive files. A display area 541 shows a character string "HDD" indicative of sound source. A display area 542 shows a character string "Restore List". A display area 543 shows the information about the archive files which can be restored (file type marker, file name, and data capacity). A cursor 544 points the still picture file storage directory or the voice file storage directory in accordance with the operation of the cursor button 17.

Returning to FIG. 105, in step S512, the HD MW 82 accepts a user operation for selecting an archive file to be restored in step S502 and waits until the user performs the select operation. To be more specific, the HD MW 82 waits until the user selects an archive file by moving the cursor 544 up or down by operating the cursor button 17 and presses the enter button 20 to establish this selection. When the user performs these operations, the procedure goes to step S513.

FIG. 107 shows a display example on the display 15 when the original directory and its files are being restored on the basis of the archive file. A display area 551 shows information "Restore (HDD→MS)" indicative that the still picture file storage directory is restored from the HDD 58 to the MS 4. A display area 552 shows the file name (in this example, "2000/08/11") of the restored archive file. A display area 553 shows a variable-length bar 554 which extends in proportion to the progress of the restore process concerned. A display area 555 blinks a character string "Restore" indicative that the restore process is being executed.

Returning to FIG. 105, in step 513, the HD MW 82 requests the MS MW 89 to restore the original directory and all its files into the MS 4 on the basis of the archive file selected to be restored. In step S514, the HD MW 82 deletes the selected archive file from the layer below the MS store/restore object 502 in the object recording area 122 of the HDD 58. Thus, the restore process is performed.

It should be noted that the subsequent processes may executed by automatically selecting the archive file to be restored rather than waiting for the user to select the archive file to be restored as the process in step 512.

Figure 108:
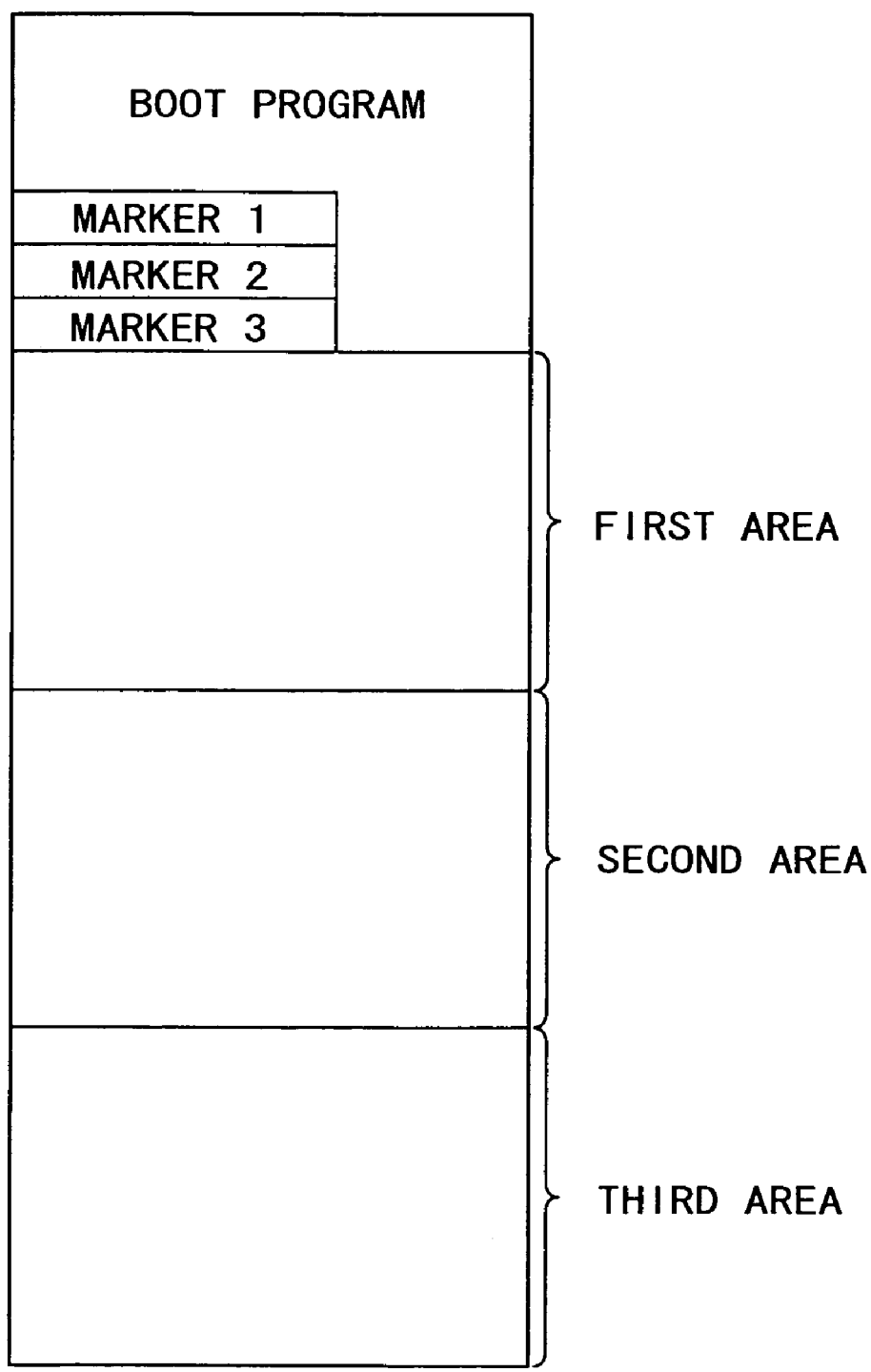
FIG. 108 is a diagram illustrating an area configuration of a flash ROM shown in FIG. 6.

FIG. 108 shows an exemplary configuration of the flash ROM 52. The flash ROM 52 stores a boot program which will be described later.

Figure 7:
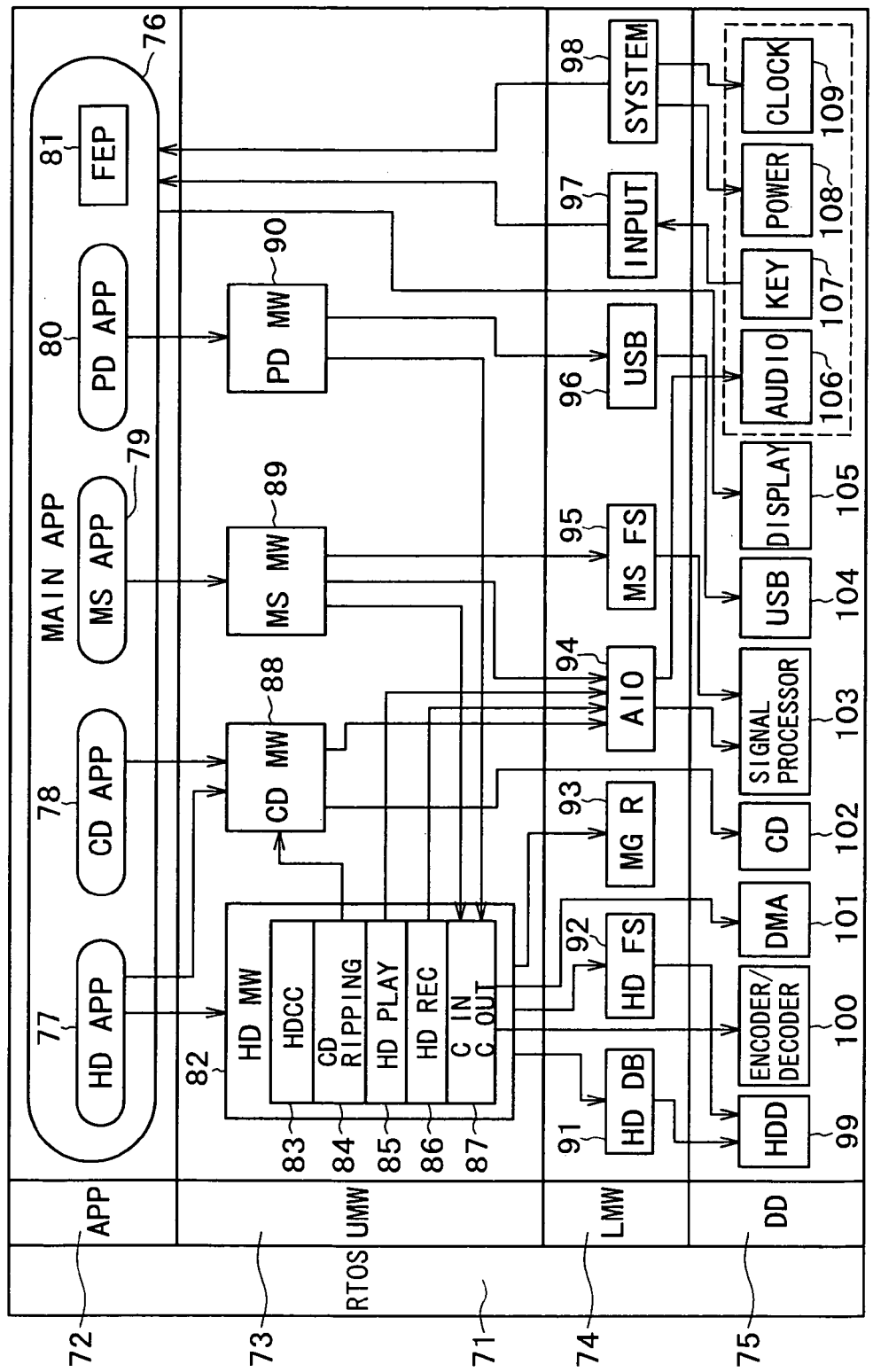
FIG. 7 is a diagram illustrating firmware which is executed by the audio server 1.

The flash ROM 52 has three storage areas, first through third storage areas, in which the firmware shown in FIG. 7 is stored on a so-called version basis. Namely, in this example, firmware of three generations of versions may be stored.

A marker 1 indicative of the version of the firmware to be stored in the first storage area, a marker 2 indicative of the version of the firmware to be stored in the second storage area, and a marker 3 indicative of the version of the firmware to be stored in the third storage area are included in the boot program.

It should be noted that, although details will be described later, each marker is incremented by 1 every time the firmware is upgraded in version. If no firmware is stored in the corresponding area, each maker has a value indicative of "INVALID".

Figure 109:
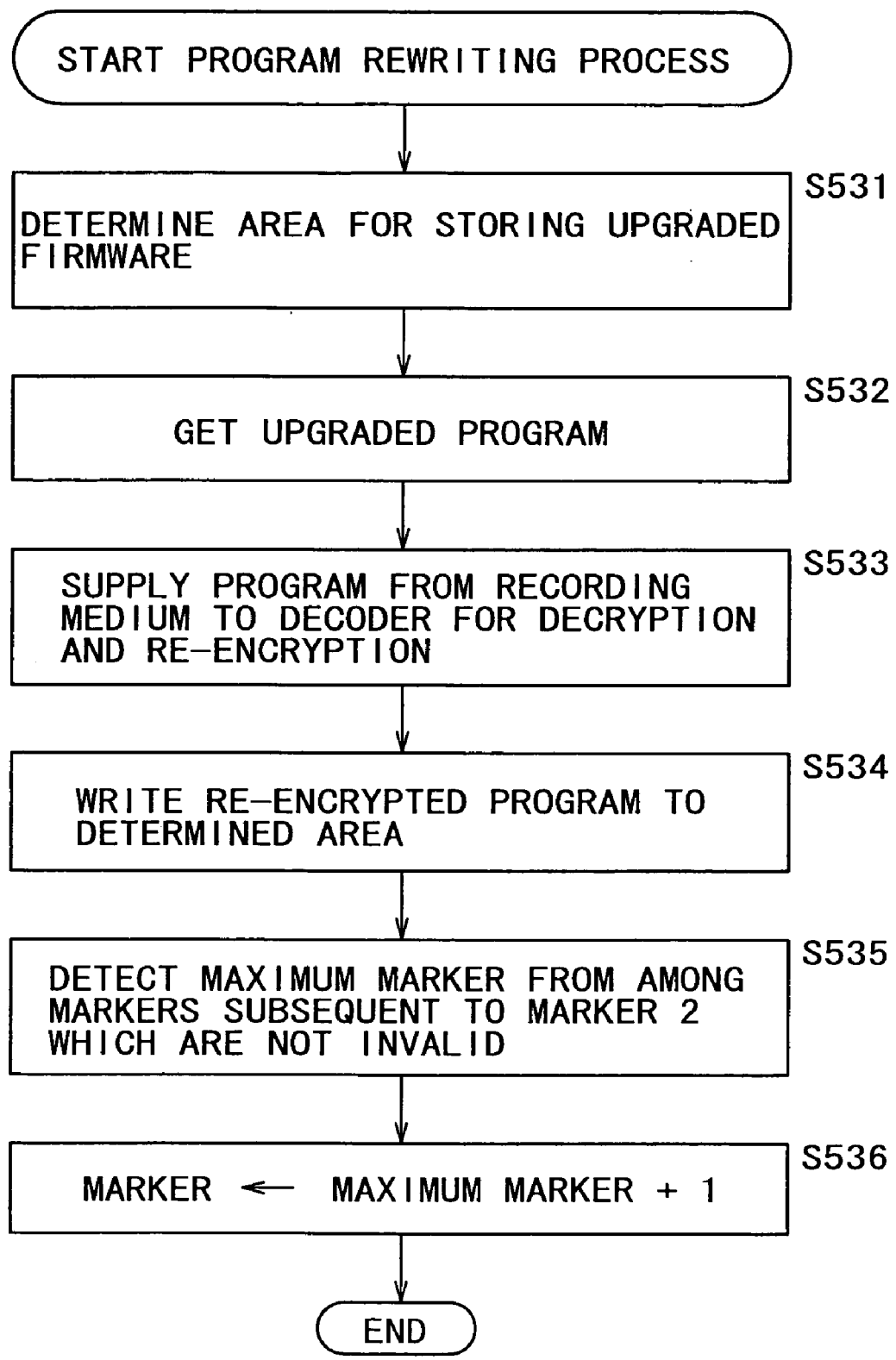
FIG. 109 is a flowchart describing a program rewriting process.

The following describes a processing procedure for upgrading firmware in version (rewriting a program) with reference to the flowchart shown in FIG. 109.

It should be noted that, this firmware version upgrading process is executed by the firmware specified by the boot program which will be described later when the user performs a predetermined operation on the audio server 1. For example, if the firmware to be upgraded in version and the firmware of a later version are stored in a CD-ROM, the CD MW 88 executes this process; if these firmware programs are stored in the MS 4, the MS MW 89 executes this process. In this example, this version upgrading process is executed by the CD MW 88.

In step S531, the CD MW 88 determines an area in which the upgraded firmware is stored.

To be more specific, one "INVALID" marker of the marker 2 and on of the flash ROM 52 (the marker 2 and the marker 3 in the example of FIG. 108) is detected and the storage area pointed by this marker provides the area for storing the upgraded firmware. If no "INVALID" marker exists in the marker 2 and on, the minimum marker is detected and the area pointed by this marker provides the area for storing the upgraded firmware.

In this example, the storage area pointed by the minimum marker stores the firmware of the least recent version.

In step S532, the CD MW 88 gets the firmware of the most recent version from the CD-ROM loaded in the CD-ROM drive 57. It should be noted that, in addition to the CD-ROM, the firmware of the most recent version may also be obtained from the MS 4 or the electronic equipment which performs data communication via the Ethernet controller/connector 67.

In step S533, the CD MW 88 supplies the firmware obtained in step S532 to the encoder/decoder 59 for decryption and, in this example, re-encryption by use of the encryption key stored in the flash ROM 52 is performed.

In step S534, the CD MW 88 writes the firmware re-encrypted in step S533 to the storage area determined in step S531.

In step S535, the maximum marker is detected from the marker 2 and on (except for "INVALID" marker). In step S536, the value obtained by adding 1 to the maximum marker provides the marker corresponding to the storage area in which the firmware was stored in step S534. Then, this upgrading process comes to an end.

As described, only by performing a predetermined operation by the user on the audio server 1, the version of firmware may be upgraded.

Figure 110:
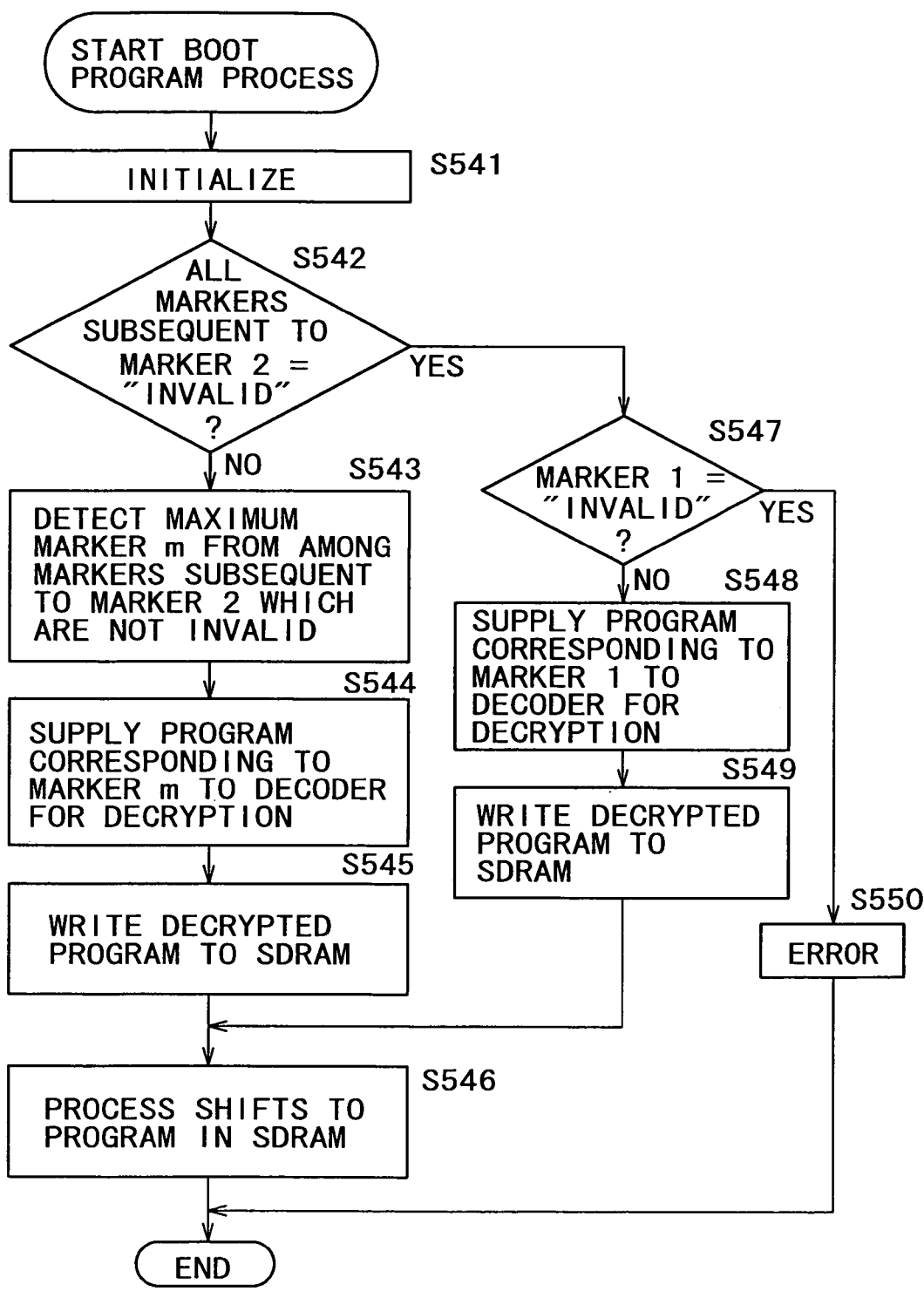
FIG. 110 is a flowchart describing a boot program process.

The following describes a processing procedure in the boot program with reference to the flowchart shown in FIG. 110. It should be noted that this boot program is executed immediately after the power is supplied from the power supply section 65 to each component of the system (upon execution of a power-on sequence).

In step S541, the boot program executes a predetermined initializing process such as register initialization for example.

In step S542, the boot program determines whether or not all of the marker 2 and on (the marker 2 and the marker 3) in the flash ROM 52 are "INVALID". If all these markers are not "INVALID", the procedure goes to step S543.

In step S543, the maximum marker m which is not "INVALID" is detected from the marker 2 and on. In step S544, the boot program supplies the firmware stored in the storage area pointed by the marker m to the encoder/decoder 59 for decryption. In step S545, the boot program writes the decrypted firmware to the SDRAM 53.

If the marker 2 and on are all found "INVALID" in step S542, then the procedure goes to step S547, in which the boot program determines whether or not the marker 1 is "INVALID". If the marker 1 is found not "INVALID", the procedure goes to step S548.

In step S548, the boot program supplies the firmware in the storage area pointed by the marker 1 to the encoder/decoder 59 for decryption. In step S549, the boot program writes the decrypted firmware to the SDRAM 53.

When the firmware is written to the SDRAM 53 in step S545 or S549, the procedure goes to step S546, in which the boot program instructs the execution of the firmware written to the SDRAM 53. Consequently, the firmware developed in the SDRAM 53 is executed.

If the marker 1 is found "INVALID" in step S547, namely, if none of the storage areas stores the firmware and all markers are "INVALID", then the procedure goes to step S550, in which error is determined.

If the firmware is executed in step S546 or if an error is determined in step S550, then the process comes to an end.

It should be noted that, in the above-mentioned example, only three storage areas for storing firmware are arranged in the flash ROM 52; the number of storage areas for storing the firmware is not limited to three as long as it is more than one. If there are two storage areas, the marker of the storage area in which the firmware is stored may be set to "INVALID" and, after storing the firmware in that storage area, set to "VALID" (to be correct, a value not INVALID). This prevents the firmware under rewriting from being developed into the SDRAM 53 for execution.

In the above-mentioned example, the firmware is upgraded in version. It will be apparent that the present invention is also applicable to a configuration in which other programs are upgraded in version. The present invention is also applicable to a configuration in which program forms are changed (for example, programs for the Japanese language and the English language).

The above-mentioned sequences of processes may be executed not only by dedicated equipment such as the audio server 1 but also by installing the firmware as shown in FIG. 7 on a general-purpose personal computer for example and executing the installed firmware.

This firmware is constituted not only by package media storing firmware such as the magnetic disk (including a floppy disk), the optical disk (including CD-ROM (Compact Disk-Read Only Memory) and a DVD (Digital Versatile Disk)), and the magneto-optical disk (including MD (Mini Disc), and the semiconductor memory which are distributed to users to provide programs independently of the general-purpose computer, but also by a ROM and a hard disk storing firmware to be provided to users as installed in the computer.

It should be noted that, in the present specification, the steps for describing the program (firmware) include not only the processing operations to be executed sequentially in time but also the processing operations to be executed in parallel or discretely.

INDUSTRIAL APPLICABILITY

As described and according to the invention, the processing of temporarily moving data formatted in a predetermined manner can be automatically executed.

The invention claimed is:

1. A recording apparatus for recording content data to a first information storage medium which is detachable from said recording apparatus, the recording apparatus comprising:
   an acceptance unit configured to accept a user operation;
   a search unit configured to search said detachable first information storage medium onto which the content data is recorded by the recording apparatus for a plurality of data files which are different in format from said content data which can be reproduced by the recording apparatus;
   a read unit configured to read said plurality of data files retrieved by said search unit from said first information storage medium;
   a storage unit configured to store, as an archive file, said plurality of data files read by said read unit, into a second information storage medium which is incorporated in said recording apparatus;
   a deletion unit configured to delete said plurality of data files, which are stored as said archive file, from said first information storage medium;

a control unit configured to control, in response to said user operation accepted by said acceptance unit, said search unit, said read unit, said storage unit, and said deletion unit; and a decode unit configured to decode said content data;

wherein said search unit searches for said plurality of data files which cannot be decoded by said decode unit.

2. The recording apparatus according to claim 1, wherein said search unit searches for said plurality of data files which belongs to a predetermined directory in said first information storage medium as said plurality of data files which is different in format from said content data.

3. The recording apparatus according to claim 1, wherein said search unit searches for said plurality of data files not attached with copyright information which is different in format from said content data.

4. The recording apparatus according to claim 1, wherein said storage unit stores, as an archive file, a plurality of data files formatted in a same way read by said read unit into said second information storage medium which is incorporated in said recording apparatus.

5. A recording apparatus for recording content data to a first information storage medium which is detachable from said recording apparatus, the recording apparatus comprising:

an acceptance unit configured to accept a user operation;

a search unit configured to search said detachable first information storage medium onto which the content data is recorded by the recording apparatus for a plurality of data files which are different in format from said content data which can be reproduced by the recording apparatus;

a read unit configured to read said plurality of data files retrieved by said search unit from said first information storage medium;

a storage unit configured to store, as an archive file, said plurality of data files read by said read unit, into a second information storage medium which is incorporated in said recording apparatus;

a deletion unit configured to delete said plurality of data files, which are stored as said archive file, from said first information storage medium;

a control unit configured to control, in response to said user operation accepted by said acceptance unit, said search unit, said read unit, said storage unit, and said deletion unit; and a decode unit configured to decode said content data;

wherein said search unit searches for said plurality of data files which cannot be decoded by said decode unit.

6. The recording apparatus according to claim 5, wherein said search unit searches for said plurality of data files which belong to a predetermined directory in said first information storage medium as said plurality of data files which are different in format from said content data.

7. The recording apparatus according to claim 5, wherein said search unit searches for said plurality of data files not attached with copyright information which is different in format from said content data.

8. The recording apparatus according to claim 5, wherein said storage unit stores, as one archive file, a plurality of said data files formatted in a same way read by said read unit into said second information storage medium which is incorporated in said recording apparatus.

9. A recording apparatus for recording content data to a first information storage medium which is detachable from said recording apparatus, the recording apparatus comprising:

an acceptance unit configured to accept a user operation;

a search unit configured to search said detachable first information storage medium onto which the content data is recorded by the recording apparatus for a plurality of data files which are different in format from said content data which can be reproduced by the recording apparatus;

a read unit configured to read said plurality of data files retrieved by said search unit from said first information storage medium;

a storage unit configured to store, as an archive file, said plurality of data files read by said read unit, into a second information storage medium which is incorporated in said recording apparatus;

a deletion unit configured to delete said plurality of data files, which are stored as said archive file, from said first information storage medium;

a control unit configured to control, in response to said user operation accepted by said acceptance unit, said search unit, said read unit, said storage unit, and said deletion unit; and a decode unit for decoding said content data;

wherein said search unit searches for said archive file which cannot be decoded by said decode unit.

10. The recording apparatus according to claim 9, wherein said search unit searches for said archive file which belongs to a predetermined directory in said second information storage medium.

11. The recording apparatus according to claim 9, wherein said search unit searches for said archive file not attached with copyright information.

12. A recording apparatus, in which only a dedicated application program for recording content data to a first information storage medium detachable from said recording apparatus can be started up to execute said dedicated application program immediately after a power-on sequence, the recording apparatus comprising:

an acceptance unit configured to accept a user operation;

a search unit configured to search a second information storage medium which is incorporated in said recording apparatus for an archive file;

a read unit configured to read said archive file retrieved by said search unit from said second information storage medium;

a restoration unit configured to restore a plurality of data files into said detachable first information storage medium onto which the content data is recorded by the recording apparatus on the basis of said archive file read by said read unit;

a deletion unit configured to delete said archive file stored in said second information storage medium;

a control unit configured to control, in response to said user operation accepted by said acceptance unit, said search unit, said read unit, said restoration unit, and said deletion unit; and a decode unit configured to decode said content data;

wherein said search unit searches for said archive file which cannot be decoded by said decode unit.

13. The recording apparatus according to claim 12, wherein said search unit searches for said archive file which belongs to a predetermined directory in said second information storage medium.

14. The recording apparatus according to claim 12, wherein said search unit searches for said archive file not attached with copyright information.

15. A recording apparatus comprising:
- a search block configured to search an external information storage medium onto which the content data is recorded by the recording apparatus for particular data files which have a particular attribute;
- a read block configured to read said particular data files retrieved by said search block;
- a storage controller configured to store, as an archive file, said particular data files read by said read block into an internal information storage medium;
- a deletion controller configured to delete said particular data files stored as said archive file in said external information storage medium;
- a controller configured to automatically perform control such that, in response to a user instruction, said search block searches said external information storage medium for the particular data files, said read block reads the retrieved particular data files, said storage controller records said particular data files to said internal information storage medium, and said deletion controller deletes said particular data files from said external storage medium; and
- a decoder configured to decode the content data; and
- wherein said search block searches for the particular data files which cannot be decoded by said decoder.

16. The recording apparatus according to claim 15, wherein said search block searches said external information storage medium for particular data managed by a particular directory.

17. The recording apparatus according to claim 16, wherein said search block further searches said external information storage medium for particular data of which copyright is not managed.

18. A recording apparatus comprising:
- a search block configured to search an internal information storage medium for particular data files which have a particular attribute;
- a read block configured to read the particular data files retrieved by said search block;
- a storage controller configured to restore the particular data files read by said read block into an external information storage medium;
- a deletion controller configured to delete said particular data files stored as an archive file in said internal information storage medium;
- a controller configured to automatically perform control such that, in response to a user instruction, said search block searches said internal information storage medium for particular data files, said read block reads the retrieved particular data files, said storage controller records said particular data files to said external information storage medium, and said deletion controller deletes said particular data files from said internal storage medium; and
- a decoder configured to decode the content data;
- wherein said search block searches for the particular data files which cannot be decoded.

19. The recording apparatus according to claim 18, wherein said search block searches said external information storage medium for particular data managed by a particular directory.

20. The recording apparatus according to claim 19, wherein said search block searches said internal information storage medium for particular data of which copyright is not managed.

* * * * *